United States Patent
Wakai et al.

(10) Patent No.: US 6,697,165 B2
(45) Date of Patent: Feb. 24, 2004

(54) INFORMATION PROCESSING SYSTEM AND METHOD THEREFOR

(75) Inventors: Masanori Wakai, Tokyo (JP); Masayuki Takayama, Kashiwa (JP); Aruna Rohra Suda, Yokohama (JP); Suresh Jeyachandran, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/999,140

(22) Filed: Dec. 29, 1997

(65) Prior Publication Data

US 2002/0015166 A1 Feb. 7, 2002

(30) Foreign Application Priority Data

Dec. 26, 1996 (JP) .............................. 8-348309
Feb. 28, 1997 (JP) .............................. 9-044531

(51) Int. Cl.[7] .......................... G06F 15/00; H04N 1/32
(52) U.S. Cl. .................... 358/1.11; 358/1.18; 358/443; 358/442; 382/175; 382/181
(58) Field of Search ................................ 358/404, 407, 358/434, 462, 402, 403, 442, 443, 444, 1.11, 1.15, 1.18; 382/175, 176, 173, 180, 181, 209, 287, 297, 317, 179, 182, 187, 190; 395/114; 709/218

(56) References Cited

U.S. PATENT DOCUMENTS

| | | | |
|---|---|---|---|
| 5,038,392 A | * 8/1991 | Morris et al. | 382/175 |
| 5,099,340 A | * 3/1992 | Kamada et al. | 358/403 |
| 5,126,858 A | 6/1992 | Kurogane et al. | 358/450 |
| 5,159,667 A | * 10/1992 | Borrey et al. | 707/500 |
| 5,175,684 A | * 12/1992 | Chong | 704/3 |
| 5,247,371 A | 9/1993 | Hikawa et al. | 358/448 |
| 5,247,591 A | * 9/1993 | Baran | 382/179 |
| 5,282,265 A | * 1/1994 | Rohra Suda et al. | 706/11 |
| 5,340,966 A | * 8/1994 | Morimoto | 235/376 |
| 5,359,667 A | * 10/1994 | Borowski et al. | 382/138 |
| 5,362,948 A | * 11/1994 | Morimoto | 235/376 |
| 5,452,379 A | * 9/1995 | Poor | 382/317 |
| 5,499,109 A | * 3/1996 | Mathur et al. | 358/400 |
| 5,555,325 A | * 9/1996 | Burger | 382/309 |
| 5,664,109 A | * 9/1997 | Johnson et al. | 705/2 |
| 5,671,067 A | * 9/1997 | Negishi et al. | 358/403 |
| 5,757,958 A | * 5/1998 | Shimizu et al. | 382/181 |
| 5,764,866 A | * 6/1998 | Maniwa | 395/114 |
| 5,881,168 A | * 3/1999 | Takaoka et al. | 382/180 |
| 5,926,565 A | * 7/1999 | Froessl | 382/181 |
| 5,937,084 A | * 8/1999 | Crabtree et al. | 382/137 |
| 5,963,966 A | * 10/1999 | Mitchell et al. | 707/513 |
| 5,982,502 A | * 11/1999 | Jinnai | 358/296 |
| 5,983,200 A | * 11/1999 | Slotznick | 705/26 |
| 6,141,662 A | 10/2000 | Jeyachandran | 707/104 |
| 6,157,465 A | 12/2000 | Suda et al. | 358/407 |

FOREIGN PATENT DOCUMENTS

| | | |
|---|---|---|
| EP | 0398185 | 11/1990 |
| EP | 0568140 A | 11/1993 |

* cited by examiner

Primary Examiner—Edward Coles
Assistant Examiner—Joseph R. Pokzywa
(74) Attorney, Agent, or Firm—Fitzpatrick, Cella, Harper & Scinto

(57) ABSTRACT

A document is read by a scanner, the document type is detected, and a specific block in the document, for which character recognition is to be performed, is determined. The character recognition is performed for the specific block, the obtained character strings are analyzed, and in accordance with the analysis results, document objectives, such as the extraction of data, filing, transmission to a printer or notification of transmission, are attained. A process corresponding to the attained objectives is performed for the document that has been read.

39 Claims, 112 Drawing Sheets

FIG. 13

| KINDS OF JOB | CONDITION | NOTIFICATION IN ADVANCE |
|---|---|---|
| INFORMATION RECEPTION | | NO |
| INFORMATION TRANSMISSION | DURING OFFICE HOURS | YES |
| STATUS NORMAL | | NO |
| STATUS ABNORMAL | | YES |
| OTHERS | | YES |

FIG. 14B
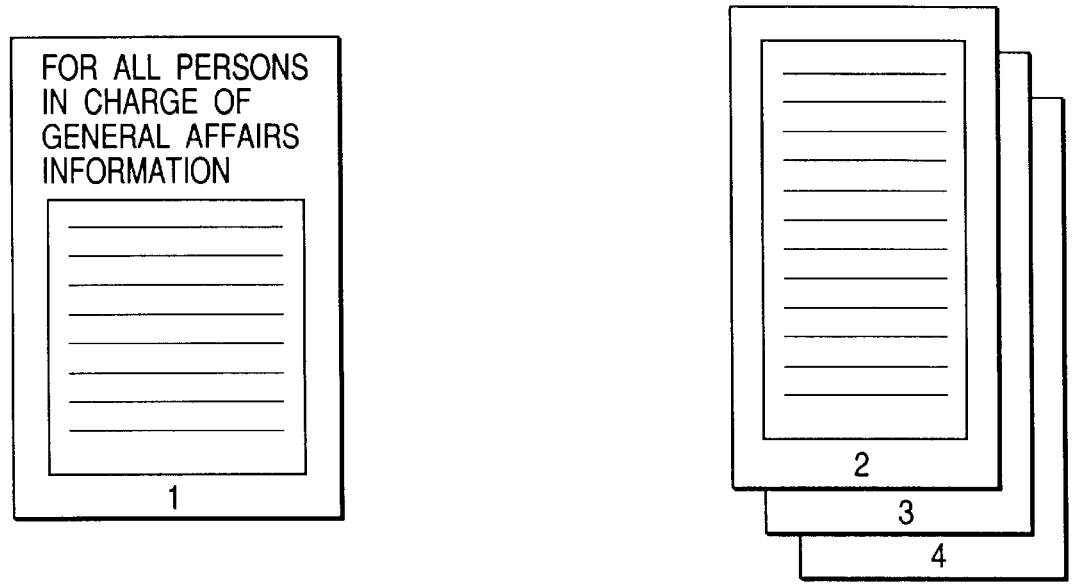
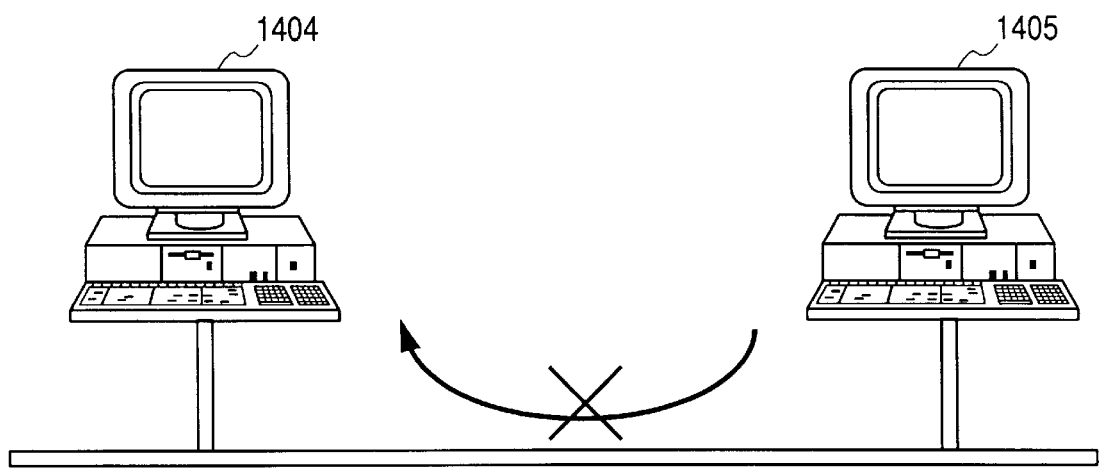

FIG. 17

INTERROGATION WINDOW

PRINTING CANNOT BE EFFECTED BY
ANY PRINTER WHICH YOU CAN USE
CHANGE TONER OF PRINTER 104 OR
FEED PAPER OF PRINTER 103

YES  NO

| JOB EXECUTION CONDITION | JOB EXECUTION CONTENTS |
|---|---|
| NO INPUT & NO JOB & POWER SUPPLY OFF PRACTICABLE PERIOD OF TIME | POWER SUPPLY OFF |

PRINT WINDOW

FILE NAME  FILE A

[PRINT]  [CANCEL]

| JOB EXECUTION CONDITION | JOB EXECUTION CONTENTS |
|---|---|
| UNCONDITIONAL | ANALIZE INPUT |
| NO INPUT & NO JOB & POWER SUPPLY OFF PRACTICABLE PERIOD OF TIME | POWER SUPPLY OFF |

INTRODUCTION OF NEW PRODUCT
SPORTS CAR FFX2

WE INTRODUCE ON DECEMBER, 1996, NEW MODEL CAR EQUIPPED WITH DX ENGINE, THE FIRST OF THE WORLD.

REFER TO TEL 0120-12345 !

FIG. 24

| INQUIRY WINDOW |
| --- |
| PRINTING BY COLOR PRINTER ? |
| YES    NO |

FIG. 25

| JOB EXECUTION CONDITION | JOB EXECUTION CONTENTS |
| --- | --- |
| NO INPUT & 10 MINUTES PASS | ATTEND TO CASE OF NO REPLY FROM USER |
| NO INPUT & NO JOB & POWER SUPPLY OFF PRACTICABLE PERIOD OF TIME | POWER SUPPLY OFF |

FIG. 26

| TIME | SCHEDULE | WHERE TO MAKE CONTACT | PREARRANGED MATERIALS FOR USE |
| --- | --- | --- | --- |
| 12/5 10:00 TO 12:00 | CONFERENCE | EXT 12345 | NO |
| 12/5 13:00 TO 15:00 | BUSINESS TALK | 03-3210-9876 | FILE A |

FIG. 27

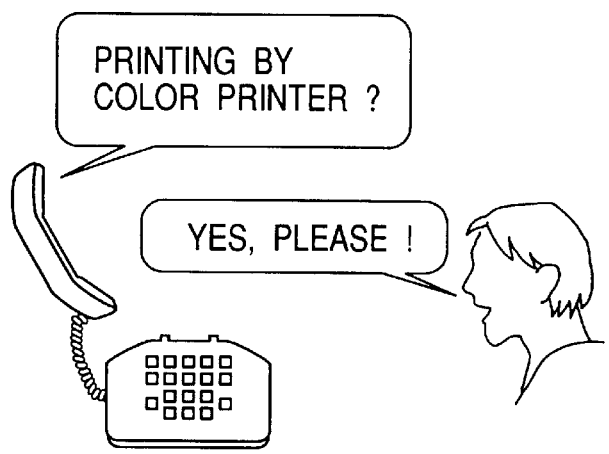

FIG. 28

| JOB EXECUTION CONDITION | JOB EXECUTION CONTENTS |
|---|---|
| NO INPUT | ATTEND TO CASE OF NO REPLY FROM USER |
| NO INPUT & NO JOB & POWER SUPPLY OFF PRACTICABLE PERIOD OF TIME | POWER SUPPLY OFF |

FIG. 29

| JOB EXECUTION CONDITION | JOB EXECUTION CONTENTS |
|---|---|
| PRINTER STATUS "IN PRINTING" HAS BEEN CHANGED TO OTHER STATUS | EFFECT PROCESSING CORRESPONDING TO STATUS |
| NO INPUT & NO JOB & POWER SUPPLY OFF PRACTICABLE PERIOD OF TIME | POWER SUPPLY OFF |

FIG. 30

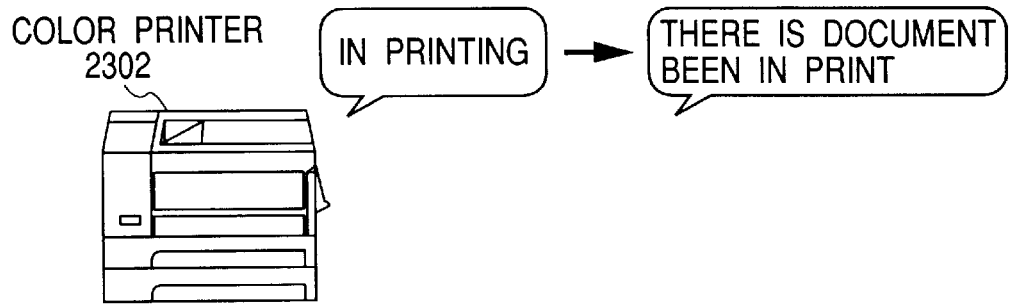

FIG. 31

| PRINTER STATUS | STATUS MEANING |
|---|---|
| NORMAL | NORMAL |
| IN PRINTING | IN PRINTING |
| PRINTED DOCUMENTS ARE THERE | PREVIOUSLY PRINTED DOCUMENTS REMAIN IN TRAY |

FIG. 32

| JOB EXECUTION CONDITION | JOB EXECUTION CONTENTS |
|---|---|
| PRINTER STATUS IS THAT ALREADY PRINTED DOCUMENT REMAIN AS IS AND 10 MINUTES PASS | ATTEND TO CASE OF REMAINDER OF ALREADY PRINTED DOCUMENT |
| NO INPUT & NO JOB & POWER SUPPLY OFF PRACTICABLE PERIOD OF TIME | POWER SUPPLY OFF |

FIG. 33
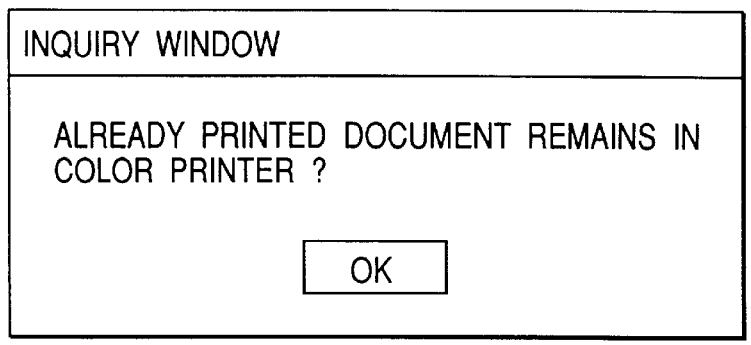
FIG. 34
| JOB EXECUTION CONDITION | JOB EXECUTION CONTENTS |
|---|---|
| PRINTER STATUS IS OTHER THAN "ALREADY PRINTED DOCUMENT REMAIN" | LOOK JOB OVER AGAIN IN RESPONSE TO STATUS "ALREADY PRINTED DOCUMENT REMAIN" |
| NO INPUT & 10 MINUTES PASS | ATTEND TO CASE OF NO REPLY FROM USER |
| NO INPUT & NO JOB & POWER SUPPLY OFF PRACTICABLE PERIOD OF TIME | POWER SUPPLY OFF |
FIG. 35
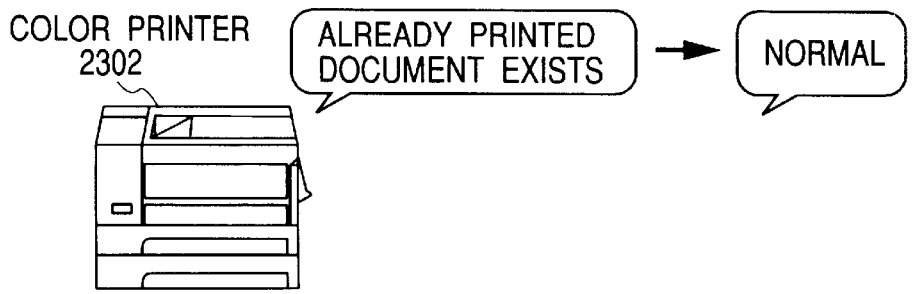

FIG. 36

| USER OBJECT | PREMISE CONDITION | PLAN & ACTION |
|---|---|---|
| ACQUIRE ALREADY PRINTED DOCUMENT | ALREADY PRINTED DOCUMENT EXISTS | (1) FIND PLACE OF DOCUMENT<br>(2) ACCESS TO THE PLACE<br>(3) ACQUIRE ALREADY PRINTED DOCUMENT |
| ALREADY PRINTED DOCUMENT EXISTS | PRINT SOURCE DOCUMENT EXISTS & DOCUMENT WHICH MEETS REQUEST IS IN PRINTABLE PRINT ENVIRONMENT | (1) GIVE INSTRUCTIONS FOR PRINTING |
| APPROVAL EXPRESSION | INQUIRY IS MADE | (1) BY USE OF VOICE, MOUSE OPERATION ETC. APPROVAL EXPRESSION OPERATION |
| OPPOSITION EXPRESSION | INQUIRY IS MADE | (1) BY USE OF VOICE, MOUSE OPERATION ETC. OPPOSITION EXPRESSION OPERATION |

FIG. 37

| SYSTEM OBJECT | PREMISE CONDITION | PLAN & ACTION |
|---|---|---|
| ATTAIN USER OBJECT | SYSTEM IS STABLE | (1) ANALIZE USER OBJECT<br>(2) PLANNING TO ATTAIN OBJECT<br>(3) EXECUTE |
| SYSTEM IS STABLE | SYSTEM IS ABNORMAL | (1) NORMALIZE SYSTEM |
|  | NO JOB IN EXECUTION & POWER SUPPLY OFF POSSIBLE PERIOD OF TIME | (1) POWER SUPPLY OFF |
| ANALIZE USER OBJECT | INPUT PRESENT | (1) ANALIZE INPUT |
| TRANSFER ALREADY PRINTED DOCUMENT TO USER | ALREADY PRINTED DOCUMENT EXISTS | (1) SHOW PLACE WHERE DOCUMENT EXISTS |
| ALREADY PRINTED DOCUMENT EXISTS | PRINT SOURCE DOCUMENT EXISTS & CLARIFY PRINT CONDITION & PRINT ENVIRONMENT IS NORMAL | (1) SELECT PRINT ENVIRONMENT<br>(2) EXECUTE PRINTING |
| PRINT SOURCE DOCUMENT EXISTS |  | (1) PREPARE PRINT SOURCE DOCUMENT |
| CLARIFY PRINT CONDITION |  | (1) INQUIRE OF USER |
| PRINT ENVIRONMENT IS NORMAL | PRINT ENVIRONMENT IS ABNORMAL | (1) NORMALIZE PRINT ENVIRONMENT |
| ACQUIRE USER INTENTION | PREDETERMINED PERIOD OF TIME PASS | (1) PLANNING AGAIN |

FIG. 39

| PROPERTY | ORIGINAL DOCUMENT | COLOR PRINTER BJC600 | BLACK AND WHITE PRINTER LBP9000 |
|---|---|---|---|
| PRINTER TYPE | | BJ | LBP |
| COLOR OR BLACK AND WHITE | IN COLOR | COLOR | BLACK AND WHITE |
| RUNNING COST | | 20 YEN/SHEET | 5 YEN/SHEET |
| PRINTING SPEED | | 5 SHEETS/MIN. | 20 SHEETS/MIN. |
| ORIGINAL PAPER SIZE | A4 | A4 | A3 |
| OUTPUT PAPER SIZE | | A4 | A3 |
| USABLE PAPER KIND | | ORDINARY, BJ, OHP | ORDINARY, OHP |
| VARIABLE REPRODUCTION RATIOS POSSIBLE | | NOT POSSIBLE | 50% TO 200% |
| LAYOUT POSSIBLE | | NOT POSSIBLE | VERTICAL · HORIZONTAL · QUADRIPARTITE |
| PRINTING DIRECTION | | CHANGEABLE | CHANGEABLE |
| METHOD OF FEEDING PAPER | | MANUAL FEED, CARTRIDGE | MANUAL FEED, A3 CARTRIDGE, A4 CARTRIDGE |
| TWO-SIDED COPY POSSIBLE | | NOT POSSIBLE | POSSIBLE |
| BINDING DIRECTION DESIGNATION | | POSSIBLE | POSSIBLE |
| BINDING MARGIN DESIGNATION | | POSSIBLE | POSSIBLE |
| FONT DESIGNATION | | POSSIBLE | POSSIBLE |

FIG. 40

| STATUS | COLOR PRINTER BJC600 | BLACK AND WHITE PRINTER LBP9000 |
|---|---|---|
| OPERATION STATE | NORMAL | NORMAL |
| REMAINING PAPER QUANTITY | 80% OR MORE | 80% OR MORE |
| REMAINING TONER QUANTITY | 80% OR MORE | 80% OR MORE |
| ALREADY PRINTED DOCUMENT | NO | [USER A DOCUMENT] [USER B DOCUMENT] |

FIG. 53

| QUALITY | ITEM | PRINTER A | PRINTER B |
|---|---|---|---|
| 1 | PRINTING PERIOD OF TIME/ONE CHARACTER | 100ms | 200ms |
| | CONSUMPTION OF TONER/ONE CHARACTER | 100mg | 200mg |
| 2 | PRINTING PERIOD OF TIME/ONE CHARACTER | 200ms | 400ms |
| | CONSUMPTION OF TONER/ONE CHARACTER | 200mg | 400mg |
| 3 | PRINTING PERIOD OF TIME/ONE CHARACTER | 300ms | 600ms |
| | CONSUMPTION OF TONER/ONE CHARACTER | 300mg | 600mg |
| 4 | PRINTING PERIOD OF TIME/ONE CHARACTER | 400ms | 800ms |
| | CONSUMPTION OF TONER/ONE CHARACTER | 400mg | 800mg |
| 5 | PRINTING PERIOD OF TIME/ONE CHARACTER | 500ms | 1000ms |
| | CONSUMPTION OF TONER/ONE CHARACTER | 500mg | 1000mg |

FIG. 56

PRINT JOB CONTENTS

CONFERENCE MATERIAL

NEW MODEL PRINTER LBPXXX

- FIRST A1 COMPATIBLE PRINTER IN THE WORLD
- HIGH SPEED PRINTING OF 1000 SHEETS/MIN
- BATTERY-OPERATED

LPBXXX TO BE RELEASED THIS SPRING HAS THREE FEATURES THAT ARE FIRST PROVIDED IN THE WORLD:
FIRST, PRINTING OF SHEETS OF A1 SIZE; SECOND, FAST PRINTING OF 1000 SHEETS PER MINUTE; AND THIRD, ENHANCED PORTABILITY USING A BATTERY, WHILE IMPLEMENTING SUCH HIGH PERFORMANCES.

| PRODUCT | PRICE | RELEASED | REMARKS |
|---------|-------|----------|---------|
| xxx     | 9999  | 95-3     |         |
| yyy     | 8888  | 95-4     |         |
| zzz     | 7777  | 95-5     |         |
| aaa     | 6666  | 95-6     |         |

PRINT JOB SETUP

PRINT COPIES [1] SHEET          DETAILS SETUP

PRIORITY ○          ○          ●

URGENCY — THIS WEEK / TODAY / 1 HOUR / 10 MIN / ● 1 MIN

ECONOMICS — HIGH / ● / LOW

QUALITY — HIGH / ● / LOW

PRINT JOB SETUP PARAMETER

[PRINT] [CLOSE] [CANCEL]

FIG. 58B

| INPUT | MEANING | REQUEST ITEM |
|---|---|---|
| PRINT | ACTION (PRINT) | OBJECT, QUALITY, NUMBER OF SHEETS |
| TRANSMIT | ACTION (TRANSMISSION) | OBJECT, DESTINATION |
| CLIENT | QUALITY (HIGH DIGNITY) | |
| MEMBER | QUALITY (UNRESTRICTED) | |
| SHEET | NUMBER OF SHEETS | NUMBER |

FIG. 59

PRINT JOB CONTENTS

CONFERENCE MATERIAL

NEW MODEL PRINTER LBPXXX

- FIRST A1 COMPATIBLE PRINTER IN THE WORLD
- HIGH SPEED PRINTING OF 1000 SHEETS/MIN
- BATTERY-OPERATED

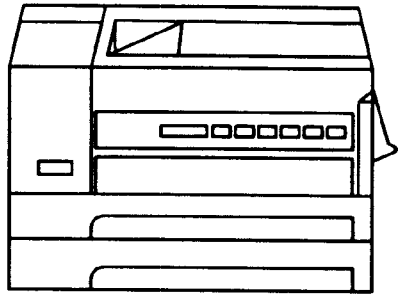

LPBXXX TO BE RELEASED THIS SPRING HAS THREE FEATURES THAT ARE FIRST PROVIDED IN THE WORLD:
FIRST, PRINTING OF SHEETS OF A1 SIZE; SECOND, FAST PRINTING OF 1000 SHEETS PER MINUTE; AND THIRD, ENHANCED PORTABILITY USING A BATTERY, WHILE IMPLEMENTING SUCH HIGH PERFORMANCES.

| PRODUCT | PRICE | RELEASED | REMARKS |
|---|---|---|---|
| xxx | 9999 | 95-3 | |
| yyy | 8888 | 95-4 | |
| zzz | 7777 | 95-5 | |
| aaa | 6666 | 95-6 | |

| DESTINATION | NUMBER OF SHEETS |
|---|---|
| CLIENT | 1 COPY |
| ABC PROJECT | 5 COPIES |

FIG. 81

CANON

DATE: NOV 25, 1996

TO: MACROHARD CORP.
ATTN: MR. JOHN SMITH
TEL: 001-1-(415)-394-1111
FAX: 001-1-(415)-394-2312

FROM: CANON INC.
SENDER: DR. ROHRA
TEL: +81-44-543-3333
FAX: +81-44-543-5555

DEAR SIR,

THANK YOU FOR YOUR PHONE CALL THIS MORNING.

PLEASE FIND ENCLOSED HERE WITH THE INFORMATION REGARDING THE HOTEL ACCOMMODATION AND OTHER TRAVEL INFORMATION FOR YOUR FORTH COMING TRIP TO JAPAN. I WILL BE COMING TO YOKOHAMA CITY AIR TERMINAL TO PICK YOU UP, HENCE KINDLY CALL ME AT MY RESIDENCE, AFTER YOU BOARD THE LIMOUSINE BUS.

HOTEL ACCOMMODATION FOR YOUR TRIP IS AS FOLLOWS:
        HOTEL: SHIN-YOKOHAMA PRINCE HOTEL
        PERIOD OF STAY: 18TH DEC 1996 - 22ND DEC 1996 (4 NIGHTS)

HAVE A PLEASANT JOURNEY,

WITH REGARDS, (ARUNA ROHRA)

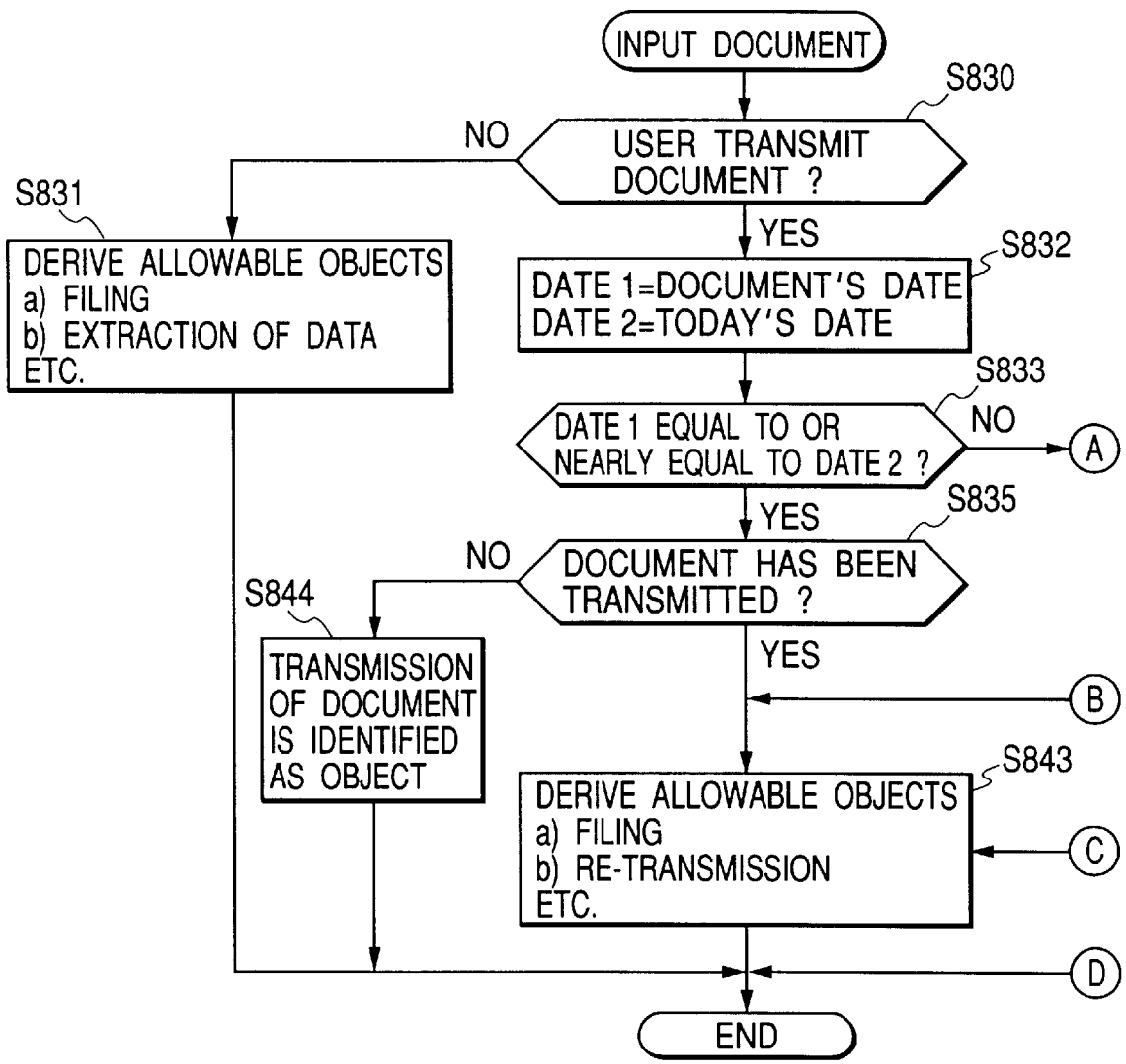

FIG. 88

| CHARACTER STRING | CONCEPTION | ROLE | CONDITION |
|---|---|---|---|
| TO:<br>FROM:<br>ATTN:<br>RECEIVER:<br>SENDER:<br>DATE:<br>TEL:<br>TEL:<br>FAX:<br>FAX:<br>... | CO. NAME OR NAME<br>CO. NAME OR NAME<br>NAME<br>NAME<br>NAME<br>DATE<br>TELEPHONE NUMBER<br>TELEPHONE NUMBER<br>FAX NUMBER<br>FAX NUMBER<br>... | RECEPTION CO. NAME OR NAME<br>TRANSMISSION CO. NAME OR NAME<br>RECEIVER NAME<br>RECEPTION NAME<br>SENDER NAME<br>DATE MAILED<br>SENDER TELEPHONE NO.<br>RECEIVER TELEPHONE NO.<br>SENDER FAX NO.<br>RECEIVER FAX NO.<br>... | DOCUMENT HEAD<br>SENDER COLUMN<br>RECEIVER COLUMN<br>SENDER COLUMN<br>RECEIVER COLUMN |

FIG. 89

| CHARACTER STRING | CONCEPTION | ROLE | ACTION |
|---|---|---|---|
| NOTIFYME:<br>NOTIFYHIM:<br>FILE:<br>KEYWORDS:<br>... | NOTIFICATION METHOD<br>NOTIFICATION METHOD<br>DIRECTORY NAME<br>KEYWORD<br>... | METHOD OF NOTIFYING SENDER<br>METHOD OF NOTIFYING RECEIVER<br>FILING PLACE<br>INDEX<br>... | NOTIFY SENDER<br>NOTIFY RECEIVER<br>FILING<br>PREPARE INDEX<br>... |

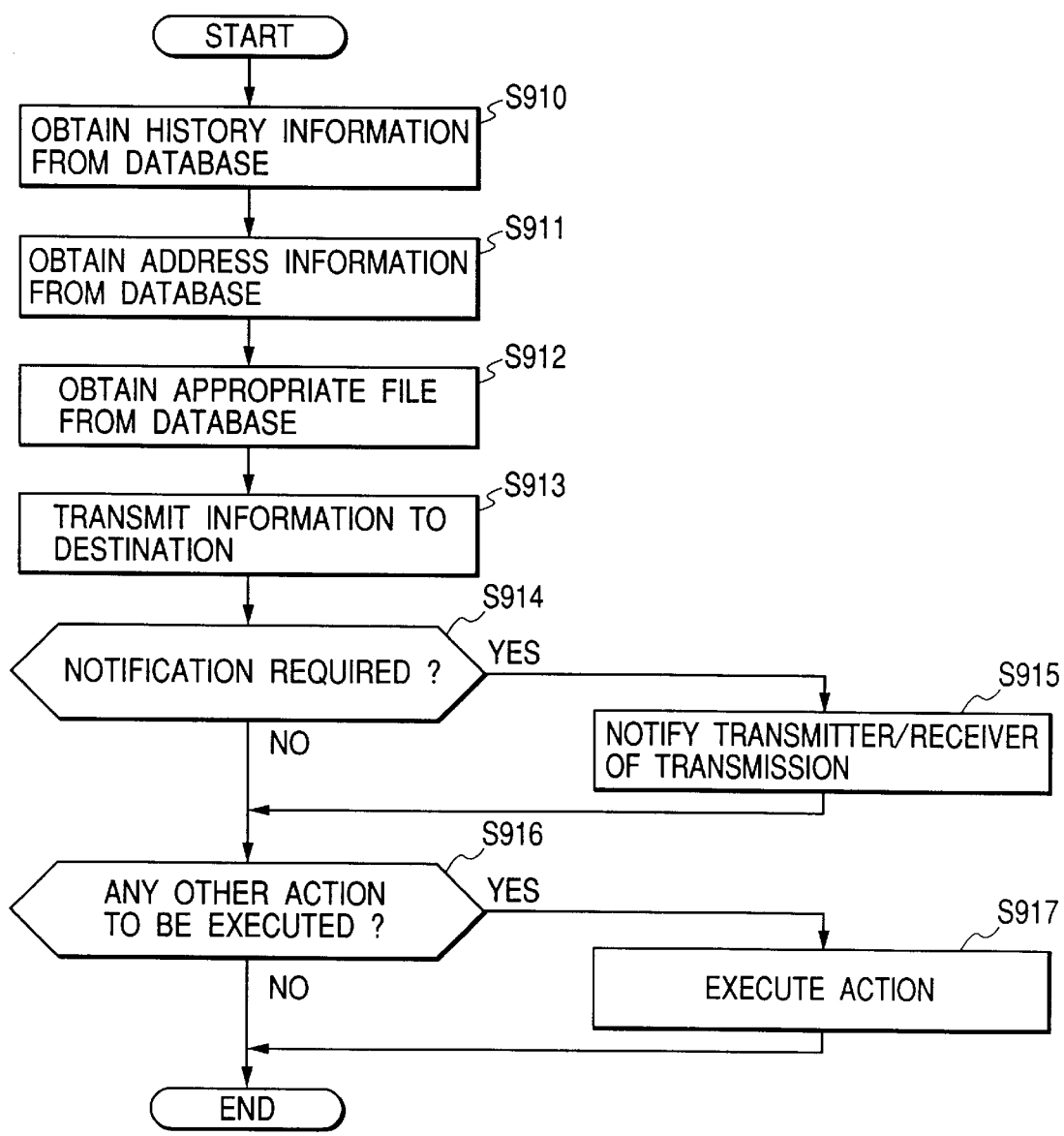

FIG. 92

DATE: NOV 22, 1996

TO: CANON INC.
ATTN: DR. ARUNA ROHRA
TEL: +81-44-543-3333
FAX: +81-44-543-5555

FROM: MACROHARD CORP.
SENDER: MR. JOHN SMITH
TEL: (415)-394-1111
FAX: (415)-394-2312

DEAR DR. ROHRA,

THANK YOU FOR YOUR FAX.

I WILL BE REACHING YOKOHAMA AT 3:00 PM ON 28TH NOVEMBER.
SINCE I AM COMING FOR THE FIRST TIME TO YOKOHAMA AND AS I AM NOT VERY FLUENT IN JAPANESE, I WOULD BE GRATEFUL IF YOU COULD KINDLY MEET ME AT THE STATION.

THANKING YOU,

YOURS SINCERELY,

JOHN SMITH

FIG. 93

SYSTEM: YOU ARE SUPPOSED TO MEET MR. JOHN ON 28TH, BUT WHAT WOULD YOU DO ?

USER: ASK MR. TANAKA TO MEET HIM, WILL YOU ?

SYSTEM: CERTAINLY.

FIG. 94

SUBJECT: JOHN'S VISIT
DATE: FRI, 23 NOV 1996 17:57:22+0900
FROM: IDCP < IDCP@abc.canon.co.jp >
REPLY-TO: IDCP < IDCP@abc.canon.co.jp >
ORGANIZATION: CANON INC.
TO: tanaka@dos.canon.co.jp
REFERENCES:

MR. JOHN ARRIVES AT YOKOHAMA ON 28TH. ROHRA WOULD LIKE YOU TO MEET HIM AND TAKE CARE OF HIM.

I ATTACH THE FACSIMILE FROM HIM FOR YOUR REFERENCE.
THANK YOU.

-YOUR FAVOURITE FRIEND! ;-)

| | BEGINNER | SENIOR |
|---|---|---|
| FAX | STANDARD UI | STANDARD UI +MULTI-ADDRESS COMMUNICATION UI |

FIG. 121

| TIME | DIRECTOR | ACTION |
|---|---|---|
| 1996/7/5 10:00 | TOM | TRANSMIT FILE ABC TO A CO. MR. A |
| 1996/7/3 18:50 | MARY | TAKE TEN COPIES OF FILE XYZ |

INFORMATION PROCESSING SYSTEM AND METHOD THEREFOR

BACKGROUND OF THE INVENTION

1. Field of the Invention

The present invention relates to an information processing system that performs a process for inputting information, and a method therefor.

2. Related Background Art

A facsimile machine for reading and transmitting image information has been widely employed.

An image filing device for reading image information and recording it on a magneto optical disk is also employed.

In addition, a character recognition process is performed for such a retrieved image to acquire character code information from the image information.

In the above described conventional technique, however, a user must designate a designation for the transmission of images by a facsimile machine, and must designate a filing destination for the filing of images in an image filing device. To perform character recognition, a user must designate a target block for recognition after an entire image has been read.

In every case, therefore, various designations by a user are required to perform a process for inputting information. In addition, for a composite device such that only a single device can implement a plurality of functions, a function to be performed must also be designated.

In order to extract effective data from character strings obtained by character recognition and to utilize the data, operations by a user, such as searching for effective data, processing the data as needed and storage of the resultant data in an appropriate location, are required.

SUMMARY OF THE INVENTION

It is, therefore, one objective of the present invention to provide an information processing system that can reduce the operating load placed on a user to perform an adequate process for inputting information, and a control method therefor.

It is another objective of the present invention to provide an information processing system that can extract and store useful data contained in input information, and a control method therefor.

According to one aspect, the present invention which achieves these objectives relates to an information processing apparatus comprising:

input means for inputting information;

analysis means for analyzing the information input by the input means;

understanding means for understanding an object of the input; and execution means for performing a process for the information in accordance with the object.

According to another aspect, the present invention which achieves these objectives relates to an information processing method comprising:

an input step of inputting information;

an analysis step of analyzing the information input at the input step;

an understanding step of understanding an object of the input; and an execution step of performing a process for the information in accordance with the object.

According to an additional aspect, the present invention which achieves these objectives relates to a computer-readable storage medium on which is stored an information processing program for controlling a computer to perform information processing, the program comprising codes for causing the computer to perform:

an input step of inputting information;

an analysis step of analyzing the information input at the input step;

an understanding step of understanding an object of the input; and an execution step of performing a process for the information in accordance with the object.

Other objectives and advantages in addition to those discussed above will become apparent to those skilled in the art during the course of the description of the preferred embodiments of the invention that follows. In the description, reference is made to accompanying drawings, which form a part thereof, and which illustrate an example of the invention. Such example, however, is not exhaustive of the various embodiments of the invention, and therefore reference is made to the claims that follow the description for determining the scope of the invention.

BRIEF DESCRIPTION OF THE DRAWINGS

FIG. 13 is a table containing remarks for determining whether or not an advance notice should be transmitted in consonance with job types and conditions;

FIGS. 14A and 14B are respectively diagrams of a case where a user is informed in advance of information to be filed and a case where unnecessary information is abandoned;

FIG. 17 is a diagram showing an example display for a window by which an optimal method is proposed to a user;

FIG. 24 is a diagram showing an inquiry window;

FIG. 25 is an example job table;

FIG. 26 is a diagram showing example scheduling data;

FIG. 27 is a diagram showing an example user query;

FIG. 28 is an example job table;

FIG. 29 is an example job table;

FIG. 30 is a diagram showing an example change in the status of a printer;

FIG. 31 is a table showing printer statuses;

FIG. 32 is an example job table;

FIG. 33 is a diagram showing a query window;

FIG. 34 is an example job table;

FIG. 35 is a diagram showing an example printer change status;

FIG. 36 is a table for displaying planning and action rules;

FIG. 37 is a table for displaying planning and action rules;

FIG. 39 is a table for example apparatus properties;

FIG. 40 is a table for example apparatus statuses;

FIG. 53 is a table showing printing periods and consumption of toner for a plurality of printers for printing a single character;

FIG. 56 is a diagram showing the contents of a print job and parameters designated by a user;

FIG. 58B is a table showing the meanings of character strings in the parameter setup, and request items with which to complete the meanings;

FIG. 59 is a diagram showing an example where parameters of a print job are set by using a document;

FIG. 81 is a diagram showing an example document from which data are to be extracted;

FIG. 88 is a table showing knowledge of a common knowledge base;

FIG. 89 is a table showing knowledge of a common knowledge base in a field specified on a cover page;

FIG. 91 is a flowchart showing the processing performed according to a thirtieth embodiment;

FIG. 92 is a diagram illustrating an example input document;

FIG. 93 is a diagram showing the contents of a conversation between a system and a user;

FIG. 94 is a diagram showing an output document that a system prepares based on the judgement of the conversation;

FIG. 120 is a flowchart for the processing performed by a server according to the fortieth embodiment;

FIG. 121 is a table showing example updated history information;

FIG. 122 is a diagram illustrating an example wherein an operation is performed based on history;

FIG. 123 is a diagram illustrating the example wherein the operation is performed based on history;

FIG. 124 is a diagram showing an example structure for a controller;

FIG. 125 is a diagram showing another example structure for a controller; and

FIG. 126 is a diagram showing an additional example structure for a controller.

DETAILED DESCRIPTION OF THE PREFERRED EMBODIMENTS

The preferred embodiments of the present invention will now be described while referring to the accompanying drawings.

[First Embodiment]

Figure 1:
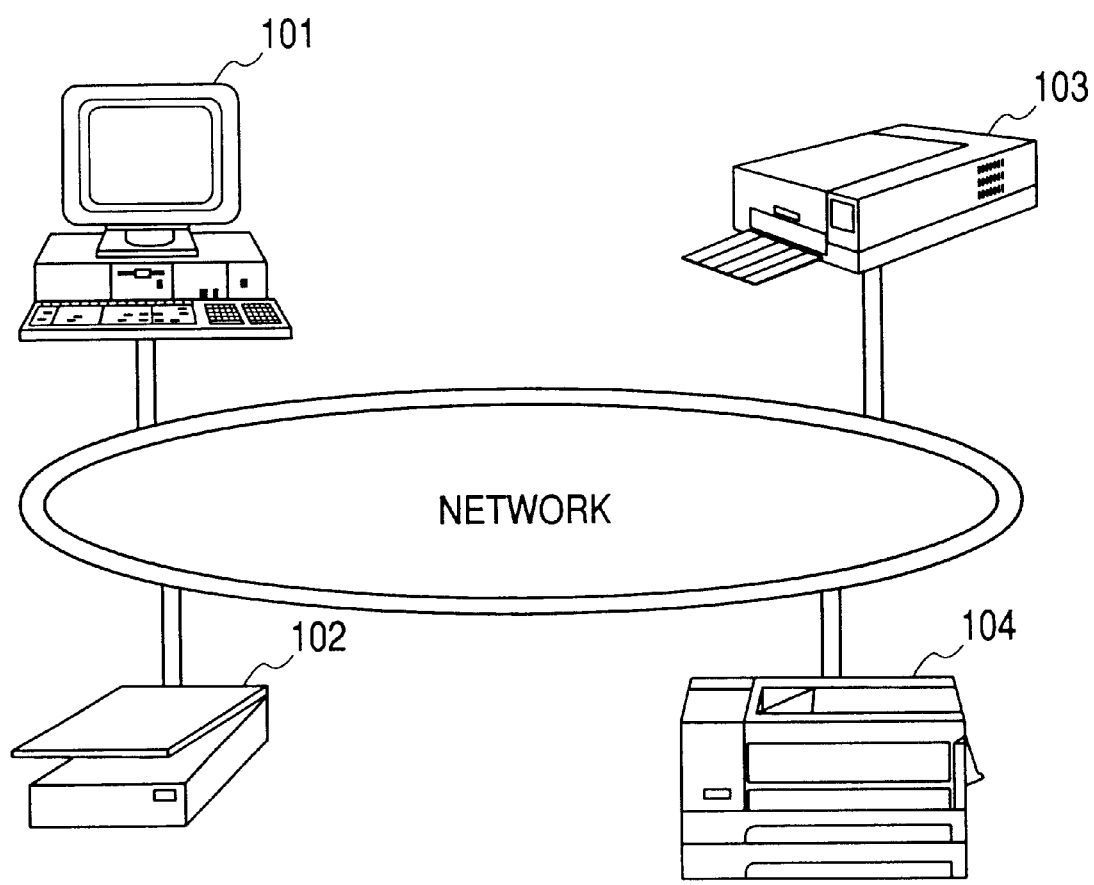
FIG. 1 is a block diagram illustrating the arrangement of an information processing system according to a first embodiment of the present invention.

FIG. 1 is a diagram illustrating a system arrangement according to a first embodiment in which a PC (Personal Computer) 101, a scanner 102, a color printer 103 and a monochrome printer 104 are connected to a network.

In this embodiment, when an apparatus in a system wherein a plurality of apparatuses are connected together is instructed to execute a specific job, the apparatus analyzes the object of the job by examining its contents, and thus ascertains which job to execute. As a result of the analysis, the apparatus acquires necessary information concerning the job and thereafter executes it.

If for the execution of a job there is available a more effective method or another and better apparatus than an instructed method or an assigned apparatus, an instruction is issued to the better apparatus or a notice is transmitted to a user to propose the use of the more effective method. Further, as a consequence of the examination of the contents of the job the instruction may be rejected.

Job types are an operation input by a user, an execution of an instruction received from another apparatus, the acquisition of results by analyzing a job, or a job that is newly generated by an owned apparatus during an idling period. When, for example, a document is to be read by a scanner and printed by a printer, the following jobs are generated.

(1) Analysis of the contents of an instruction that is transmitted from a user to a scanner and that is related to a document set in the scanner;
(2) A reading and analyzation process for a document, and an instruction process for instructing a printer to print a document that has been read, both of which are generated by analyzing an instruction from a user that is received by the scanner (and the fact that the document has been set in the scanner).
(3) Generation by the scanner of a printing instruction for a printer during the instruction process.
(4) Generation of a printing process by the printer as a result of an analysis of the printing instruction received from the scanner.

A method for generating and managing these jobs will later be described in detail by referring to an eleventh and following embodiments.

The procedures according to which a plurality of apparatuses execute the above described processes will be specifically described while referring to the drawings.

Figure 2:
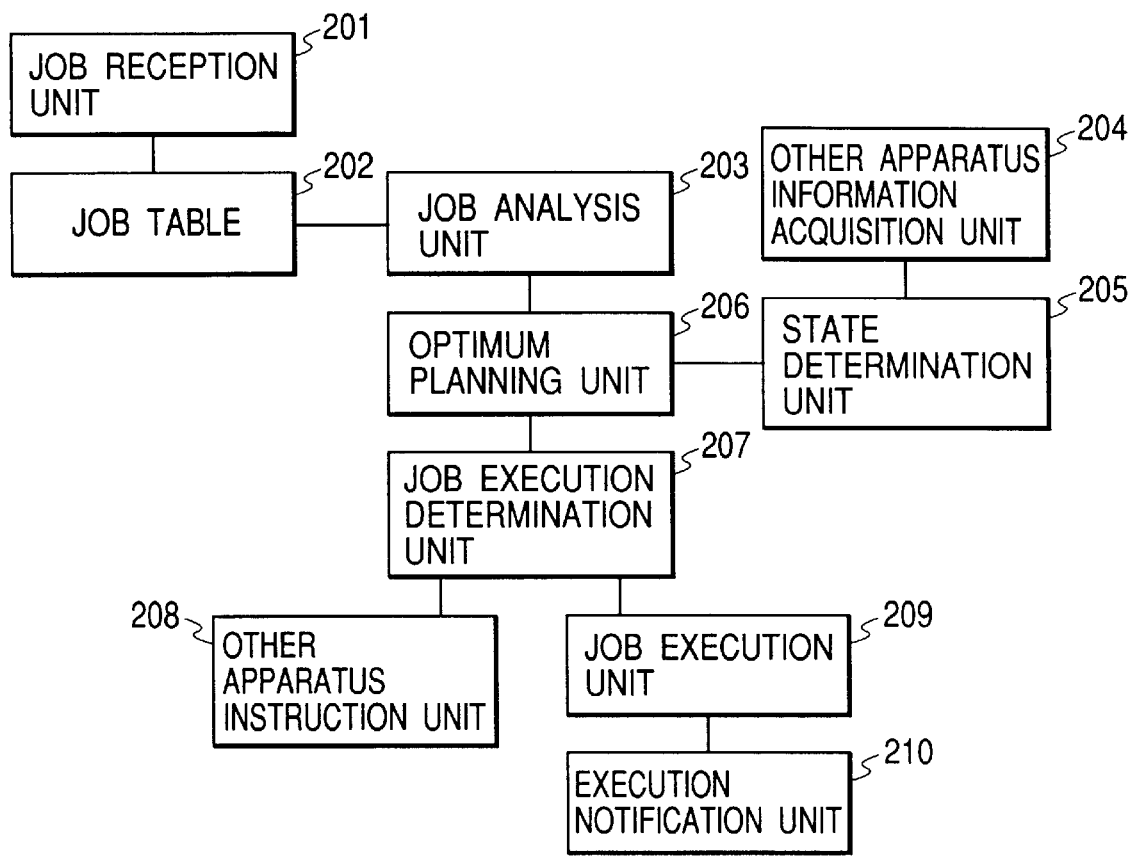
FIG. 2 is a diagram illustrating the functional arrangement according to the first embodiment.

FIG. 2 is a diagram illustrating the functional arrangement for performing the processing in this embodiment. A job reception unit 201 receives a job from a user or another apparatus. The received job is registered in a job table. A job analysis unit 203 reads and analyses a job registered in the job table 202. Another apparatus information acquisition unit 204 acquires the attributes and the current states of the other apparatuses that are connected. A state determination unit 207 determines the state from the current states of the other apparatuses.

An optimum planning unit 206 makes an optimal plan for the execution of a job. A job execution determination unit 207 determines whether a job should be executed, or when the job is to be executed, and determines whether an owned apparatus or another apparatus will execute the job. When another apparatus executes the job, another apparatus instruction unit 208 sends an instruction to another apparatus for the job execution. When the owned apparatus executes the job, a job execution unit 209 executes the job. An execution notification unit 210 notifies a user that the execution instruction has been issued to another apparatus.

Figure 3:
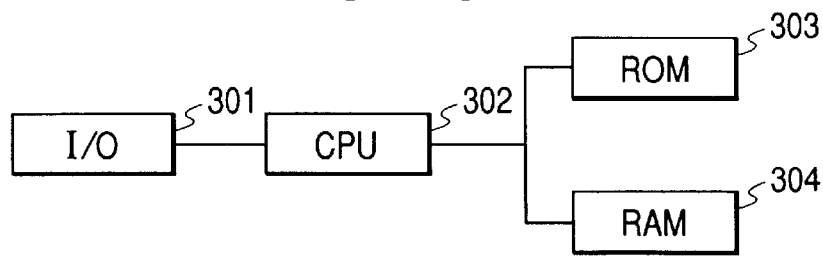
FIG. 3 is a diagram illustrating the hardware arrangement of the individual units according to the first embodiment.

FIG. 3 is a diagram showing the hardware arrangement of the units that perform the processing in this embodiment.

An I/O 301 exchanges input/output data with external apparatuses. A CPU 302 executes a program and controls the individual units. A ROM 303 is used to store programs, which correspond to individual flowcharts that will be described later and which are to be executed by the CPU 302, and fixed data. A RAM 304 is used to temporarily store variables and intermediate data, such as the attributes and the current states of the other apparatuses acquired by the other apparatus information acquisition unit 204, that are generated during the processing. A program from an external source may be loaded into the RAM 304 and stored therein.

Figure 4:
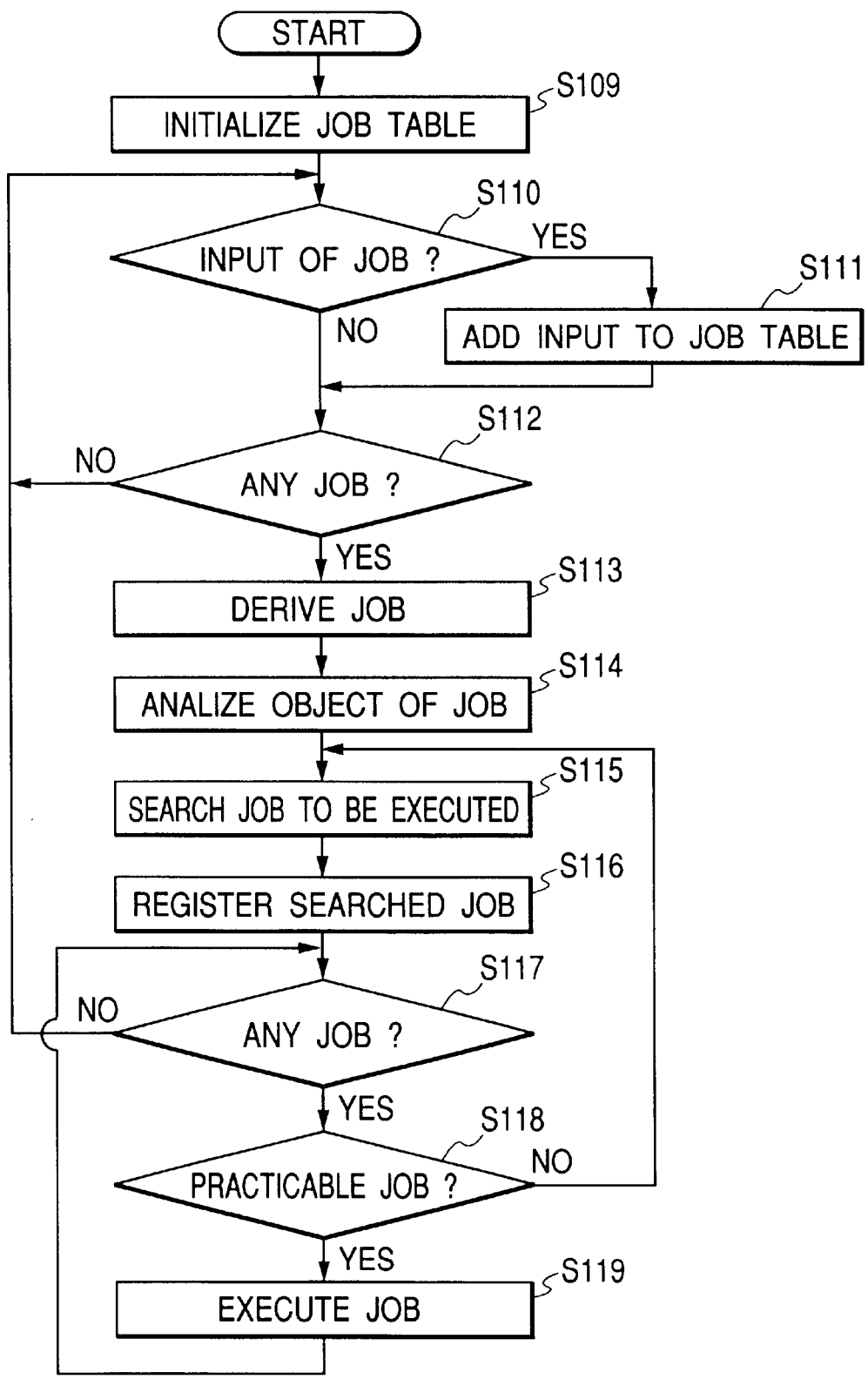
FIG. 4 is a flowchart showing the processing performed for the first embodiment.

FIG. 4 is a flowchart showing the processing performed for the first embodiment.

At step S109, the contents of the job table are initialized. At step S110, in order to determine whether a job has been input, a check is performed to determine whether or not a job has been input by a user, a job has been input by a device that can be detected by the system, from results obtained by analyzing the job, or a new job has been generated by an owned apparatus during idling. When a job has been input, at step S111, the input job is added to the job table. At step S112, the job table is examined to determine whether there is job. If there is a job, at step S113 the job is extracted. At step S114 a received instruction is analyzed, and from the information thus obtained, the object of the job is acquired. At step S115, the analyzed instruction is employed to search for a job that is to be executed. At step S116 a job that is searched for at S115 is registered.

At step S117 a check is performed to determine whether or not there is a job that has not yet been executed. If there is such a job, program control advances to step S118. At step S118 a check is performed to determine whether or not the job can be executed. When it is ascertained that the job can not be executed, program control returns to step S115 and a job that must be executed is searched for. At step S119 the job is executed and program control returns thereafter to step S117.

If a user sends an instruction, for example, to read a document using a scanner and to print the document using a printer, it is assumed that, as a result of the analysis, the acquisition of a printed document is the object of a user. In this case, a document reading and analysis process, which is generated by analyzing information received by the scanner from the user, and a process for instructing a printer to print the document that has been read are searched for as jobs. These processes will be described in detail during the course of the eleventh and the following embodiments while referring to specific examples.

Figure 5:
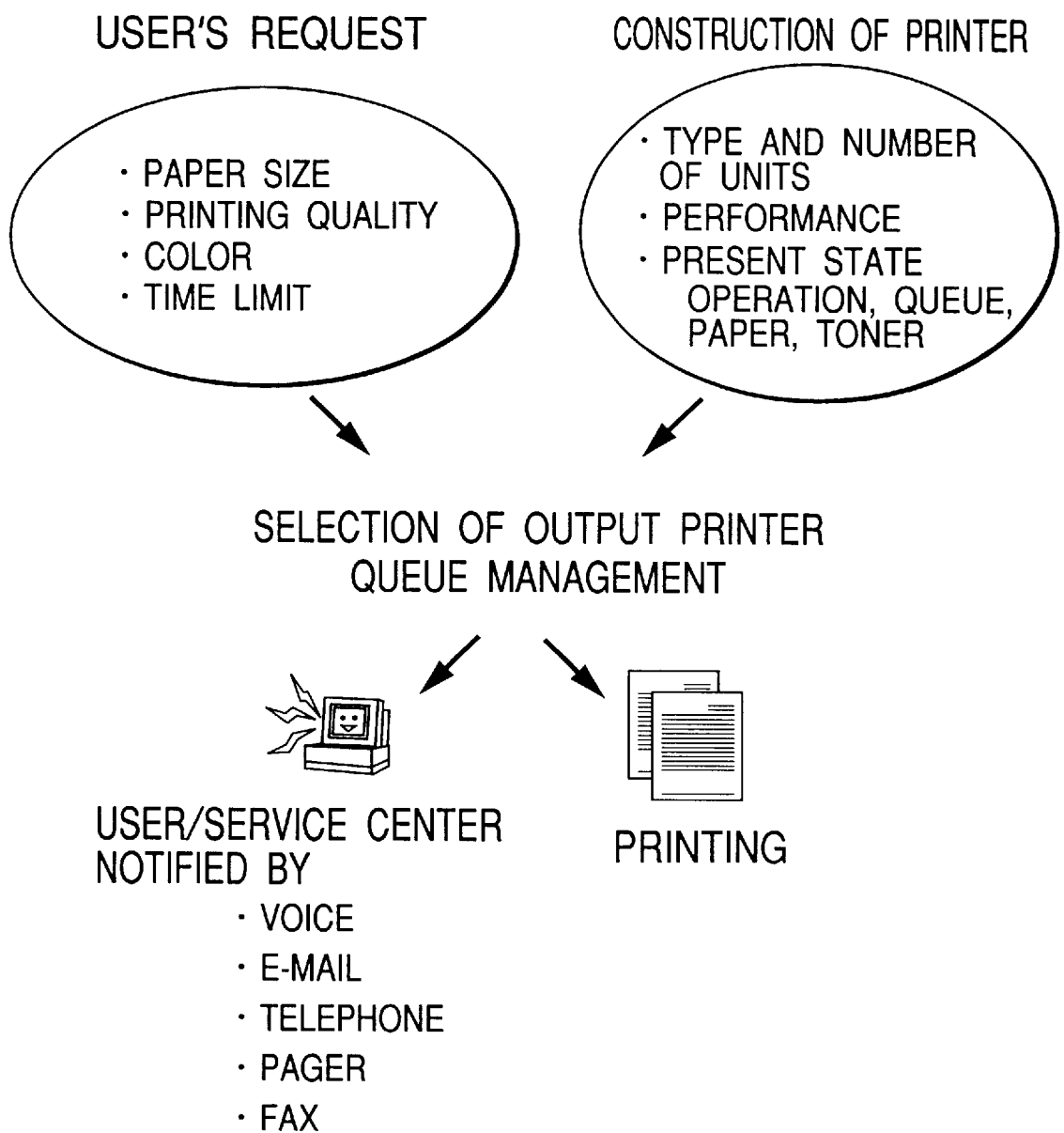
FIG. 5 is a diagram showing a process for selecting an optimal printer from a plurality of printers and performing a printing job with it.

FIG. 5 is a diagram showing a process for selecting from among a plurality of printers an optimal printer for performing printing.

In FIG. 5, job information is input/transmitted as a command from a host computer or an instruction from a remote controller, or is obtained by analyzing a voice command issued by a user using natural language, or from bar code or a sentence read from a cover page.

A device that has received the job information analyzes the job, and then selects a printer that can execute a process suitable for the job and outputs the data to the printer. Further, when there is an instruction for notification, the device selects an optimal medium and dispatches a notice thereto.

Therefore, upon the receipt of a request from a user, the structure of the printer is referred to, and an appropriate printer is selected to perform the printing. At this time, in consonance with the situation, the processing can be allocated for a plurality of printers. Further, when there is an instruction for notification, an optimal medium is selected to dispatch a notification that the printing has been terminated along with the name of the printer that has performed the printing.

A request submitted by a user concerns paper sizes, printing quality, colors and time limit (e.g., completion of printing by 5 o'clock). The printer configuration covers the printer types and the number of printers in the system, and their performances or their current statuses (whether the printers are normally operated, whether there is a printing queue, or whether paper or toner is insufficient). As for a medium and a method used for notification, a notification is transmitted by voice through a user's terminal or by telephone, or a notification message is transmitted to a pager, or a document describing the contents of a notification is transmitted by electronic mail or by facsimile.

A situation where the individual units perform the processing shown in FIG. 5 will now be described while referring to the flowchart in FIG. 4.

First, if, at step S110, an urgent instruction for outputting a specific document by five o'clock is transmitted to a host computer, at step S111 a job is added to a job table. At step S113, the job is extracted from the job table and at step S114 the received instruction is analyzed to obtain the object of the job.

At step S115, the following jobs are searched for following the analysis of the instruction.
(1) Acquisition of specifications (paper size, printing quality, color document, etc.) to be used for selecting a suitable printer for outputting a document, and of other information, such as time limit.
(2) Selection from among the connected printers of a suitable printer for specifications (1).
(3) Examination of the selected printer to determine whether or not any obstacle to printing output exists.
(4) Output data to a selected printer.
(5) Issuance of the selected printer and a notification that the data has been output.

At step S116, the job found at step S115 is registered. The above process is repeated until, at step S117, there are no jobs to be searched for. At step S118 a check is instituted to determine whether or not the job can be performed. When the performance of the job is not possible, another job that must be executed is searched for. At S119, the jobs that have been searched for are sequentially performed.

[Second Embodiment]

Figure 6:
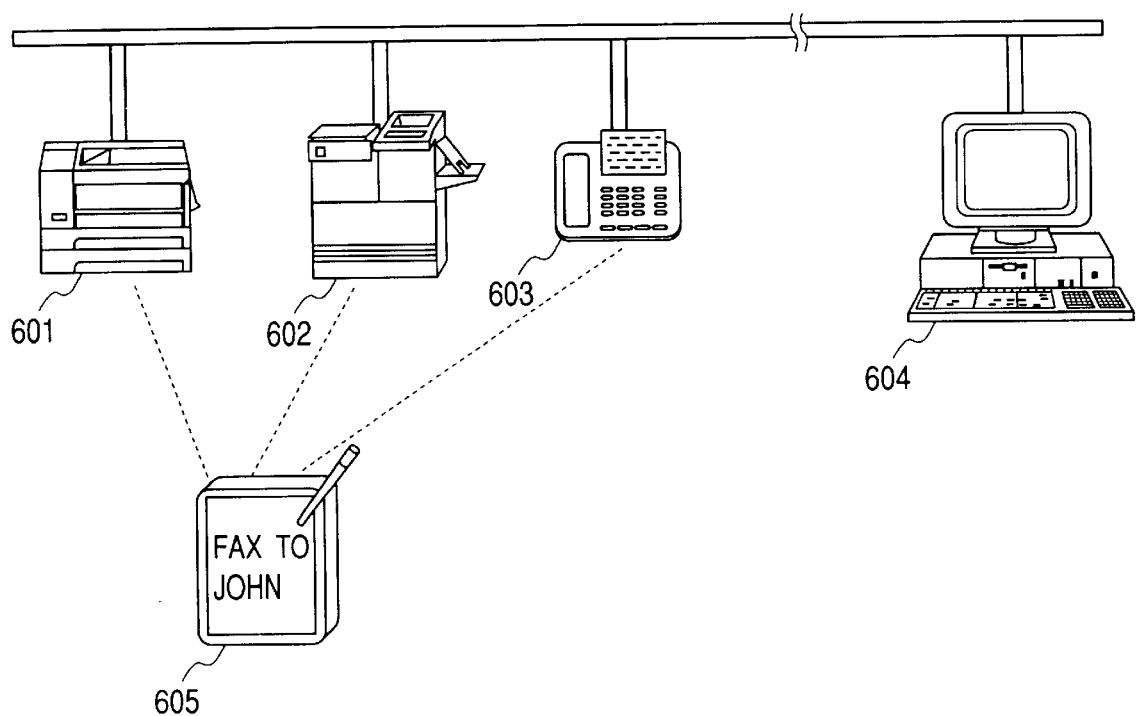
FIG. 6 is a diagram for explaining a case where a controller is used.

FIG. 6 is a diagram for explaining an example wherein a remote controller (hereinafter referred to merely as a controller) is employed as a means for sending instructions to various devices.

A controller 605, which has a display, displays a control panel for, or information concerning a device, such as a printer 601 or 602, a facsimile machine 603 or a PC 604, only by approaching the device, and sends instructions to the device to control it. Further, the controller 605 can control a remote device across a network via the device that is near the controller 605.

The controller 605 can also monitor and display the status of each device, and can acquire the status of a remote device on the network via a device that is near the controller 605.

[Third Embodiment]

Figure 7:
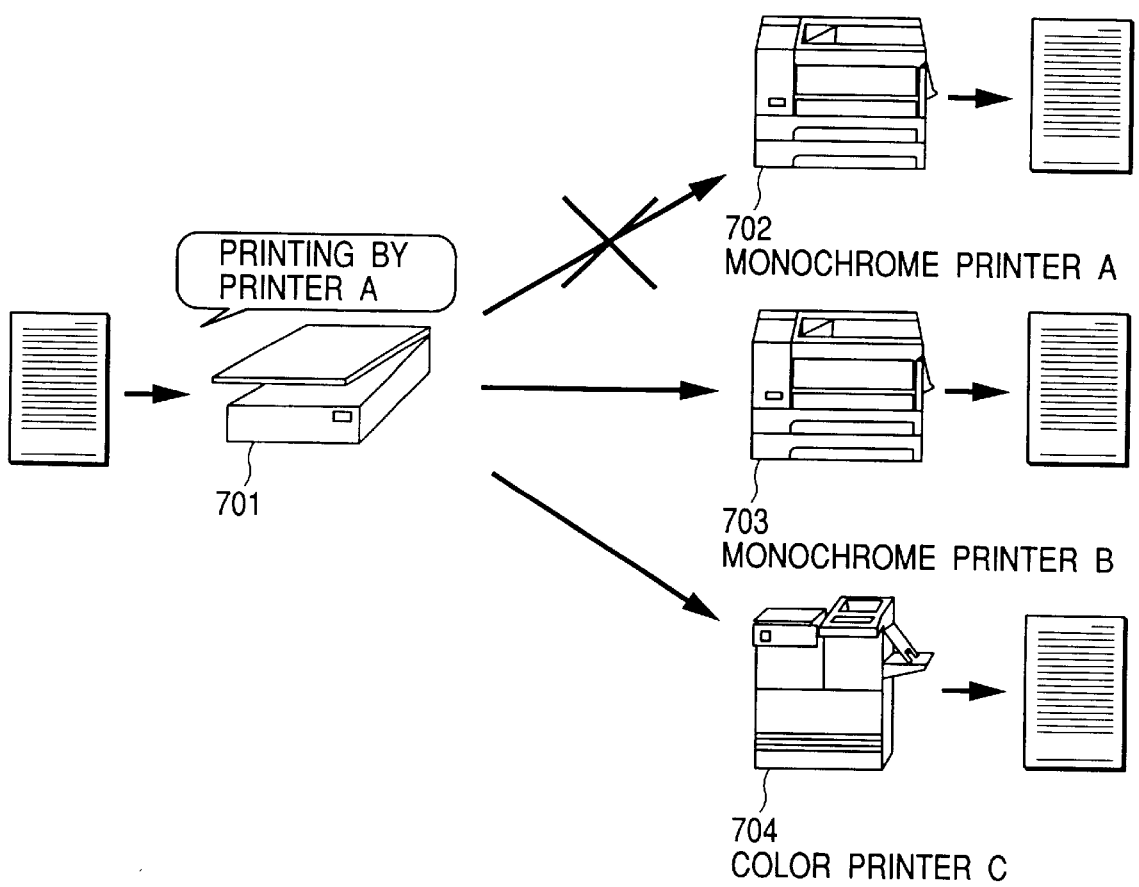
FIG. 7 is a diagram showing a case where a document is read by a scanner for transmission to a specific printer.

FIG. 7 is a diagram showing an example where a document is read by a scanner and is transmitted to a specific printer.

When a document has been read by a scanner 701, a user designates an addressee by voice, etc., or a destination transmission is designated on a cover sheet, and is thus automatically determined. When a monochrome printer 702 is determined as an addressee,
(1) if the addressee is not in the ready for printing state, the document data is transmitted to another printer (e.g., a monochrome printer 703) for printing;
(2) if a printer designated as an addressee can not print the document because of the conditions specified, such as color and paper size, data for only for the pertinent page is transmitted to another printer (e.g., a color printer 704 if color printing is requested);
(3) data for a document having a large number of pages are allocated to a plurality of printers to print; or
(4) if a transfer destination is designated at the addressee, the data is transferred to the transfer destination.

[Fourth Embodiment]

Figure 8:
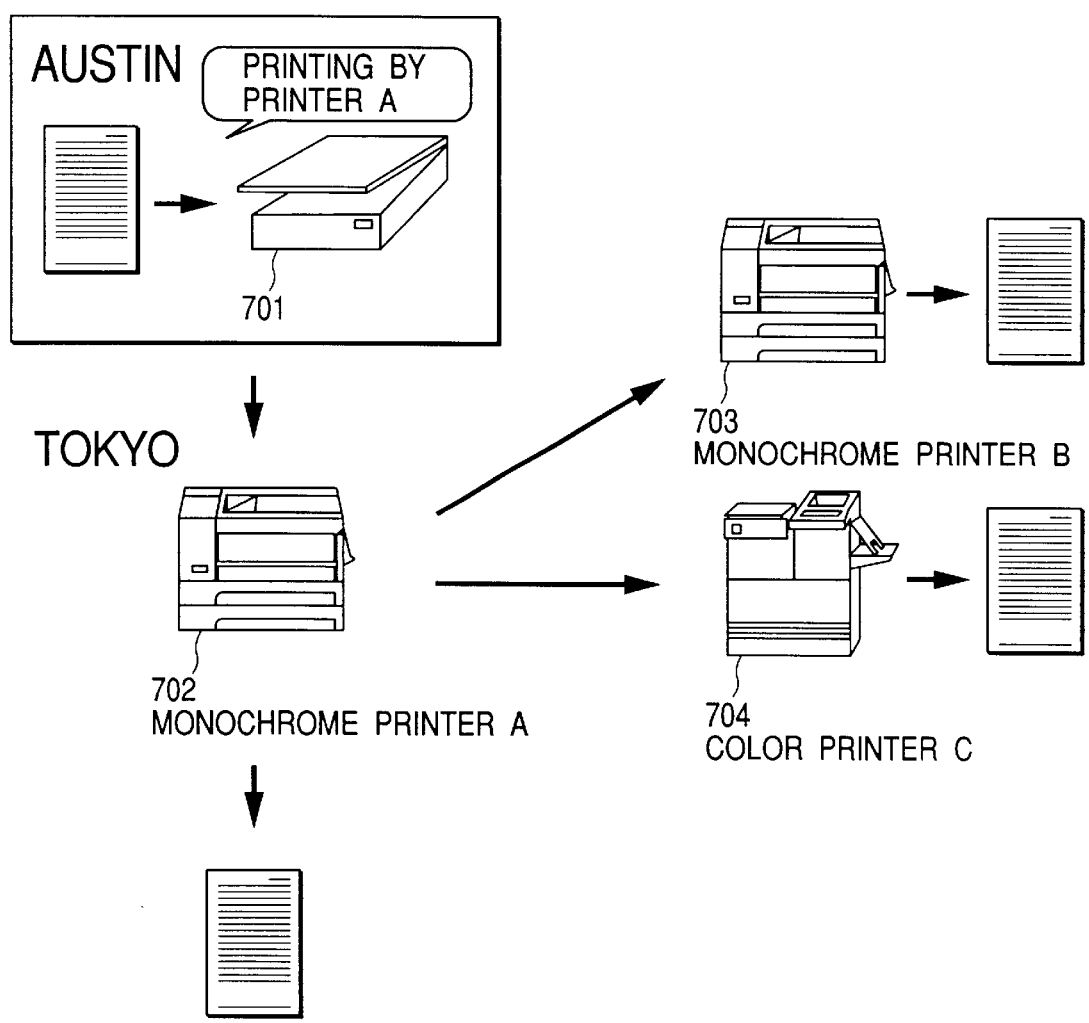
FIGS. 8, 9 and 10 are diagrams illustrating a case where a document is read by a scanner for transmission to a specific printer that the scanner can not control.

FIG. 8 is a diagram showing an example where a document is read by a scanner and is transmitted to a specific printer that the scanner can not manage because it is in a different network domain, etc.

When, a document is read by a scanner 701 in Austin, a user designates an addressee by voice, etc., or an addressee that is described using a character string or a bar code on a cover sheet is read and recognized/interpreted to determine the addressee. As a result, a monochrome printer 702 in Tokyo is determined to be the addressee. After the document data are transmitted to the monochrome printer 702:
(1) when the monochrome printer 702 is not ready for printing, it transmits the data to another printer (a monochrome printer 703) for printing;
(2) if the monochrome printer 702 is not ready for printing the received document data because of specified conditions, such as color and paper size, it transmits either all the data for the received document or only data for pertinent pages to another printer (e.g., a color printer 704, if color printing is requested);
(3) if a document has a large number of pages, the monochrome printer 702 prints part of the data and also allocates printing data to a plurality of other printers; or
(4) if a transfer destination is designated at the monochrome printer 702, the printer 702 transfers the data to the transfer destination.

A difference between the third and the fourth embodiments is that in the third embodiment the scanner 701 determines the addressee, and in the fourth embodiment the printer 702 that received the document from the scanner 701 determines the transfer destination.

[Fifth Embodiment]

Figure 9:
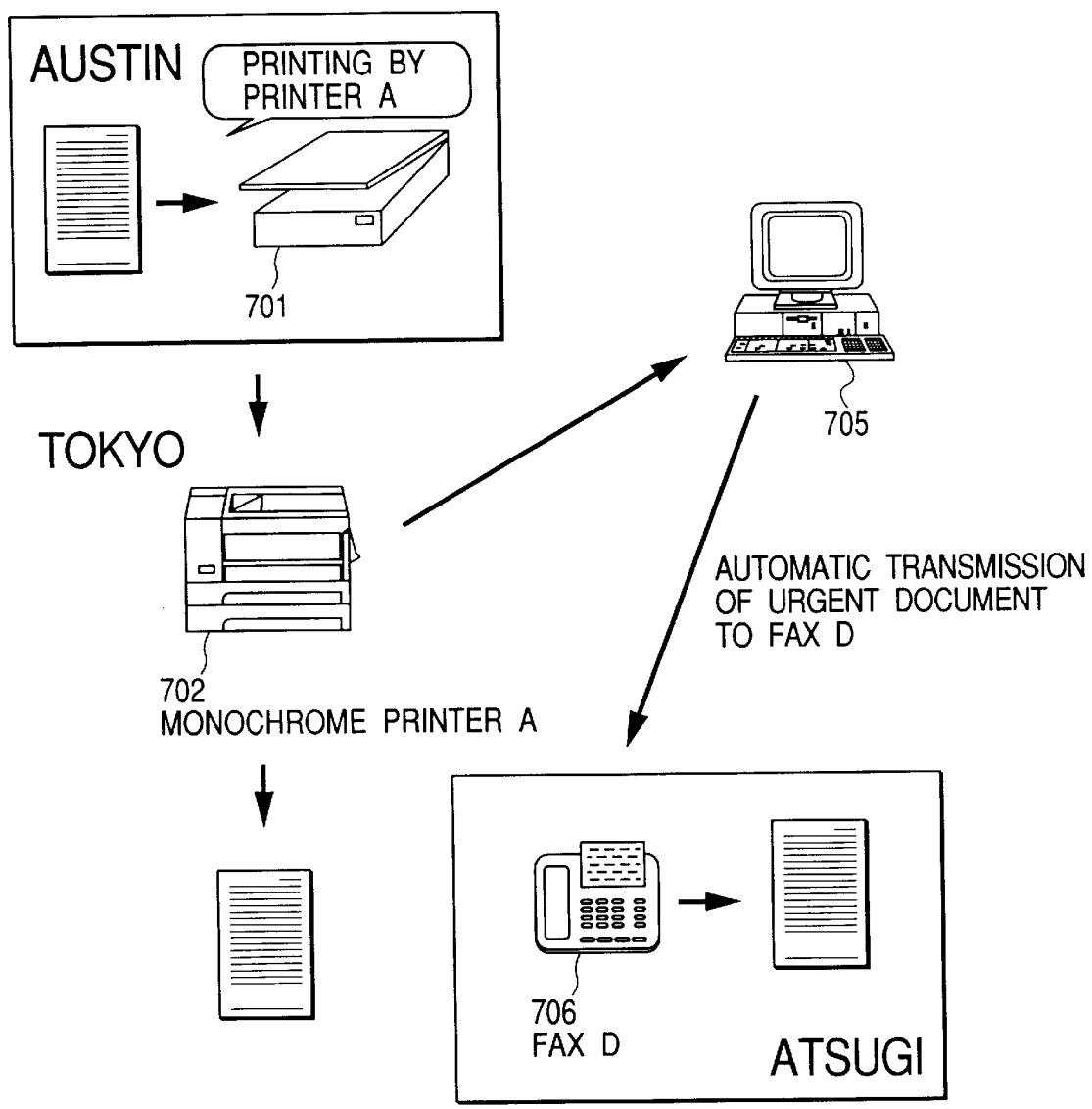

FIG. 9 is a diagram showing an example wherein a document is read by a scanner and is transmitted to a specific printer that the scanner can not manage because it is in a different network domain, etc.

When, a document is read by a scanner 701 in Austin, a user designates an addressee by voice or using a keyboard, or an addressee that is described using a character string or a bar code on a cover sheet is read and recognized/ interpreted to determine the addressee. As a result, a monochrome printer 702 in Tokyo is determined as the addressee. After document data are transmitted to the monochrome printer 702, they are further transferred to a personal computer 705 that can perform a higher level operation.

As a result, the personal computer 705 determines, from the entry "urgent" on the cover letter, for example, that the document is an urgent document. The personal computer 705 examines schedule data to find the location of the recipient of the document, and transfers the data to that location, for example, Atsugi. At this time, if the transfer destination is not a printer but is a different medium, such as a facsimile machine 706, medium conversion is performed before transmission.

[Sixth Embodiment]

Figure 10:
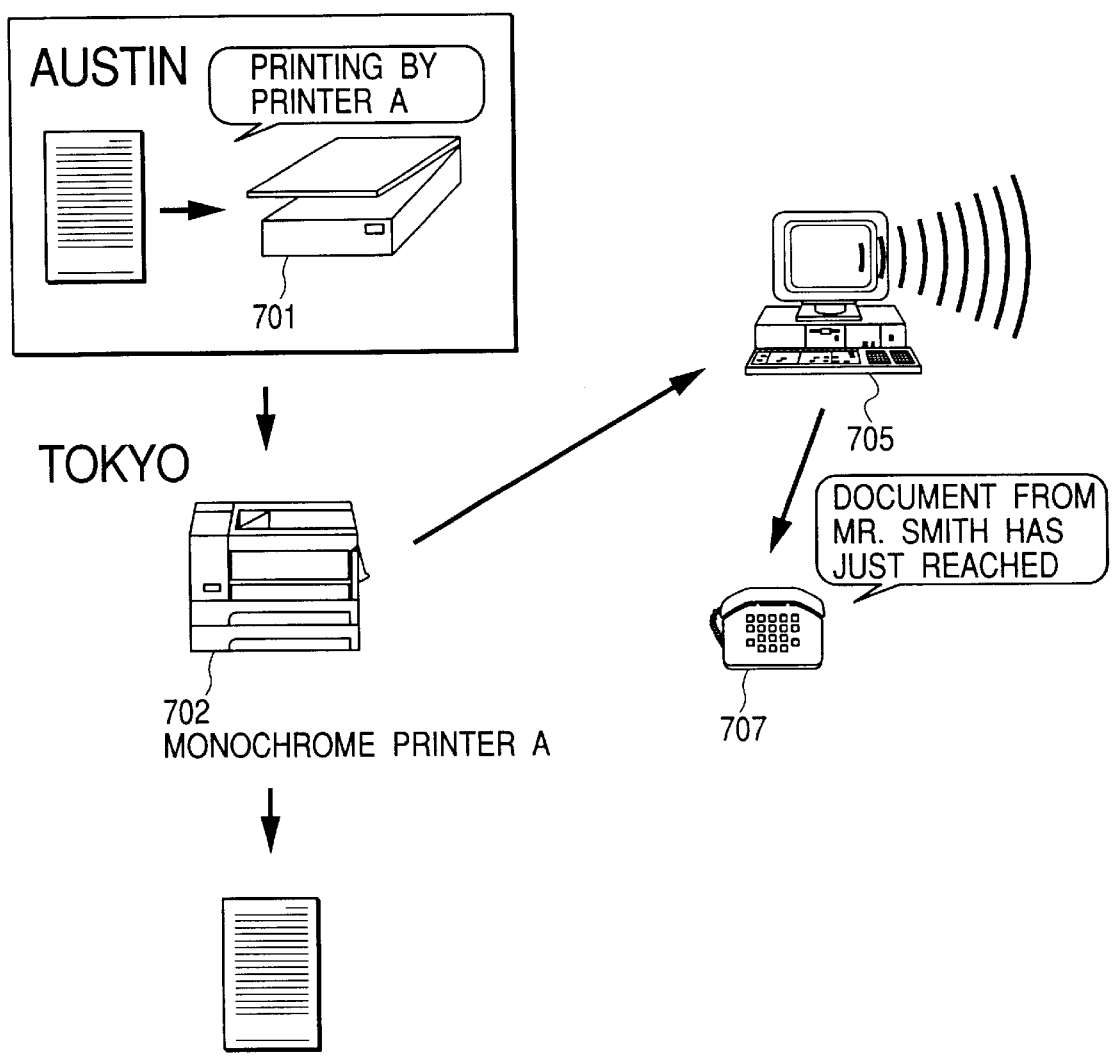

FIG. 10 is a diagram showing an example wherein a document is read by a scanner and is transmitted to a specific printer that the scanner can not manage because it is in a different network domain, etc.

When, a document is read by a scanner 701 in Austin, a user designates an addressee by voice, etc., or an addressee that is described using a character string or a bar code on a cover sheet is read and recognized/interpreted to determine the addressee. As a result, a monochrome printer 702 in Tokyo is determined as the addressee. After document data are transmitted to the monochrome printer 702, they are further transferred to a personal computer 705 that can perform a higher level operation. As a result, the personal computer 705 identifies the recipient, prepares a notification sentence, and notifies the recipient of the arrival of the document.

[Seventh Embodiment]

Figure 11:
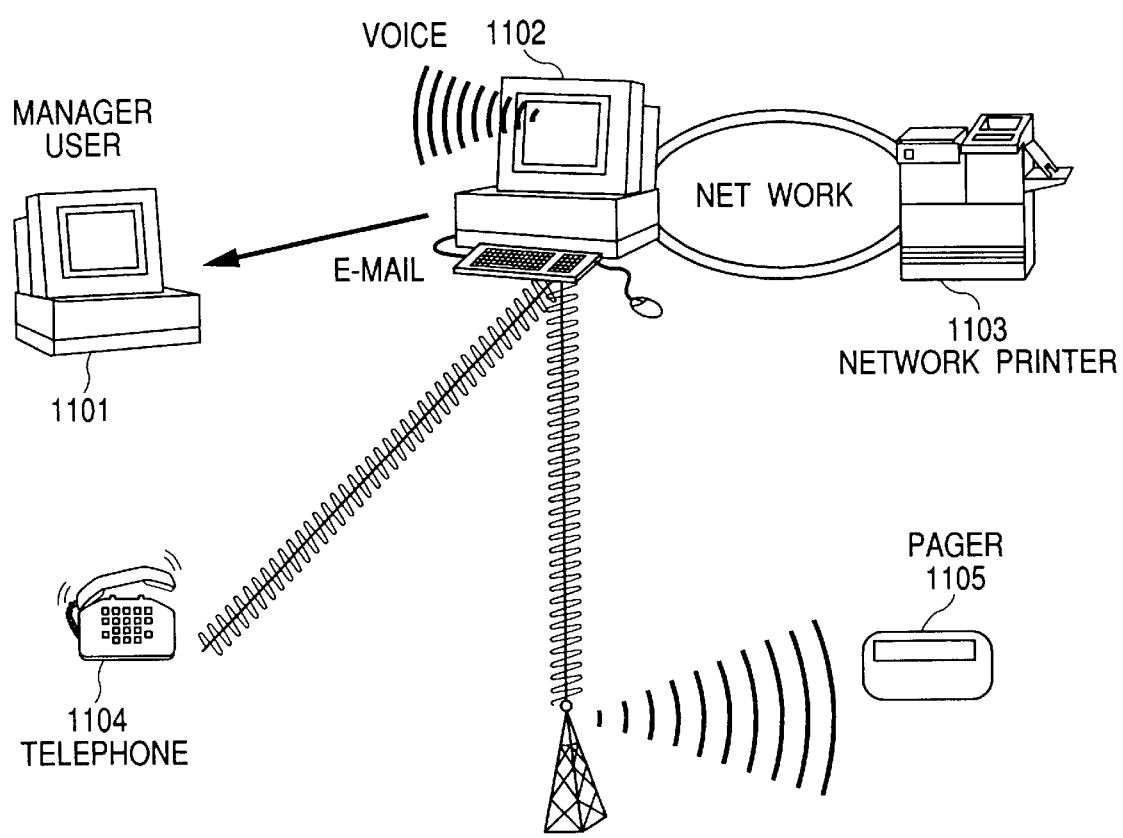
FIG. 11 is a diagram illustrating a case where information concerning the state of a printer is distributed.

FIG. 11 is a diagram showing an example wherein a notification concerning the status of a printer is transmitted.

When a PC 1102 acquires the status of a printer 1103 across a network and detects a change in the status, such as the occurrence of an error or an event, the PC 1102 determines a notification destination, such as a user or a manager, in consonance with the contents of the change, and employs a medium corresponding to the determined destination to transmit a notification. For example, to transmit a notification to a terminal 1101 of a user or a manager, the PC 1102 uses electronic mail, or a telephone 1104, or transmits a message to a pager 1105.

Therefore, in the example in FIG. 10, for example, a notification of the reception of the document may be issued using electronic mail or a pager, instead of the telephone 707.

[Eighth Embodiment]

In this embodiment, before executing an instructed job an apparatus notifies a user of the contents of the job in accordance with the type or the condition of the job, or cancels a job that is determined to be unnecessary for a user.

Figure 12:
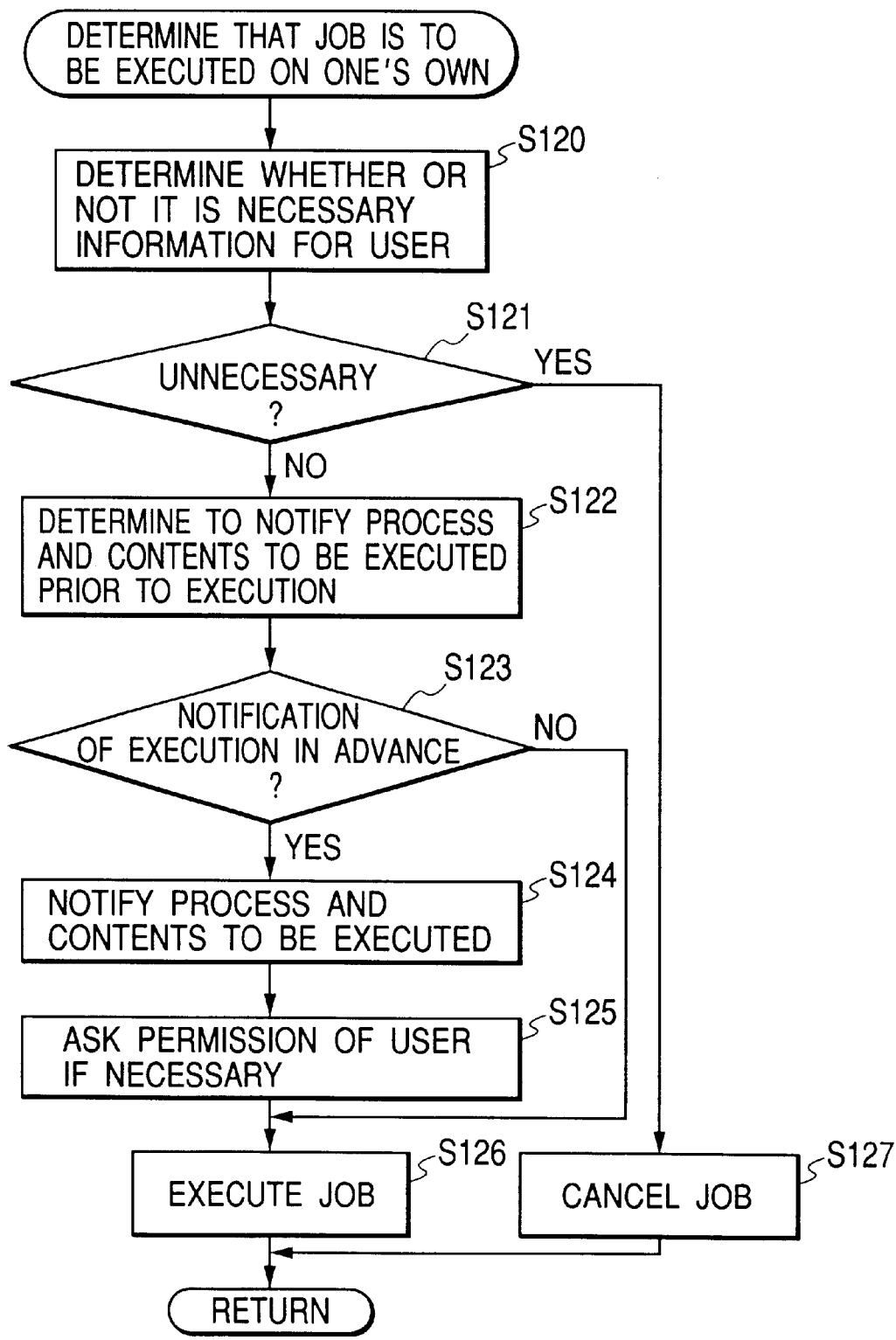
FIG. 12 is a flowchart showing the processing performed an eighth embodiment.

FIG. 12 is a flowchart showing the processing in this embodiment. FIG. 13 is a table showing, in consonance with the types and conditions of jobs, whether or not an advance notice should be issued.

In FIG. 12, first, at step S120 a check is performed to determine whether or not a job constitutes necessary information for a user. If this is true, the processes at step S122 and the following steps are performed. If not, at step S127 the job is canceled. At step S122, information concerning the advance notice that corresponds to the job type and conditions in FIG. 13 is referred to, or the contents described on a cover sheet are analyzed to determine whether or not a notice for the process to be executed and the contents of the process should be issued to a user prior to the performance of the instructed job. When advance notice is not required, program control moves to step S126. When advance notice is issued, program control moves to step S124, whereat a user is notified of the process to be performed and its contents. At step S125, the permission for the performance is received from a user, if necessary. At step S126 the job is performed.

An explanation will be given for an example wherein, when the contents of a job call for the filing of information, an analysis of the system contents is performed prior to the filing of information, and information concerning the contents is transmitted to a user.

Figure 14A:
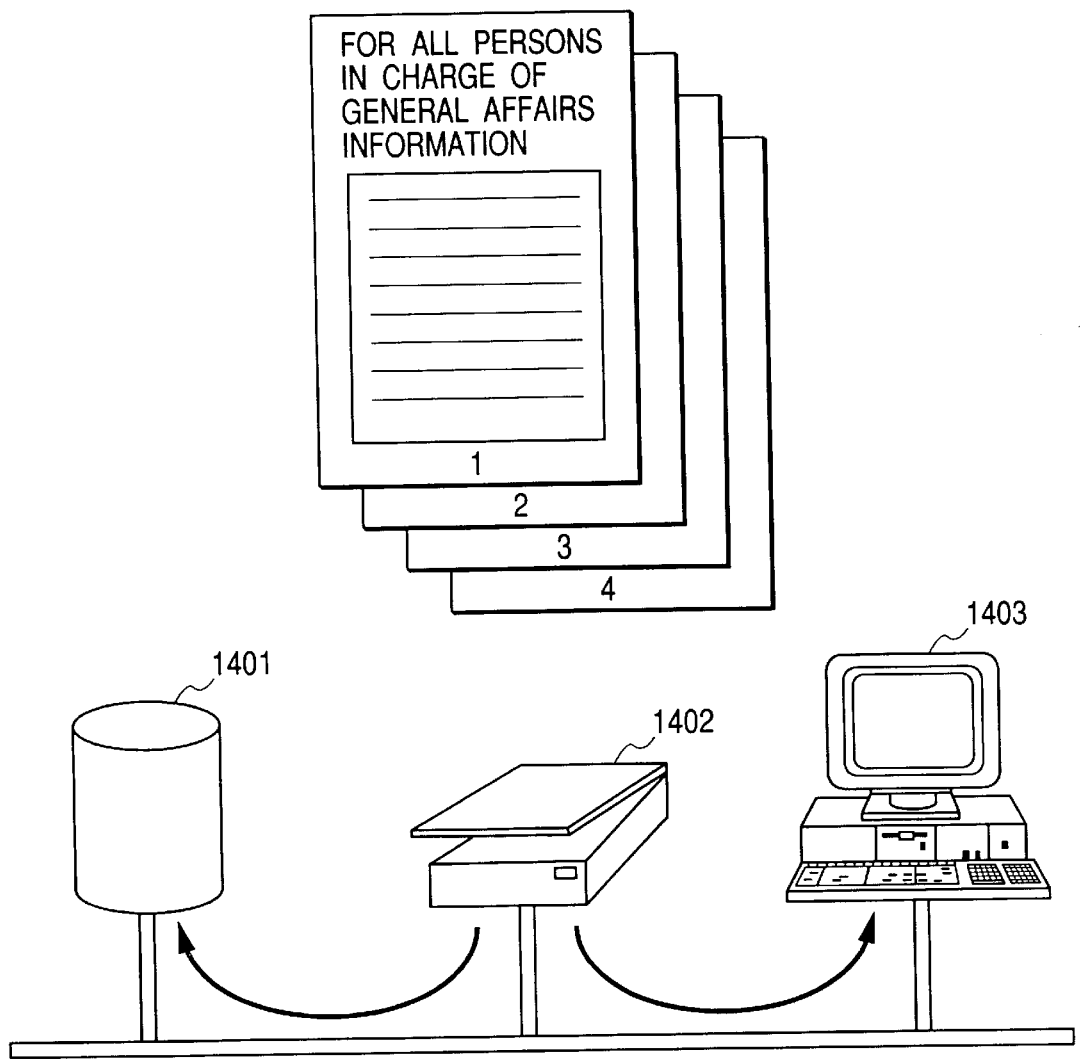

FIG. 14A is a diagram showing an example wherein filing process information to be filed is transmitted to a user in advance. A file storage unit 1401, a scanner 1402 and a user terminal 1403 are provided in this system. The processing performed by the scanner 1402 in FIG. 14A will now be described while referring to the flowchart in FIG. 12.

At step S120, since an instructed job is for information filing, it is assumed that this is necessary for a user. At step S122, while information designated in FIG. 13 is referred to, it is ascertained that a notice concerning information to be filed should be issued before the filing, and that the information should then be scanned. Program control then moves to step S124 to issue a notice concerning information to be filed. At step S124 the scanned information is transmitted to the user terminal 1403 via a network. At step S126, the filing job is performed.

Next, an explanation will be given for an example wherein the information on the first page is received and analyzed, and when the information is not at all related to a user, the following information is not received.

FIG. 14B is a diagram showing an example wherein whether or not a large amount of data to be received is required by a user is determined by examining the first page, and the receipt of information for the following pages is canceled. A reception PC 1404 and a transmission PC 1405 are provided.

The processing performed by the PC 1404 in FIG. 14B will be explained while referring to the flowchart in FIG. 12.

At step S120, the first page of the received data is analyzed. Since "For All Persons In Charge Of General Affairs Information" is entered on the first page, it is apparent that this document is not intended for a user who is not in charge of general affairs information, and the receipt of the information is determined to be unnecessary. Program control therefore moves to step S127. At step S127, the first page, which has been received, is canceled, and information for the second and the following pages is not received. The processing is thereafter terminated.

[Ninth Embodiment]

Figure 15:
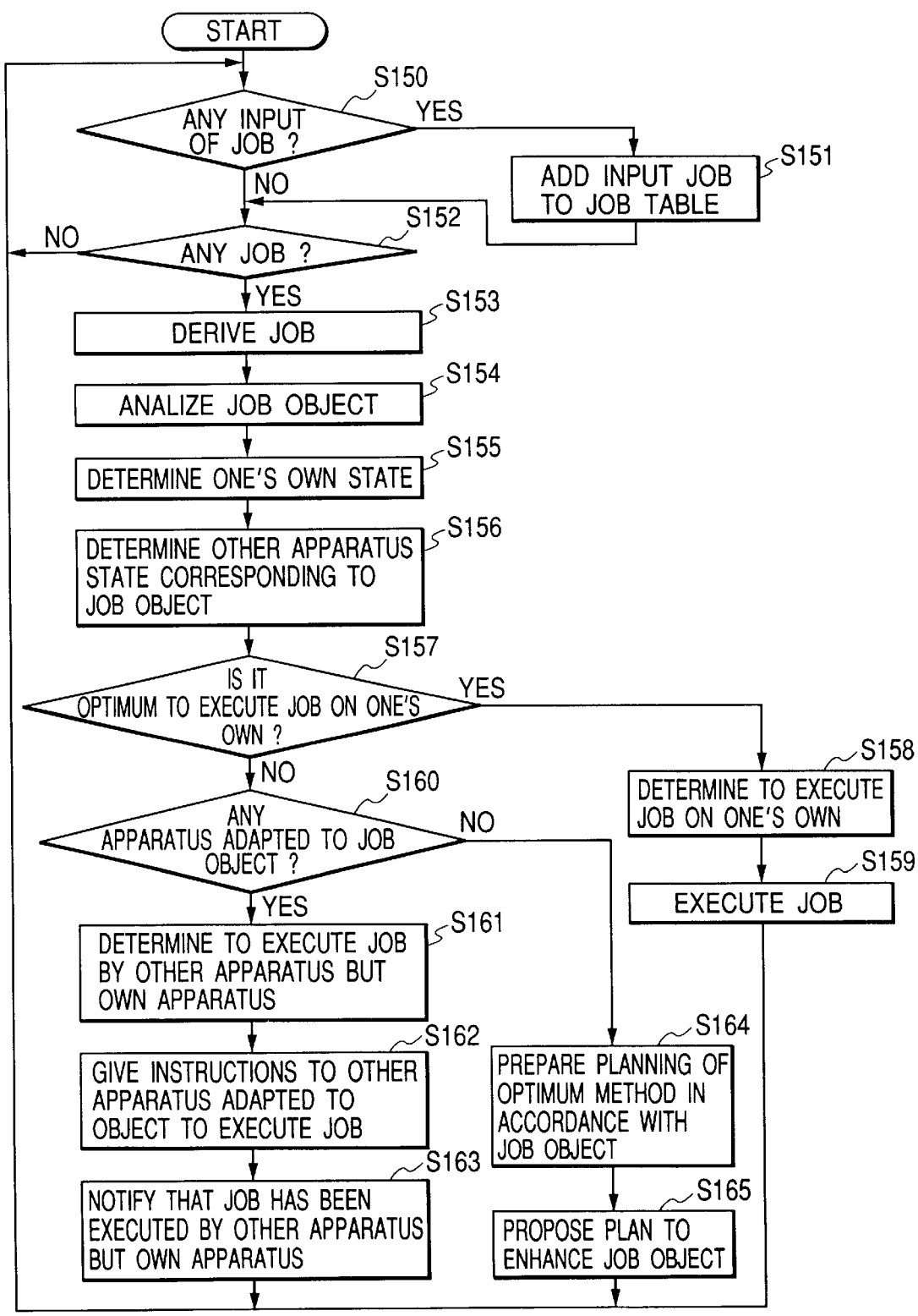
FIG. 15 is a flowchart showing the processing for a ninth embodiment.

FIG. 15 is a flowchart showing the processing for a ninth embodiment. In this embodiment, an apparatus that is designated to perform the processing determines whether it or another apparatus should perform the processing, and as a result of the determination, either performs the processing itself or sends an instruction to another apparatus to perform the processing.

At step S150 a check is performed to determine whether or not a job has been input. If a job has been input, at step S151 the input job is entered in a job table. At step S152 the job table is examined to determine whether any jobs have been entered. If they have been, at step S153 a job is extracted from the table. At step S154 a received instruction is analyzed and the object of the job is apprehended using the result. At step S155 the status of the apparatus is examined. At step S156 the status of another apparatus consonant with the object of the job is examined.

When, as the result of a comparison of the statues of the locally owned apparatus and other apparatuses, it is found that the locally owned apparatus is optimal for the performance of the job, program control moves from step S157 to step S158, whereat it is determined that the owned apparatus will perform the job, and at step S159 the job is performed by the locally owned apparatus. If there is an optimal apparatus other than the locally owned apparatus that has capabilities consonant with the object of the job, program control goes from step S160 to step S161, whereat it is determined that the other apparatus will perform the job, and at step S162 the locally owned apparatus sends a job execution instruction to the apparatus having capabilities consonant with the object of the job. At step S163 the locally owned apparatus notifies a user that another apparatus has executed the job.

If there is no apparatus having capabilities consonant with the object of the job, program control moves from step S160 to step S164, whereat a plan is prepared for the use of an optimal method that does not depart from the object of the job, and at step S165 the plan is proposed to a user.

Figure 16A:
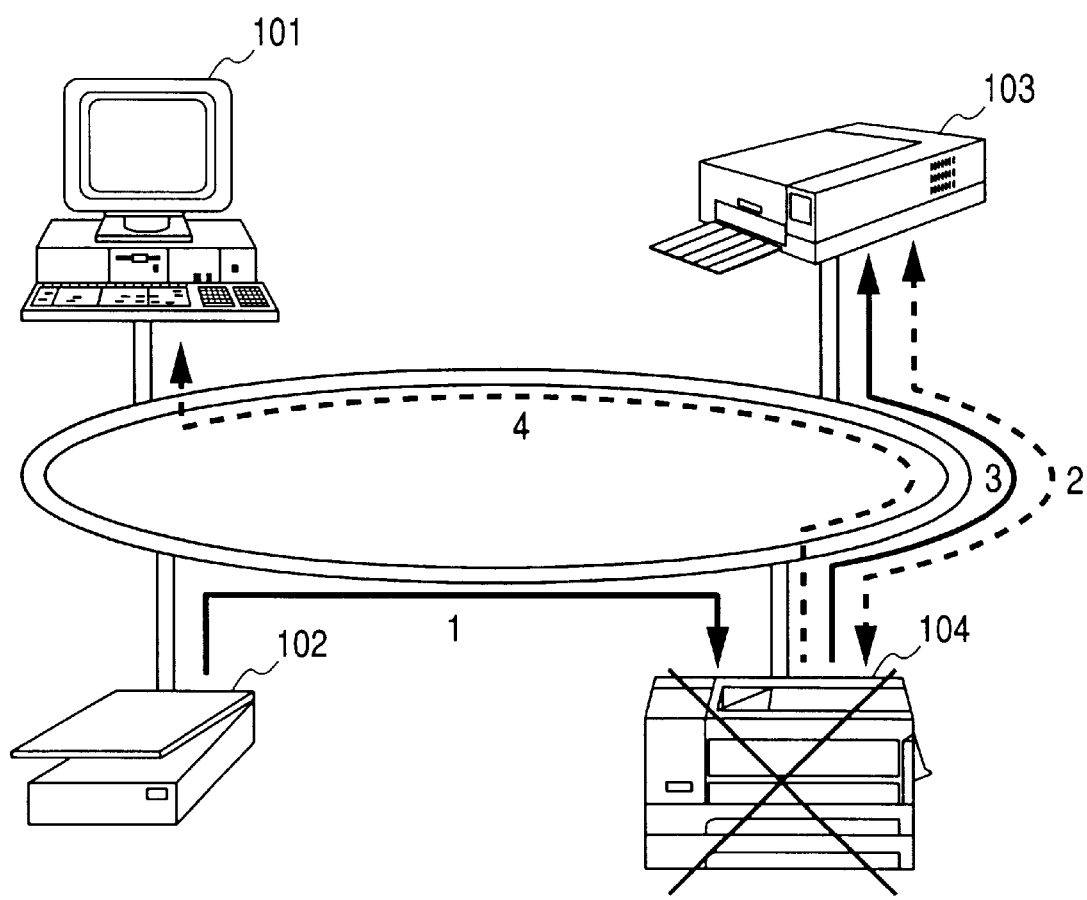
FIG. 16A is a diagram showing the transmission of information for the ninth embodiment.

FIG. 16A is a diagram showing the transmission of information in this embodiment.

When a user of a PC 101 provides for a printer 104 a job for the output of information input by a scanner 102, and when the printer 104 has, for example, a printing malfunction, the printer ascertains that it can not perform the instructed job, and by communicating with other apparatuses, it finds a printer 103 that can perform the instructed job. Thus, the printer 104 determines that the printer 103 can act for it and perform the job, and so instructs the printer 103. Further, the printer 104 transmits a notification to the PC 101 to inform the user of the action that it took. In FIG. 16A, the process flow for these activities is described by arrows.

The processes performed by the individual units in FIG. 16A will be described while referring to the flowchart in FIG. 15.

First, the process performed by the scanner 102 will be explained. At step S150 the scanner 102 scans a document and acquires a job, information concerning which is to be transmitted to the printer 104. At step S151 this job is entered in the job table, and at step S153 the job is extracted. At step S154, the scanner 102 scans additional data and determines that the data is a job to be transmitted. At step S155, the scanner 102 ascertains that it is operating normally and that no problem exists in the scanning and transmission of instructed information.

At step S156 it is ascertained that the job can not be transmitted to another apparatus. At step S157, since optimally the scanner 102 should execute the job, program control moves to step S158. At step S158 the scanner 102 determines that it should scan the information, and at step S159 the scanner 102 scans the information and transmits it to the printer 104 via a route 1 on a network.

At step S150, the printer 104 receives the job for the output of received information. At step S151, the printer 104 enters the job in the job table, and at step S153, it extracts it. At step S154, the printer 104 ascertains from the information it receives that the information for the user from the PC 101 is to be printed on paper. At step S155 the printer 104 determines that it is out of toner and disables printing. At step S116 the printer 104 searches, via the network, for printers that can output the received information, and finds the printer 103 (route 2).

Since, at step S157, the printer 104 can not execute the job, program control moves to step S160. Then, as at step S160 it is determined that the job for the output of information can be performed by the printer 103, at step S161 it is determined that the received information should be transmitted to the printer 103. At step S162 the printer 104 sends an instruction to the printer 103 to print the information that is to be received (route 3). At step S163 to notify the user that the instructed job was performed by the printer 103 electronic mail for the user is transmitted to the PC 101 (route 4).

Figure 16B:
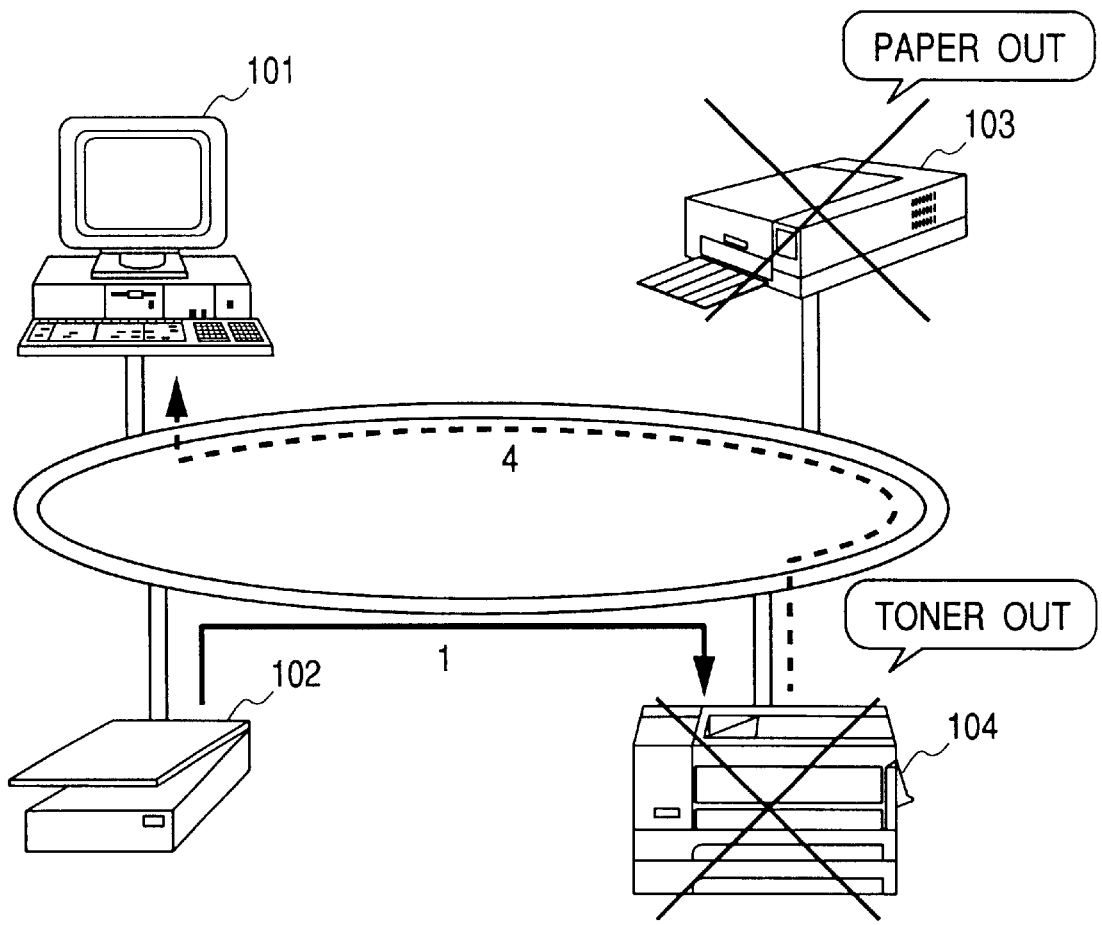
FIG. 16B is a diagram showing the transmission of information when an apparatus corresponding to the object of a job is not present.

FIG. 16B is a diagram showing the transmission of information for a case where no apparatus having capabilities consonant with the object of a job is available.

When the user of the PC 101 provides a job for the output to the printer 104 of information input by the scanner 102, and when the printer 104 disables printing because it is out of toner, the printer 104 communicates with other apparatuses, finds the printer 103, which is suitable for the object of the job, and determines its status. Then, since the printer 103 disables printing because it is out of paper, and as there is no other printer available that is suitable for the object of the job, a notice is issued to the PC 101 to propose to the user an optimal plan whereby when either the printer 103 or 104 has recovered to the printing enabled state, that printer will perform the job. In FIG. 16B, the process flow for these actions is indicated by arrows.

The procedures performed by the individual units in FIG. 16B will be explained while referring to the flowchart in FIG. 15.

The process whereby the scanner 102 reads a document and transmits it to the printer 104 is performed in the same manner as was described previously.

At step S150 the printer 104 receives a job for the output of received information. At step S151, the job is entered in the job table, and at step S153, it is extracted. At step S154, the printer 104 ascertains from the information it receives that the information for the user from the PC 101 is to be printed on paper. At step S155, the printer 10 ascertains that it is out of toner and printing is disabled. At step S156, the printer 104 communicates across the network with other printers to find one that can print the received information. The printer 104 determines that the printer 103 has also disabled printing because it is out of paper, and that no other appropriate apparatus is available.

Since, at step S157, the printer 104 disables the performance of the job, program control moves to step S160. At step S160, as there is no apparatus that can perform the job for the output of information, program control goes to step S164. At step S164, planning is begun to prepare an optimal method for performing the printing, which is the object of the job for the output of information. As a result, it is determined that the optimal method involves the return of a printing apparatus to its normal operating status. At step S165, the proposed method, whereby either the printer 104, which is out of toner, or the printer 103, which is out of paper, is to be recovered to the printing enabled state, is presented in a window shown in FIG. 17 for approval by the user.

Then, a response received from the user, or a change in the printer status is identified as an input job, and the same processing is again performed. In this fashion, the object of the user can be achieved.

The above described planning will be described later in detail during the course of the explanation of specific examples for an eleventh and subsequent embodiments.

[Tenth Embodiment]

In the processing for the ninth embodiment, wherein, at steps S158 and S159, a locally owned apparatus determines to perform a job itself, and performs the job, before another instructed job is performed, the possibility of the occurrence of a problem is analyzed in detail, as in the procedures in FIG. 17. When it is ascertained, in consonance with environmental conditions or the status of the job performance, that performing the job is not advisable, a notice concerning the problem may be issued, or the request for the performance of the job may be rejected.

When, for example, an instruction for printing a secret document is issued and a user is not identified as an authorized user, the instruction is rejected.

Figure 18:
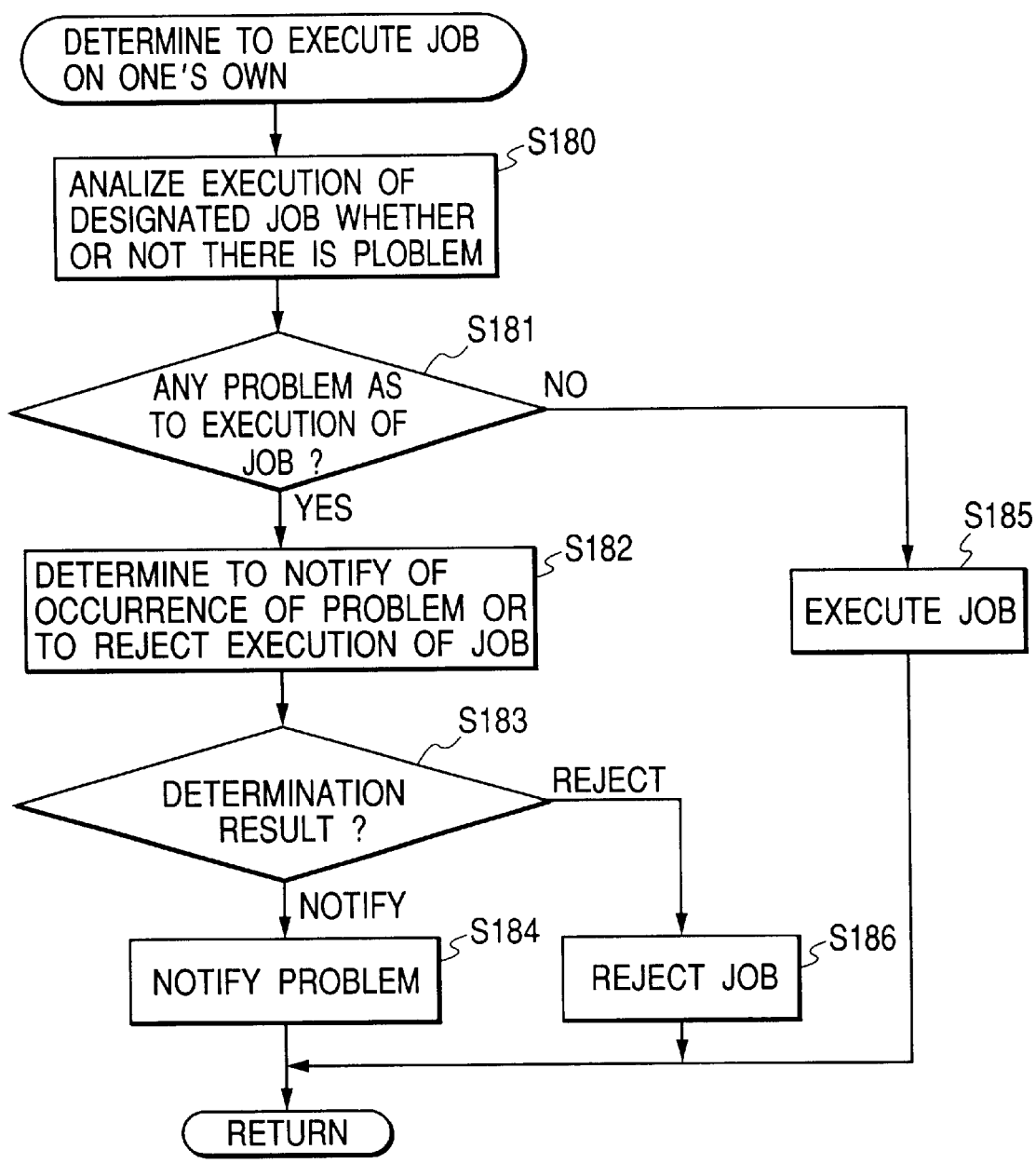
FIG. 18 is a flowchart showing the detailed procedure for job execution.

FIG. 18 is a flowchart showing the detailed procedures for the performance of a job.

At step S180 a check is performed to determine whether or not a problem exists concerning the performance of the instructed job. At step S181 no problem affecting the performance of a job is found, at step S185 the job is performed. If a problem is found, at step S182 a check is performed to determine whether a notice concerning the problem that was discovered should be transmitted to a user, or whether the request for the performance of the job should be rejected. When it is ascertained that such a notice should be transmitted to a user, at step S184 the notice is transmitted to the user. When it is determined that the request for the performance of the job is to be rejected, at step S186 the request for the performance of the job is rejected and a notice of rejection is transmitted to the user.

Figures 19, 20, 21:
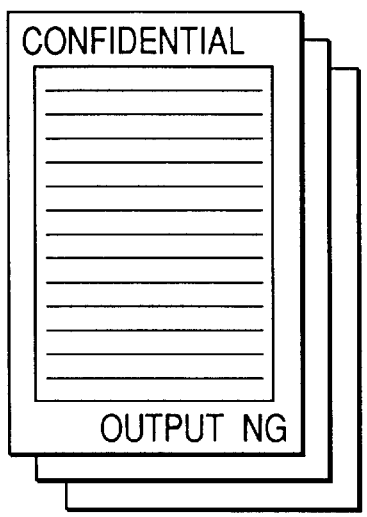
FIG. 19 is a diagram showing an example of classified information to be read.
FIG. 20 is an example job table.
FIG. 21 is a diagram showing an example printing window.

An example wherein a user of the PC 101 issues an instruction to output to the printer 104 confidential information read by the scanner 102 will now be described while referring to FIGS. 15 and 18. FIG. 19 is a diagram showing example confidential information to be read.

First, at step S150 the scanner 102 scans available information and receives a job for the transmission of information to the printer 104. At step S151 the job is entered in the job table, and at step S153, the job is extracted therefrom. At step S154 data are scanned, and it is ascertained the data constitute a job to be transmitted. At step S155, the scanner 102 determines that it is operating normally and that there is no problem affecting the scanning and transmission of the instructed information.

At step S155 it is ascertained that the job can not be transmitted to another apparatus. Since, at step S157, it is ascertained that optimally the scanner 102 should perform the job itself, program control moves to step S158, whereat the scanner 102 determines that it should scan the information itself.

At step S180, as a result of the scanning of the information, it is determined to be confidential information whose output is inhibited. Since a problem affecting the performance of the job exists, at step S182 it is determined that the job (the scanning and the outputting of information) should be rejected. At step S183 the job is rejected, and program control thereafter goes to step S186. At step S186, a notice is issued that the job was rejected.

Similarly, when a plurality of users employ the same system, the current user can be identified by a log-in name, and an instruction for the output of the contents of files belonging to other users can be rejected. When, instead of an instruction from a user, a document is received from the outside and the destination user differs from the current user, the output of the received document and the notice of the receipt of the document are rejected, or the processing is halted until the destination user begins to employ the system.

[Eleventh Embodiment]

The processing for an eleventh embodiment will now be described while referring to FIG. 4. At step S109 the job table is initialized. Then, at step S110 a check is performed to determine whether there is input from a user or from an apparatus that can be detected by the system. At step S111 an input analysis job is entered in the job table to analyze the contents input at step S110. At step S112 a check is performed to determine whether there is a job to be performed. If there is such a job, it can be acquired at step S113. At step S114, the object comprising the background for the performance of the job is understood.

At step S115 a possible process is planned by using the contents that are input, the status of a device that can be detected by the system, and the knowledge that the system has currently acquired. At step S116 a new job is added if necessary. At steps S117 to S119 the process as planned at step S115 is performed in consonance with the contents. The processing is repeated until no more jobs remain, and program control thereafter returns to step S110.

Figures 22, 23:
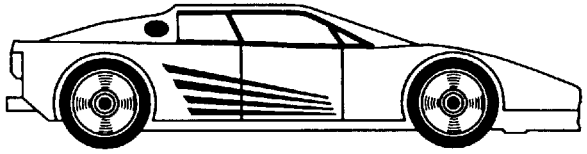
FIG. 22 is an example job table.
FIG. 23 is a diagram showing the contents of <file A>.

A case where a user is to print <file A> will now be explained. FIG. 23 is a diagram showing the contents of <file A>, the colored picture of a car. FIG. 1 is a diagram showing the structure of the system in this embodiment. A user sends an instruction from a PC 101, and a monochrome printer 104 is set as a normally used printer. A color printer 103 is also set.

At step S109 the job table is initialized. At step S111 a job that is to be performed when there is no input is added to the job table (FIG. 20). When file name <file A> is designated in a window in FIG. 21 and printing for it is selected, at step S110 it is determined that there is input, and program control advances to step S111. At step S111, as is shown in FIG. 22, an input analysis job is entered in the job table. Since, at step S112, there is a job to be executed, program control advances to step S113. At step S113 an analysis of the job to be performed (input "print <file A>") is acquired. At step S114 it is ascertained that the object of the input "print <file A>" is the printing of the <file A>.

At step S115 planning is performed, based on the following conditions and statuses, for proposing, to a user that the printing be performed by a color printer.

<file A> includes a colored portion (the portion comprising the car in FIG. 23)

the color printer 103 that can be used is present (FIG. 1).

At step S119 a query "Perform printing by a color printer?" is directed to a user (FIG. 24). At the same time, a job corresponding to an event is added to the job table when no response is received from the user (FIG. 25). Program control thereafter returns to step S110.

When, at step S110, there is no input for ten minutes, at step S112 it is assumed that there is a job to be performed, and program control advances to step S113. At step S113, a job to be performed (when no response is received from a user) is acquired.

At step S114 it is ascertained that the object for a job when there is no response from a user is to determine whether a proposal can be accepted. At step S115 it is determined from the flow condition and the status that the user should be queried by telephone.

The telephone number of the current location of the user is acquired (schedule data in FIG. 26)

The printing priority is urgent (according to the schedule data in FIG. 26, file A is to be used at the business talk at 13:00).

At step S119 a query, "Perform printing with a color printer?" is directed to the user (FIG. 27). At the same time, a job corresponding to an event is added to the job table when no response is received from the user (FIG. 28). Program control thereafter returns to step S110.

When, at step S110, a user responds with "Yes, please" as is shown in FIG. 27, it is assumed that data input is to be performed, and program control moves to step S111. At step S111 an input analysis job is added to the job table (FIG. 21). At step S112 it is assumed that there is a job to be performed, and program control moves to step S113. At step S113, a job to be performed, the input, "Yes, please" is analyzed. At step S114 it is ascertained that the object of the input, "Yes, please" is the acceptance of the proposal.

At step S115 it is determined that <file A> is to be transmitted to and printed by the color printer 103. At step S118 <file A> is transmitted to and printed by the color printer 103. At the same time, a job for confirming whether or not the printing has been terminated normally is added to the job table (FIG. 29). Program control thereafter returns to step S110.

If, at step S110 there is no data input and at step S112, as is shown in FIG. 30, the printer status is changed from "Printing" to "Printed document in tray" it is assumed that there is a job to be executed, and program control advances to step S113. At step S113 a process corresponding to the job to be executed, printer status, is acquired. At step S114, from a printer status entry in FIG. 31, the status "Printed document in tray" means that there is a printed document in a printer tray, and the object of the job is understood to be the delivery of the printed document to a user.

At step S115, a waiting state is specified because the user may soon come to pick up the printed document. At step S116, a job for confirming whether the user has come and has picked up the printed document is added to the job table (FIG. 32). Program control thereafter returns to step S110. If, at step S110, there is no input for ten minutes and at step S112 the printed document is still on tray, there is a job to be executed, and program control therefore advances to step S113. At step S113 a process corresponding to the job to be executed, when the printed document is still on hand, is acquired. At step S114, from the table in FIG. 31 the status "Printed document on tray" means that a printed document is still in the printer tray, and it is assumed that the object is the delivery of the printed document to the user. Since at step S115 the printed document has not been picked up for ten minutes, it is assumed that the user has forgotten to collect the document, and it is determined that a notice, "Printed document is in color printer tray" is to be issued (FIG. 33). Also, a job corresponding to the failure of the user to respond and a job corresponding to the collection of the printed document by the user are added to the job table (FIG. 34). Program control thereafter returns to step S110.

When at step S110 there is no input and at step S112 the printer status is changed from "Printed document in tray" to "Normal" as is shown in FIG. 28, there is a job to be executed and program control advances to step S113. At step S113 a job corresponding to the job to be executed, printed document in tray, is re-evaluated. At step S114 the object for the rechecking of the job corresponding to the "Printed document in tray" is understood to be the deletion of an unnecessary job. At step S115, it is determined that the job of waiting for a response from the user should be deleted, and at step S119 the job of waiting for the user's response is deleted. A new job is not added. While the job table is in its initial state, program control returns to step S110.

FIGS. 36 and 37 are tables showing plans, actions and rules.

When a user presses the button "Print" in the printing window in FIG. 21, it is determined by referring to the plans and actions in FIG. 36 that the object of the user is the changing of the current state to the "Printed document in tray". In addition, since "Printed document in tray" is the assumption for the object "Acquire printed document" the final object of the user is determined to be "Acquire printed document".

When a user expresses agreement or disagreement by voice or by the manipulation of the mouse in response to the query in the inquiry window in FIG. 24 or the window in FIG. 33, or the telephone query in FIG. 27, it is determined that the object of the user is the statement of the agreement or disagreement relative to the query.

In FIG. 37 the final object of the system is the thus constitutes the achievement of the object of the user. As the basis for this, the system must be stable. In addition, the system must (1) apprehend the object of the user and (2) must make a plan for the achievement of the object and execute it.

To stabilize the system, not only an abnormal timing for the system must be adjusted to the normal condition, but also the system must be powered off when it is not required in order to reduce costs and to prevent the system from becoming unstable.

Figure 38:
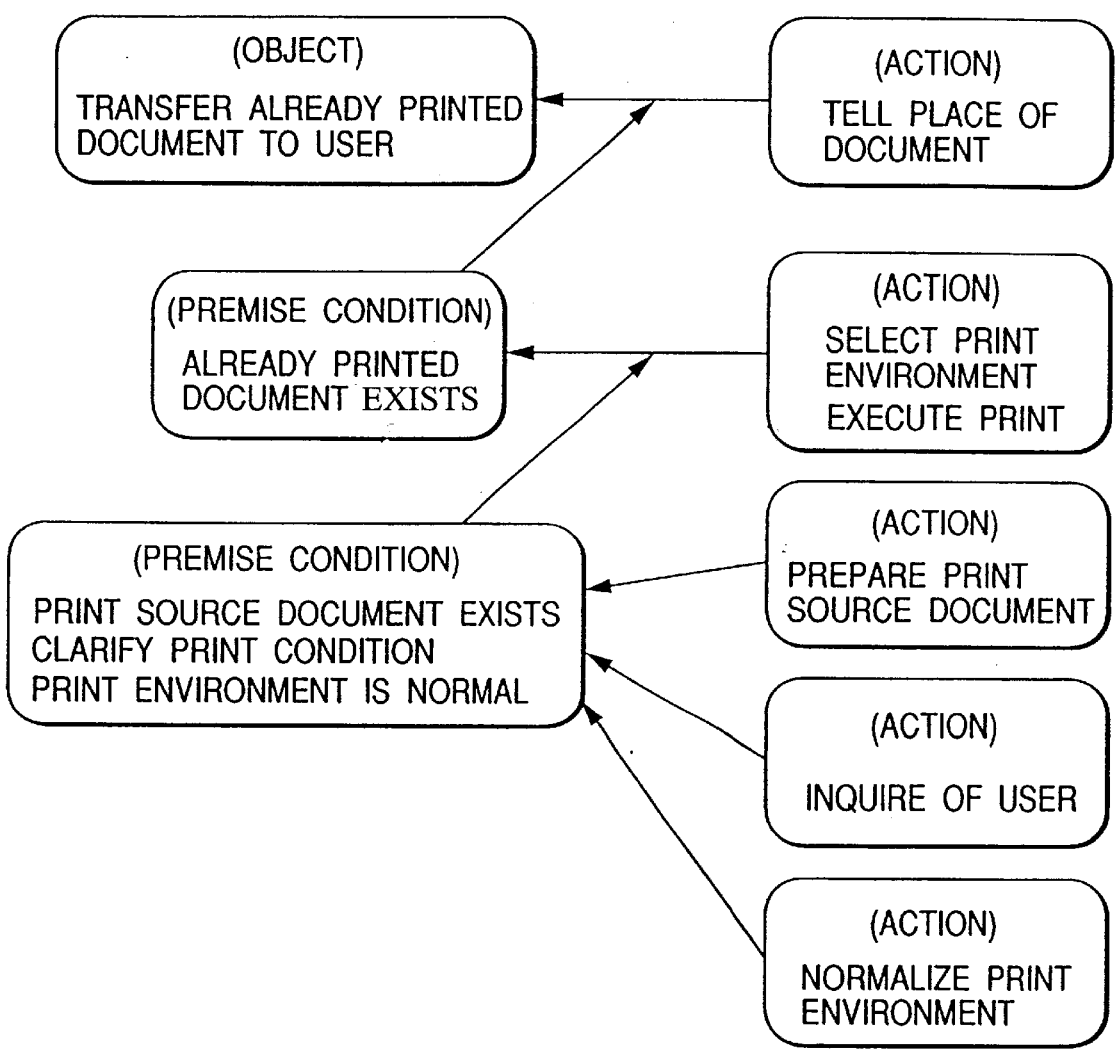
FIG. 38 is a diagram showing actions and premise conditions for an object.

FIG. 38 is a diagram that for easier understanding shows only one part of the table in FIG. 37.

In order to understand the object of the user, data that is input is identified. Further, corresponding to "acquire printed document" which is the object of the user in FIG. 36, "Transfer printed document to user" which is the object of the system.

The presence of a printed document is the premise for the transfer of the printed document to a user, and the object is achieved by notifying the user of the location of the document. Of course, the user must collect the document or the document must be delivered to the user by some means in order for the user to acquire the document; in this embodiment, it is determined that when the printed document is no longer in the printer tray, that is the equivalent of the user having acquired the document.

The presence of an original document and the printing conditions are required in order to obtain a printed document, and it is premised that a corresponding printing environment normally exists. In this situation, a corresponding printing environment is selected to perform printing. The original document must be so prepared that its existence is constant. In addition, to clarify the printing conditions, only when there is a question concerning a condition need ask a user queries. When a printing environment is abnormal, the printing environment is normalized to maintain normal environment. When no response is received from a user within a predetermined period of time, additional planning must be performed to ascertain the intent of the user.

The properties of each device are stored in a memory in each device, or in the memory of the server that manages each device. FIG. 39 is a table showing the properties of the devices. The statuses of the devices are held in the devices, and are voluntarily transmitted to other apparatuses by the devices, or by the passive transfer of them when requested by another server.

In this system, the properties are inherent to the individual devices and do not change; they are acquired when the system is activated or when a connection across the network is altered. In the planning process, the statuses are acquired, as needed, or at a specific time interval, and are updated as information intended for the internal memory.

[Twelfth Embodiment]

An explanation will now be given for the processing performed in a case where, as in the eleventh embodiment, a color printer is busy when <file A> is to be printed.

First, when "Print <file A>" is input, it is entered in the job table, and its object is understood to be a request that printing be performed. Assume as the condition/situation that the colored portion is included in a document and a color printer is busy. A plan is devised to query a user concerning whether the job can wait until the color printer is not busy, or whether the data can be printed in monochrome. The query, "The color printer is busy. Wait, or print in monochrome?" is presented to a user. When the user selects "Wait" the process is placed on standby until the color printer is no longer busy.

[Thirteenth Embodiment]

When "<file A> was changed to <file A'>" is input, it is ascertained that the updating of the job table is the object. As the condition/situation, the <file A> printing job is stored in the job table. Thus, a plan is made to query a user concerning the changing of the printing target to <file A'>. Then, the query "Print <file A'> instead of <file A> before amended?" is presented to the user.

[Fourteenth Embodiment]

According to this embodiment, in a system wherein a plurality of apparatuses are connected together (in this case, they are connected across a network), when a job for an individual apparatus is instructed, an analysis of the object of the job is performed by the appearance. When the apparatuses determine from their statuses and the status of the instructed apparatus, that the instructed apparatus should not execute the job, the performance of the job is transferred to another apparatus.

Figure 41A:
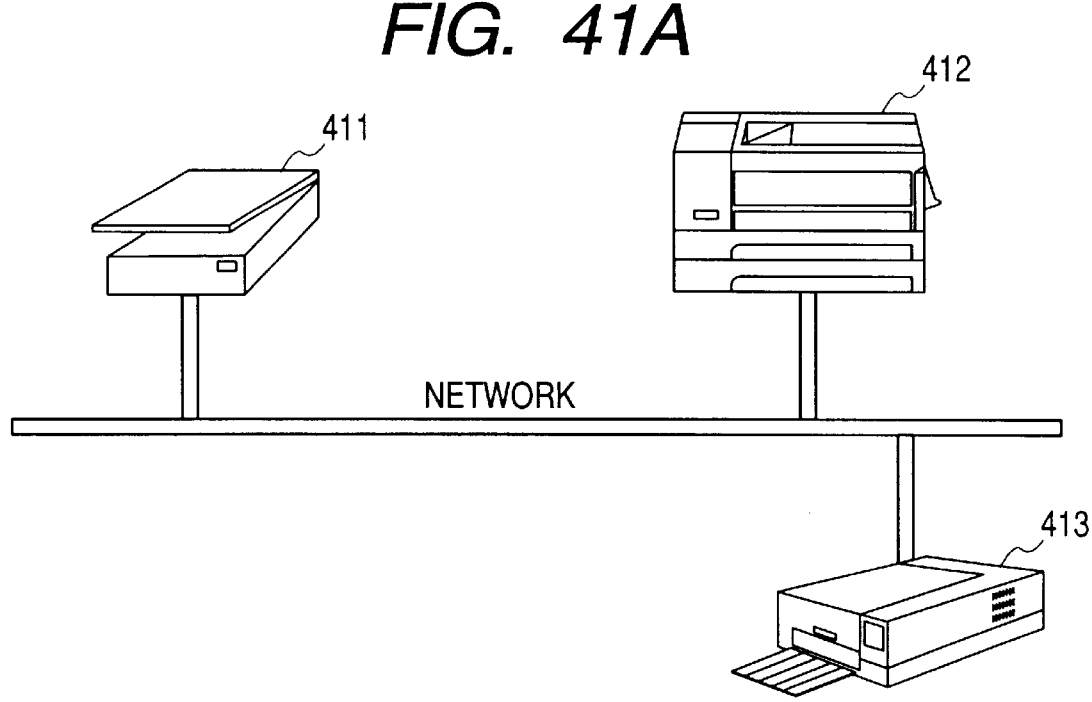
FIGS. 41A and 41B are diagrams showing states where a plurality of apparatuses are connected to a network.
Figure 41B:
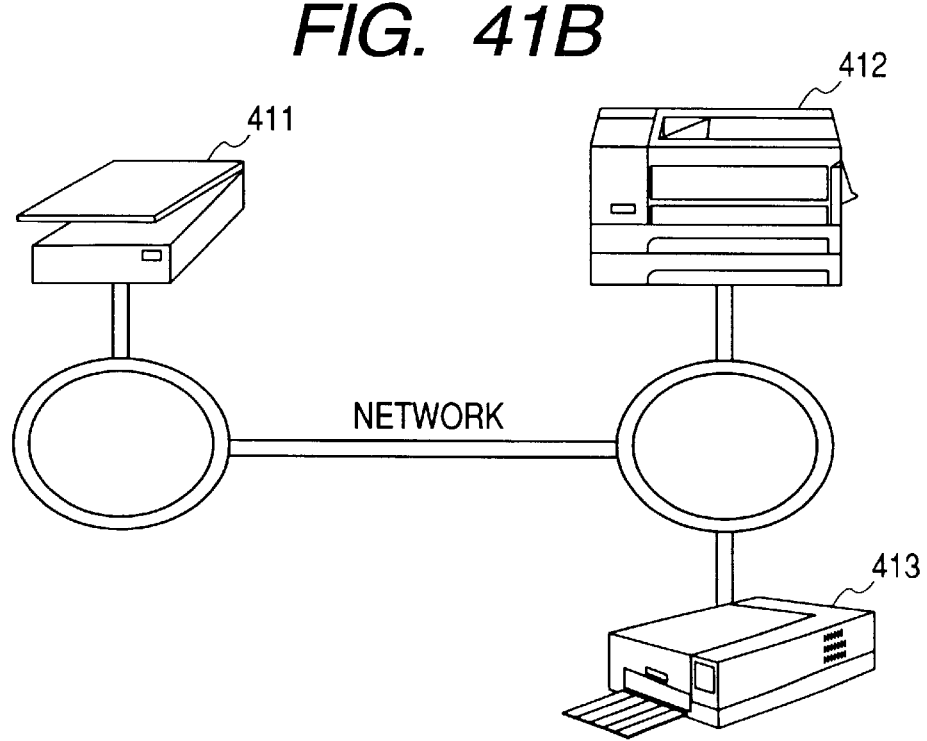

FIGS. 41A and 41B are diagrams in each of which is shown the condition where a plurality of apparatus are connected to a network. A network in FIG. 41A provides an environment wherein a scanner 411 and printers 412 and 413 can determine the states of the other apparatuses. A network in FIG. 41B provides an environment wherein the scanner 411 and the printers 412 and 413 can not determine the states of the other apparatuses.

Figure 42:
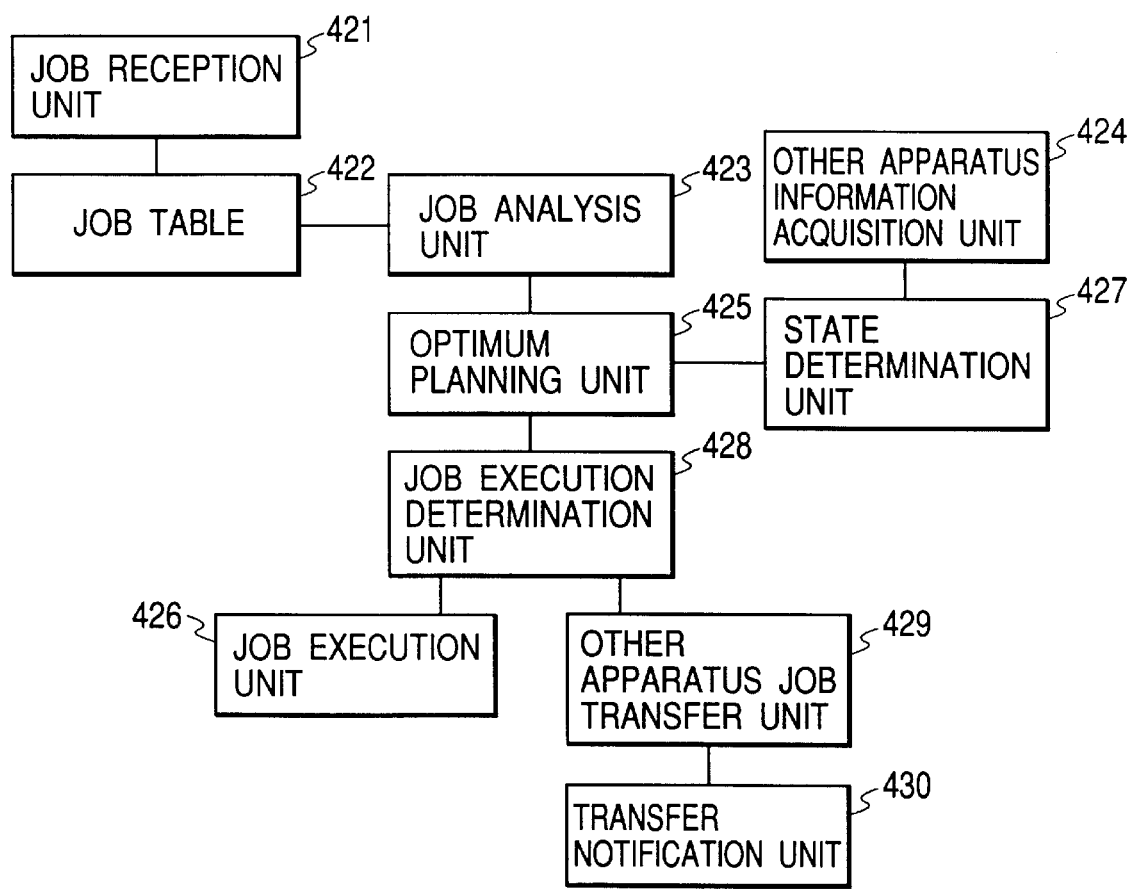
FIG. 42 is a diagram showing a functional arrangement for performing the processing for a fourteenth embodiment.

FIG. 42 is a diagram illustrating a functional arrangement for performing the processing in this embodiment. A job reception unit 421 receives a job from a user or from another apparatus. A received job is registered in a job table 422. A job analysis unit 423 extracts the job from the job table 422 and analyzes it. Another apparatus information acquisition unit 424 determines the attributes and the current statuses of other connected apparatuses. A self state determination unit 427 determines the attribute and the current state of the self apparatus.

An optimum planning unit 425 prepares an optimal plan for the performance of a job. A job performance determination unit 428 determines whether or not a job is to be performed, and whether the locally owned apparatus or another apparatus should perform the job. When the job is to be performed by the locally owned apparatus, a job performance unit 426 performs it. When another apparatus is to perform the job, another apparatus job transfer unit 429 transfers the job to another apparatus. A transfer notification unit 430 notifies a user of the results obtained by the job performance or the transfer of the job to another apparatus.

Figure 43:
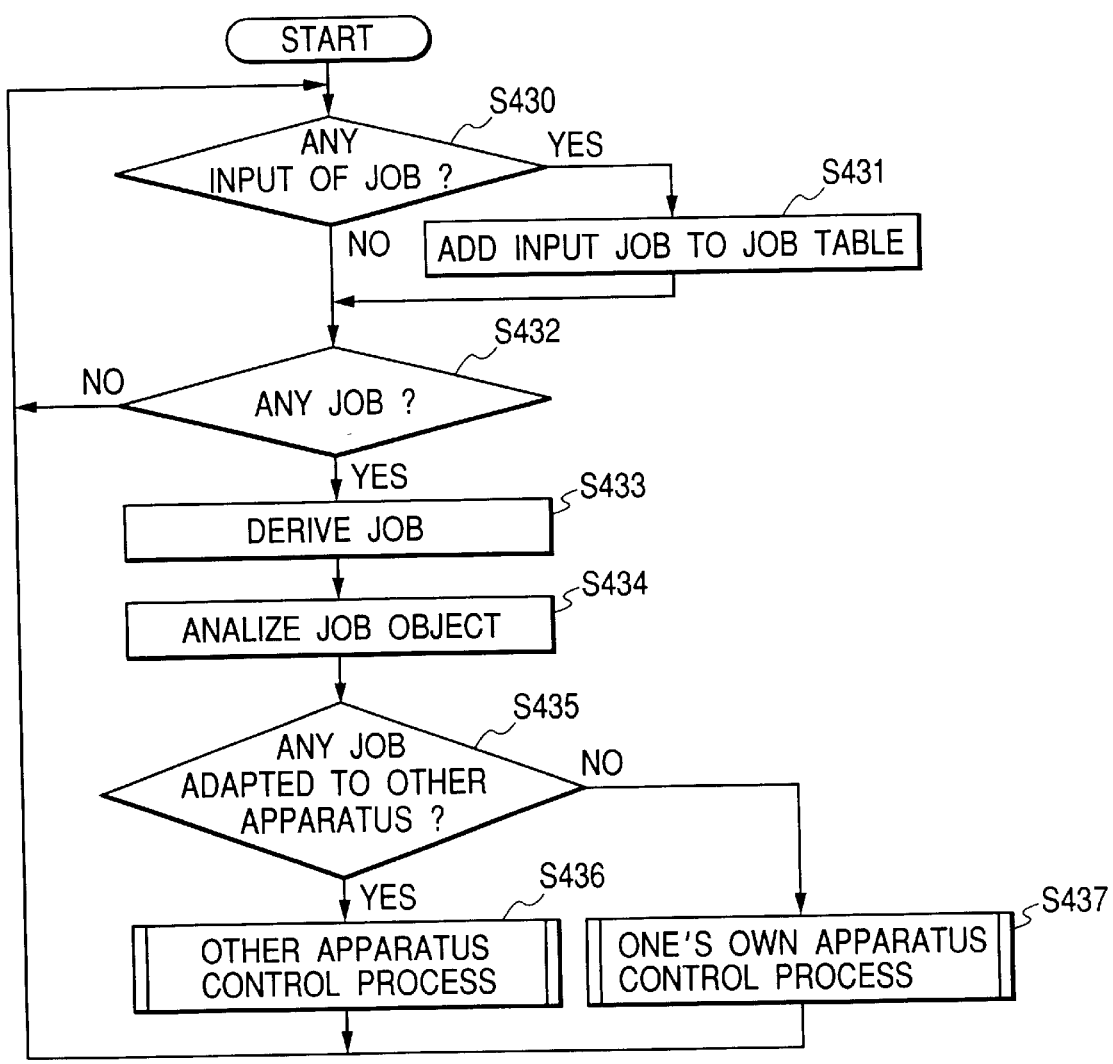
FIG. 43 is a main flowchart showing the processing for the fourteenth embodiment.

FIG. 43 is a main flowchart showing the processing performed for this embodiment.

At step S430, in order to determine whether a job has been input, a check is performed to determine whether or not a job has been input by a user, a job has been input by a device that can be detected by a system, based on the results obtained by analyzation of the jobs, or a new job that has been generated by the locally owned apparatus while idling. When a job has been input, at step S431, an input job is added to the job table. At step S432, the job table is examined to determine whether there is a job. If there is a job, at step S433 the job is extracted. At step S434 a received instruction is analyzed, and from the information attained by the analyzation, the object of the job is obtained. At step S435 a check is performed to determine whether or not a job for another apparatus is present. If there is such a job, at step S436 control of another apparatus is initiated. If there is no such job, at step S437 a control process the locally owned apparatus is initiated.

Figure 44:
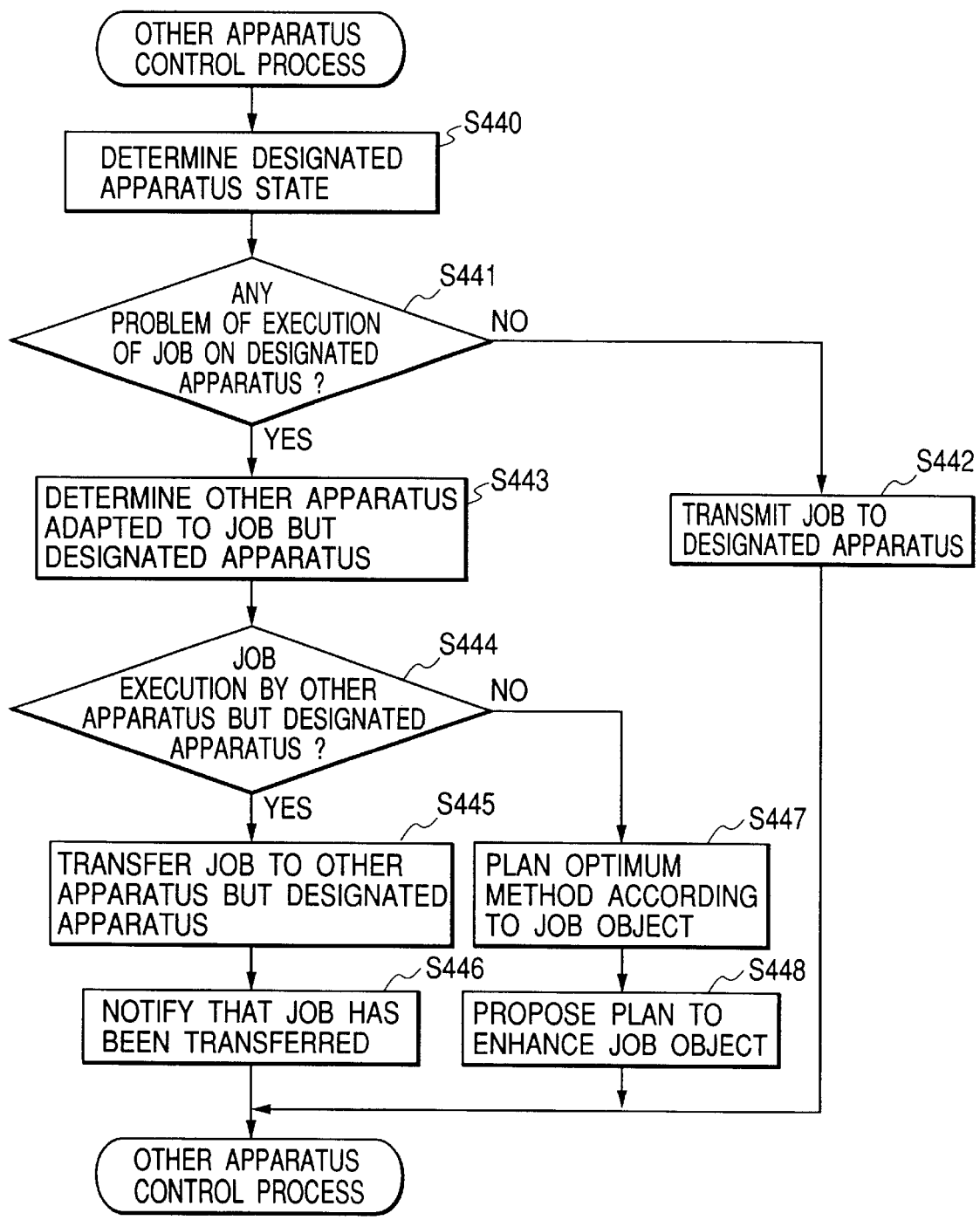
FIG. 44 is a flowchart showing the processing for controlling other apparatuses.

FIG. 44 is a flowchart for the process for controlling another apparatus performed at step S436 in the main flowchart.

At step S440 the status of an apparatus that is designated in the job is examined, and at step S441, based on the status, a check is performed to determine whether a problem affecting the performance of the job by the designated apparatus exists. If no such problem exists, at step S442 the job is transmitted to the designated apparatus. If a problem affecting the performance of the job by the designated apparatus exists, at step S443 a check is performed to determine whether or not there is an apparatus other than the designated apparatus that is suitable for the performance of the job. If there is such an apparatus, its status is examined. As a result, if there is another apparatus that can execute the job, at step S445 the job is transferred to that apparatus, and at step S446 the user is notified of that the job was transferred to that apparatus. When there is no apparatus other than the designated apparatus that can perform the job, or when another suitable apparatus can not be used at that time, at step S447 an optimal plan is devised that will not degrade the object of the job, and at step S448, the plan is proposed to the user.

Figure 45:
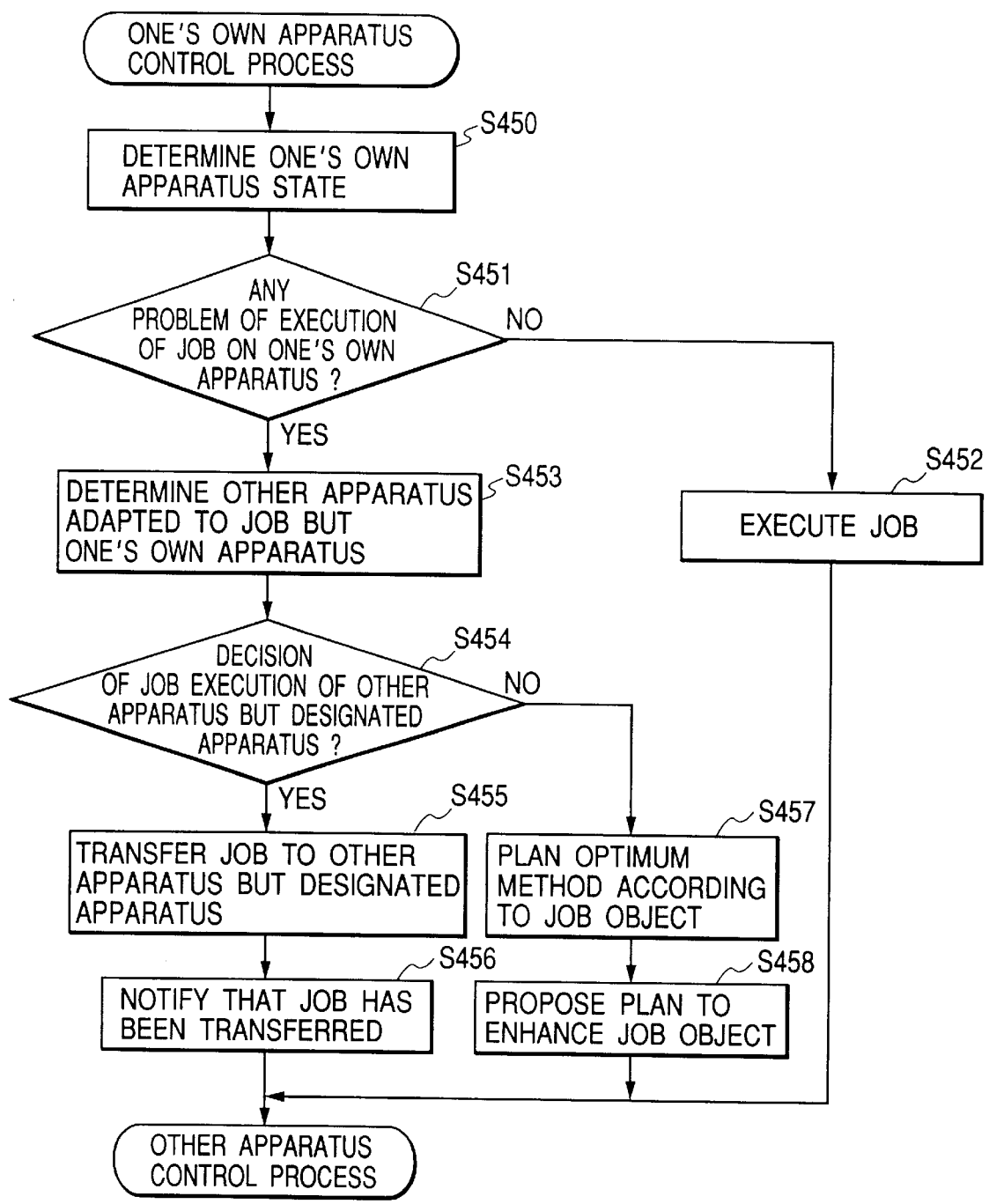
FIG. 45 is a flowchart showing the processing performed by one's own apparatus.

FIG. 45 is a flowchart for the process for controlling the locally owned apparatus performed at step S437 in the main flowchart.

At step S450 the status of the locally owned apparatus is examined, and at step S451, based on the status, a check is performed to determine whether a problem affecting the performance of the job by the locally owned apparatus exists. If no such problem exists, at step S452 the job is performed by the locally owned apparatus. If a problem affecting the performance of the job by the locally owned apparatus exits, at step S453 a check is performed to determine whether or not there is an apparatus other than the locally owned apparatus that is suitable for the performance of the job. If there is such an apparatus, its status is examined. As a result, if there is another apparatus that can execute the job, at step S455 the job is transferred to that apparatus, and at step S456 the user is notified that the job was transferred to that apparatus. When there is no apparatus other than the locally owned apparatus that can perform the job, or when another suitable apparatus can not be used at that time, at step S457 an optimal plan is devised that will not degrade the object of the job, and at step S458, the plan is proposed to the user.

Figure 46:
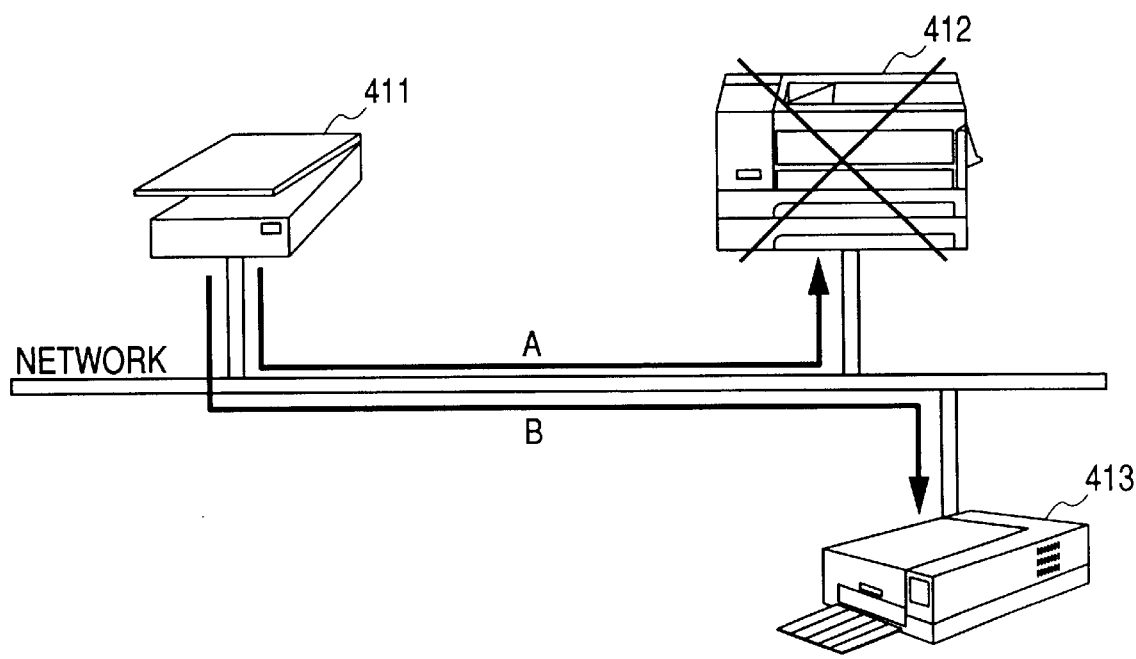
FIG. 46 is a diagram showing an example where a printer other than a designated printer is employed for output.

FIG. 46 is a diagram showing the condition that exists when, while, in FIG. 41A, an instruction is issued to output to the printer 412 along route A information that has been read by the scanner 411, the other apparatus information acquisition unit 424 of the scanner 411 discovers a malfunction at the printer 412, and this information is output to the printer 413 along route B.

Figure 47:
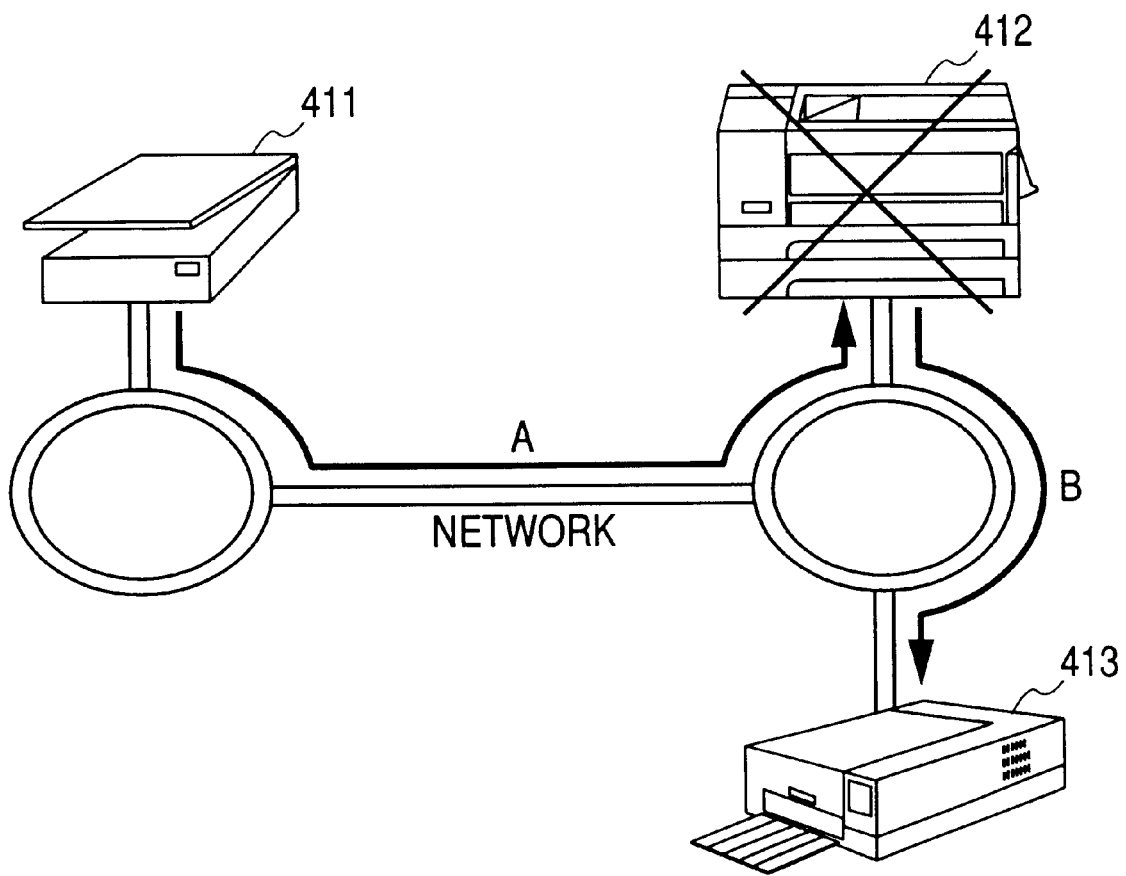
FIG. 47 is a diagram showing an example where a designated printer transfers a job to another printer.

FIG. 47 is a diagram showing the condition that exists when, while, in FIG. 41B, the scanner 411 is instructed to output the information that is read to the printer 412 along route A and to confirm the status of the printer 412, since the printer 412 is located in a remote area, the scanner 411 takes the status of the network into account and unconditionally transmits the information to the printer 412, which then, because a malfunction has occurred there, transfers the received information (job) to the printer 413.

The processing performed in FIGS. 46 and 47 will be described while referring to the flowcharts shown in FIGS. 43 to 45.

When in FIG. 46 a job is to be output by the scanner 411 and transferred to the printer 412, the scanner 411 performs the following process.

First, at step S430 the scanner 411 receives a job for the scanning of information and the transmission of it to the printer 412. At step S431 the job is entered in the job table, and at step S433, it is extracted therefrom. At step S434 the scanner 411 scans the data and ascertains the job involves the transmission of data to a designated printer. At step S435 it is determined that there is a job, which is to be executed by another apparatus, for the output of the scanned information by the printer 412. Based on this determination, at step S436 program control moves to another apparatus control process in FIG. 44.

At step S440 the current state of the printer 412 is acquired. Then, information that the printer 412 has malfunctioned is received, and at step S441 it is determined that printing by the printer 412 is disabled. In this case, besides a malfunction, the printer 412 can also be in an out of paper or out of toner disabled state. At step S443, it is assumed that the designated printer 412 can not execute the job, and another apparatus that can execute the job is searched for by communicating with the other apparatuses across the network. At step S444 it is found that the printer 413 can execute the job and the performance of the job is assigned to it.

At step S445 the scanned information is transmitted to the printer 413. And at step S446, since a process other than the one instructed is being performed, the user is notified of the job alteration. Since the process for the instructed job has been terminated, the system waits for the next job.

Following this, a process in FIG. 47 where a job is to be output by the scanner 411 and transmitted to the printer 412 will now be explained.

First, at step S430 the scanner 411 receives a job for the scanning of information and the transmission of the information to the printer 412. At step S431 the job is entered in the job table, and at step S433, it is extracted therefrom. At step S434 the scanner 411 scans the data and ascertains the job is for the transmission of data to a designated printer. At step S435 it is determined that there is a job, which is to be executed by another apparatus, for the output of the scanned information by the printer 412. Based on this determination, at step S436 program control moves to another apparatus control process in FIG. 44.

At step S440, while the scanner 411 communicates with the printer 412 and attempts to acquire its status, it is found that the printer 412 is in a remote area and the scanner 411 decides to transmit the information, regardless of the status of the printer 412. At step S441 it is determined that there is no problem with the printer 412 since it is in a remote area, and at step S442 the scanned information is transmitted to the printer 412, which is the designated apparatus, and the job is transferred thereto. Since the instructed job has been terminated, the scanner 411 waits for the next job.

At step S430 the printer 412 receives the job for outputting the received information. At step S431 the job is entered in the job table, and at step S433, it is extracted therefrom. At step S434 the printer 412 understands that the job is for the printer 412 to output the received information. At step S435 it is determined that there is no job for another apparatus, and at step S437 program control moves to an own apparatus control process in FIG. 45.

At step S450 the current state of the printer 412 is examined, and at step S451 the printer 412 judges by itself that the printer 412 has a malfunction and is in a printing disabled state. In this case, besides the malfunction, the printer 412 can be in such an output disabled state as out of paper or out of toner. At step S453, another apparatus that can execute the job is searched for by communication with the other apparatuses across the network.

At step S454 the printer 413 that can execute the job is found, and the execution of the job at the printer 413 is determined. At step S455, the printer 412 transmits the received information to the printer 413. At step S456, since the process other than being instructed is performed, the user is notified of the alteration of the job. In this embodiment, such a notice is issued to the instruction source user. Since the output destination is far away from the instruction source, the notice may be issued to a recipient. Since the instructed job has been terminated, the system waits for the next job. As at the printer 413 there is no processing problem and the printer 413 can perform the job for the output of the received information, the printer 413 performs the job.

In the above embodiment, the individual units automatically transfer the job. If there is a problem at each apparatus, a user may provide a transmission order for the transfer of the job by the apparatuses. In this embodiment, a user inputs as a job the employment of a designated printer to print a scanned document; however, a second and a third printer may at the same time be set for the job, so that if the designated printer malfunctions they can replace it and perform the printing. Thus, at step S443 or S453, the second or the third printer can be selected as a suitable apparatus for the job and its status is examined. A second or a third printer may be set as a printer to receive a job and to replace a designated printer when it is in a printing disabled state. However, even when a second or the third printer is not set for the job, the printer that receives the job can transfer it in consonance with destinations that are set internally.

In addition to a malfunction and an operation disabled state, the following conditions can cause the performance of a job to be canceled: the specifications may be inappropriate for the performance of the job, e.g., a case where a job for the printing of color data is issued to a monochrome printer; or immediate processing of the job may not be possible because there are too many jobs in a queue.

[Fifteenth Embodiment]

In this embodiment, in a process for determining the status of the locally owned apparatus at step S450 in FIG. 45, schedule information for a user, which is the object, is examined as a factor that is used to determine whether a problem exists that will affect the performance of a job involving the output to a user of urgent information received by a printer.

Figure 48:
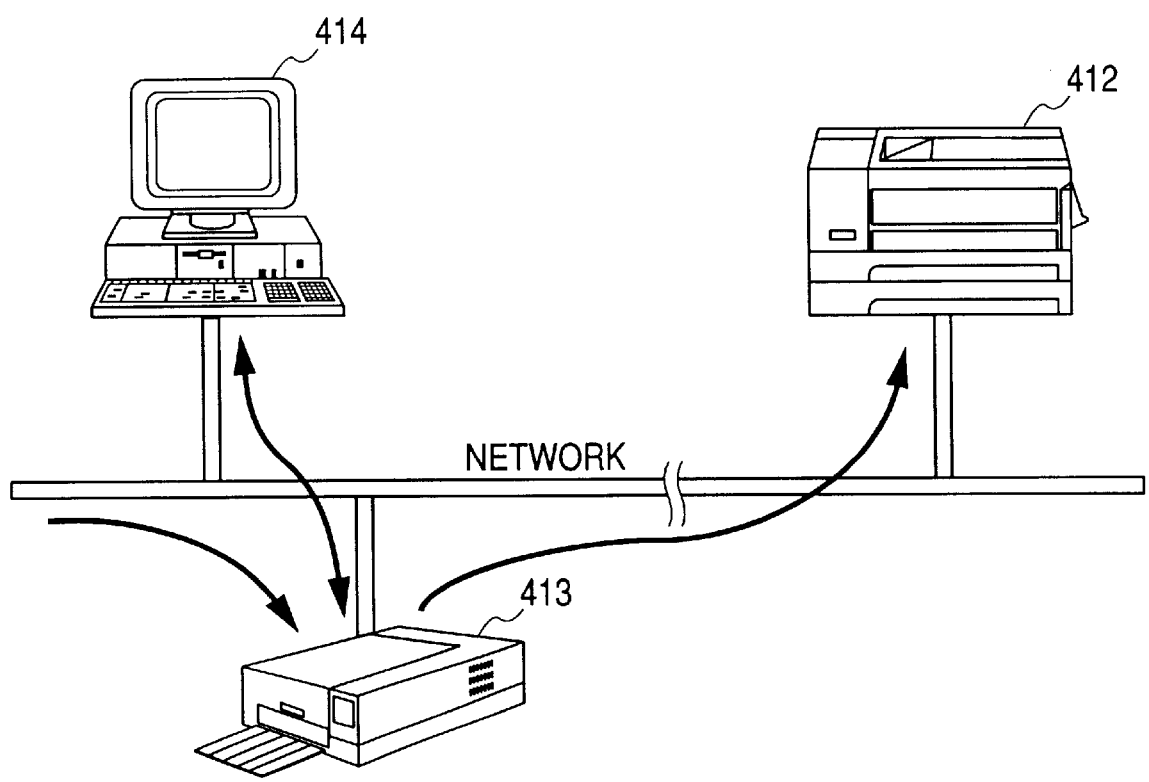
FIG. 48 is a diagram showing an example where a user's printer transfers a job to a printer at a user's destination.

An explanation will be given for a process that is to be performed in the environment shown in FIG. 48, where a user, to whom urgent information is to be transmitted, is currently at an outside location at which a printer 412 is available that is connected to a network.

In the procedures in FIG. 43, at step S434 it is ascertained that the object of the job is the transmission to a user of urgent information that has been received. At step S435, since at this time there is no job for another apparatus, program control moves to step S437. At step S437 the process advances to the locally owned apparatus control process in FIG. 45.

At step S450, in order to determine the status of the locally owned apparatus, the schedule of a user who is designated as a transmission source is confirmed by the PC 414, and it is ascertained that the user is at an outside location. Since the user is at an outside location, at step S451 it is determined that a problem related to making urgent contact exists at the locally owned apparatus. At step S453 a check is performed to determine whether or not a printer that can output information is present at the user's destination. At step S454 it is confirmed that there is a printer 412 that can output information, and it is determined that the printer 412 will be used to output the information. At step S455 the information is transmitted to the printer 412. At step S456 the users at the transmission source and at the reception destination are notified that the job has been transferred.

When, at step S443, there is no printer available to which to transfer the job but there is another apparatus that can be employed by the user, such as a PC, a facsimile machine or a telephone, at step S444 it may be determined to perform the job by using one of the available apparatuses. Since the information can not be transmitted unchanged, at step S445 the information to be output to the printer is converted into an electronic mail document or a facsimile document, or is changed to voice information for the output.

At step S446, depending on the medium used for the output, a notice that the job was transferred to another medium need not be issued, and can be transmitted by using the same medium. For example, when a telephone is used to transmit the information, it is better to notify a user of the job transfer before or after the transmission of the information.

Instead of the telephone, at step S443, the above PC, the facsimile machine or the telephone may be determined to be a suitable apparatus to replace the printer for the job. At step S447 the employment of such an apparatus may be determined to be an optimal plan that does not degrade the object of the job, and at step S448 the plan may be proposed to a user.

[Sixteenth Embodiment]

Figure 49:
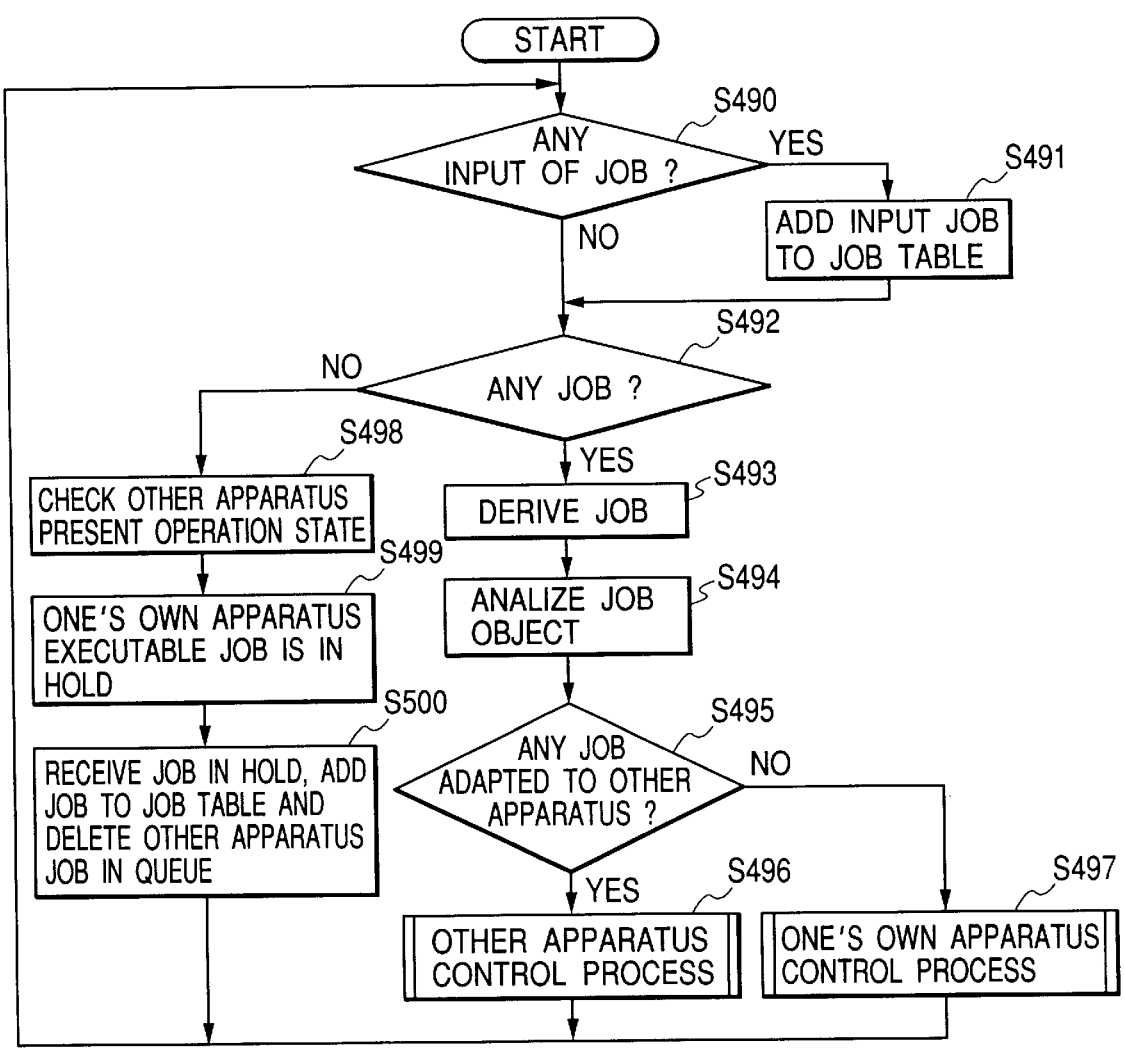
FIG. 49 is a flowchart showing the processing for a sixteenth embodiment.

FIG. 49 is a flowchart showing the processing for this embodiment. Steps S498 to S500 are additionally provided for the flowchart in FIG. 43 as a process to be performed when there is no job. At step S498 the current operating statuses of other apparatuses are examined, and at step S499 a check is performed to determine whether or not a job that the locally owned apparatus can perform is being held in another apparatus and not being performed. If such a job is being held in another apparatus, at step S500 the job is extracted from the pertinent apparatus and is entered in the job table for the locally owned apparatus, while it is deleted from the job table for the pertinent apparatus. In this embodiment, therefore, an apparatus finds a job by itself and processes it.

Figure 50:
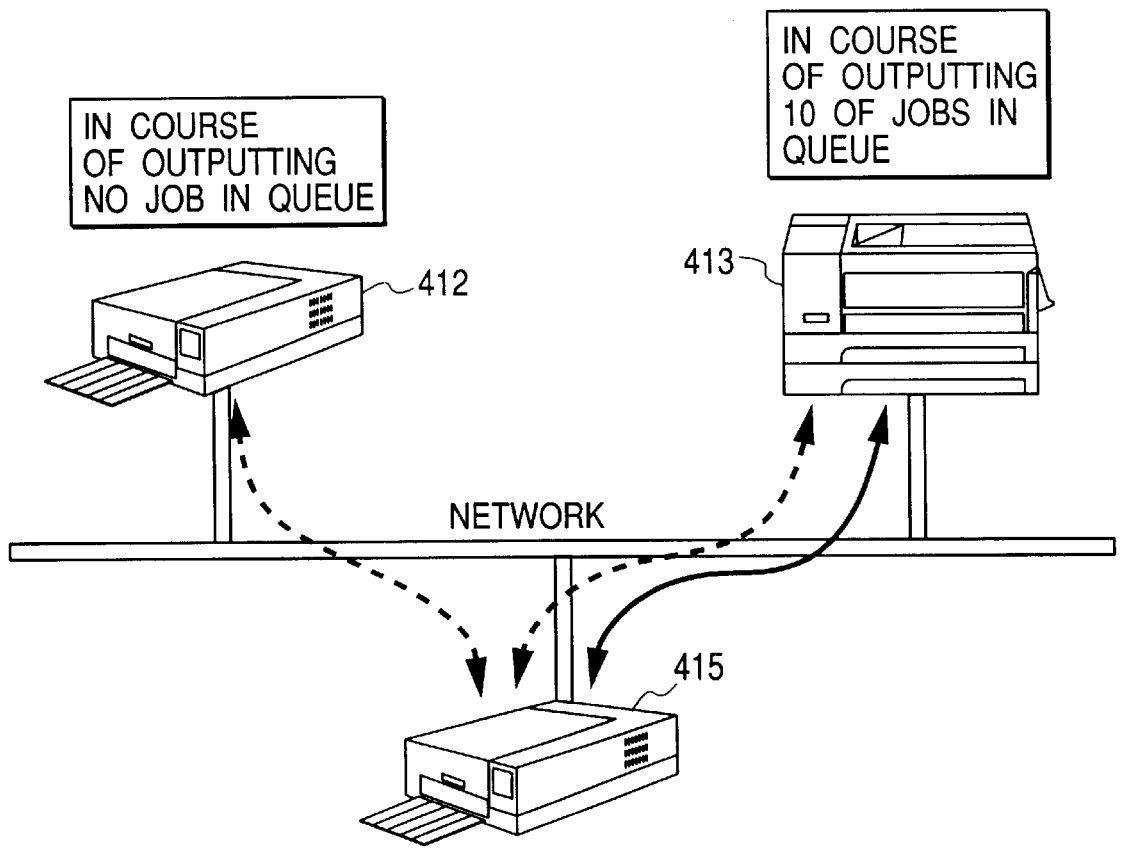
FIG. 50 is a conceptual diagram showing the processing for the sixteenth embodiment.

FIG. 50 is a conceptual diagram showing the situation for this processing. Since no job is present in a printer 412, and a printer 413 has ten jobs in a queue, a printer 415 acquires a job from the printer 413 and processes it.

The process performed by the printer 415 is as follows. At step S492 there is no job, and program control moves to step S498. At step S498 the current statuses of the other printers, 412 and 413, are examined. At step S499 it is determined that at the printer 413 there is a job that the printer 415 can execute. At step S500 the printer 415 extracts that job from the printer 413, and enters it in its job table. Then, the extracted job is deleted from the job table for the printer 413. Since at step S490 there is no job input, and at step S492 there is a job that was entered previously, program control moves to step S493 to execute the job.

The operations for the performance of the job by the locally owned apparatus, which were explained in the fourteenth and the fifteenth embodiments, are performed, and the processing is thereafter terminated.

[Seventeenth Embodiment]

Figure 51:
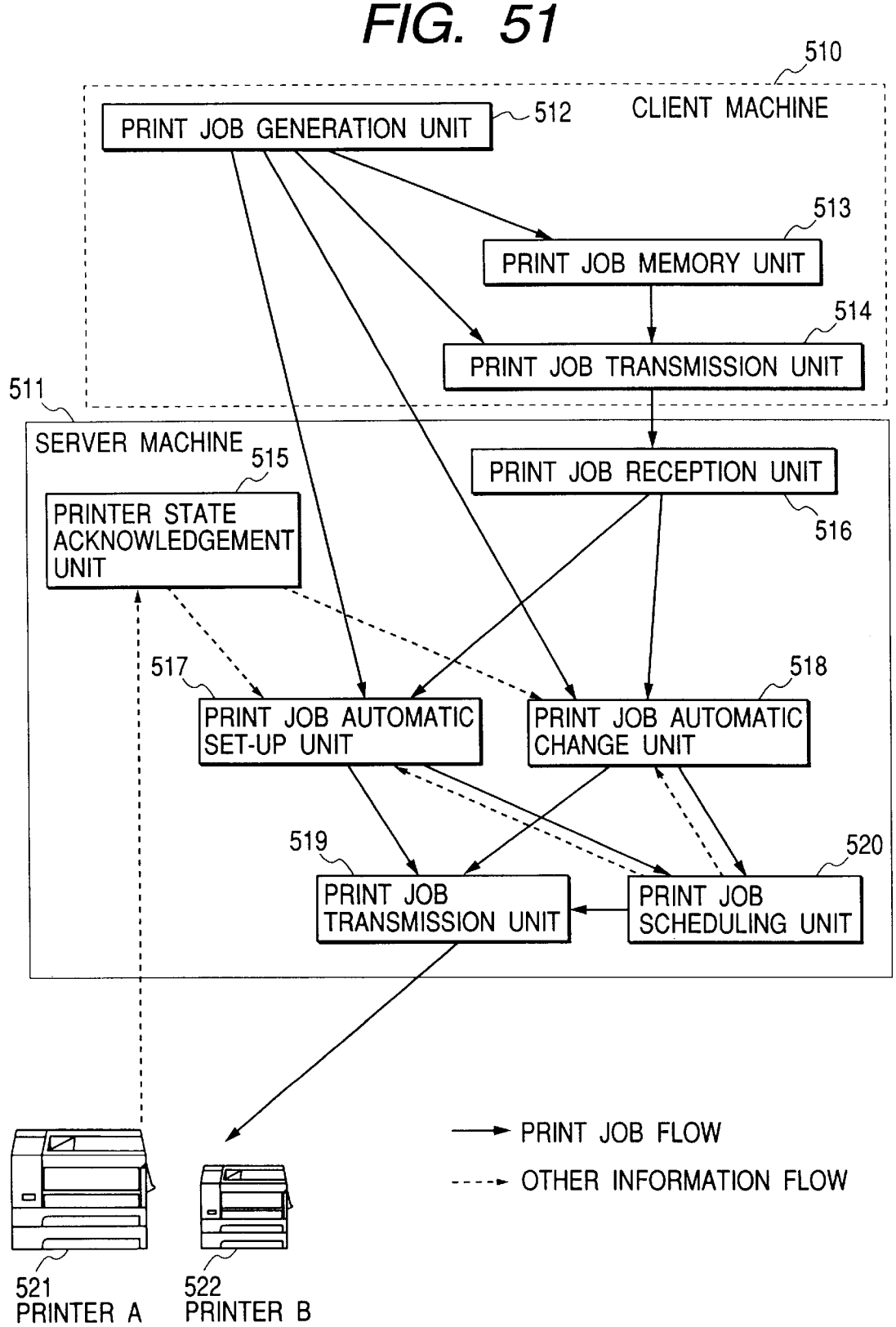
FIG. 51 is a diagram showing transmission of a job for a seventeenth embodiment.

FIG. 51 is a diagram showing the transmission in this embodiment of a print job and other information in a system employing apparatuses. The heavy arrows are used to depict the transmission routes for the print jobs, and the broken line arrows are sued to depict the transmission routes for other information.

The print job in this embodiment includes parameters that are referred to during printing: the document to be printed; the number of print copies; the print quality; and the print size. The other information includes the statuses, such as printing, normal, or out of paper, of individual printers, and a schedule for a print job processed by a print job scheduling unit.

In FIG. 51, in a client machine 510, a print job generation unit 512 generates a print job, and stores it in a print job memory unit 513. Then, the print job is transmitted by a print job transmission unit 514 in the client machine 510 to a server machine 511 for managing printers.

In the server machine 511, a print job reception unit 516 receives the print job. When the parameters of the print job have not yet been set, the print job is transmitted to a print job automatic setup unit 517, and when the parameters have already been set, the print job is transmitted to a print job automatic change unit 518.

The print job automatic setup unit 517 sets print parameters while taking into consideration the urgency, economy and the quality that are acquired by the print job. The print job automatic change unit 518 can perform the same process for changing parameters that have previously been set. The print jobs that are set or altered are registered in a print job schedule included in a print job scheduling unit 520 and are sequentially read to a print job transmission unit 519, or the print job may be directly transmitted to the printer job transmission on the unit 519 from the print job automatic setup unit 517 or the print job automatic change unit 518. The printing is then performed.

The status, such as in printing, normal or out of paper, of an available printer is acquired by a printer state acknowledgement unit 515, and is transmitted to the print job automatic setup unit 517 and the print job automatic change unit 518 where it is employed for the setup or change of the print job. Similarly, the printing schedule for the print job included in the print job scheduling unit 520 is also transmitted to these units 517 and 518 for their employment.

As is shown in FIG. 51, a print job may be transmitted along a different route. When a machine for generating a print job is the same as a machine for managing printers, the print job may not be transmitted via the print job transmission unit 514.

Figure 52:
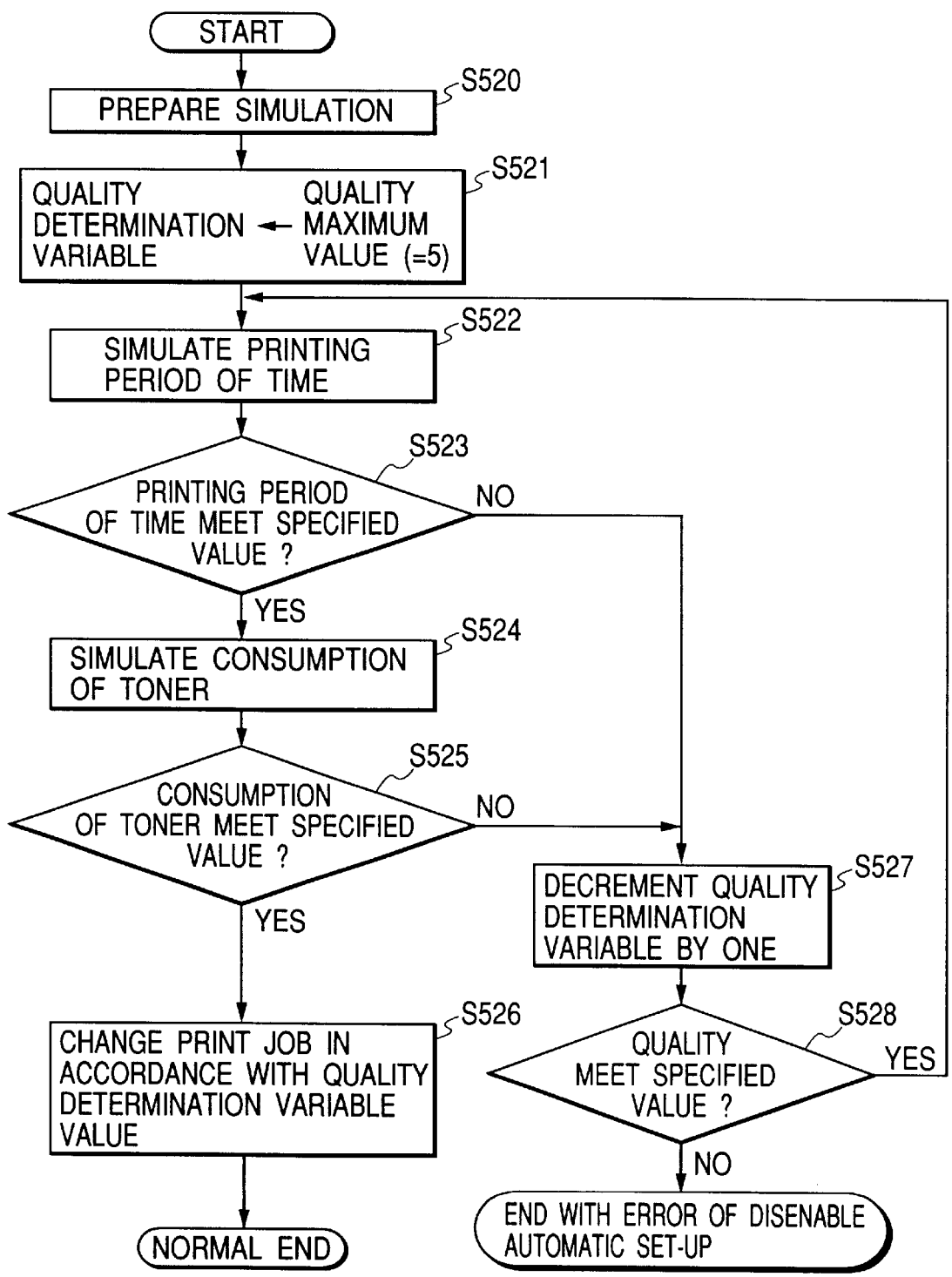
FIG. 52 is a flowchart showing the processing performed by a print job automatic setup unit.

FIG. 52 is a flowchart showing the processing performed by the print job automatic setup unit 517. The print job automatic setup unit 517 automatically sets parameters within a range that satisfies a designated quality and the printing can be performed as rapidly and as economically as possible.

In FIG. 52, at step S520 a factor for determining the printing time and the amount of consumed toner is initialized in preparing for the simulation. Then, at step S521 a quality determination variable is initialized to a maximum quality value (e.g., 5), and at step S522 the period of time for the printing is simulated. At step S523 a check is performed to determine whether the simulated period of time for the printing equals a specified value. When the time period for the printing equals a specified value, at step S524 the consumption of toner is simulated. At step S525 a check is performed to determine whether the simulated consumption of toner equals a specified value. When the consumption of toner equals a specified value, the job is changed to the current quality determination variable value at step S526.

When, at step S523 or S525, the period of time for the printing or the consumption of toner is not equivalent to its specified value, at step S527 the quality determination variable is decremented by one. At step S528 a check is performed to determine whether or not the resultant quality determination variable satisfies is equivalent to a designated quality. When the designated quality is satisfied, program control returns to step S522. When the designated quality is not satisfied, the processing is terminated with an automatic setup disabled state.

FIG. 53 is a table showing the period of time for the printing and the consumption of toner for one character corresponding to different specified qualities for the printers A521 and B522. These values may be fixed values inherent to individual printers, or may be dynamic variable values, which are averages obtained for printing periods or for consumption of toner that were measured in the past.

Figure 54:
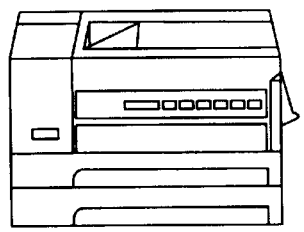
FIG. 54 is a diagram showing the contents of a print job and parameters designated by a user.

FIG. 54 is a diagram showing the contents of a print job that is to be output in this embodiment, and parameters that were designated by a user. In the system for the embodiment, the contents of a print job in FIG. 54 and the set-up parameters are collectively called a print job. In this embodiment, calculated in terms of characters, 500 characters are employed as the printing quantity for the print job in order to simulate the period of time for the printing and the consumption of toner. In addition, it is assumed that for urgency a user will designate a period of only one minute, and will keep the default values for economy and quality.

In the example shown in FIG. 54, when the print job automatic setup unit 517 is activated, at step S520 in preparing of simulation, a factor for determining the period of time for the printing and the consumption of toner is initialized. As defined in the table in FIG. 53, for example, the periods of time required for the printing of one minimum quality (=1) character by the printer A521 and the printer B522 are, on average, 100 mS and 200 mS respectively, and the consumption of toner for one character are 100 mg and 200 mg.

Following this, at step S521 the quality determination variable is initialized to the maximum quality value (e.g., 5), and at step S522 the printing period of time for the printing is simulated. If, for example, the printers A521 and B522 are prepared for printing and no print job is scheduled in the print job scheduling unit 520, printing can be initiated immediately, and no waiting time is required. Thus, when the target print job includes 500 characters, as simulation, printer A takes 250 seconds to print the characters and printer B takes 500 seconds.

Then, at step S523 it is determined that this condition does not satisfy the one minute urgency period that is specified by the parameter in FIG. 54, and at step S527 the quality determination variable value is decremented by one.

Since the quality is not specified in the parameter in FIG. 54, program control returns to step S522 for simulation of the period of time for the printing. When, as the result of the repetition of the above process, the quality is set to the minimum quality of 1, the period of time for the printing by the printer A521 is 50 seconds, which satisfies the urgent figure. Therefore, the quality is set to the minimum quality determination variable value (=1), and the processing is normally terminated.

If the quality is set to 2 or higher, it does not meet the parameters set by the user, and the processing is terminated as an automatic setup disable error.

[Eighteenth Embodiment]

Figure 55:
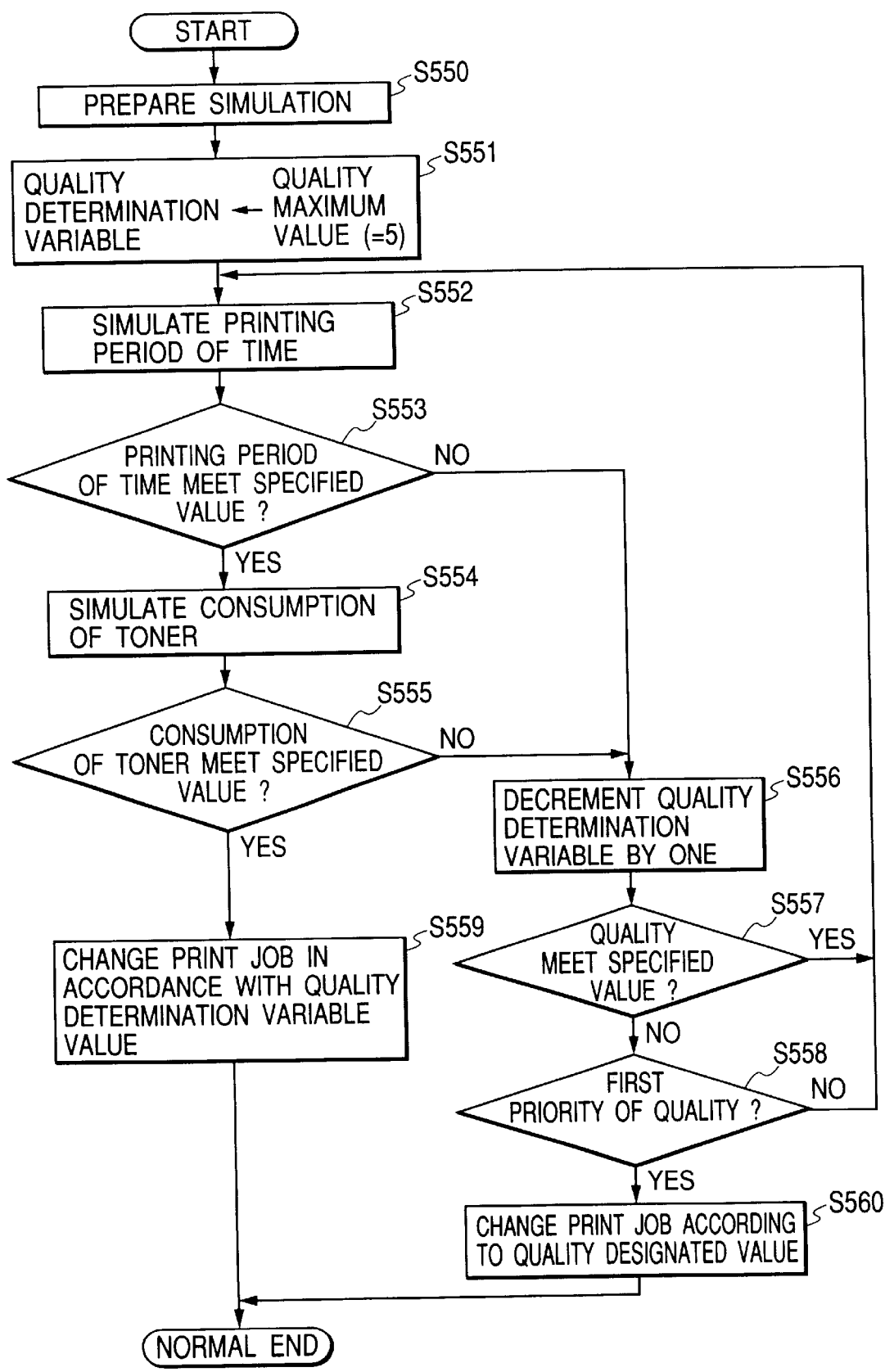
FIG. 55 is a flowchart showing the processing performed by a print job automatic change unit.

FIG. 55 is a flowchart showing the processing performed by a print job automatic change unit 518. The print job automatic change unit 518 automatically changes a parameter within a range that satisfies a specified urgency and economy so as to print data having as high a quality as possible. When all the specified parameters can not be satisfied, the most important designated parameter is satisfied and the others are changed as slightly as possible.

FIG. 56 is a diagram showing the contents of a print job that is to be output in this embodiment, and parameters designated by a user. In the system of the embodiment, the contents of a print job in FIG. 56 and the set-up parameters are collectively called a print job. In this embodiment, calculated in terms of characters, 500 characters are employed as the printing quantity for the print job in order to simulate the period of time for the printing and the consumption of toner. In addition, it is assumed that a user designates all of the parameters and particularly specifies that the quality is the most important.

In the example shown in FIG. 55, when the print job automatic change unit 518 is activated, at step S520 in preparing for the simulation, a factor for determining the period of time for the printing and the consumption of toner is initialized. As is defined in the table in FIG. 53, for example, the period of time required for the printing of one minimum quality (=1) character by the printer A521 and the printer B522 are, on average, 100 mS and 200 mS respectively, and the consumption of toner for one character are 100 mg and 200 mg.

Following this, at step S551 the quality determination variable is initialized to the maximum quality value (e.g., 5), and at step S552 the period of time for the printing is simulated. If, for example, the printers A521 and B522 are prepared for printing and no print job is scheduled in the print job scheduling unit 520, printing can be initiated immediately, and no waiting time is required. Thus, when the target print job includes 500 characters, as simulation, printer A takes 250 seconds to print the characters and printer B takes 500 seconds.

Then, at step S553 it is determined that this condition does not satisfy the one minute urgency period that is specified by the parameter in FIG. 56, and at step S556 the quality determination variable value is decremented by one.

Since, at step S557, the quality in the parameter in FIG. 56 is not satisfied, program control returns to step S552 for simulation of the period of time for the printing. As a result of the repetition of the above process, even when the quality is the one (=3) designated by the user, the urgency period can not be satisfied. When, at step S556, the quality determination variable value is decremented by one, at step S557 the quality specified by the user is still not satisfied, and program control therefore moves to step S558. At step S558 a check is performed to determine whether the quality is the most important parameter. When the quality is the most important parameter, at step S560 the print job is changed in accordance with the specified quality, and the processing is normally terminated.

For a case where the urgency is specified as the most important, when the quality is set to the minimum quality of 1, the printing period for the printer A521 is 50 seconds, which conforms to the urgency setting. Therefore, the quality is set to the quality determination variable value (=1), and the processing is normally terminated.

[Nineteenth Embodiment]

Figure 57:
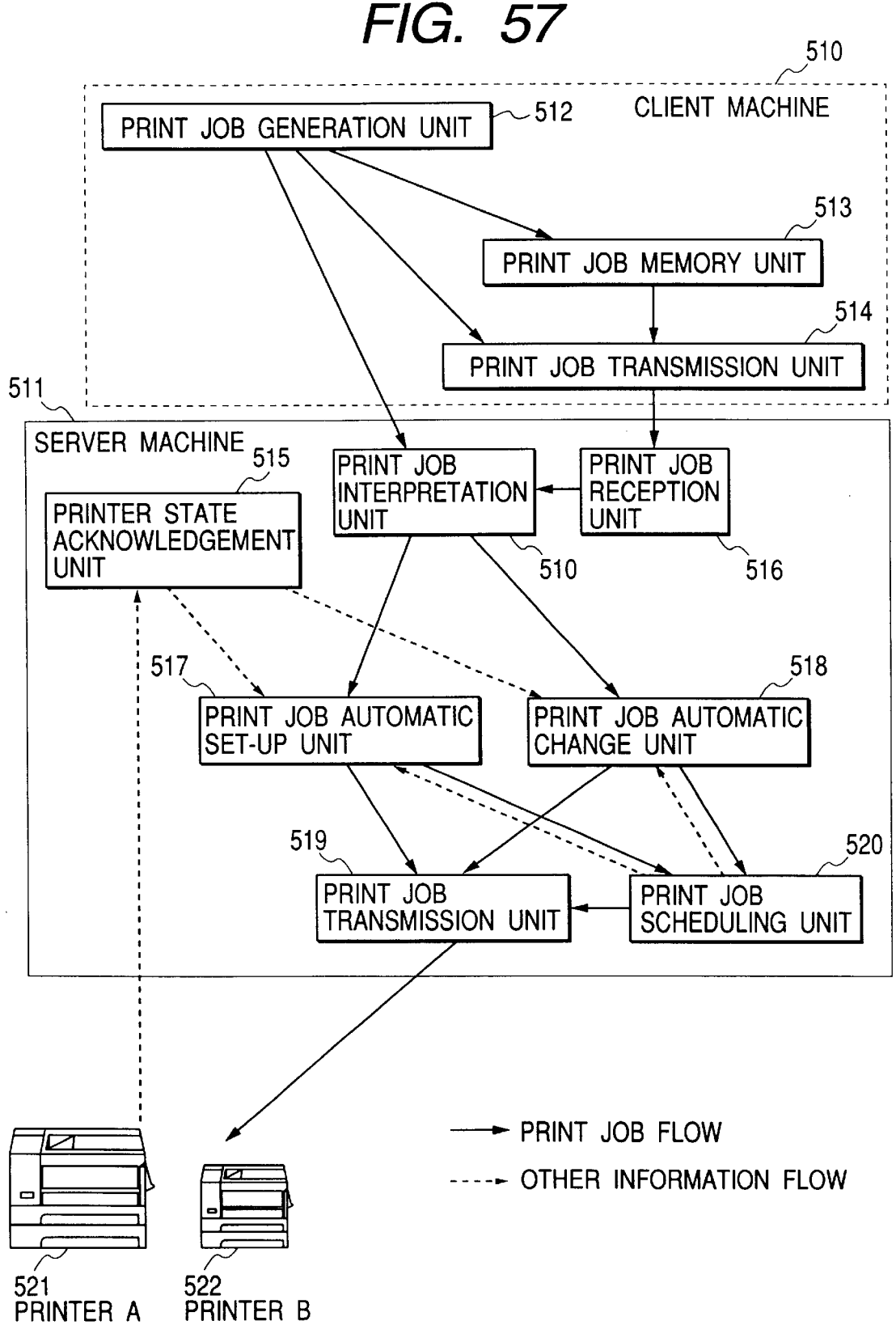
FIG. 57 is a diagram showing transmission of a job for a nineteenth embodiment.

FIG. 57 is a diagram showing the transmission of a print job and other information in a system in this embodiment employing apparatuses. The thick arrows describe the transmission routes for print jobs and the broken line arrows describe the transmission routes for other information.

The print job in this embodiment includes parameters that are referred to during printing: a document to be printed; the number of print copies; the print quality; and the print size. The other information includes statuses, such as printing, normal, or out of paper, of individual printers, and a schedule for a print job that is included in a print job scheduling unit 520.

In FIG. 57, in a client machine 510, a print job generation unit 512 generates a print job and stores it in a print job memory unit 513. Then, the print job is transmitted by a print job transmission unit 514 in the client machine 510 to a server machine 511 for managing printers.

In the server machine 511, a print job reception unit 516 receives the print job and transmits it to a print job interpretation unit 571. The print job interpretation unit 571 interprets an instruction from a user that is included in the received print job, and converts the instruction into information, such as a parameter, that can be processed by the system. When the parameters of the print job have not yet been set, the print job is transmitted to a print job automatic setup unit 517, and when the parameters have already been set, the print job is transmitted to a print job automatic change unit 518.

The print job automatic setup unit 517 sets print parameters while taking into consideration the urgency, economy and quality values that are acquired from the print job. The print job automatic change unit 518 can perform the same process to change the parameters that have been set. The print jobs that are set or altered are registered in a print job schedule included in a print job scheduling unit 520 and are sequentially read to a print job transmission unit 519, or the print job is directly transmitted to the print job transmission unit 519 from the print job automatic setup unit 517 or the print job automatic change unit 518. The printing is then performed.

The status, such as in printing, normal or out of paper, of an available printer is acquired by a printer state acknowledgement unit 515, and is transmitted to the print job automatic setup unit 517 and the print job automatic change unit 518 where it is employed for the setup or change of the print job. Similarly, the printing schedule for the print job included in the print job scheduling unit 520 is also transmitted to these units 517 and 518 for their employment.

As is shown in FIG. 57, a print job may be transmitted along a different route. When a machine for generating a print job is the same as a machine for managing printers, the print job may not be transmitted via the print job transmission unit 514.

Figure 58A:
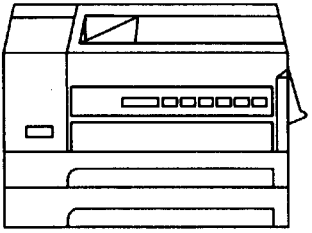
FIG. 58A is a diagram for explaining an example where parameters are set for a print job by employing a natural language.

In this embodiment, as is shown in FIG. 58A, the parameters of the print job are set ambiguously by using natural language. FIG. 58B is a diagram showing, relative to an input character string in the natural language, the meanings represented by character strings according to the parameters and the items required to complete the meanings. The print job interpretation unit 571 refers to the meaning corresponding to an input character string in the natural language in FIG. 58B and the item required to complete the meaning, and interprets the instruction given in the natural language that is received as a print job setup parameter as follows.

From the character string "Print" in the input natural language, "printing" is the action that is the object of the user according to the meaning of the character string. Further, it is assumed that the required item "object" indicates the contents of a print job that was input at the same time, and that "quality" and "number of sheets" should be designated at a portion in the input natural language that has not yet been interpreted. Thus, the character string "one copy for client and five copies for members" is interpreted as an instruction to print one "sheet" having a high "quality" and five "sheets" having a desired "quality".

The processes hereinafter performed by the print job automatic setup unit 517 and the print job automatic change unit 518 are the same as those in the seventeenth and the eighteenth embodiments.

[Twentieth Embodiment]

In this embodiment, as is shown in FIG. 59, the print job parameters are set based on the distribution destination described in a document, which is the contents of the print job, and on the number of sheets.

The action of the job is printing.

Printing for a "client" is interpreted as high quality printing, and the number of sheets is one.

"ABC project" is interpreted as a "member use" and the printing quality is arbitrary, the number of sheets being five. A user acquires in advance information that he or she is a member of the ABC project.

The processes hereinafter performed by the print job automatic setup unit 517 and the print job automatic change unit 518 are the same as those in the seventeenth and the eighteenth embodiments.

[Twenty-first Embodiment]

Figure 60:
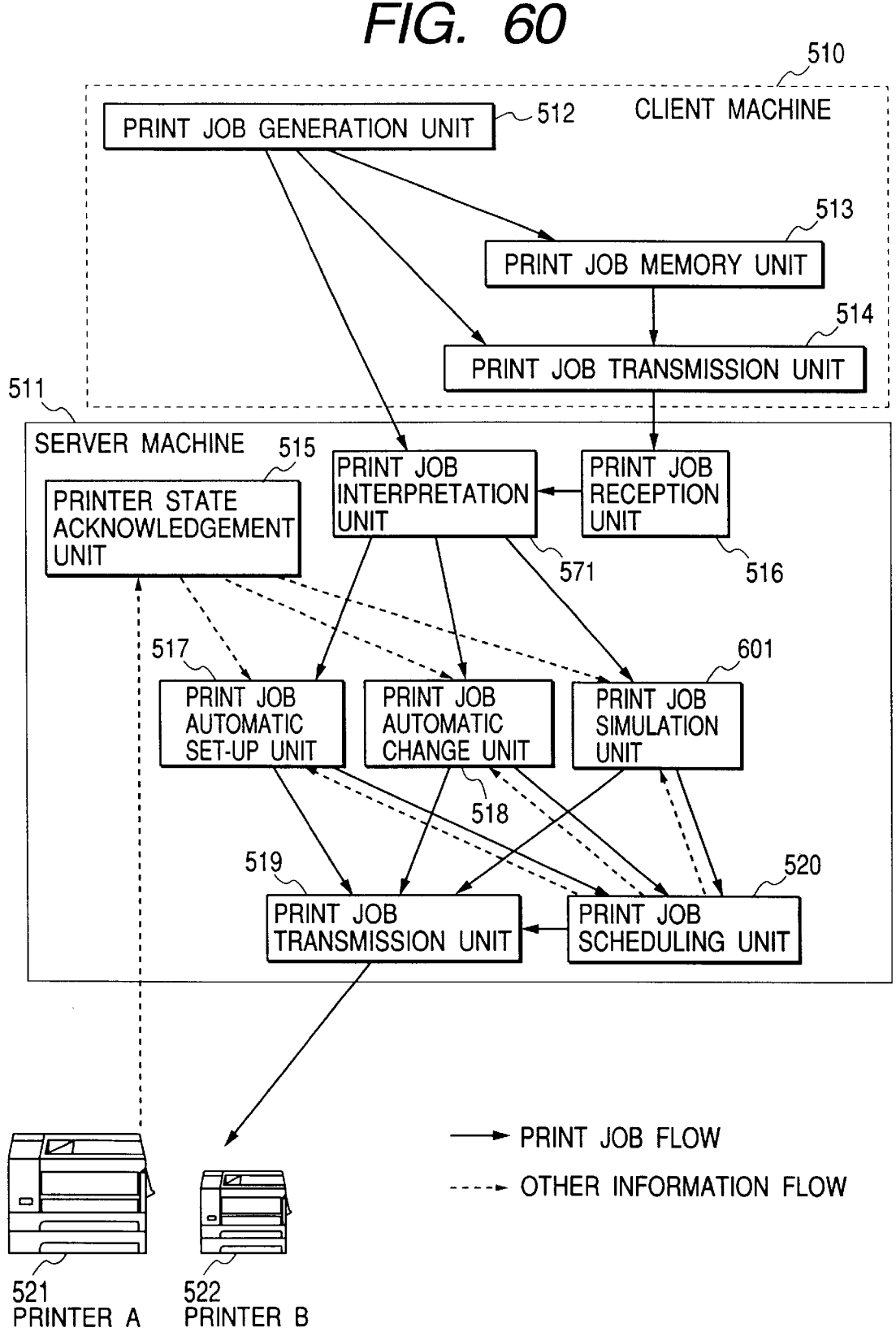
FIG. 60 is a diagram showing transmission of a job for a twenty-first embodiment.

FIG. 60 is a diagram showing the transmission of a print job and other information in a system in this embodiment employing apparatuses. The heavy arrows describe the transmission routes for print jobs and the broken line arrows describe the transmission routes for another information.

The print job in this embodiment includes parameters that are referred to during printing: the document to be printed; the number of print copies; print quality; and print size. The other information includes statuses, such as printing, normal, or out of paper, of individual printers, and a schedule for a print job that is included in a print job scheduling unit 520.

In FIG. 60, in a client machine 510, a print job generation unit 512 generates a print job, and stores it in a print job memory unit 513. Then, the print job is transmitted by a print job transmission unit 514 in the client machine 510 to a server machine 511 for managing printers.

In the server machine 511, a print job reception unit 516 receives the print job and transmits it to a print job interpretation unit 571. The print job interpretation unit 571 interprets an instruction from a user that is included in the received print job, and converts the instruction into information, such as a parameter, that can be processed by the system. When the parameters of the print job have not yet been set, the print job is transmitted to a print job automatic setup unit 517, and when the parameters have already been set, the print job is transmitted to a print job automatic change unit 518. A print job simulation unit 601 simulates printing at the setup that is specified by the print job to acquire the period of time for the printing and the consumption of toner.

The print job automatic setup unit 517 sets print parameters while taking into consideration the urgency, economy and quality values that are acquired from the print job. The print job automatic change unit 518 can perform the same process to change the parameters that have been set. The print jobs that are set or altered are registered in a print job schedule included in a print job scheduling unit 520 and are sequentially read to a print job transmission unit 519, or the print job is directly transmitted to the print job transmission unit 519 from the print job automatic setup unit 517 or the print job automatic change unit 518. The printing is then performed.

The status, such as printing, normal or out of paper, of an available printer is acquired by a printer state acknowledgement unit 515, and is transmitted to the print job automatic setup unit 517 and the print job automatic change unit 518 where it is employed for the setup or change of the print job. Similarly, the printing schedule for the print job included in the print job scheduling unit 520 is also transmitted to these units 517 and 518 for their employment.

As is shown in FIG. 60, a print job may be transmitted along a different route. When a machine for generating a print job is the same as a machine for managing printers, the print job may not be transmitted via the print job transmission unit 514.

Figure 61:
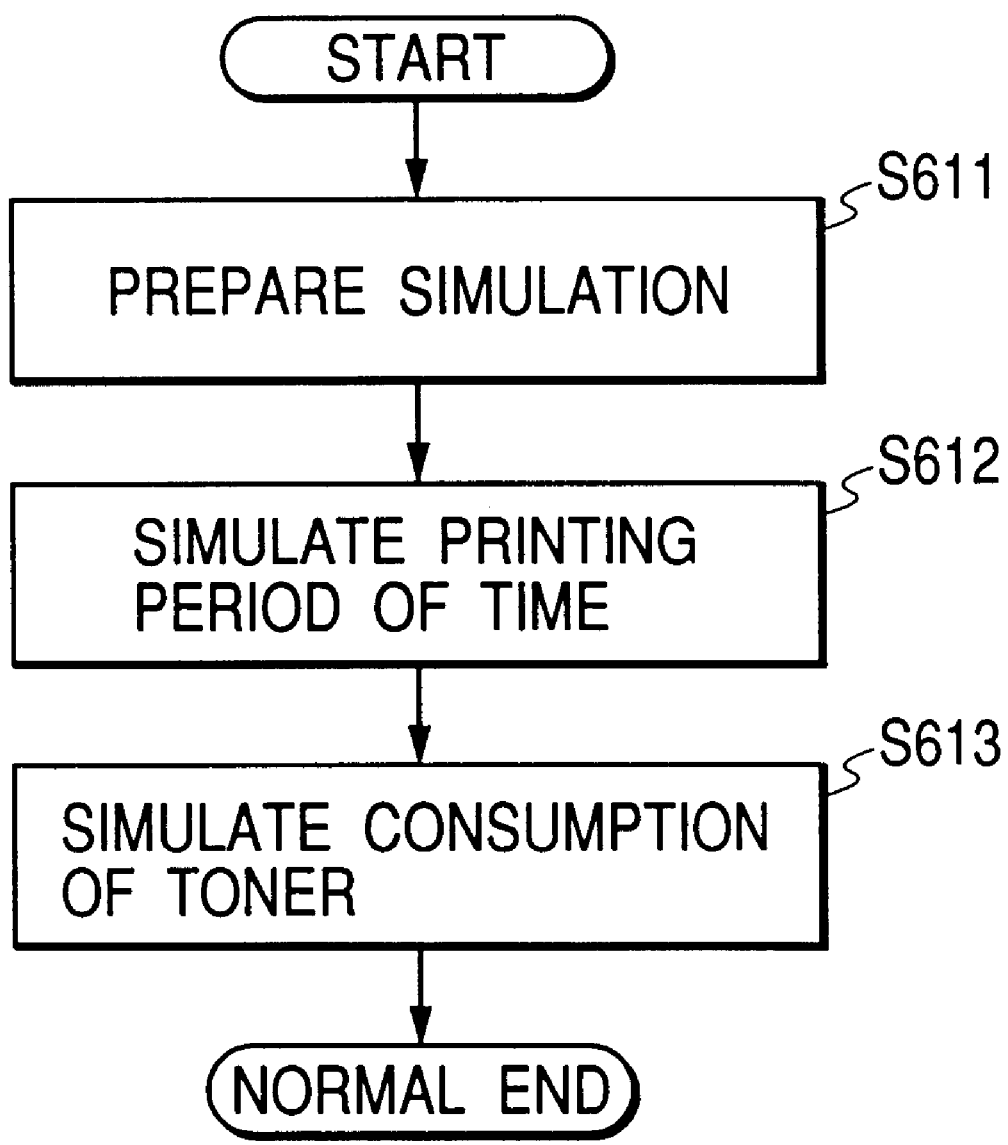
FIG. 61 is a flowchart showing the processing performed by a print job simulation unit.

FIG. 61 is a flowchart showing the processing performed by the print job simulation unit 601. First, at step S611, the print job simulation unit 601 initializes, in preparing for the simulation, a factor for determining the printing period and the consumption of toner. At step S612 the period of time for the printing is simulated at the setup that is also specified by the print job, and at step S613 the consumption of toner is simulated at the setup designated by the print job. In this manner, the period of time for the printing and the consumption of toner are acquired.

A specific method is the same as that explained in the seventeenth and the eighteenth embodiments.

[Twenty-second Embodiment]

In this embodiment, a plurality of output trays are provided for a printer, and a tray is selected in consonance with a user.

Figure 62:
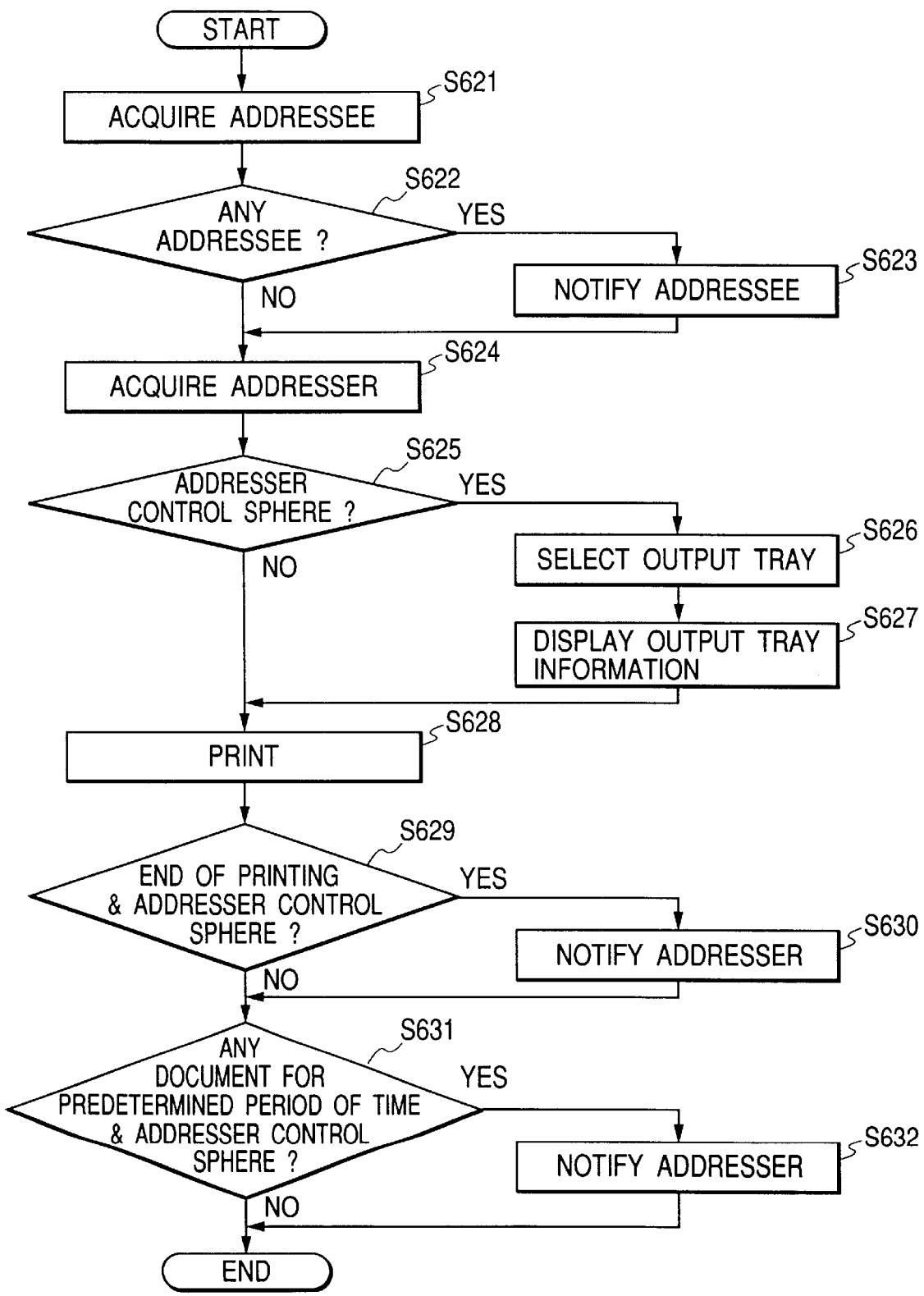
FIG. 62 is a flowchart showing the processing performed by a printer system according to a twenty-second embodiment.

FIG. 62 is a flowchart showing the processing for a printer system in this embodiment. When a printer system receives a print job, first it performs a process for coping with a case where a plurality of print jobs are received at the same time, and then it initiates the processing shown in FIG. 62.

Figure 63A:
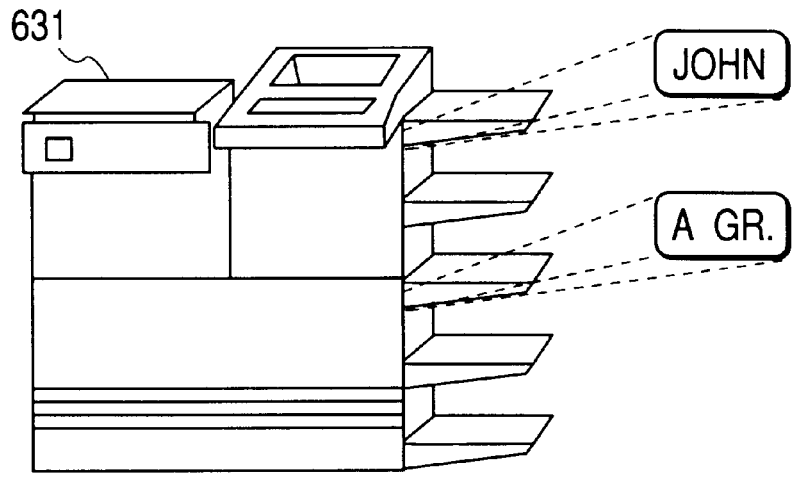
FIGS. 63A and 63B are diagrams illustrating the external appearance of the printer system according to the twenty-second embodiment.
Figure 63B:
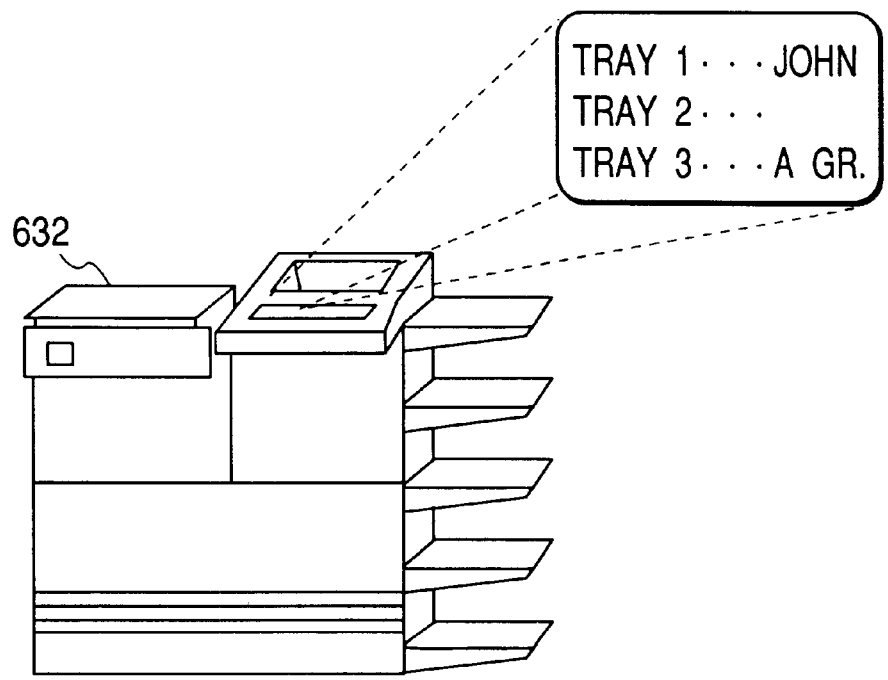

FIGS. 63A and 63B are diagrams showing the external appearances of the printer systems in this embodiment. As is shown, printers 631 and 632 each have a plurality of output trays: for the printer 631, each output tray is provided with a screen for displaying the name of the person to whom a document on the tray belongs; and for the printer 631, the names of the persons whose document remain on which trays are displayed on a common screen. When a user is set in advance for each output tray, the individual trays are user dedicated trays. When the trays are not specifically assigned, the users of the output trays are changed as needed.

The printer system in this embodiment implements the functions of notifying a user of the receipt of a document, the termination of printing, and the failure to collect a printed document (uses a sensor).

The above processing will now be described. In FIG. 62, at step S621 information concerning a destination is acquired from information included in a print job. The information concerning the destination is obtained, as is explained in the twenty-ninth embodiment, either by interpreting the setup described in the print job, or by extracting it from information, such as E-mail, that is set separately from the contents of the print job. At this time, when, as in conventional use, a printer is employed as an output device for a personal computer, usually an addressee is not designated. When the printer is employed as a facsimile machine or for transmission of E-mail, as in the system in this embodiment, an addressee is normally designated.

At step S622 a check is performed to determine whether or not an addressee is designated. At step S623 the addressee is notified of the arrival of a document. At step S624 the addresser information is acquired from the information included in the print job. The addresser information is acquired, as is explained in the twenty-ninth embodiment, either by interpreting the designation described in the print job, or by extracting it from information, such as E-mail, that is set separately from the print job. When, as in conventional use, a printer is employed as an output device for a common personal computer, normally the addresser falls within the control sphere of the system. However, when the printer is used as a facsimile machine, as in the system in this embodiment, usually the addresser is not within the control sphere. At step S625 a check is performed to determine whether the addresser is in the control sphere. At step S626 when the addressee is designated, a corresponding output tray is selected. When the addressee is not specified and only the addresser is specified, an output tray corresponding to the addresser is selected. At step S627 the addresser or the addressee information is transmitted to the corresponding output tray, as is shown in FIG. 63A. Or, as is shown in FIG. 63B, the addresser or the addressee information and the output tray that is employed are displayed on the common display. When the user is set for each output tray, the individual trays are user dedicated trays. When the trays are not specifically assigned, the users of the output trays are changed as needed.

At step S628 printing is executed. At step S629 a check is performed to determine whether the printing has been terminated and whether the addresser is within the control sphere. At step S630 the addresser is notified of the termination of the printing. At step S631 a check is performed to determine whether a document has been left for a predetermined period of time and whether the addresser is in the control sphere. At step S632 the addresser is notified that a printed document has been left in the tray for an extended time period.

[Twenty-third Embodiment]

Figure 65:
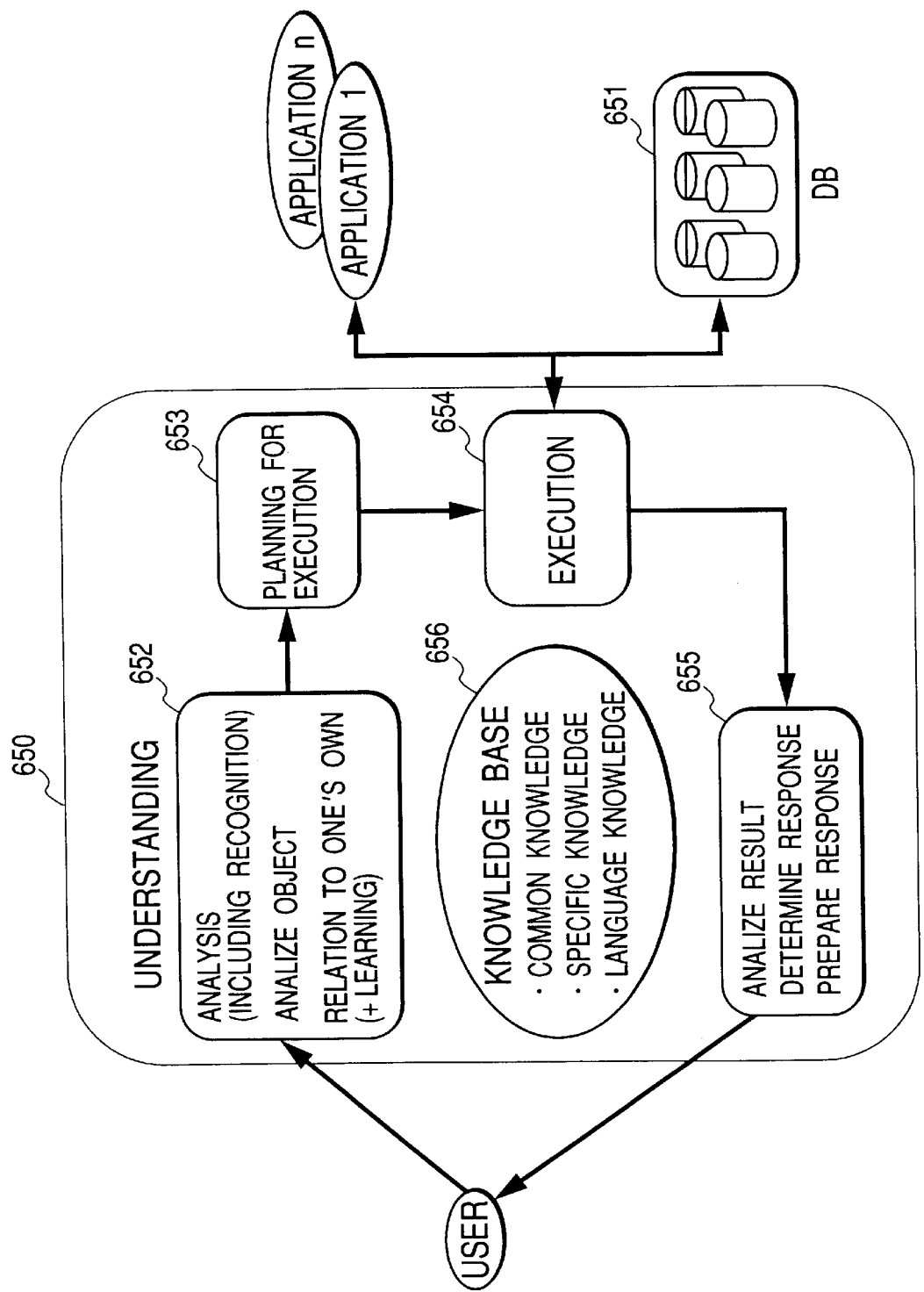
FIG. 65 is a diagram showing the functional arrangement of a system according to the twenty-third embodiment.

In this embodiment, information concerning the time is handled. FIG. 65 is a diagram showing the functional arrangement of a system according to the embodiment. A processor 650 includes an understanding unit 652, a planning unit 653, an execution unit 654, a response unit 655 and a knowledge base 656, and is connected to a database 651.

Figure 64:
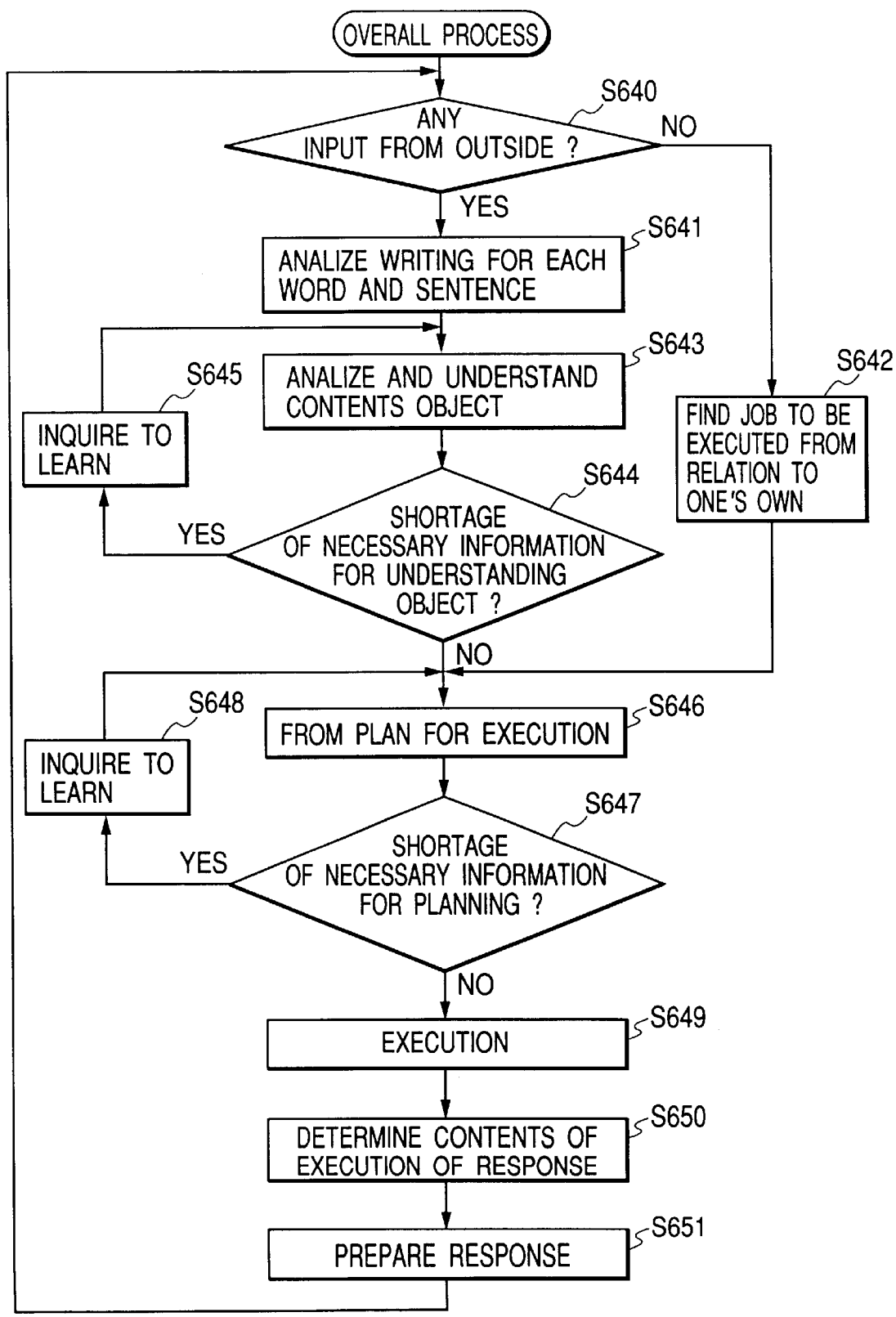
FIG. 64 is a flowchart showing the processing performed for a twenty-third embodiment.

FIG. 64 is a flowchart showing the processing performed by the functional arrangement in FIG. 65 in this embodiment.

At step S640 a check is performed to determine whether or not there is external input. If so, at step S641 the understanding unit 652 employs the knowledge base 656 to analyze an input document as the units of words and sentences, and at step S643 the object of the input contents is analyzed and ascertained. At step S644 a check is performed to determine whether information required for an understanding of the object is insufficient. If the information is unsatisfactory, at step S645 a query is issued to a user, and a response from the user is studied in the knowledge base 656. Program control thereafter returns to step S643. If the information is adequate, program control moves to step S646. When, at step S640, there is no input, at step S642 a job to be executed is found and program control advances to step S646.

At step S646 the planning unit 653 prepares a plan to achieve the object. At step S647 a check is performed to determine whether information required for planning is insufficient. If the information is unsatisfactory, at step S648 a query is issued to the user, and a response from the user is studied in the knowledge base 656. Program control thereafter returns to step S646. If the information is adequate, at step S649 the execution unit 654 executes the plan. At this time, the execution unit 654 accesses the database 651 or communicates with another application, as needed. At step S650 the response unit 655 determines whether or not a response should be made. If a response should be made, a decision is made concerning the selection of the contents for the response. Further, at step S651 a response is prepared in accordance with the selected contents, and is transmitted to the user.

The understanding unit 652 acknowledges, as needed, externally input information, such as keyboard input, voice input, E-mail or facsimile or news information, analyzes the received information and also the time concept contained in the words in sentences, and obtains an understanding of the contents of the sentences that are concerned with time.

Figure 67:
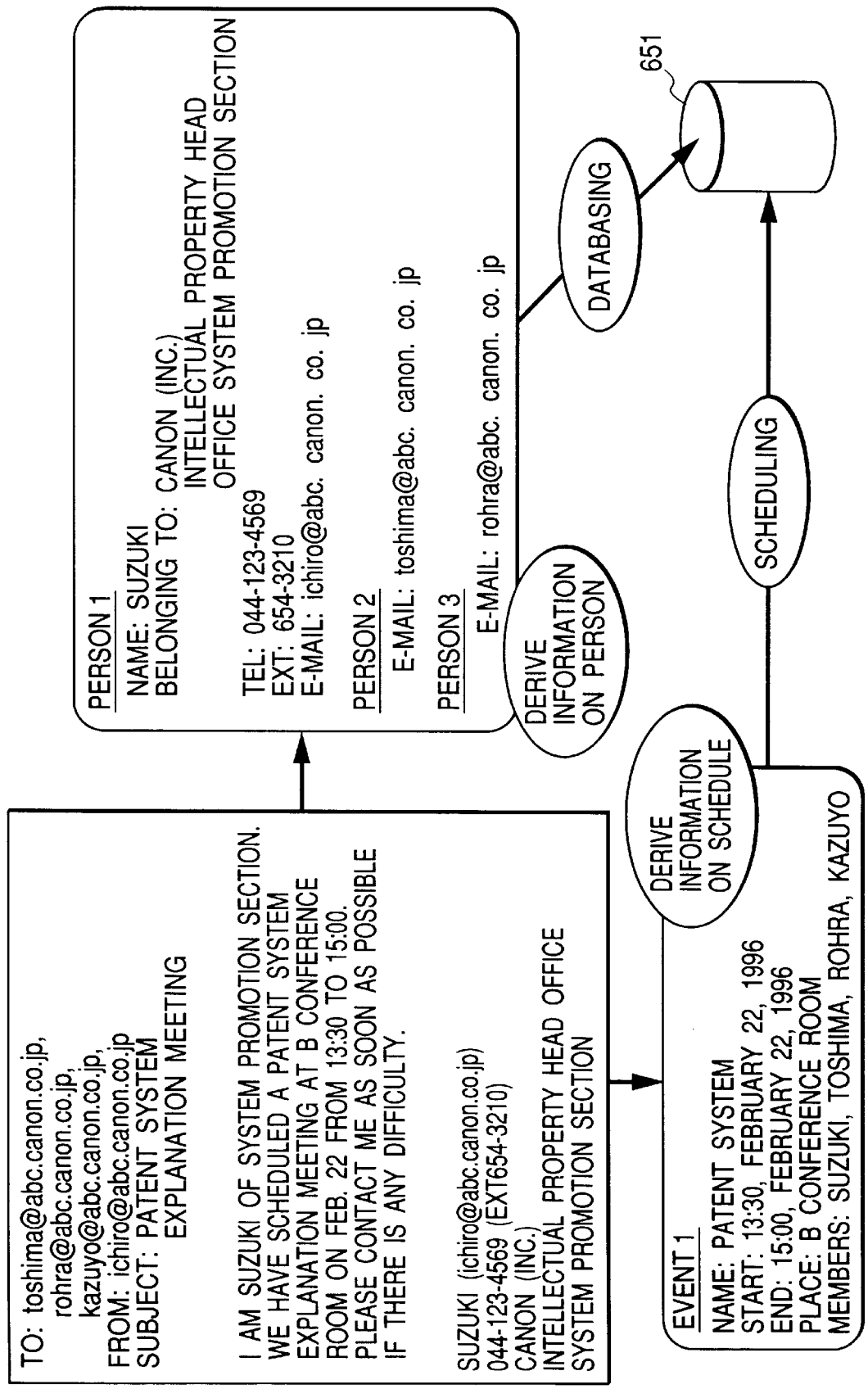
FIG. 67 is a diagram showing an example where a schedule is extracted from electronic mail.

FIG. 67 is a diagram showing an example where schedule information is extracted from electronic mail. In the above process, specifically, as is shown in FIG. 67, the contents of a document received by E-mail are analyzed, and the time concepts such as "February 22nd", "13:00" and "15:00" are found and analyzed. Then, an understanding of the sentence concerning the concept, "We have scheduled a patent system explanation meeting at conference room B from 13:00 to 15:00 on February 22" is obtained, and an action associated with the time can be correlated with the schedule.

The analyzed time concept is compared with the current time. If the time concept describes the future, a corresponding action is registered in the schedule, but if the time concept describes the past, it is abandoned without being registered or it is registered as an information of a type other than that for a schedule, such as information for a personal data base, that is used to record past events.

The understanding unit 652 analyses the contents of externally input information, such as keyboard input, voice input, E-mail, facsimile or news information. When the understanding unit 652 finds in the sentences a term (a word or a concept) that is unknown to the system, or a plan that the system has not yet executed, and when the word or the plan that is detected is not urgent, the understanding unit 652 studies the term or the plan by sequentially searching for information concerning it, and stores it as knowledge in the knowledge base 656.

Specifically, when, for example, the unknown term XYZ appears, the presence of XYZ is memorized, and sentences "XYZ is very delicious" and "XYZ is hard" are analyzed to extract the concept that XYZ is hard, delicious food.

Similarly, when a new plan is instructed and when from the current situation it is understood to be a plan for use when a user is absent, the understanding unit 652 studies the plan as an example of how to make a plan for when a user is absent.

In addition, when, for example, a system has been acquiring information concerning a user from news and notifying the user each time such information is found, and then upon the receipt of a notification that the user responds by sending the system an instruction in natural language that "from now on, there is no need to take notice of this information" the system can ascertain that transmission of the information is no longer necessary.

As is described above, in the system, the understanding unit 652 analyzes the contents of externally input information and also analyzes the object. The planning unit 653 prepares a plan of an action for the system to take to achieve the object. The execution unit 654 performs the processing. And the response unit 655 notifies a user of the results of the processing.

When, for example, it is ascertained, from information concerning an addresser, upon the receipt of the E-mail message shown in FIG. 67 that the mail is from an addresser who is not registered in the database, information concerning the addresser is extracted from the message and is registered in the personal database in the database 651. Further, when more information is obtained concerning the addresser who is not registered in the personal database, the information may be registered in the personal database.

Figure 69:
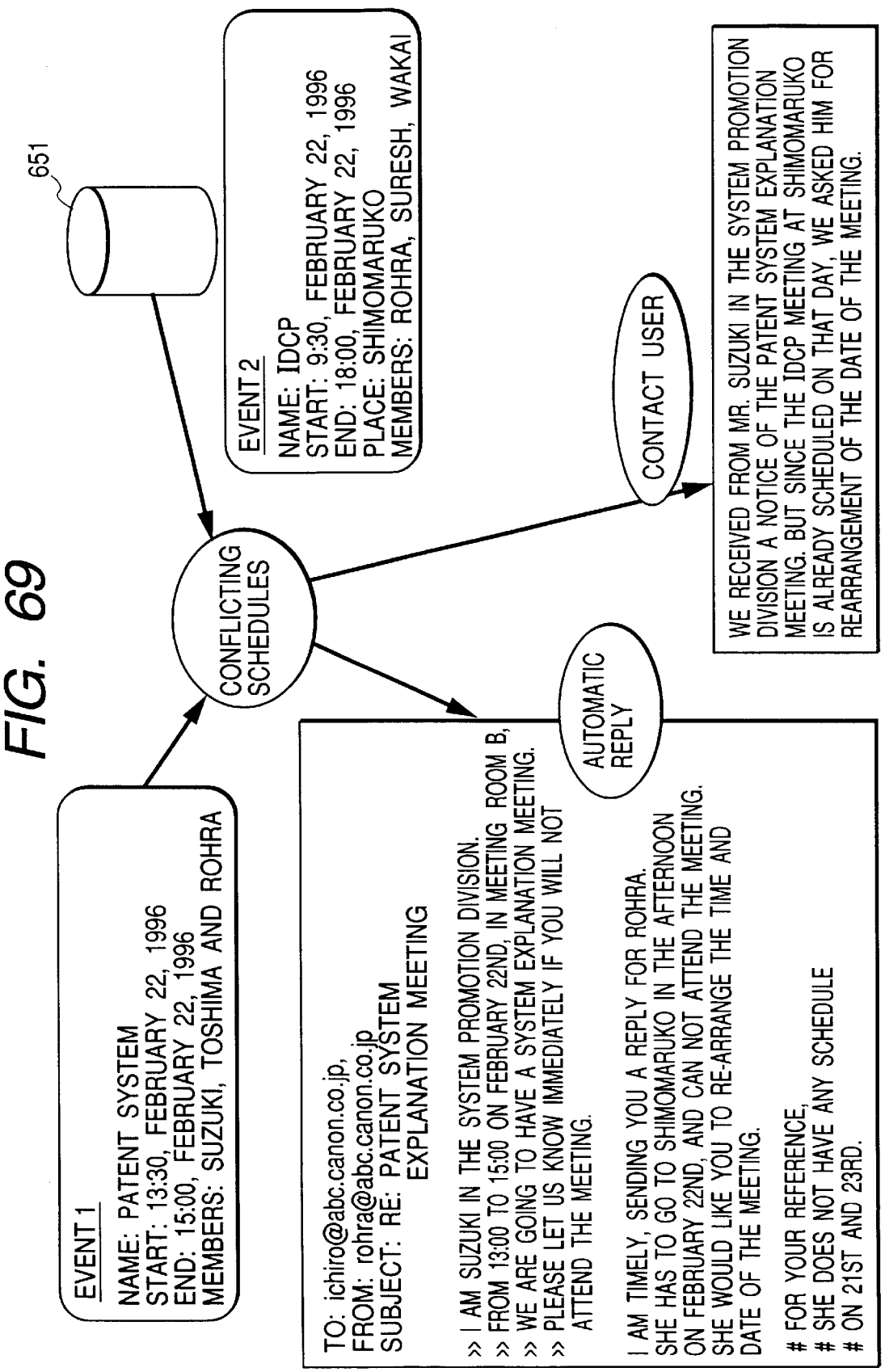
FIG. 69 is a diagram showing an example schedule conflict.

Since the understanding unit 652 understands the message is for a notice for an explanation meeting, it accesses the schedule of a user in the database 651, and compares new schedule data with the current schedule data. When the new schedule data and the current schedule data do not conflict, the new data are additionally registered in the schedule. However, as is shown in FIG. 69, when the schedule data conflict, a reply to the addresser and a notice for a user are prepared.

As is described above, since this system understands the contents of received information, the system can prepare a response in consonance with the situation and execute it.

In the above explanation, the system prepares a reply to a user who sent the E-mail without confirming it with a user, and transmits the reply. This is because the sentence, "Please contact me as soon as possible if there is any difficulty" is in the message, and as a result of the analysis of this sentence, it is determined that a response is very urgently required. If the urgency of a response is determined to be low because a date for the holding the meeting is fairly advanced and the attendance at the meeting is arbitrary, the system confirms it with a user before transmitting a response. In other words, the system determines in which action to take in consonance with the degree of urgency.

In addition, the schedule or the personal database can be accessed to transmit a response, relative to the input of the natural language by a user, as well as a natural language instruction received from a user.

For example, the personal database can be accessed by asking the natural language question, "What is the telephone number of Mr. XX?". Or the schedule can be accessed when the natural language question, "Where will the meeting on the 16th be held?" is received, to send a reply to a user.

Figure 66:
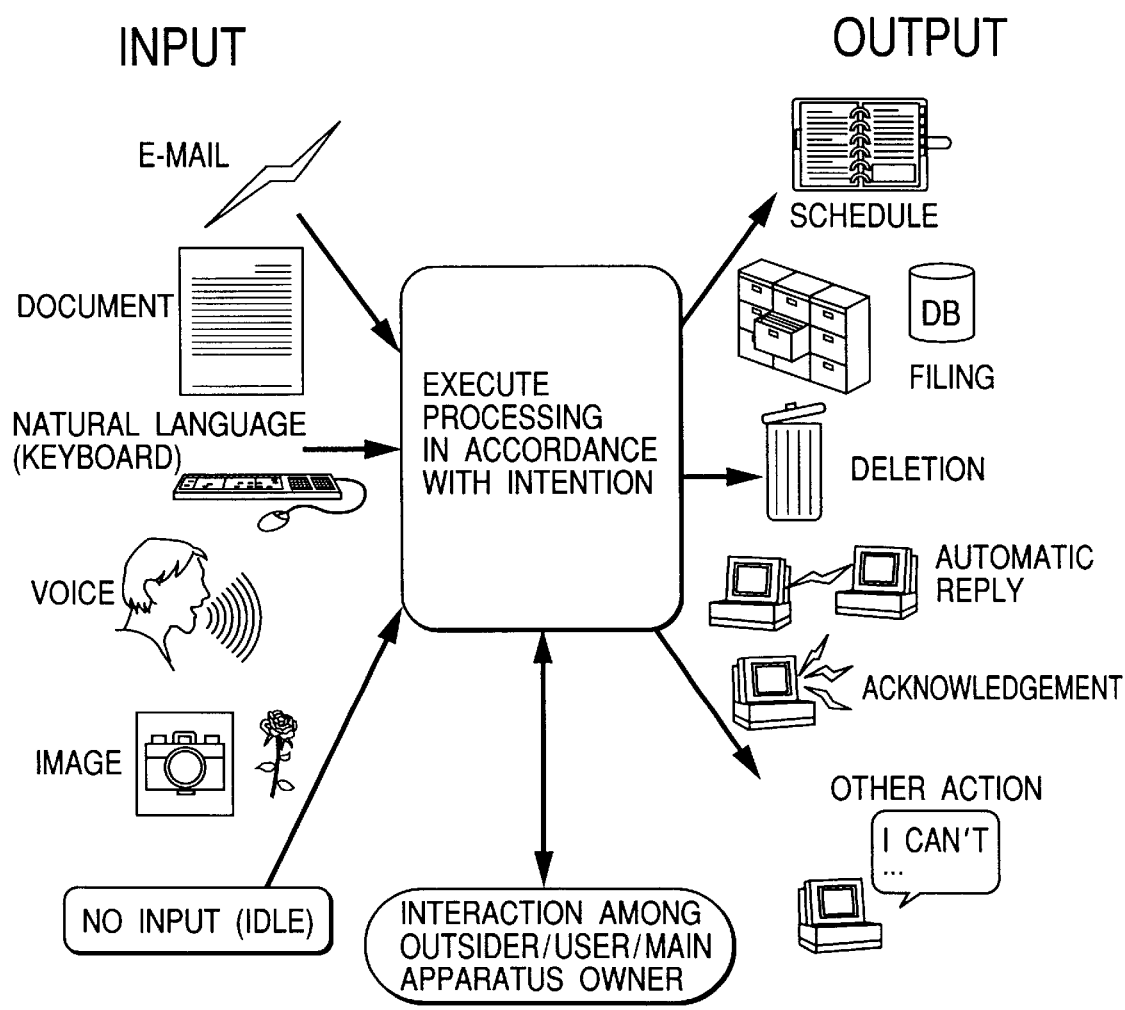
FIG. 66 is a diagram showing a system for performing the overall process according to the twenty-third embodiment and input/output types relative to an external apparatus.

FIG. 66 is a diagram showing the input/output types between the system that performs the overall processing in this embodiment and external devices.

Input data can be data input via a keyboard, natural language information received by E-mail, documents or pictures input as images by a scanner, voice input via a microphone or images input by a camera. A character recognition process is preformed for a document that is read by the scanner, or a voice recognition process is performed for speech, so that input information in natural language can be obtained.

As for when there is no input (idle state), as is shown at step S642 in FIG. 64, when there is no external input the system searches for a job that it should execute and regards it as input. In the idle state, when no job is given to the system, the system, for example, accesses news and aggressively acquires as input information concerning the user.

As for output, there are the registration of a schedule in a database, the filing or erasure of data relative to a file memory device, or the dispatch of a notice to a user or a reply to an addresser. The importance of the output is that it can be determined that a process can not be performed within the control range of a system, and another action, such as transmitting a response to that effect, can be performed.

An input/output destination is a user or an external device, or a different processor in the system or another application.

In addition, input documents are analyzed, and data concerning a person and data concerning the time are extracted and stored in the personal database and the schedule database. Also, data required for the anticipation of an action is extracted to use for planning.

In the example in FIG. 67, as a result of analysis of an E-mail document that is input, the following description concerning a person is acquired:
To: toshima@ abc.canon.co.jp,
rohra@ abc,canon.co.jp,
kazuyo@ abc.canon.co.jp
From ichiro@ abc.canon.co.jp
I am Suzuki of system promotion section.
Suzuki (ichiro@ abc.canon.co.jp)
044-123-4569 (ext. 654-3210)
Canon Inc. Intellectual Property Head Office System Promotion Section
Assuming that a person whose mail address is "kazuyo@ abc.canon.co.jp" is already registered in the personal database and the other persons are not registered, as is shown in FIG. 67, data for PERSON 1, 2 and 3 are extracted and registered in the database 651.

Since there is a description concerning the time, "We have scheduled a patent system explanation meeting at conference room B from 13:00 to 15:00 on February 22" data for EVENT1 is extracted.

Figure 70:
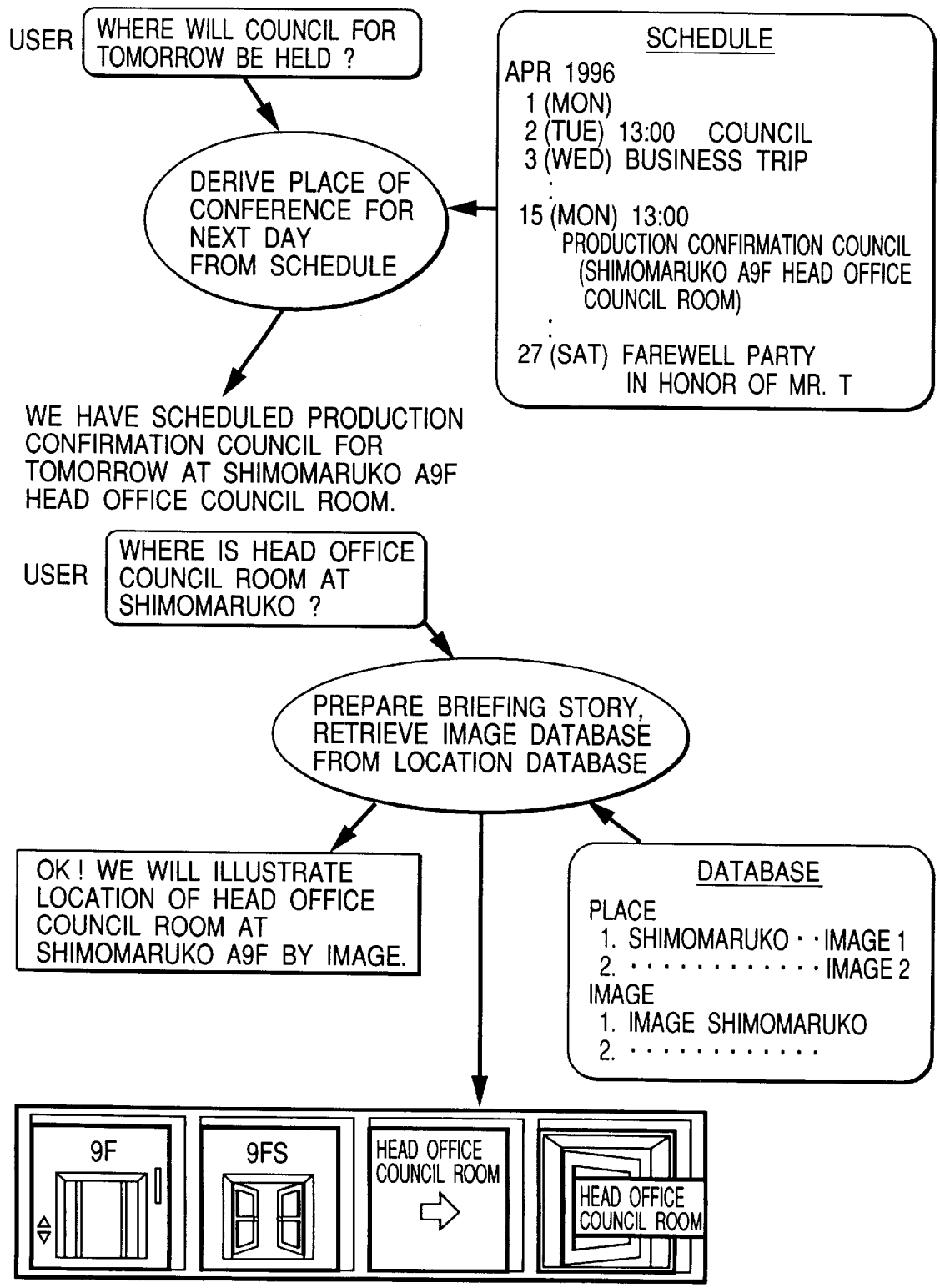
FIG. 70 is a diagram showing an example where a user aurally queries a system.

Further, since there is a description used for estimating an expected action, "Please contact me as soon as possible if there is a difficulty" this is used for the processing to be explained while referring to FIG. 70.

Figure 68:
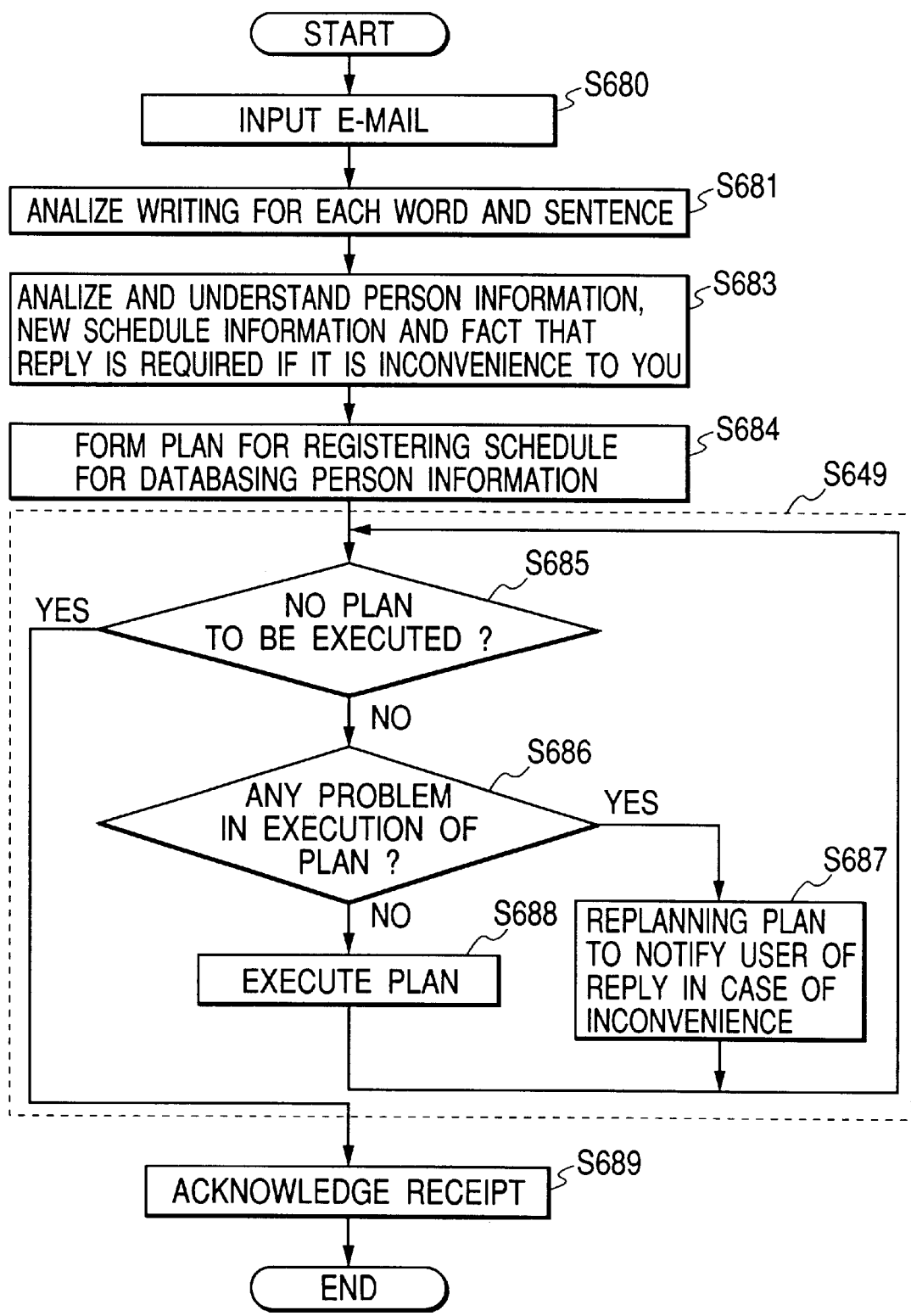
FIG. 68 is a flowchart showing specific processing performed for the twenty-third embodiment.

FIG. 68 is a specific flowchart for step S649 prepared by extracting the portions from the flowchart in FIG. 64 that are required for performing the processes in FIGS. 67 and 69.

The processing will now be explained while referring to FIGS. 67 and 69.

At step S680 E-mail is input and at step S681, of each word and sentence, the input E-mail document is analyzed. At step S683 it is ascertained from a signature and a header that "there is information concerning persons" and "an event, an explanation meeting, will be held". Further, it is ascertained that "a reply is requested if there is a difficulty".

At step S684 the data concerning a person is extracted and a plan for registering the data in a database and a plan for registering the explanation meeting event in the schedule are made. At step S685, it is ascertained that there is a plan to be executed. At step S686 it is found that there is no problem with the plan, and program control thereafter moves to step S688. At step S688 the data concerning the person is extracted and registered in the database, and program control returns to step S685.

In FIG. 67, at step S685 there is a plan to be executed: registration of the explanation meeting event in the schedule. At step S686 it is assumed that the event can be registered in the schedule with no problem, and program control goes to step S688. At step S688 the event is registered in the schedule, and program control returns to step S685. At step S685 there is no other plan to be executed, and at step S689 no acknowledgement receipt is required. The processing is thereafter terminated.

In FIG. 69, at step S685 there is a plan to be executed: registration of the explanation meeting event in the schedule, and at step S686 a conflict is found in the schedule. Since there is a problem with the execution of a plan, at step S687 a reply to that effect is transmitted and a plan is made to notify a user that there is a problem. At step S685 there is a plan for writing a reply and transmitting it, and at step S686 no problem concerning the execution of the plan is found. At step S688, therefore, a reply indicating that the timing is inconvenient is prepared and transmitted to the addresser. At step S685 there is a plan for preparing a document for notification of a user. At step S686, there is no problem in execution, and at step S688 a response to a user is prepared describing that a reply was sent for reconsideration because of the contents of the E-mail and the conflict of the schedules. At step S685 there is no plan to be executed and at step S689 since there is an notice to a user, it is transmitted to the user. The processing is thereafter terminated.

In the example in FIG. 69, when the schedule information EVENT1 that is extracted is compared with the schedule EVENT2 that is planned previously, it is found that the two events conflict. Further, according to the information extracted in the example in FIG. 69, it is apparent that a reply is necessary if there is a difficulty. In the system in this embodiment, the knowledge for preparing letter is employed to write a letter describing that a user can not attend the meeting because the schedules are conflicting, and the reply is automatically transmitted.

In addition, the user of the system in this embodiment is notified that the system automatically has transmitted a reply for the user.

[Twenty-fourth Embodiment]

FIG. 70 is a diagram showing an example where a user sends a question by voice to a system according to this embodiment.

When a user asks by voice "where will tomorrow's conference be held?", the system can examine the schedule information of the user and tell the location of the conference.

When the user does not know how to get the location for the conference and asks "In which area in Shimomaruko?", the system examines the database, performs planning for an explanation to make a user understand, prepares a briefing story, and uses graphical images and sounds to explain how to get the location.

Figure 71:
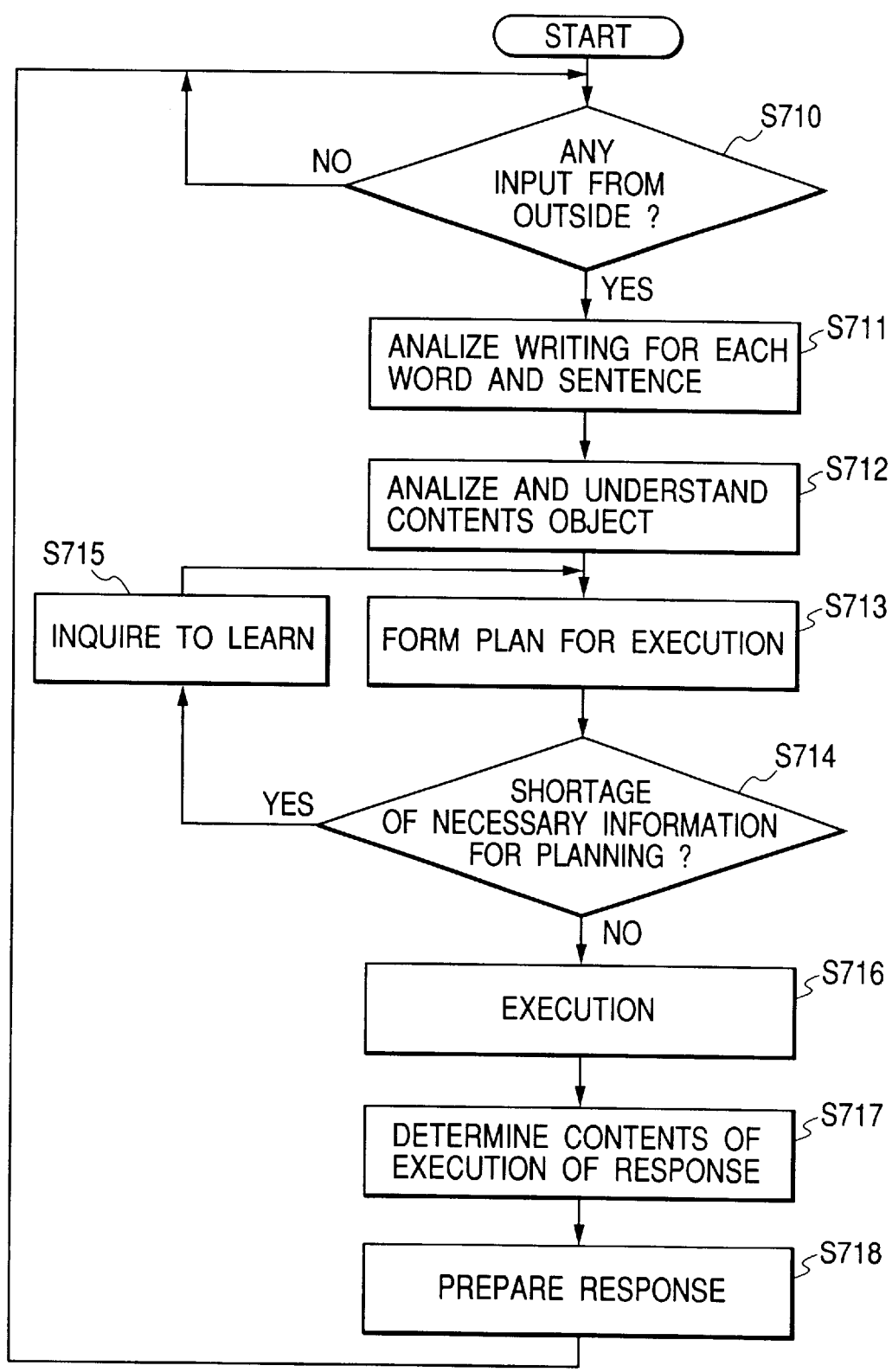
FIG. 71 is a flowchart showing the processing for a twenty-fourth embodiment.

FIG. 71 is a flowchart showing the processing performed in FIG. 70 by referring to the basic flowchart in FIG. 64. An external input is regarded as a query.

The processing relative to a first inquiry will be explained. At step S710 voice (where will tomorrow's conference be held?) is externally input, and at step S711 the input sentence is analyzed. At step S712 it is understood that the input sentence is an inquiry for the conference, and that the object of the user is to know the location of the conference. At step S713 the following planning is performed to answer the inquiry. (1) Tomorrow's schedule is extracted. (2) The location registered in the schedule is acquired. (3) A reply is prepared to tell the acquired location.

At step S714 information is sufficient and program control moves to step S716. If the schedule show a plurality of conferences, the system does not identify which conference is. Therefore, at step S715 a query is sent to a user to remake a plan. At step S716 the plan made at step S713 is executed, and a reply document to the user is prepared. At step S717 it is ascertained that there is a response to the user, the system determines the transmission of the response. At this time, since it is understood that the input was done by voice, transmission of the reply by voice is also determined. At step S718 the response, which is voice data obtained by conversion, is transmitted to the user.

The processing is temporarily terminated, and following this, an inquiry from the user is input. The process relative to the second inquiry will now be described.

At step S710, voice (In which area in Shimomaruko?) is input externally, and at step S711 the input sentence is analyzed. At step S712 it is understood that this inquiry is a continuous question of the first one, and also that a specific location of the place name that was answered is being asked.

At step S713 the following plans are made to respond the question: (1) a plan for explaining that it is difficult to explain the location by writing; (2) a plan for explaining the location by sequentially sending images; (3) a plan for acquiring necessary images from an image database and a location database; and (4) a plan for preparing sentences corresponding to images.

At step S714 the information is adequate, and at step S716 the plans made at step S713 are sequentially executed and a reply to a user consonant with the images is prepared. At step S717, since there is a reply document to be transmitted to the user, the transmission of the response is determined. At this time, it is understood that the input was done by voice, so that it is also determined that explanation will be given by voice while displaying images on a monitor. At step S718 the response is transmitted to the user. The processing sequence in FIG. 70 is thereafter terminated.

[Twenty-fifth Embodiment]

Figure 72:
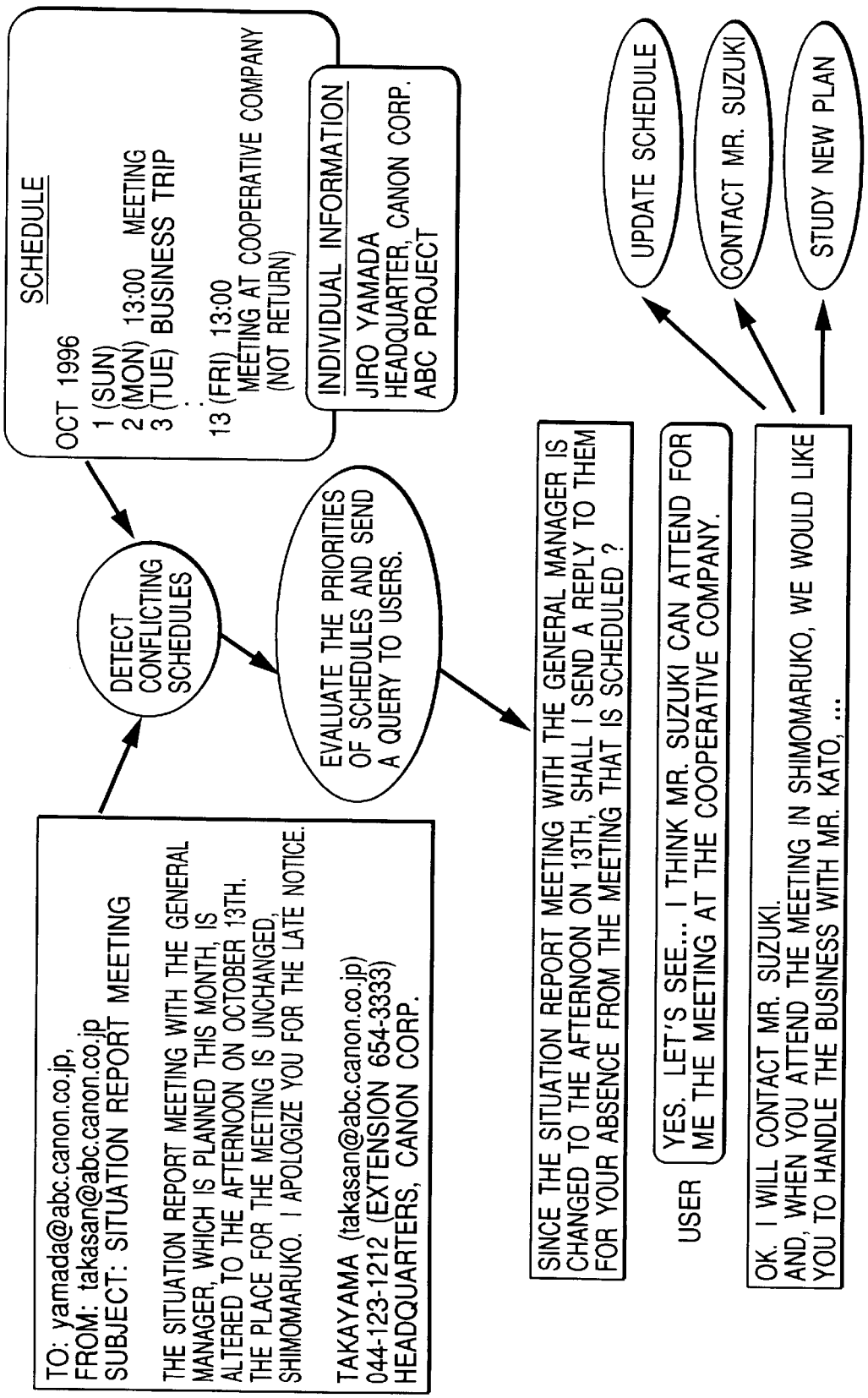
FIG. 72 is a diagram showing an example rearrangement of conflicting schedules.

In an example shown in FIG. 72, when two scheduled events conflict, the order of priorities of the two events is obtained from a comparison, and a plan to handle this problem is prepared and proposed to a user.

That is, in this example, when one schedule is found to be more important than the other, it is proposed that the less important schedule be canceled.

If the user knows somebody to send as his or her proxy to the scheduled event for which cancellation is proposed, the user can send the system a response to that effect. The system can then perform an action in consonance with the response. Also, the system can study a plan for despatching another person as a proxy.

In FIG. 72 is shown a combination of other methods performed at step S646 in FIG. 64 to make plans when the schedule conflict is found at step S686 in the flowchart in FIG. 68.

The processing in FIG. 68 has been explained for unconditionally transmitting to a user a response for an inconvenience. In this embodiment, the processing for a plurality of plans is employed as the re-planning method at step S646.

Figure 73:
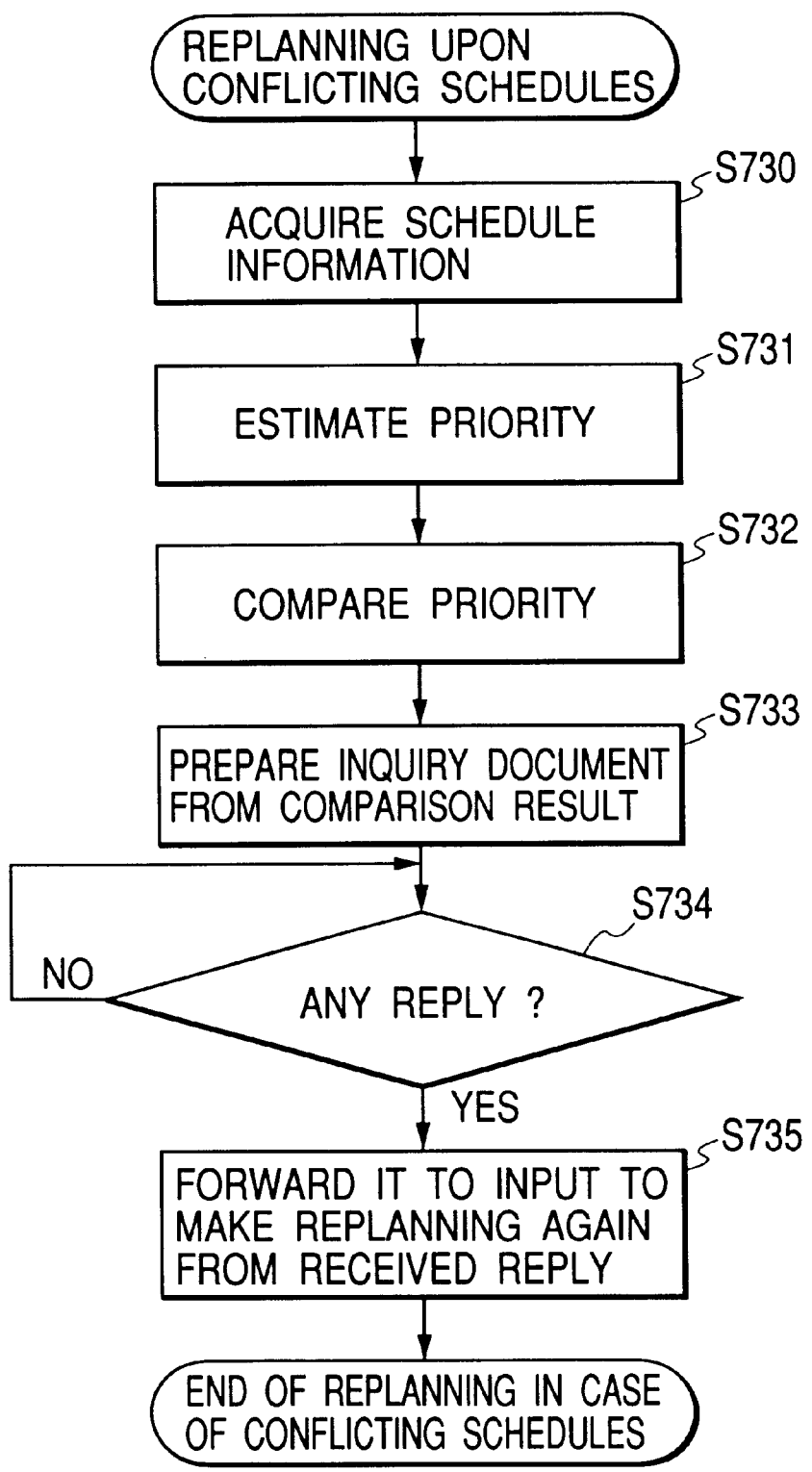
FIG. 73 is a flowchart showing the processing for re-planning conflicting schedules.

FIG. 73 is a flowchart for evaluating a priority extracted from the contents of a document and for proposing it to a user. The processing will now be explained.

The priorities of the scheduled events is determined by using information that the user has set in advance for each schedule, attendance at an event included in the schedule, the object of a scheduled event and the result obtained as a result of the analysis of the received document. A user may set the priorities of persons that are expected to attend the pertinent event.

The priority determined according to the object of the schedule may be set in advance by a user, or may be determined while taking into account the object or the field that the system understands, from the study of the past, that the user is interested in. That is, when the user engages in computer associated work, the schedule for a computer associated event priority over an event associated with real estate. Of course, if a user plans to purchase a house and that data is stored as information concerning the user, the schedule of an event associated with real estate may take priority.

For the priority determined from the result of the analysis of the document, when a document including the sentence "Please be sure to attend the meeting" and a document including the sentence "Please attend the meeting if possible" setup a conflict, the first document received is determined to take priority.

In FIG. 73, at step S730 the current schedule information is acquired. At step S731 the priority for new schedule information is evaluated. At step S732 the priorities of both schedules are compared. At step S733 from the result of the comparison, a plan is made to prepare a notice for querying a user (e.g., display two conflicting scheduled events and ask whether the event having the lower priority can be canceled). At step S734 the prepared notice is transmitted to the user. At step S735 a response from the user relative to the inquiry concerning the plan is acquired. The same re-planning process as in FIG. 68 is performed to again prepare a plan by using the response obtained from the user so that an action consonant with the response of the user can be taken.

Figure 74:
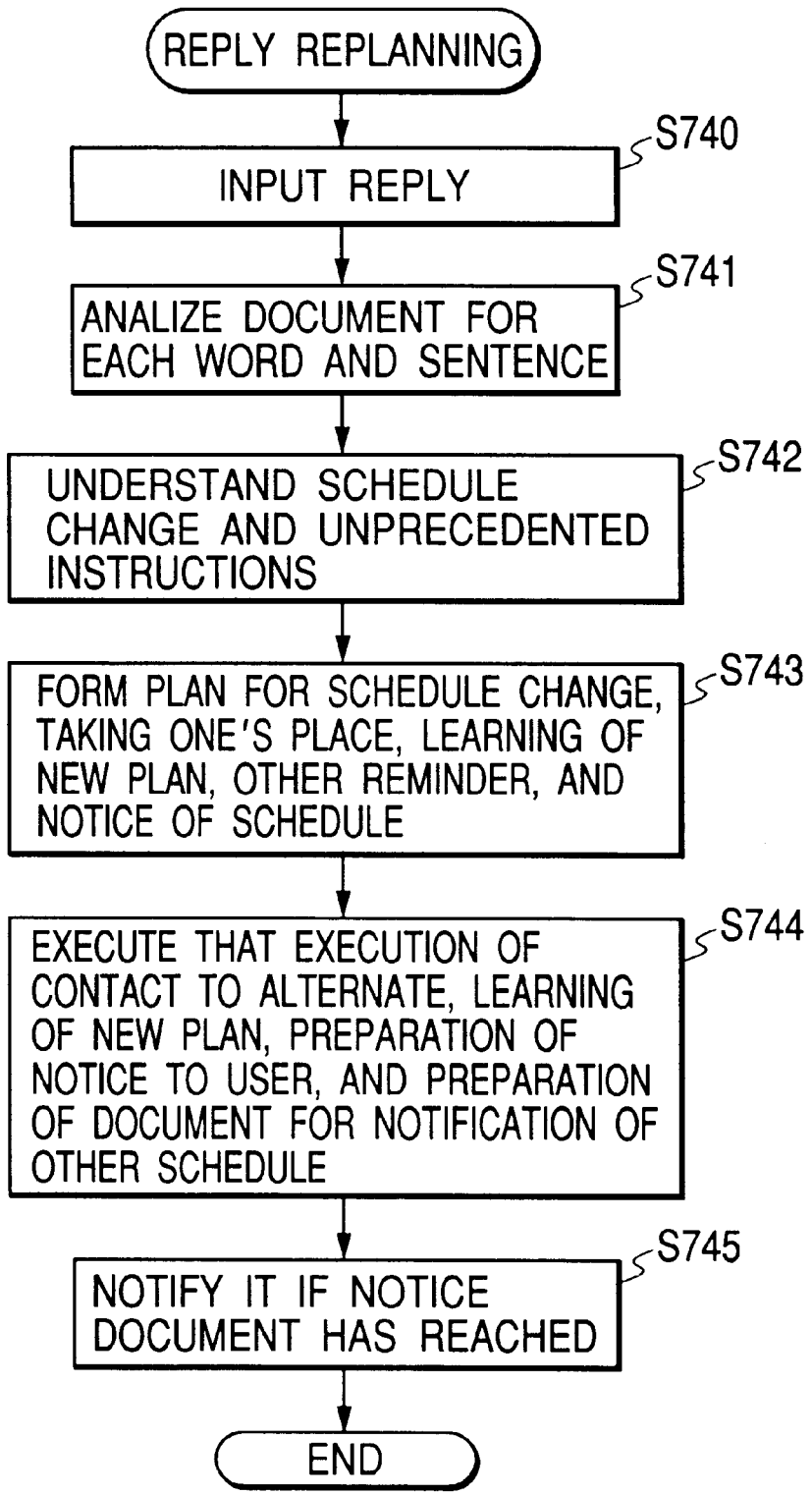
FIG. 74 is a flowchart showing the processing for re-planning responses.

FIG. 74 is a flowchart showing the re-planning process.

At step S740 the response finally obtained in FIG. 73 is regarded as input. At step S741 the input sentence is analyzed. At step S742 it is ascertained that the schedule is to be changed and that this is the first instructed plan.

At step S743 the following plans are made: (a) the changing of the schedule; (b) the preparation of a document to transmit the schedule to a proxy; (c) the study of a new plan; (d) the preparation of a document to transmit the new plan to the user; and (e) the notification sent to a user concerning another schedule that should be recalled.

At step S744 the plans made at step S743 are executed: (a) the schedule is changed; (b) a document is prepared to transmit the schedule to a proxy; (c) a new plan is studied; (d) a document is prepared to transmit the new plan to the user; and (e) a user is notified of another schedule that should be recalled.

At step S745 the notification document is transmitted to the user. The processing for performing the process in FIG. 72 is thereafter terminated.

[Twenty-sixth Embodiment]

Figure 75:
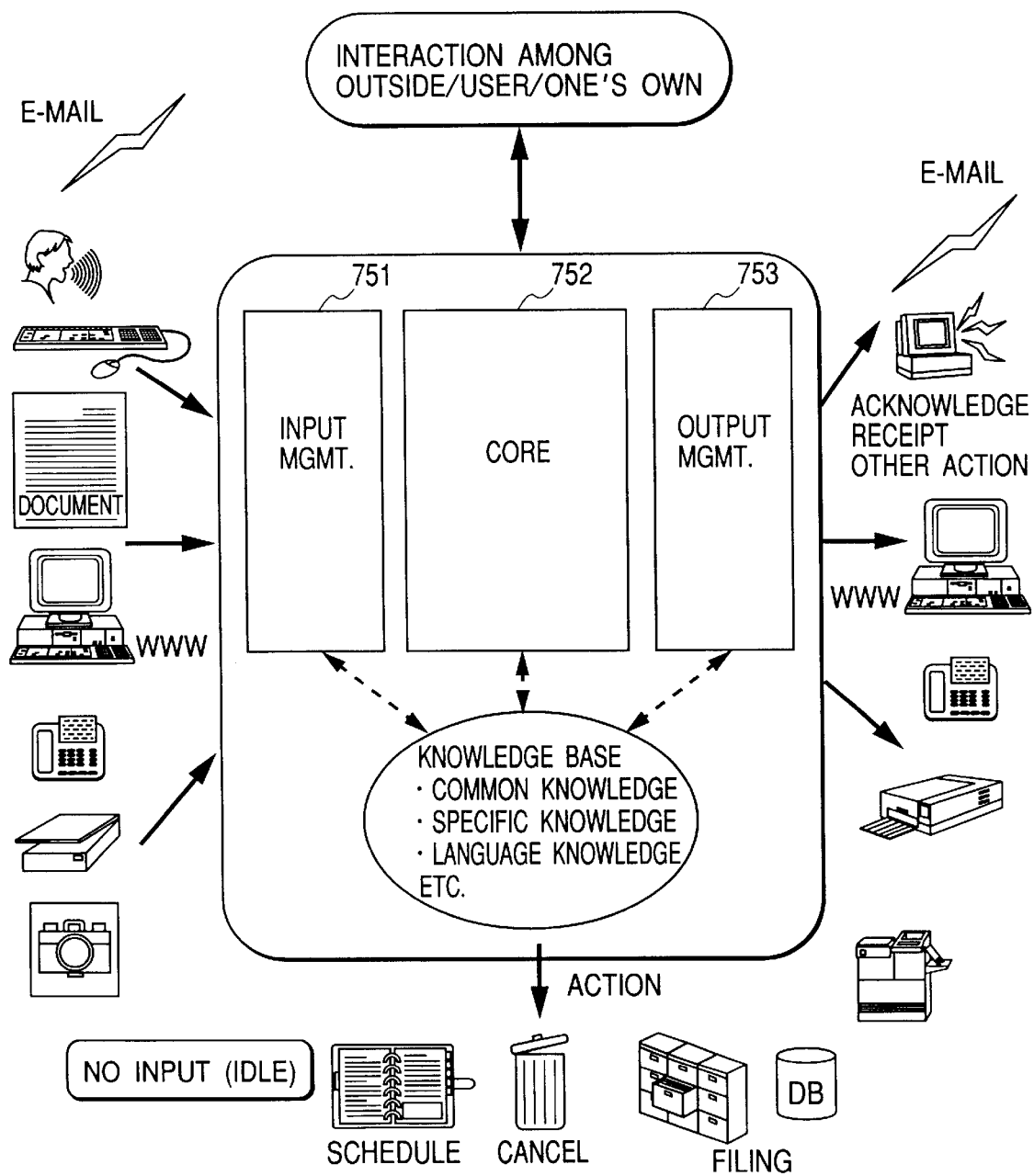
FIG. 75 is a diagram showing an overall image including the input/output of a system according to a twenty-sixth embodiment.
Figure 76:
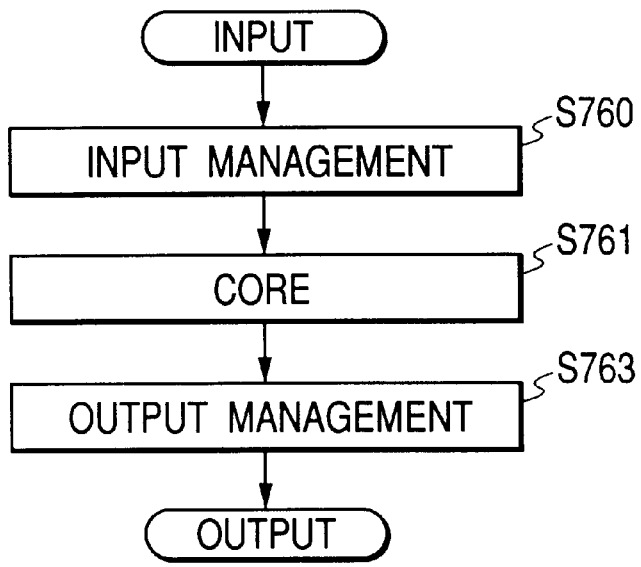
FIG. 76 is a flowchart showing the overall processing performed by the system according to the twenty-sixth embodiment.

FIG. 75 is a diagram illustrating the overall image of a system according to this embodiment, including input/output devices. FIG. 76 is a flowchart showing the processing performed by the system in FIG. 75.

Information input by E-mail, by voice, via a keyboard, across the WWW, and by input devices, such as a telephone, a facsimile machine, a scanner and a camera, is analyzed by an input management unit 751 (step S760). A core unit 752 ascertains the contents of the information and plans an appropriate process (step S761). An output management unit 753 determines an output medium and prepares the contents to be output and an output route (step S763). Then, the information is output by E-mail, by voice, across the WWW, or by output devices, such as a telephone, a facsimile machine, a printer and a copier.

Figure 77:
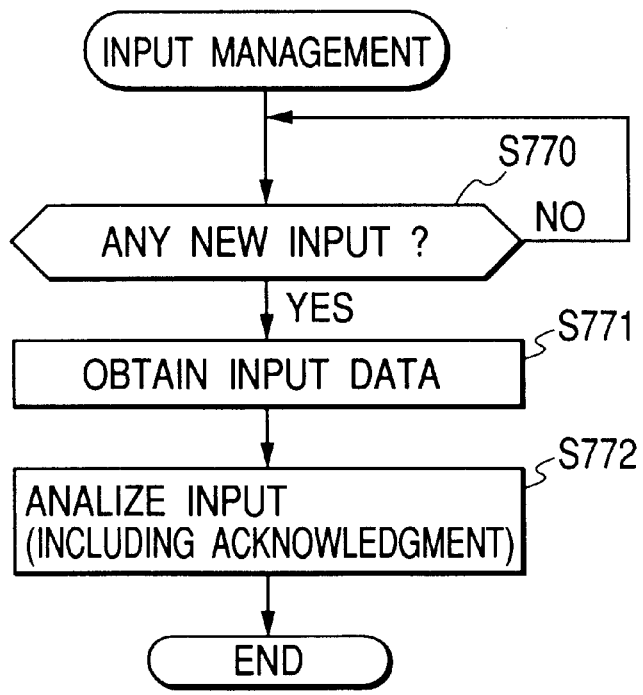
FIG. 77 is a flowchart showing the processing performed by an input management unit.
Figure 78:
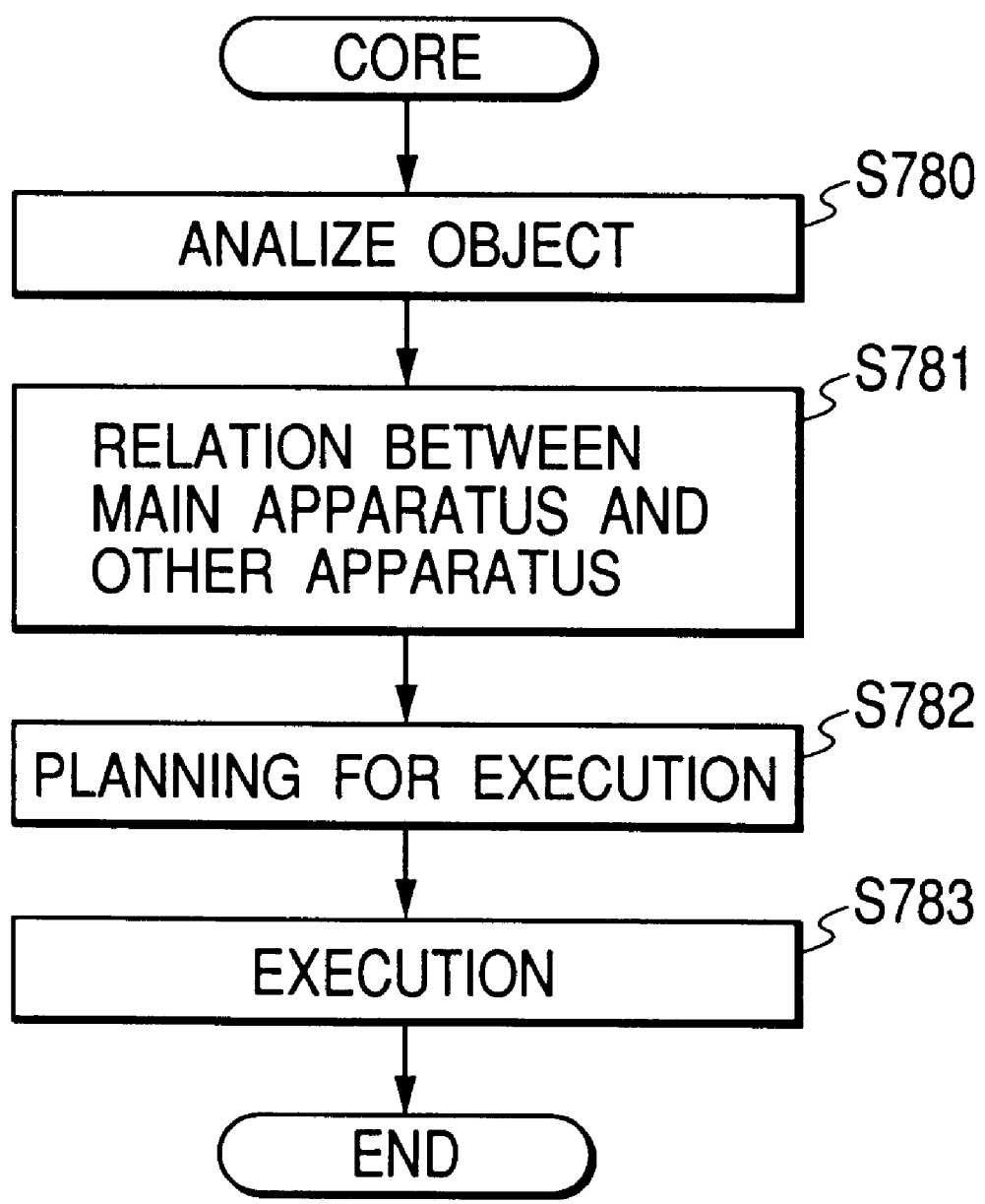
FIG. 78 is a flowchart showing the processing performed by a core unit.
Figure 79:
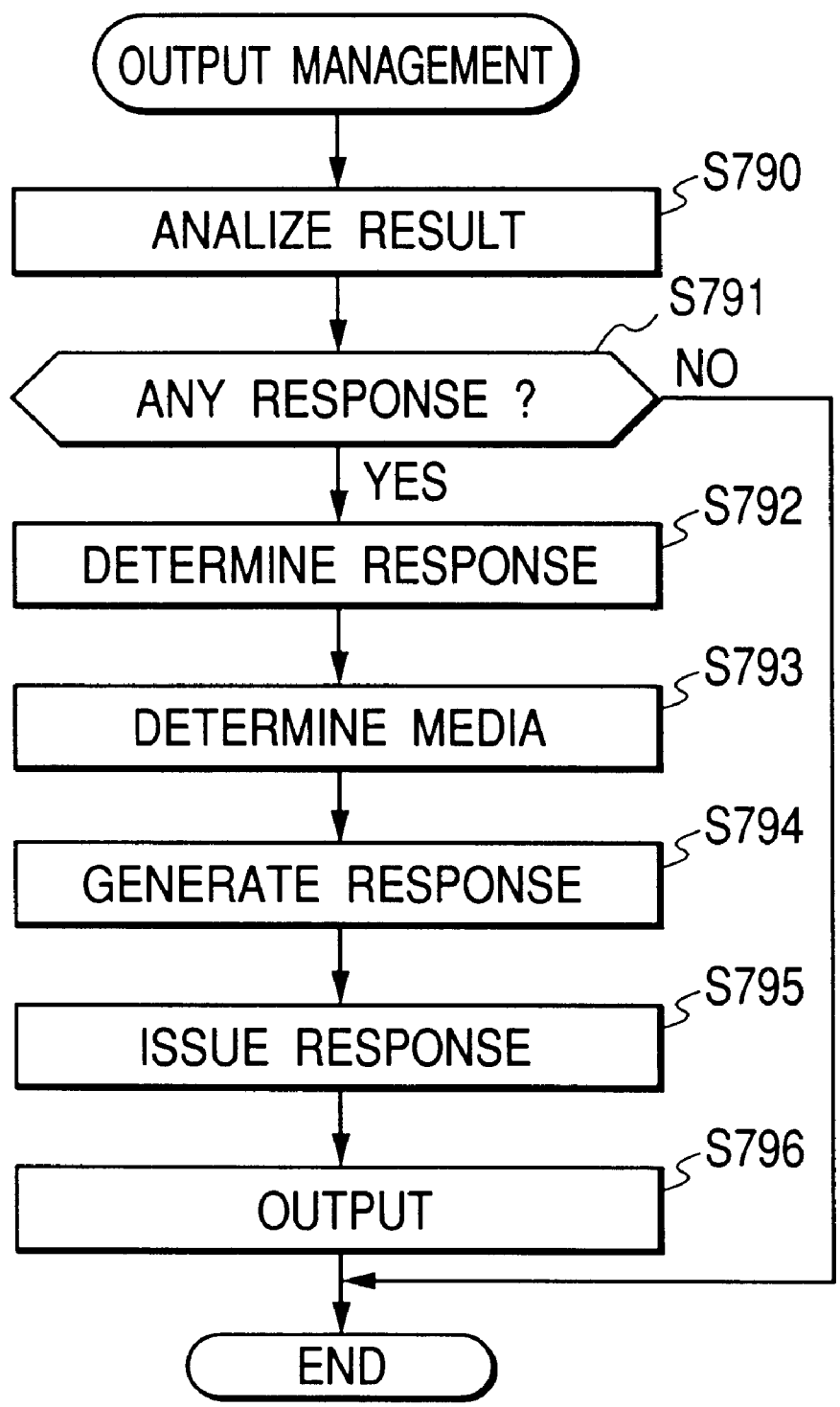
FIG. 79 is a flowchart showing the processing performed by an output management unit.

FIGS. 77 to 79 are specific flowcharts showing the process at step S760 (the process performed by the input management unit 751), at step S761 (the process performed by the core unit 752) and at step S763 (the process performed by the output management unit 753).

In FIG. 77, when, at step S770, it is determined that there is new input, at step S771 the input information is obtained. At step S772 the input information is analyzed, as needed, after the information has been identified. At this time, the input management unit 751 accepts information from various media and identifies or analyzes the data using methods corresponding to the individual media.

In FIG. 78, the core unit 752 receives the information that is analyzed in FIG. 77.

At step S780 the object of the input information is analyzed and ascertained from the result of the analysis. At step S781 how the object of the input information is related to the main apparatus (the system or the user) is examined. At step S782, from the relationship with the main apparatus, planning for what to execute is performed in consonance with the object. At step S783 the plan made at step S782 is executed.

In FIG. 79 the output management unit 753 employs the results obtained in FIG. 78 to determine whether a response is needed. If a response is required, it is prepared and output.

At step S790 the result obtained in FIG. 78 is analyzed. At step S791 a check is performed to determine whether or not there is a response relative to the results. When there is no response, the processing is thereafter terminated. If there is a response, at step S792 a response relative to the external response is determined. At step S793 a medium for the response is determined. At step S794 a response is prepared in consonance with the designated medium. At step S795 the prepared response is issued by the designated medium. At step S896 the response is actually output. The processing performed by the arrangement in FIG. 75 has been explained.

When, for example, E-mail is received that notifies the user of the holding of a conference, the input management unit 751 analyses the input information according to the procedures in FIG. 77. From the obtained result, the core unit 752 prepares a plan, according to the procedures in FIG. 78, as to how the user and the system should handle the information. The plan is transmitted to the output management unit 753, which in turn performs the process according to the procedures in FIG. 79. When a response should be transmitted with the plan, a response is actually prepared and transmitted.

Depending on the contents of the conference described in E-mail message and the status of the schedule of the user, at step S782 a plan is prepared for the aggressive transmission of the response to the user, so that preparation of the response is required. At step S791, therefore, it is determined that a response is to be transmitted. At step S792 the contents of the response are determined. When the schedules conflict and when it is uncertain which schedule should be selected or whether a user intends to attend a specific conference, the contents of a response asking for a decision are determined. At step S793 a medium is selected by which the contents of the response can be transmitted most effectively. When, for example, the user is outside the office, a medium, such as a telephone or a facsimile machine, is selected that can issue a notice to the user. When the user is being operating a personal computer, a medium, such as a personal computer, is selected that can effectively display various reference materials. At steps S794 and S795 a document and an image are prepared in consonance with the contents and the medium that are decided above, and a response is prepared using a method for converting the data into voiced natural language in consonance with a specific medium, and is issued.

Figure 80:
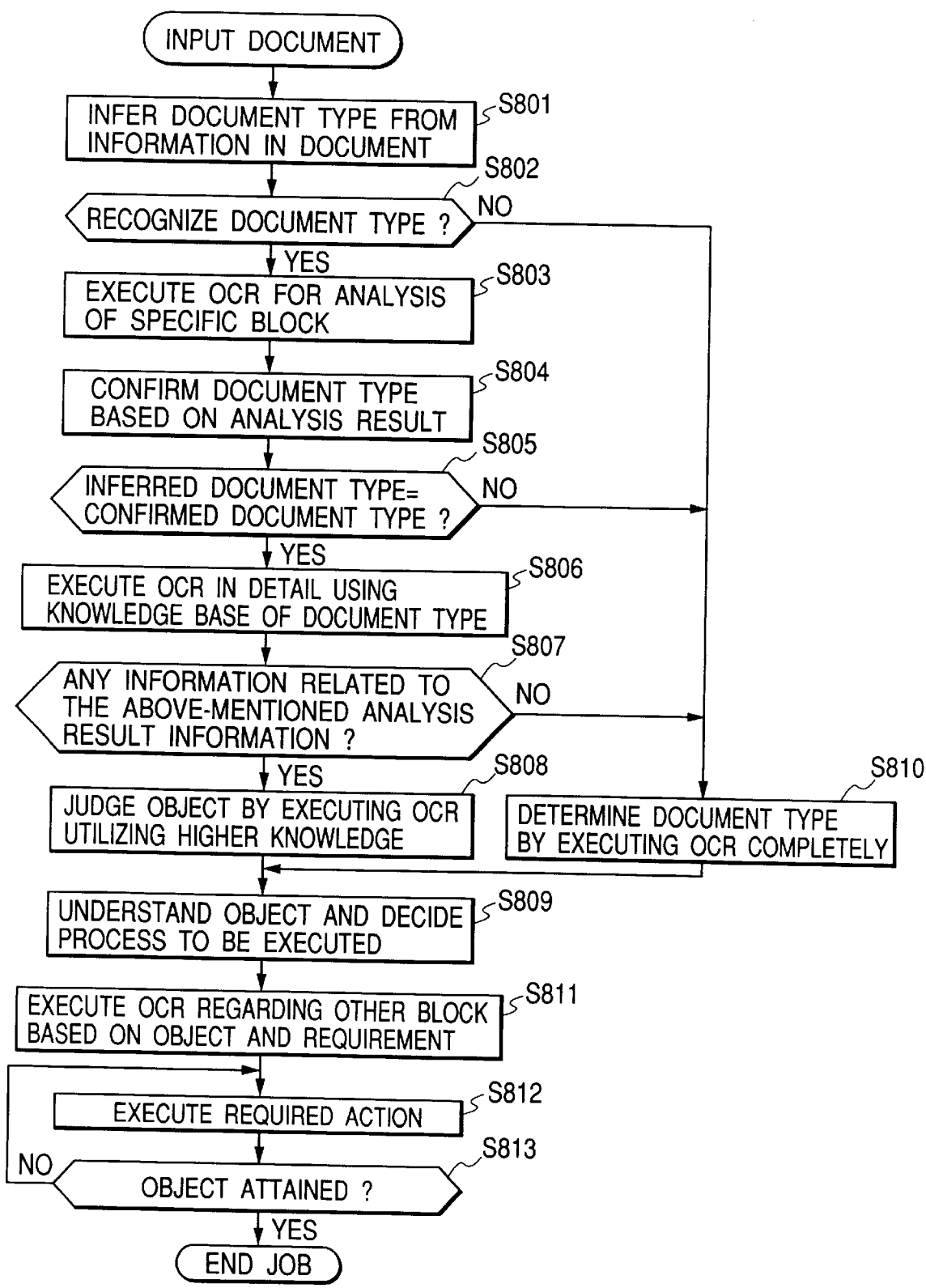
FIG. 80 is a flowchart showing data derivation processing.

FIG. 80 is a detailed flowchart for FIG. 75 to explain the processing for extracting data from input information. In this system according to the embodiment, when a document is input, at step S801 type identification symbols, such as the layout and a bar code of a document, are employed to infer the document type. If the document is inferred to be a letter, a report or a patent publication, program control moves to step S803. When no identification of the document is possible, program control goes to step S810 whereat OCR is thoroughly performed to ascertain the document type.

Figure 82A:
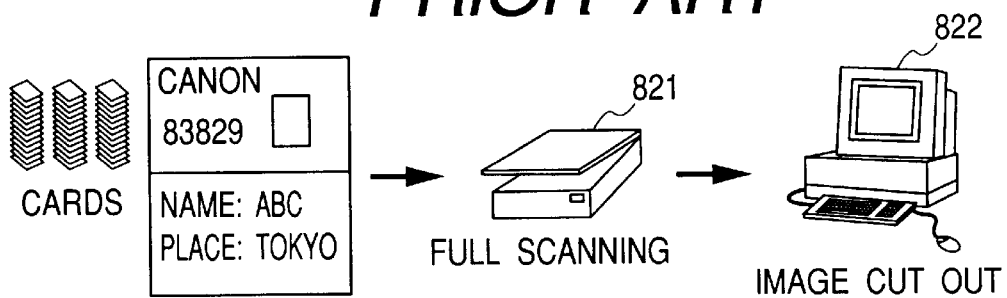
FIGS. 82A and 82B are diagrams for explaining a specific block reading process.
Figure 82B:
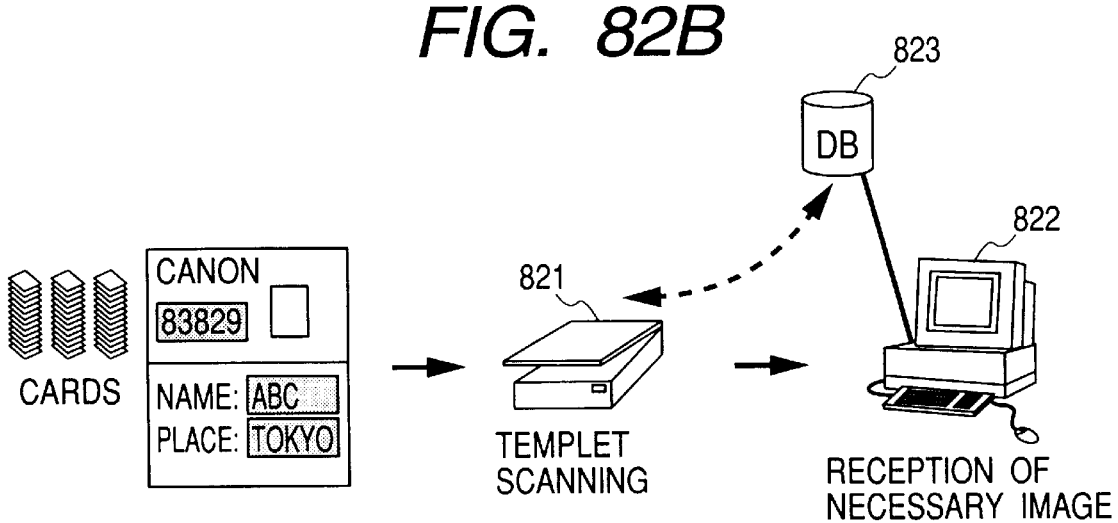

At step S803, in order to confirm the inferred document type is correct, a characteristic block is interpreted by the OCR to identify the document type (see FIGS. 82A and 82B). At step S804 the addressee of a letter and the patent serial number of the patent publication are found and the document type is confirmed. When the confirmed document type matches the inferred document type, program control advances to step S806. If the document types do not match, program control moves to step S810. For slips, at the top of which character strings describing the slip type are printed, the document type can be easily determined by the OCR on the employing upper portion of the sheet.

At step S806 the knowledge base of the document type that has been confirmed is employed to read and interpret a specific block using OCR. At step S807 a check is performed to determine whether there was information in the past that concerns the resultant information. If such information was present, program control moves to step S808. If such information was not present, program control goes to step S810. As a result, the addressee or the patent number is found and whether the information is a reply to a letter that was sent in the past can be ascertained.

At step S808, based on the identified status, the object is decided from the contents of the important text, and at step S809 a process to be executed is determined.

At step S811, because of the above object, the information is analyzed in another range where OCR has not yet been performed. At step S812 a required process is actually performed. As a result, a filing process, etc., is performed as needed.

In the above process, the OCR can be performed while inferring the contents of the information, more efficient and precise OCR results can be obtained than when, as in the conventional case, the OCR use is effected from the beginning. Accordingly, the process based on the OCR results can be performed precisely.

FIG. 81 is a diagram showing an example letter/facsimile that is a target for data extraction.

In this example, at step S801 the document type is inferred from the layout of a document. As a result, DocType1=letter/fax.

At step S803 a specific block is read by the OCR and is interpreted (see FIGS. 82A and 82B). Then, "From", "To" and "Dear Sir" are acquired, and at step S804 DocType2= letter/fax.

The process for reading a specific block by using OCR, which was explained at step S803 in FIG. 80, will be specifically described. FIGS. 82A and 82B are diagrams for explaining this process.

The system in this embodiment scans a specific block as follows:

(1) A specific block is read fast by pre-scanning with a low resolution.
(2) A form of the information that is read is compared with an information form stored in a DB 823. When the forms match, input information other than the form, or information in an area (e.g., inside the frame of a card in FIGS. 82A and 82B) specified for each form, is read at a high resolution.
(3) Only the area that is read is regarded as an OCR target and analyzed, and the processing is continued.

In addition, since in this example it is assumed that there are a plurality of cards having the same form, documents that are to be read at a predetermined interval probably have the same form. Therefore, first, the process is performed while it is assumed that the documents have the same form, and when a contradiction occurs, it is assumed that the documents have different forms and a re-analysis of them is performed.

As a result, the processing speed is considerably increased, the analysis range is limited, and an analysis domain is determined by specifying a form, and the analysis precision is drastically improved.

The determination of the object from the contents of the information, which was explained at step S808 in FIG. 80, will be specifically described.

Figure 83B:
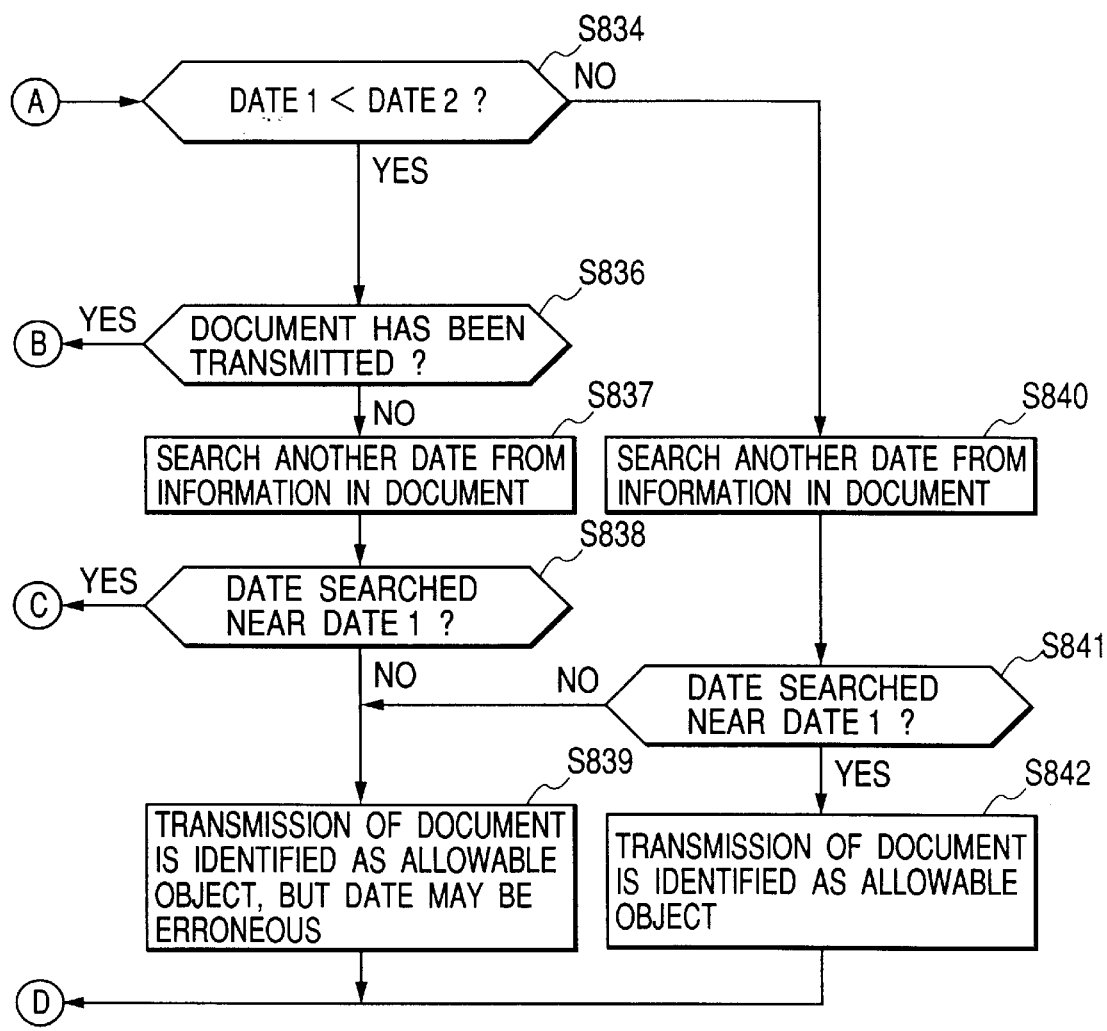
FIG. 83 which is composed of FIGS. 83A and 83B are flowcharts showing determination procedures in a process for referring to date data.

The system in this embodiment employs date data to perform the determination process according to the procedures in FIGS. 83A and 83B. When a sender is a user, the following process is performed.

(1) When the current date is today, transmission by facsimile is decided.
(2) When this date is yesterday or some time in the past, the user is queried as to whether the same document was received before or whether he or she has seen the same contents, in order to determine whether to perform filing, re-transmission, or whether the user made a mistake.
(3) When the date is tomorrow or some day in the future, the user is queried in order to determine whether the information should be held until the designated date, or whether the user made a mistake.

More specifically, assuming that in a document in FIG. 81, Date1 is the date of a document, Date2 is the today's date, (1) Date1=Nov. 25, 1996 & Date2=Nov. 25, 1996-send the document
(2) Date1=Nov. 25, 1996 & Date2=Jul. 2, 1996-filed
(3) Date1=Nov. 25, 1996 & Date2=Nov. 26, 1996
Date of contents=Dec. 18 and 22, 1996-mistake FIGS. 83A and 83B are flowcharts showing the processing for analyzing the object extracted from an input document. When a document is input, at step S830 a check is performed to determine whether the sender is a user. If the sender is a person other than a user, the input document is determined to be a received document. At step S831 a corresponding object, such as filing or data extraction, is examined, and the processing is thereafter terminated.

When the sender is a user, program control advances to step S832 to analyze the type of the input document. At step S833 the date of the document is compared with the current date. When the two dates are close to each other, at step S835 a check is performed to determine whether the document was transmitted before. When the document was not transmitted before, its object is determined to be "transmission of a document". If the same document was transmitted before, at step S843 the object for filing or retransmission is extracted.

When the date of the document is a fairly old date, program control moves to step S836, whereat a check is performed to determine whether or not the same document was transmitted before. When the document was transmitted before, program control moves to step S843. When the document was not transmitted, program control goes to step S837 whereat a check is performed to determine whether any other date is described in the information for the document. When there is another date, program control goes to step S843. When no other date is found, it is ascertained that the object can be transmission of the document, and also that the date may be wrong.

When the date of the document is a date fairly far in advance, at step S840 a check is performed to determine whether any other date is described in the information for the document. When, at step S841, there is another date, the object is determined to be "transmission of the document". When no other date is found, program control moves to step S839.

[Twenty-seventh Embodiment]

Figure 84:
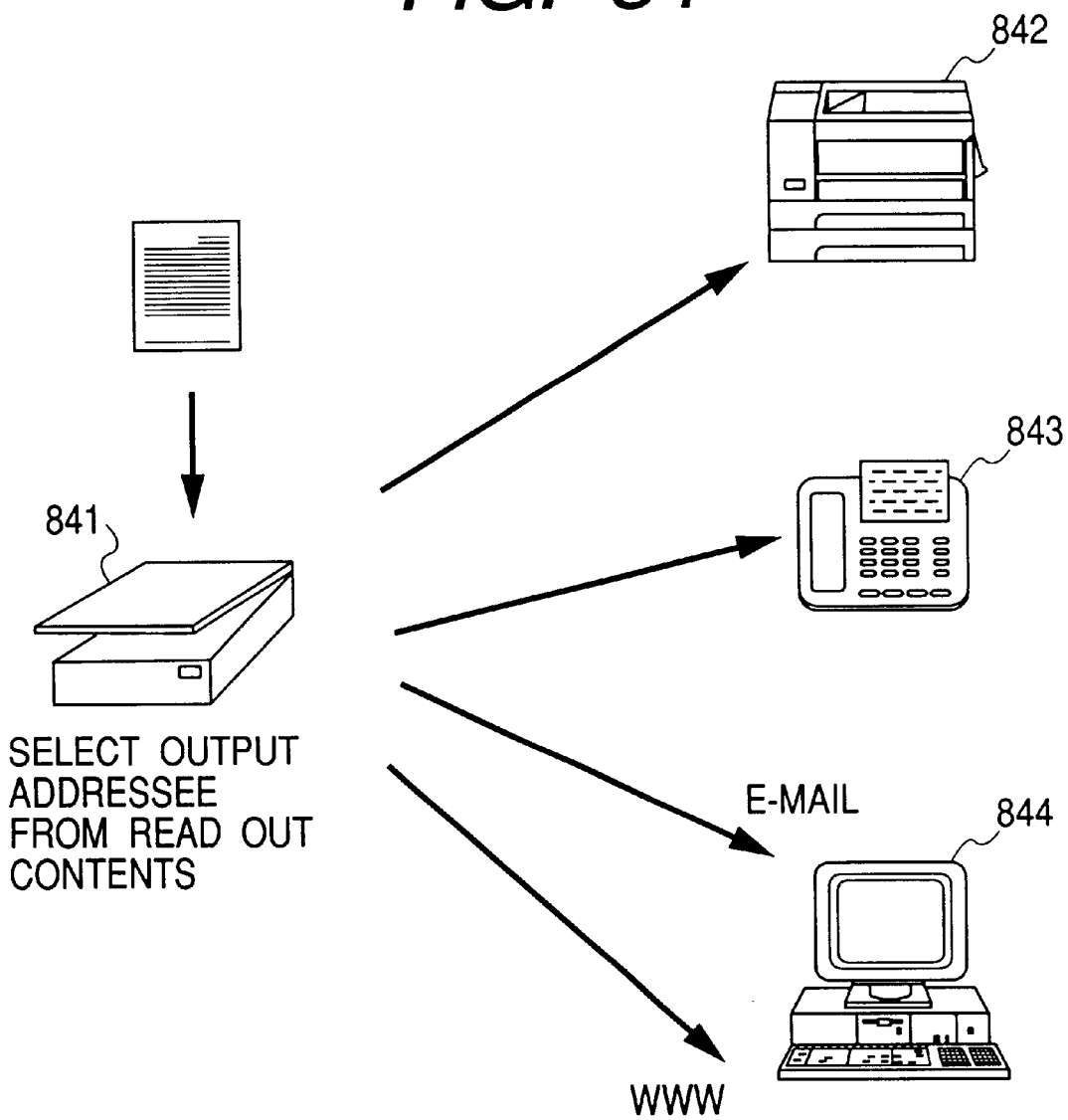
FIG. 84 is a diagram showing transmission of information according to a twenty-seventh embodiment.

FIG. 84 is a diagram showing an example arrangement of a system according to this embodiment. In this embodiment, the system serves as a current facsimile machine.

According to the system in this embodiment, without a user specifying an addressee, the addressee for a document is determined from bar code on a document that is read or information on a cover sheet, so that the document can be transmitted to a correct addressee.

As a result, appropriate information can be transmitted to a printer or a facsimile machine, by E-mail or via the WWW.

[Twenty-eighth Embodiment]

Figure 85:
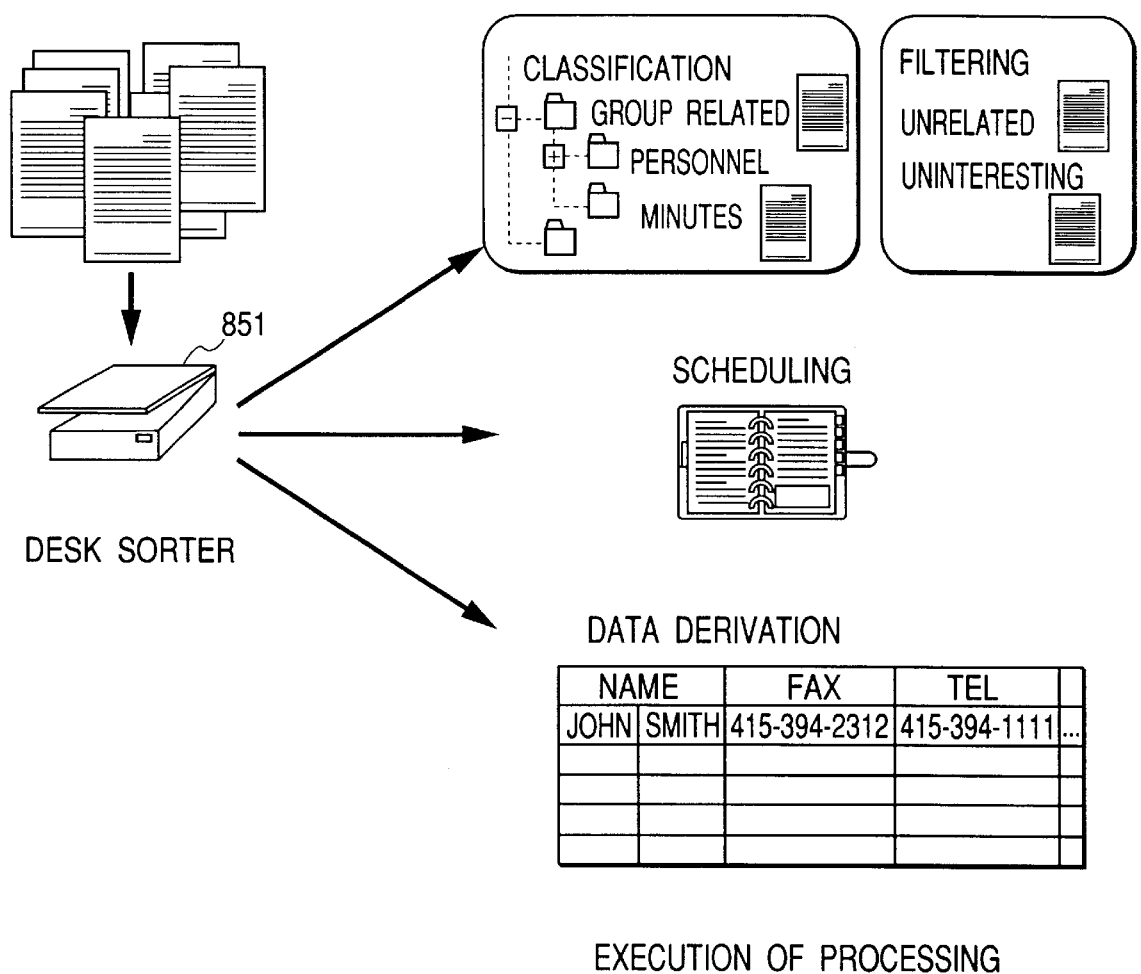
FIG. 85 is a diagram showing transmission of information according to a twenty-eighth embodiment.

FIG. 85 is a diagram illustrating an example arrangement of a system according to this embodiment. In this example, the system implements a desk sorter function for processing all the kinds of documents on the desk.

That is, in consonance with the contents of the document that is read, sorting, filing, scheduling, data extraction and automatic processing are performed.

[Twenty-ninth Embodiment]

Figure 86:
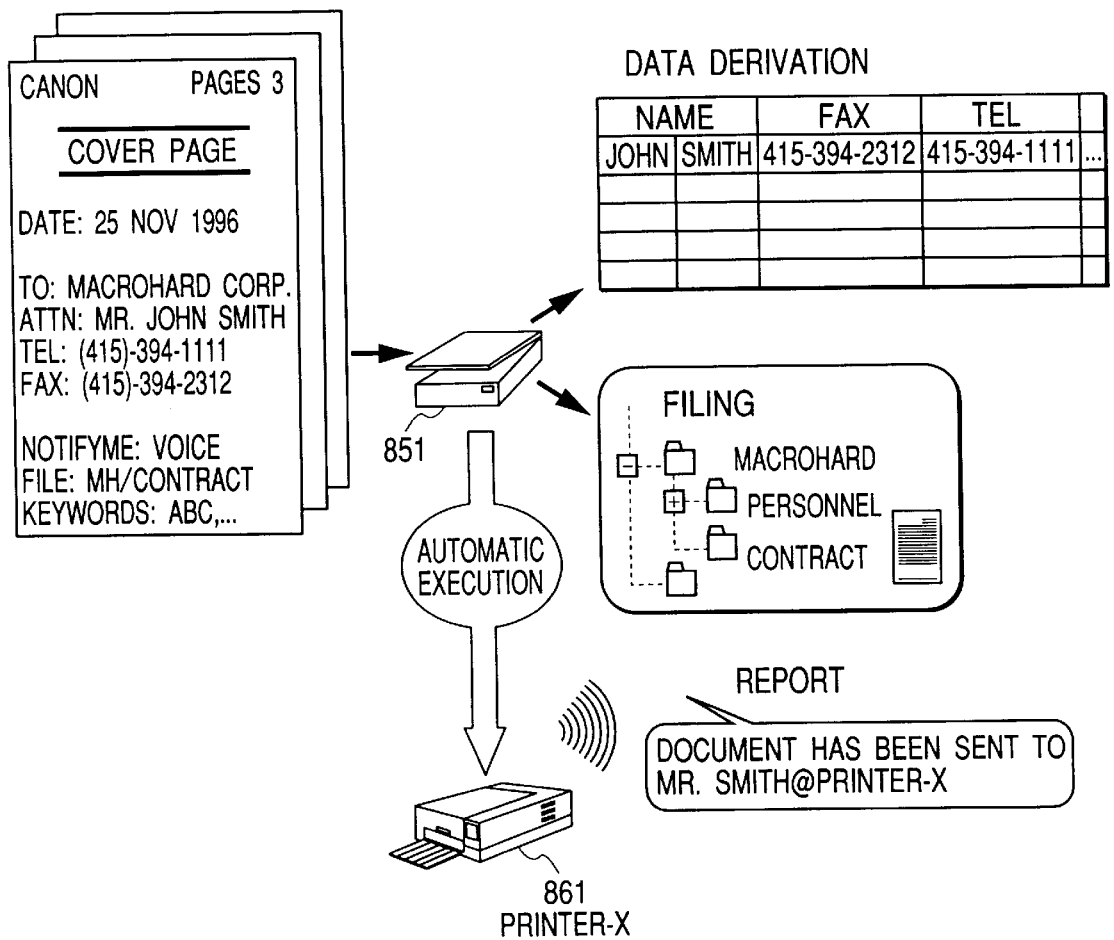
FIG. 86 is a diagram showing transmission of information according to the twenty-eighth embodiment.

FIG. 86 is a detailed diagram for explaining the system in FIG. 85. The processing performed by the system shown in FIG. 86 will be specifically described while referring to the flowchart in FIG. 87.

Figure 87:
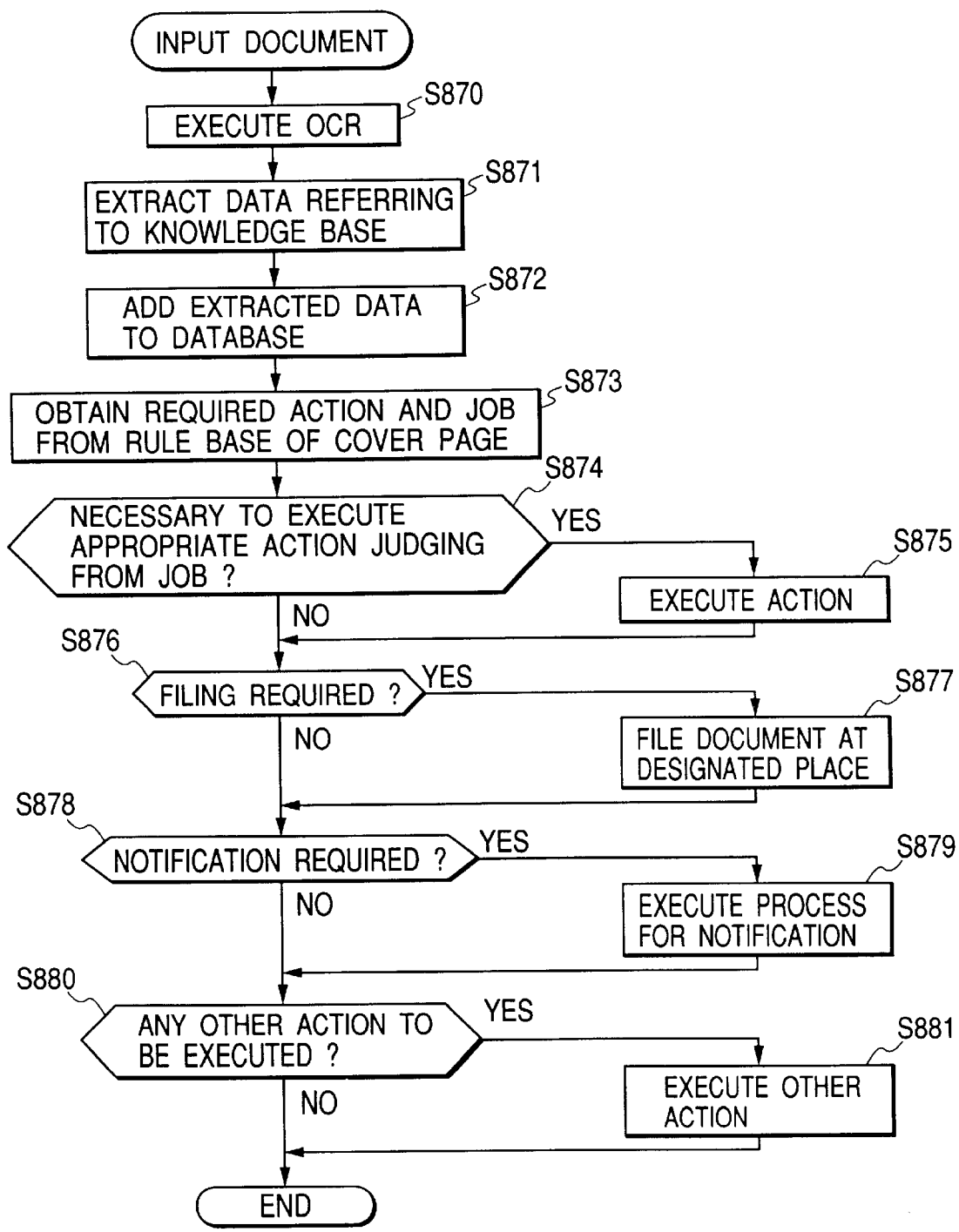
FIG. 87 is a flowchart showing the processing for the twenty-eighth embodiment.

FIG. 87 is a flowchart showing the processing for this embodiment. FIGS. 88 and 89 are tables for knowledge used during the processing; the table in FIG. 88 shows the knowledge in general knowledge base, and the table in FIG. 89 shows the knowledge in a knowledge base of a field specified on a cover sheet. In this embodiment, information defined in the tables in FIGS. 88 and 89 is employed to compare a character string included in an input document with a character string defined in a character string column in the table, and the conception in a corresponding column, a Role for further specifying the meaning, and a Condition for specifying succeeding information, or an instructed process Action are acquired, and analysis for them is performed.

In FIG. 87, at step S870 a cover page is scanned and an OCR process is performed. At step S871 the knowledge base in FIG. 88 is examined to extract from it data, such as the names of a sender and a receiver and their telephone numbers and facsimile numbers. At step S872 the obtained data are registered in a database. In the example in FIG. 86, character string "To: Macrohard Corp." is included in the cover page of a received document. When this character string is compared with an item defined in the character string column in FIG. 88. Then, matching item "To" is found and its Role is a reception company name or an individual name, so that "Macrohard Corp." is extracted as information concerning a receiver.

At step S873 a notification method and means, a filing job, an action for a place, and a job are extracted. In the example in FIG. 86, character string "File: MH/Contract" is included in the cover page of the received document. When this character string is compared with the items defined in the character string column in FIG. 89, matching item "File" is found, filing is extracted from the column as an instructed action, and "MH/Contract" is extracted from the document as information for a filing place.

Assuming that Date1=Nov. 25, 1996 and Date2=Nov. 25, 1996, as is explained in FIGS. 83A and 83B, it is determined that the object is transmission of a document.

At step S874 a check is performed to determine whether an action for the object of the processing is present. Since the transmission of the document to a receiver is the object, at step S875 a transmission action is performed. At step S876 the information on the cover page is employed to determine whether the filing is necessary. Since the filing is required in the example in FIG. 86, at step S877 the document is filed at the instructed place, "MH/Contract".

At step S878 as well as at step S876 the information on the cover page is employed to determine whether or not a notification for the transmission of the document should be issued to the sender. Since it is instructed to notify the sender, by voice, of the transmission of the document, at step S879 the sender is notified by voice of that the document has been transmitted to the receiver. At step S880 whether or not another action is determined. At step S881 a keyword is designated, and an index is prepared by using keyword ABC.

[Thirtieth Embodiment]

Figure 90:
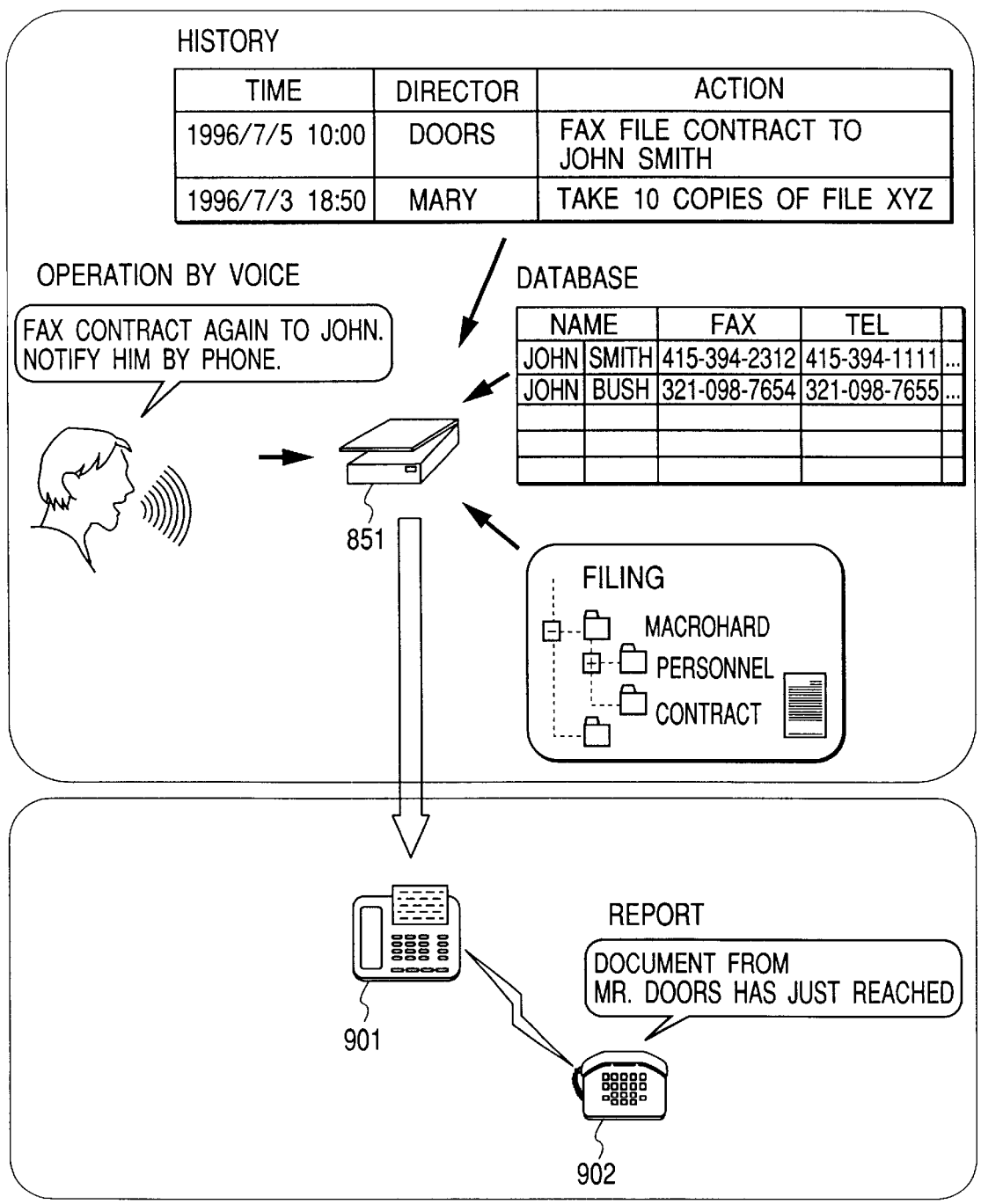
FIG. 90 is a diagram showing an example where voice is used to refer to processing history to perform a process.

FIG. 90 is a diagram showing an example processing where the history in the past is referred to based on an instruction by voice in natural language. The processing in FIG. 90 will be explained while referring to the flowchart in FIG. 91.

FIG. 91 is a flowchart showing the processing for this embodiment. When an aural instruction "Fax Contract again to John. Notify him by Phone" is received from a user, the system analyzes the object of the instruction in the natural language, and understands "Re-transmit document "Contract" to John, and Notify him of the transmission". Thus, the processing in FIG. 91 is initiated to specify the document Contract and the addressee John.

Since re-transmission means that the document was previously transmitted, at step S910 history information is acquired from the database. Then, the document Contract and the addressee John are specified from the history information. At step S911 the address of the John is obtained from the personal database. Since, in the database, there are two Johns, John Smith and John Bush, ordinarily the addressee can not be specified. Since at step S910 the history information is referred to, however, it is judged that John to whom the document Contract was transmitted is John Smith, and the addressee is thus specified. At step S912 the document "Contract" is acquired from the filing database. At step S913 the document is transmitted to addressee John. Since there is notice instruction "Notify him by Phone" at step S914 it is determined that transmission of the notice is necessary. At step S915, as well as in FIG. 89, according to the rule of the knowledge base, an instruction is issued to a facsimile machine 901 as a reception apparatus to send a notice to a receiver by phone. At step S916 the other actions are not instructed, and program control thereafter determined.

Upon the receipt of the document, according to the notification instruction, the facsimile machine 901 notifies John by phone of the receipt of the document from Mr. Doors. When the facsimile machine 901 can not notify the addressee by phone of the receipt of the document, this addressee may take its place.

[Thirty-first Embodiment]

Figure 95:
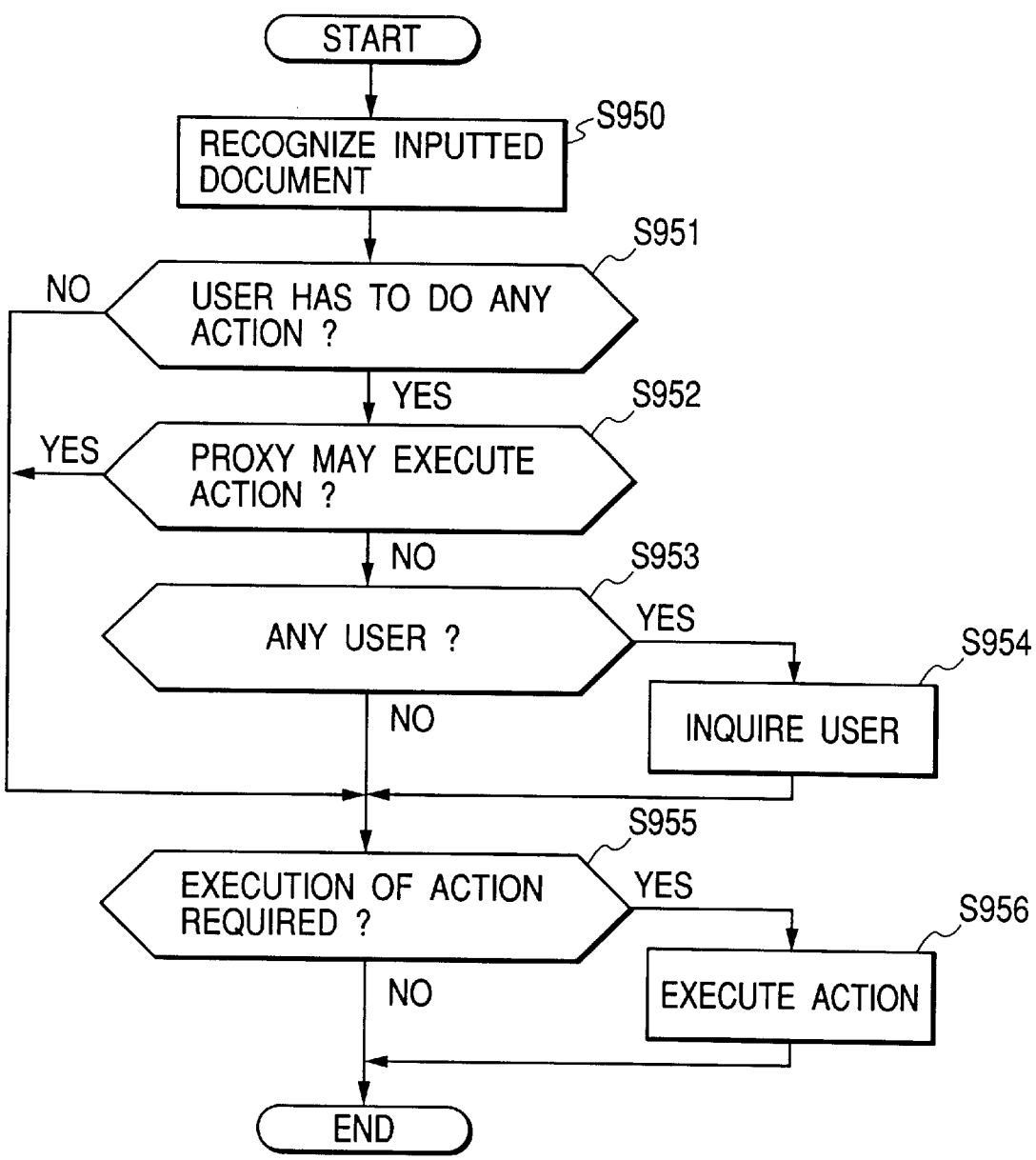
FIG. 95 is a flowchart for an example where a required process is automatically performed after a user is queried.

FIG. 95 is a flowchart showing example processing where, from the contents of a document that is input and analyzed, it is determined that a user should do something, a query is actually transmitted to the user, and a required process is preformed automatically. FIG. 92 is a diagram showing an example input document. FIG. 93 is a diagram showing the contents of a conversation between a system and a user. FIG. 94 is a diagram showing a document that is prepared by the system as the result of judgement of the conversation in FIG. 93.

The processing for preparing an output document in FIG. 94 from an input document in FIG. 92 will be described while referring to the flowchart in FIG. 95.

At step S950 the input document in FIG. 92 is analyzed and the following objects are understood: (a) Mr. John Smith arrives at Yokohama at three o'clock on November 28; (b) Mr. John Smith little understands Japanese; and (c) some one should meet him at the station.

At step S951 what the user should do is determined from the contents that are obtained. Since it is determined that some one must meet him at the station, program control advances to step S952. At step S952 a check is performed to determine whether a proxy (system) may execute the action. Since the system can not meet him at the station, program control goes to step S953. At step S953 a check is performed to determine whether an inquiry should be issued to the user, and if so, program control moves to step S954. In this example, since it is determined from the addressee of the input document that this is a request for Dr. Aruna Rohra, program control moves to step S954.

At step S954 a process for inquiring the user (Dr. Aruna Rohra) is performed. In this case, as the result obtained at step S951 the user must meet John at the station, and an inquiry what to do is issued to the user. At step S955 what to do next is determined from the result of the inquiry, and whether or not an action is to be initiated is determined. In this example, the user instructs to ask Mr. Tanaka to meet him, the action is initiated according to the instruction. Since there is a request for Mr. Tanaka to act as a proxy, it is assumed that the action must be initiated. At step S956 a document for requesting Mr. Tanaka as a proxy is prepared and a contact is made with Mr. Tanaka. In this example, an electronic mail document is prepared and transmitted. In this example, information that John arrives on 28th, an instruction for meeting him for the user and the original document that caused the request are attached to automatically form the document.

As is described above, processing has been explained for performing the matter (meeting John at the station) where from the input document the user must actually perform an action.

[Thirty-second Embodiment]

Figure 96:
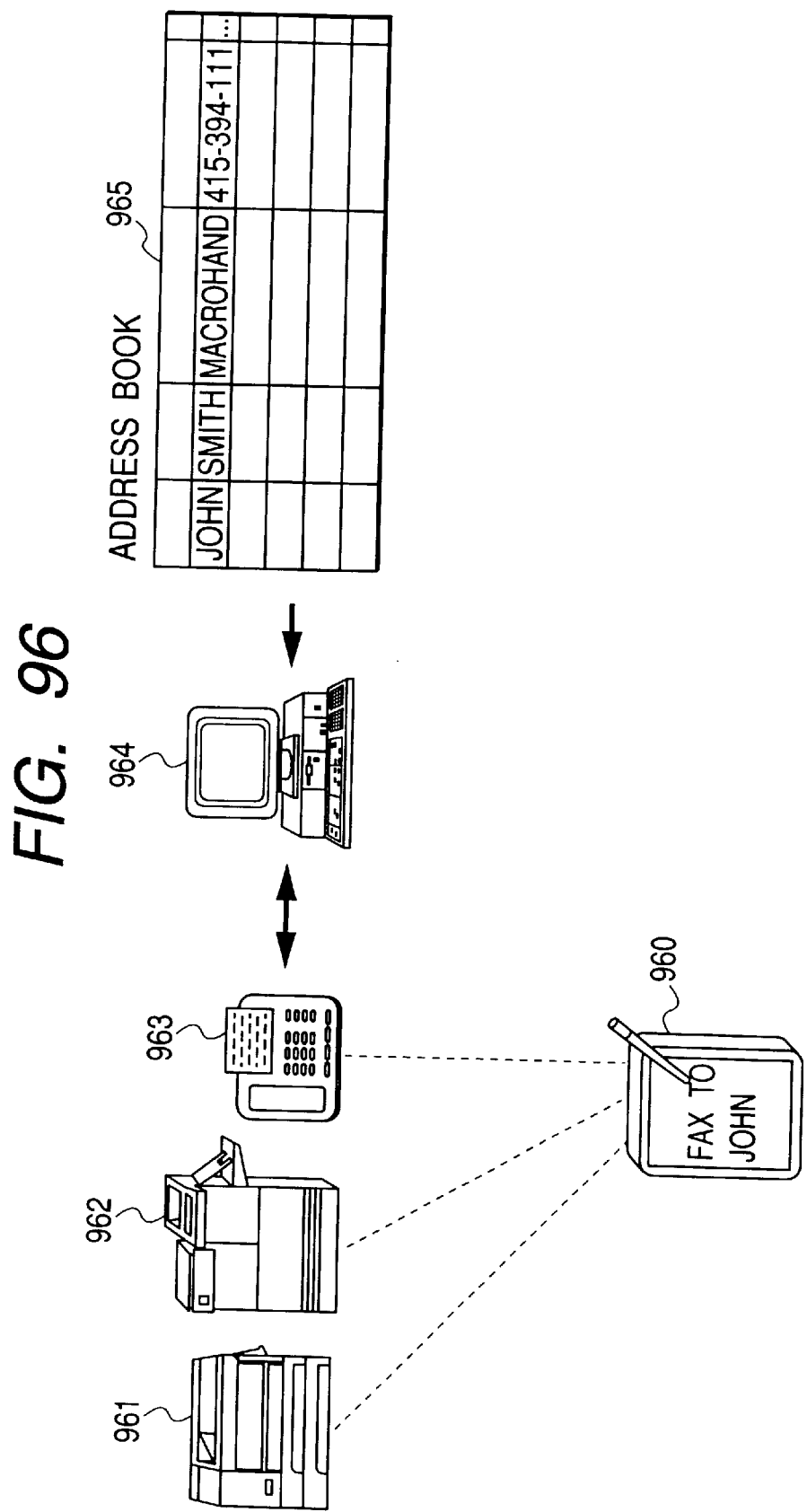
FIG. 96 is a diagram showing an example wherein a system is operated by a controller.

FIG. 96 is a diagram illustrating a thirty-second embodiment where a system is operated by a controller.

According to the system in this embodiment, devices and a controller directly or indirectly communicate with each other to specify the other.

Therefore, the following functions are provided: (1) automatic specifying of a device; (2) acquisition of a device capability from the device; (3) a UI (User Interface) inherent to a device; (4) operation by voice; (5) common basic operation for all the devices; (6) a UI inherent to a user; and (7) a UI having a high degree of freedom in consonance with the status.

That is, (1) only when a controller faces an operating target device, it automatically recognizes the target device; (2) information for each device is acquired from the pertinent device via IrDA or via a wireless LAN; (3) a UI inherent to each device is provided from the information for the device; (4) an operation by voice can be performed; (5) common basic operation can be provided by using the same controller; (6) user identification information is employed to acquire necessary information for each user from the database or the address book and to implement the UI inherent to the user; and (7) the optimal UI is provided in consonance with the status.

In FIG. 96 since a controller 960 faces a facsimile machine 963, it acquires model identification information from the facsimile machine 963, and renders a UI, which corresponds to the model, active. Then, following the displayed "Fax to" character string "Fax to John" is input with a touch pen, and transmitted to the facsimile machine 963. John's facsimile number is read from an address book 965 in a personal computer 964, and a document set in the facsimile machine 963 or a document designated on a file in the personal computer 964 is transmitted to the fax number. The detailed processing will be described later.

[Thirty-third Embodiment]

Figure 97:
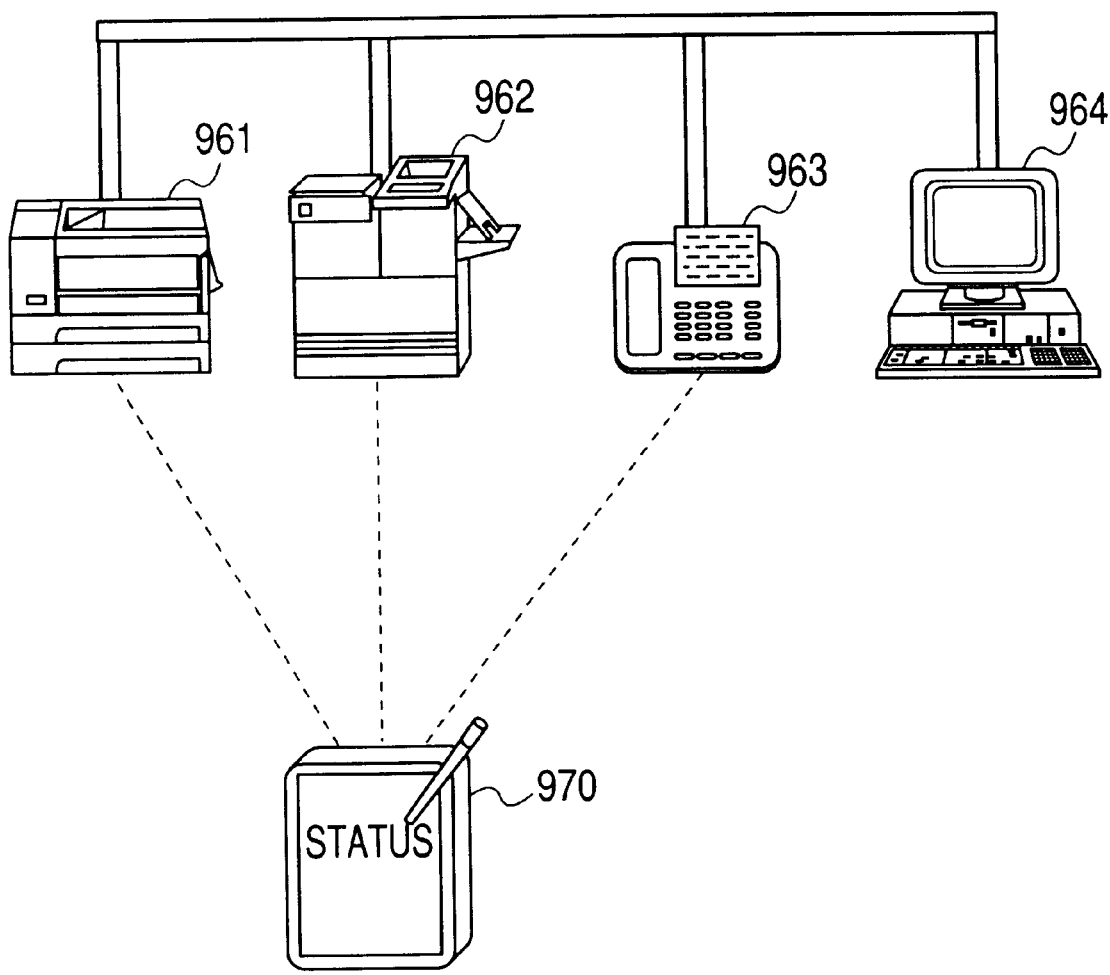
FIG. 97 is a diagram showing an example status monitor.

FIG. 97 is a diagram showing a status monitor.

In a system according to this embodiment, information of an apparatus that is other than the apparatus that a user directly operates can be referred to.

Therefore, the following functions can be provided: (1) remote and handy management; (2) specifying of automatic device; (3) common input/output for examining a status; (4) the same function as a portable telephone; (5) operation by voice; and (6) handling of all the devices that can input/output infrared rays.

That is, (1) required information can be acquired even from a remote area from a target device; (2) only when a controller faces the target device, it can automatically recognize the target device; (3) common basic operation can be provided by using the same controller; (4) the usability is enhanced by providing the portable telephone function for the controller; (5) operation by voice can be performed; and (6) the common protocol is employed to cope with all the devices that can input and output infrared rays.

In FIG. 97, a status monitor 970 selects a printer 961, a copier 962 or a facsimile machine 963, and character string "Status" is input with a touch pen and instructed. The status monitor 970 retrieves status information from the device that the status monitor 970 faces, so that the user of the status monitor 970 can confirm the statuses of the devices. Even when a personal computer 964 is located at an area where a command from the status monitor 970 can not reach, the status of the personal computer 964 is requested to a printer 961, which can communicate with the personal computer 964 via the network. Then, the status information can be retrieved to the status monitor 970 from the personal computer 964 via the network and the printer 961.

[Thirty-fourth Embodiment]

Figure 98:
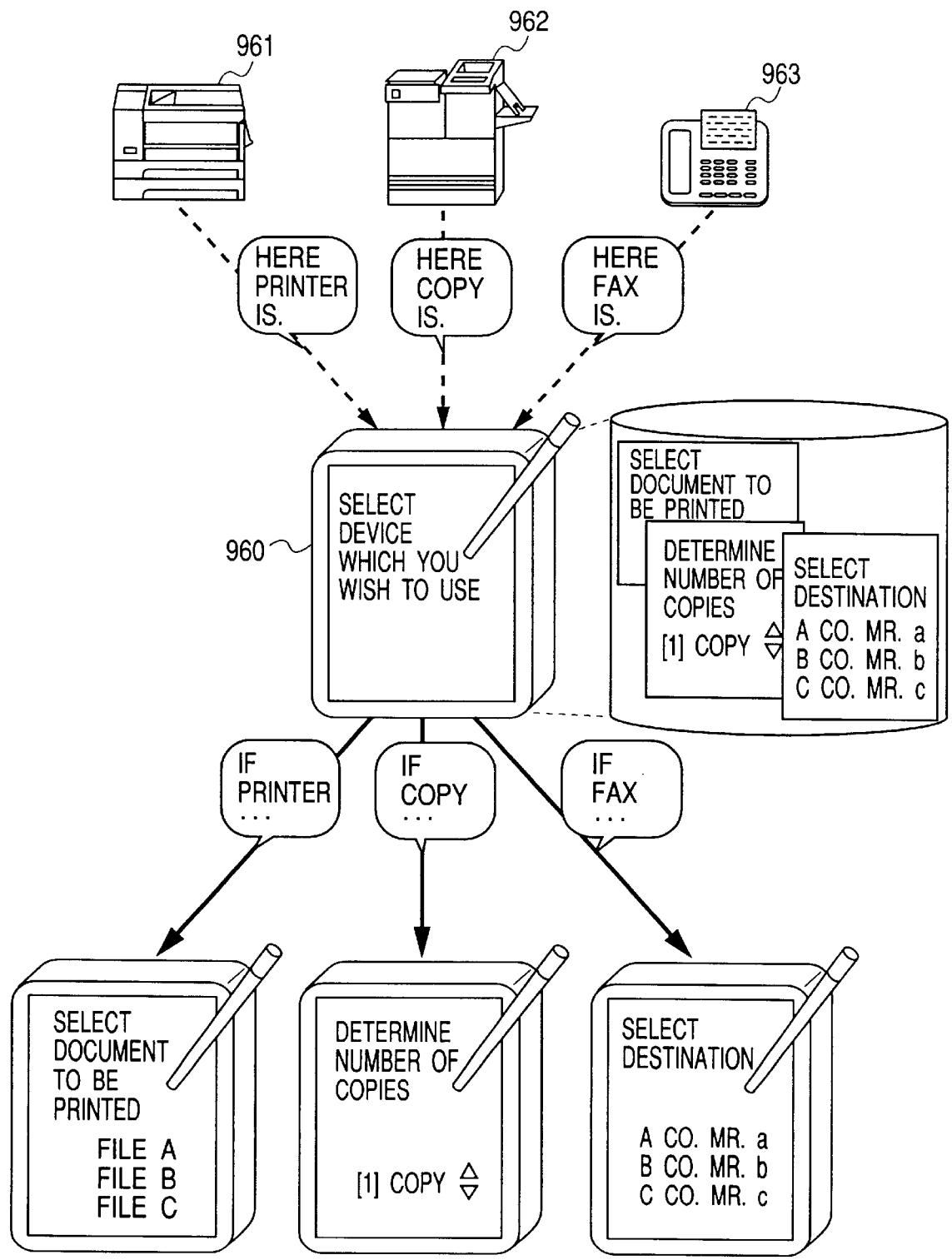
FIG. 98 is a diagram showing an example wherein a controller recognizes a target model and displays a corresponding UI.

FIG. 98 is a diagram showing an example where a controller 960 recognizes a target model, and a corresponding UI is read from the controller 960 and displayed. The controller 960, which does not face a target device, has a default screen on which message "Select a device which you would like to use" is displayed, as is shown in the center in FIG. 98.

The communication between the controller and the target model will now be described. It should be noted that (2) and (3) are not necessarily required. When, for example, in (4) a target model generates a signal to the controller at predetermined intervals, the same effect can be obtained. The positional relationship between the controller 960 and a target model may be employed to determine that the controller 960 selects the target model. Further, in (4) the controller 960 may identify a target model by examining the shape of the model, or by reading the bar code attached to the target model. In other words, only the essential portion is shown in FIG. 98.

(1) A user directs the controller 960 to a target model.
(2) The user touches a touch panel on the controller 960 in order to determine the timing at which the controller 960 transmits to the target model a target model identification signal request signal. Or, the controller 960 is set in advance to transmit a target model identification signal request signal at a predetermined interval.
(3) The controller 960 transmits a target model identification signal request signal to the target model.
(4) A target model identification signal is transmitted upon the receipt of the target model identification signal request signal from the controller 960, or according to the setup that a target model identification signal request signal at a specified interval.
(5) The controller 960 that receives the target model identification signal determines a UI in consonance with a target model indicated by the signal, and displays a corresponding UI internally stored. In this case, the identification signal is provided for each model; however, when an identification signal is provided for each device, a different UI can be employed for each of devices though they are the same model.

Figure 99:
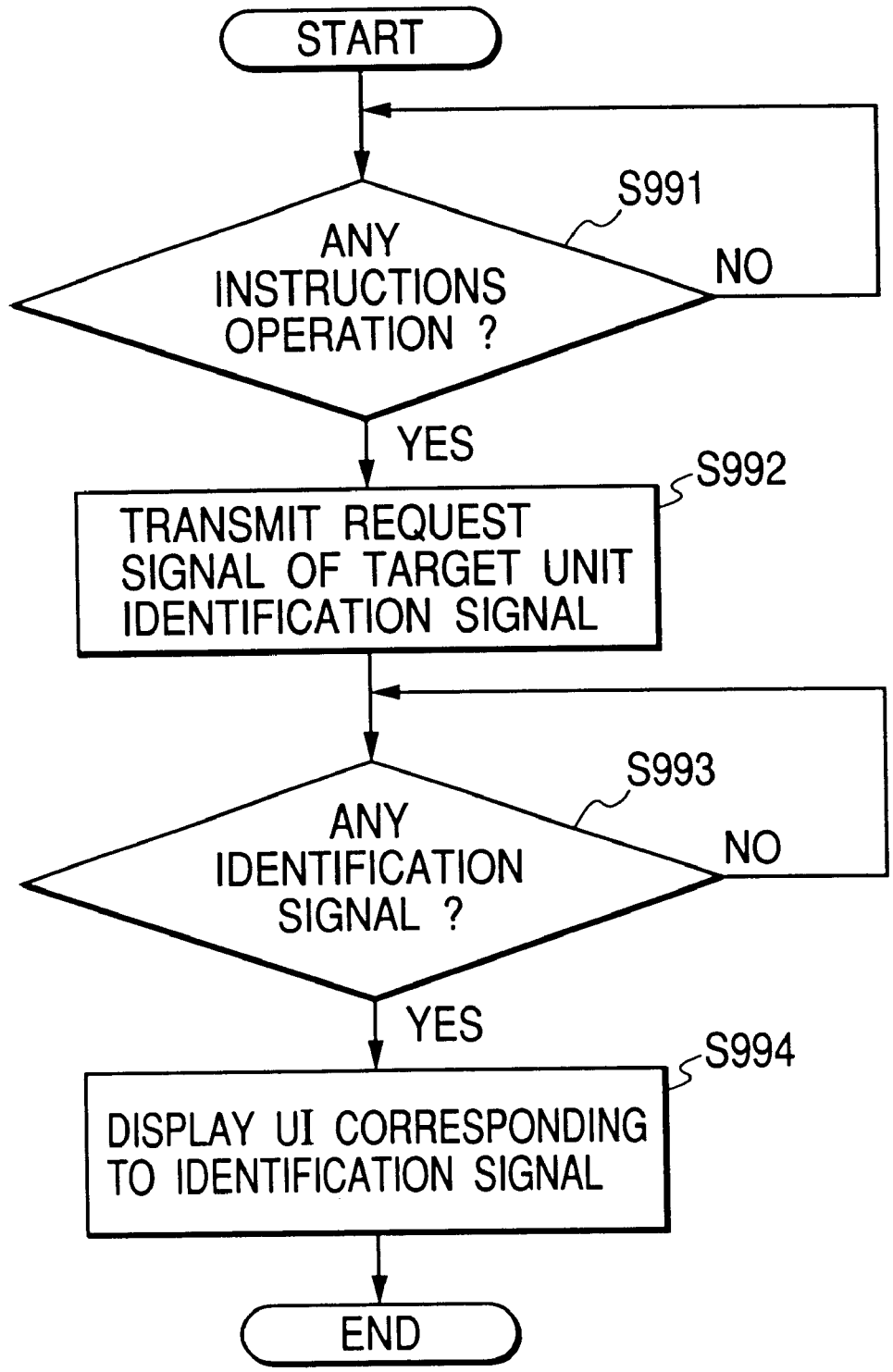
FIG. 99 is a flowchart showing the processing performed by a controller for the example wherein the controller recognizes a target model and displays a corresponding UI.

FIG. 99 is a flowchart showing the processing performed by the controller 960 when the controller recognizes a target model, and reads and displays a corresponding UI. The processing performed by the controller 960 will now be described.

At step S991 the controller 960 waits until an instruction from a user is input. At step S992 a target model identification signal request signal is transmitted by an infrared ray communication method in order to obtain a target model identification signal from the target model. At step S993 the controller 960 waits until the target model outputs a target model identification signal. At step S994, the UI corresponding to the received target model identification signal is acquired from internal memory and is displayed.

Figure 100:
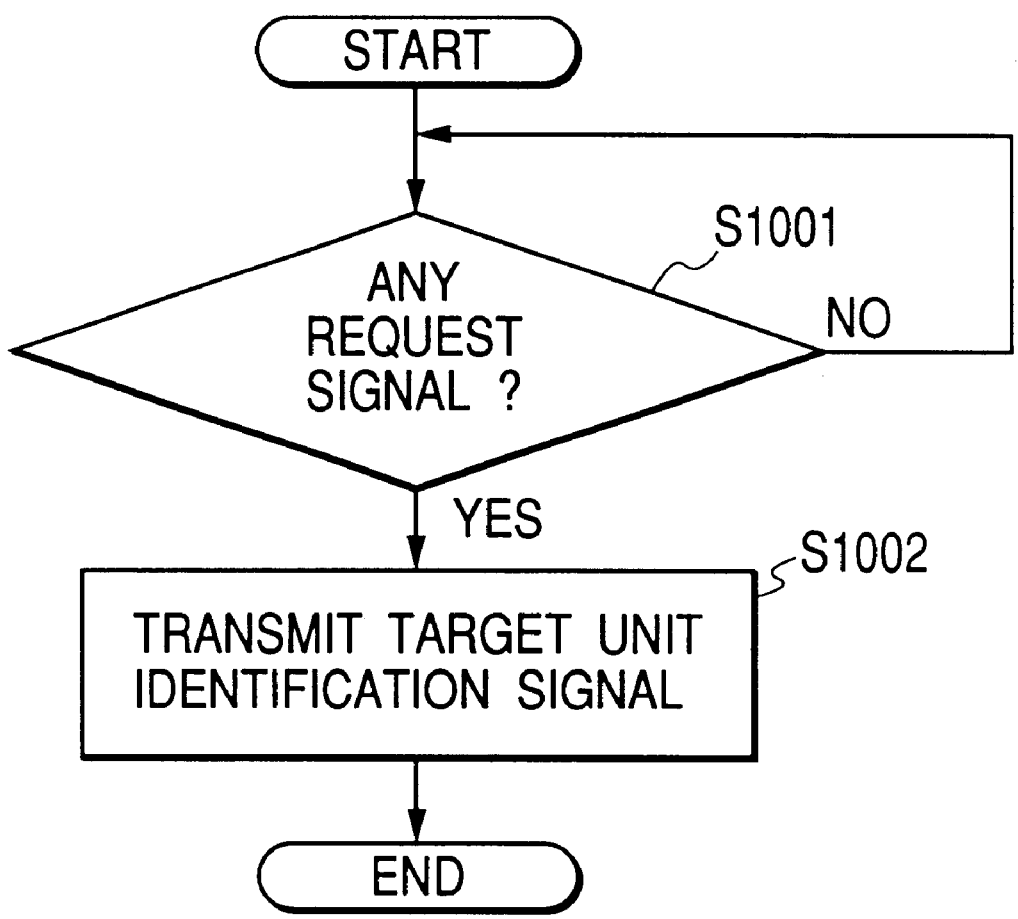
FIG. 100 is a flowchart showing the processing performed by a target model for the example wherein the controller recognizes a target model and displays a corresponding UI.

FIG. 100 is a flowchart showing the processing performed by a target model when the controller 960 recognizes a target model, and reads and displays a corresponding UI. The processing performed by the target model will now be described.

At step S1001, the target model waits for a request signal from the controller 960. At step S1002 the target model transmits a target model identification signal by an infrared communication method, etc.

[Thirty-fifth Embodiment]

Figure 101:
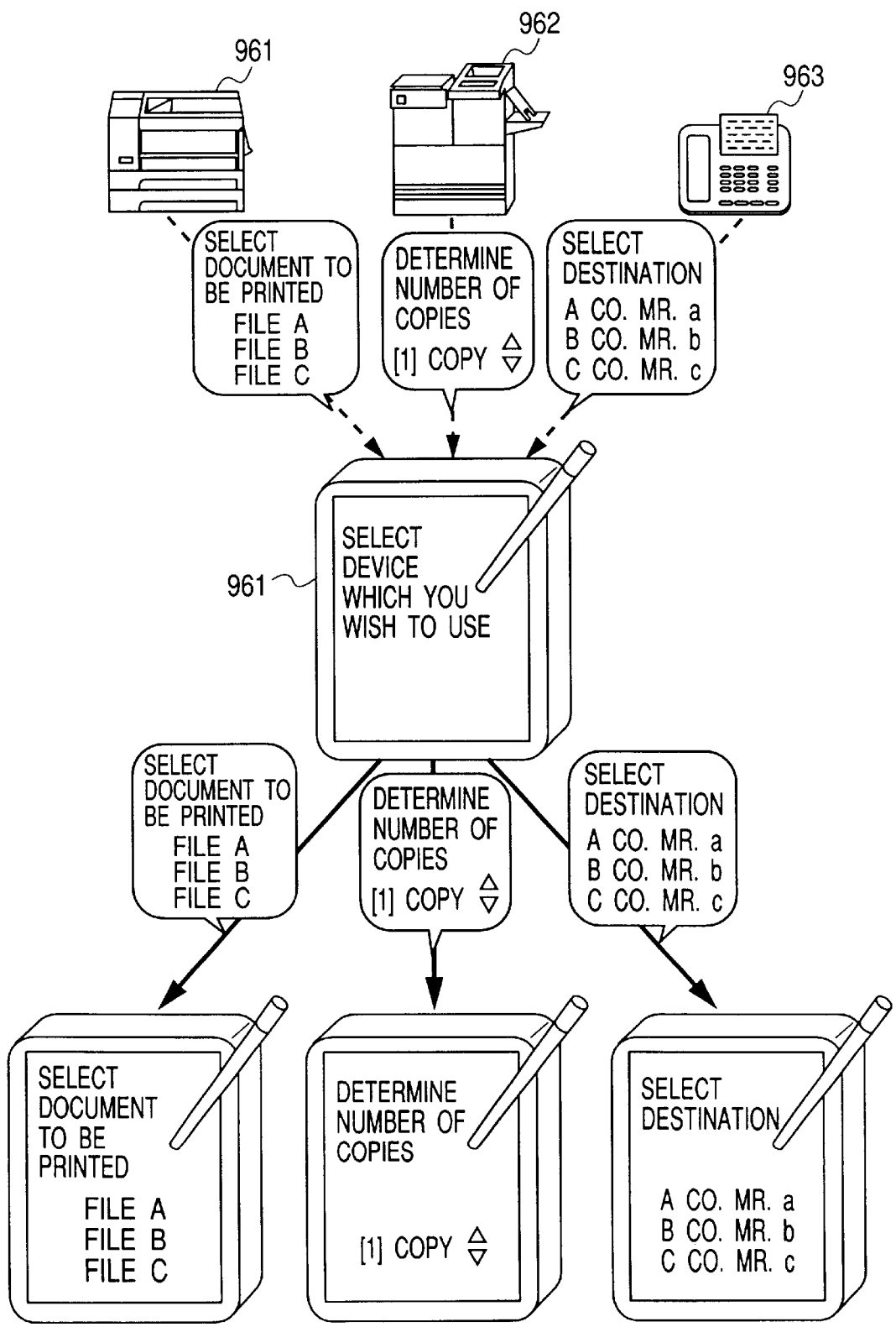
FIG. 101 is a diagram showing an example wherein a controller receives a UI from a target model and displays it.

FIG. 101 is a diagram showing an example where a controller 960 receives a UI from a target model and displays it. The controller 960, which does not face a target device, has a default screen, as is shown in the center in FIG. 101.

The communication between the controller and the target model will now be described. It should be noted that (2) and (3) are not necessarily required. When, for example, in (4) a target model generates a signal to the controller at predetermined intervals, the same effect can be obtained. The positional relationship between the controller 960 and a target model may be employed to determine that the controller 960 selects the target model. Further, in (4) the controller 960 may identify a target model by examining the shape of the model, or by reading the bar code attached to the target model. In other words, only the essential portion is shown in FIG. 101.

(1) A user directs the controller 960 to a target model.
(2) The user touches a touch panel on the controller 960 in order to determine the timing at which the controller 960 transmits a UI request signal to the target model. Or, the controller 960 is set in advance to transmit a UI request signal at a predetermined interval.
(3) The controller 960 transmits a UI request signal to the target model.
(4) A UI signal is transmitted upon the receipt of the UI request signal from the controller 960, or according to the setup that a UI request signal at a specified interval.
(5) The controller 960 that receives the UI signal displays the UI.

Figure 102:
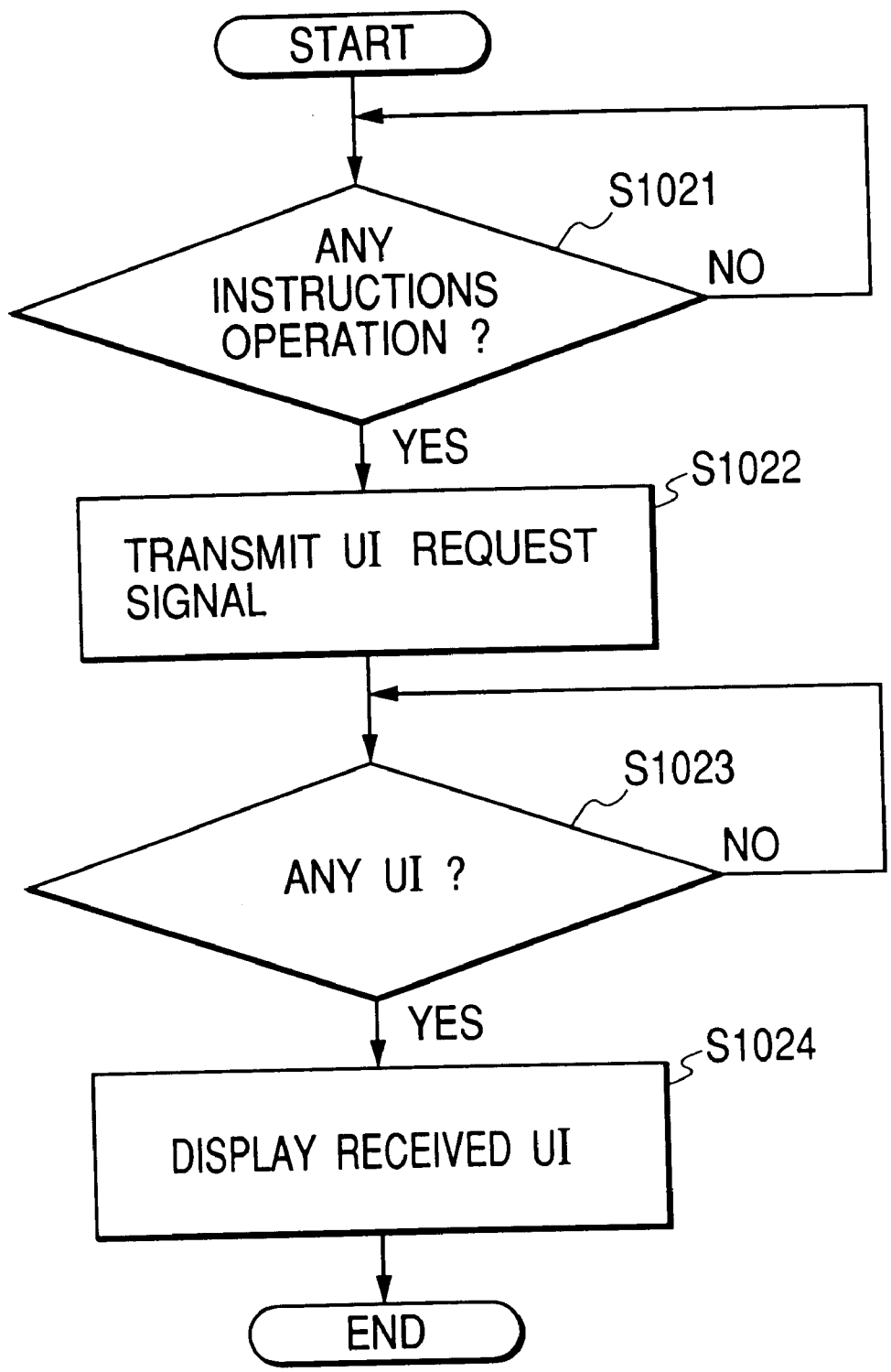
FIG. 102 is a flowchart showing processing performed by a controller for the example wherein the controller receives a UI from a target model and displays it.

FIG. 102 is a flowchart showing the processing performed by the controller 960 when the controller receives a UI from a target model and displays it. The processing performed by the controller 960 will now be described.

At step S1021 the controller 960 waits until an instruction from a user is input. At step S1022 a UI request signal is transmitted by an infrared ray communication method in order to obtain a UI signal from the target model. At step S1023 the controller 960 waits until the target model outputs a UI signal. at step S1024, the received UI is displayed.

Figure 103:
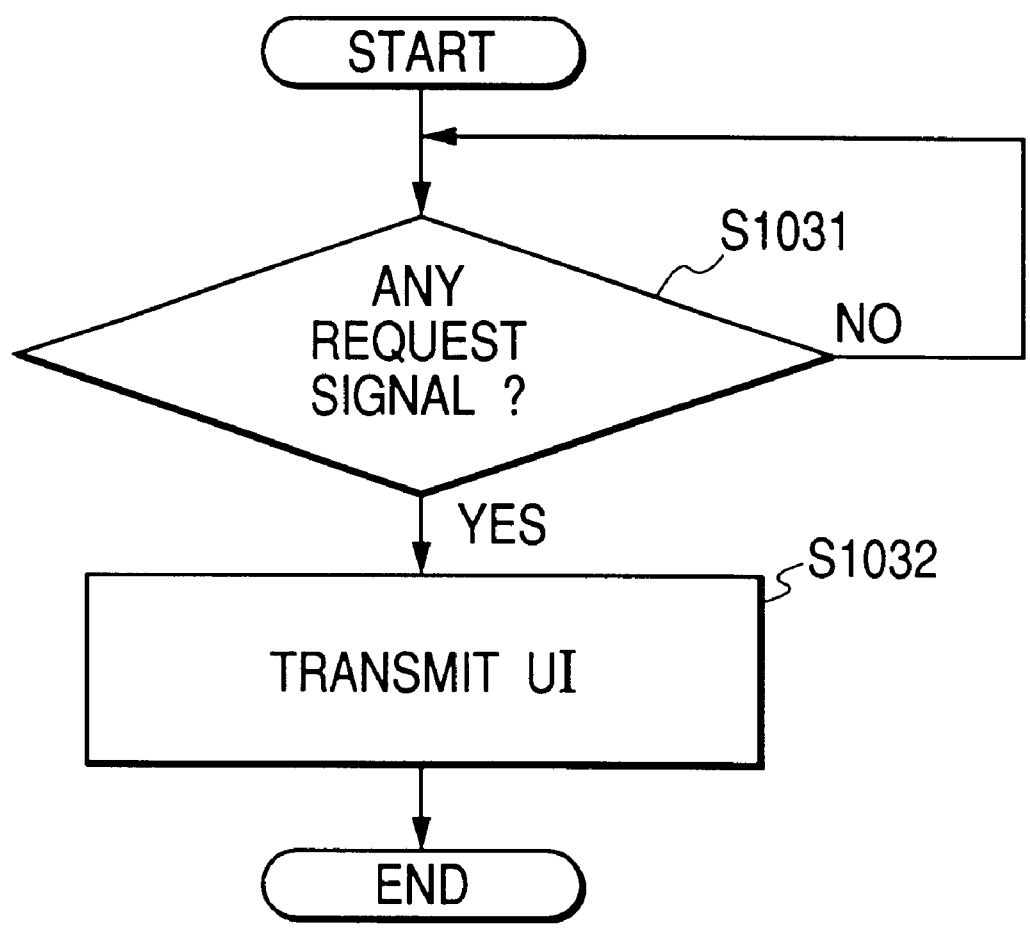
FIG. 103 is a flowchart showing processing performed by a target model for the example wherein the controller receives a UI from the target model and displays it.

FIG. 103 is a flowchart showing the processing performed by a target model when the controller 960 receives a UI from a target model and displays it. The processing performed by the target model will now be described.

At step S1031, the target model waits for a request signal from the controller 960. At step S1032 the target model transmits a UI signal by an infrared communication method, etc.

[Thirty-sixth Embodiment]

Figure 104:
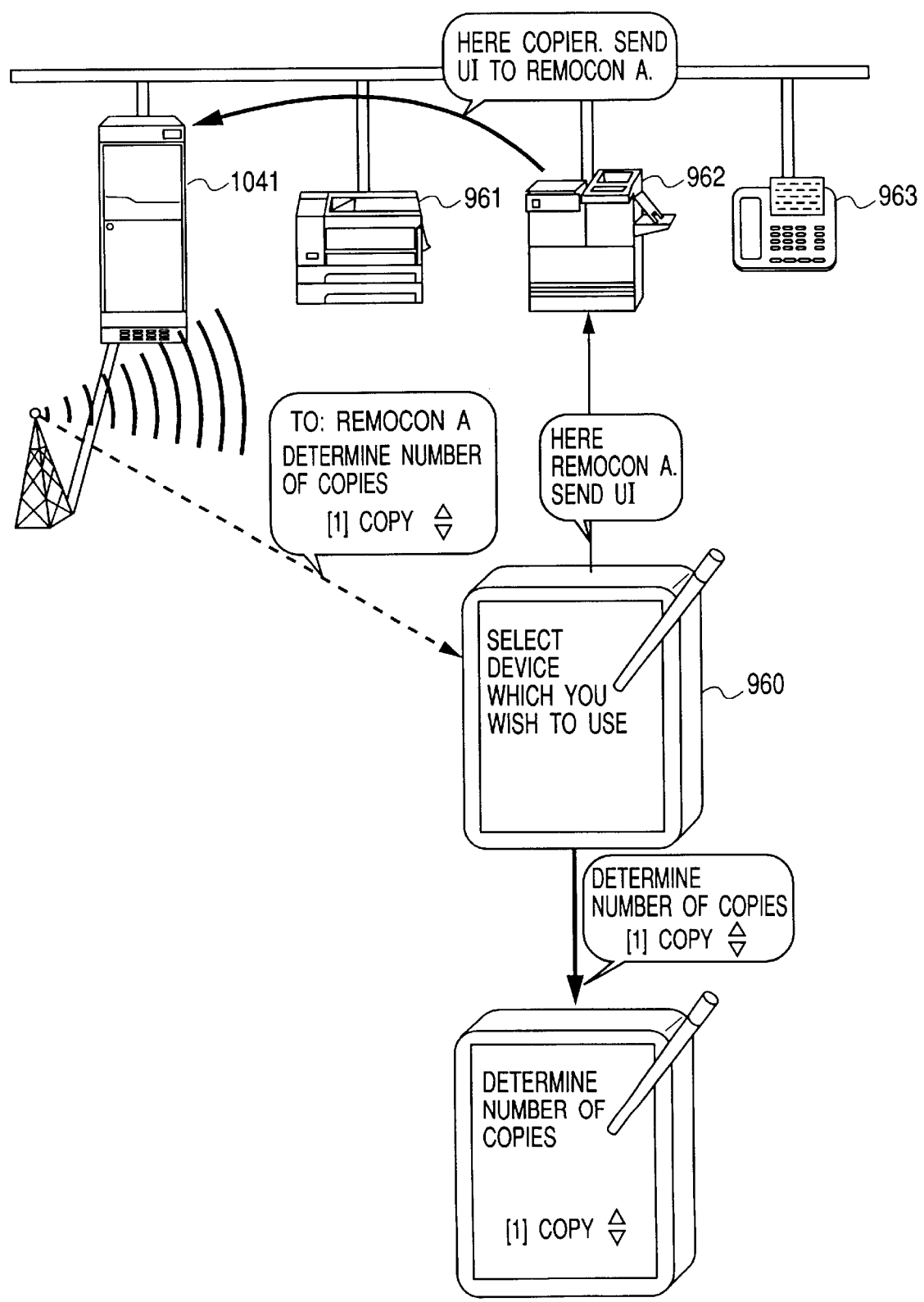
FIG. 104 is a diagram showing an example wherein a controller receives a UI from a target model via a wireless LAN rather than directly, and displays it.

FIG. 104 is a diagram showing an example where UIs of devices are stored in a wireless LAN server 1041 and when a controller 960 faces a copier 962 as a target model and requests a UI, a UI is transmitted, upon a request from the copier 962, from the wireless LAN server 1041 to the controller 960, and is displayed.

The controller 960, which does not face a target device, has a default screen, as is shown in the center in FIG. 104.

The communication between the controller and the target model will now be described.

(1) A user directs the controller 960 to a target model (a copier 962).
(2) The user touches a touch panel on the controller 960 in order to determine the timing at which the controller 960 transmits a UI request signal to the target model. Or, the controller 960 is set in advance to transmit a UI request signal at a predetermined interval.
(3) The controller 960 transmits controller identification data (controller A) to identify itself and a UI request signal to the target model.
(4) When the target model receives the controller identification data and the UI request signal from the controller, the target model transmits, to the server 1041 that manages the target model, the controller identification data (controller A) and target model identification data (copier) to identify itself, and requests the transmission of the UI.
(5) The server 1041 transmits the UI of the target model, which is indicated by the target model data, via a wireless LAN to the controller 960, which is indicated by the controller identification data.
(6) The controller 960 receives the UI addressed to itself, and displays the UI.

Figure 105:
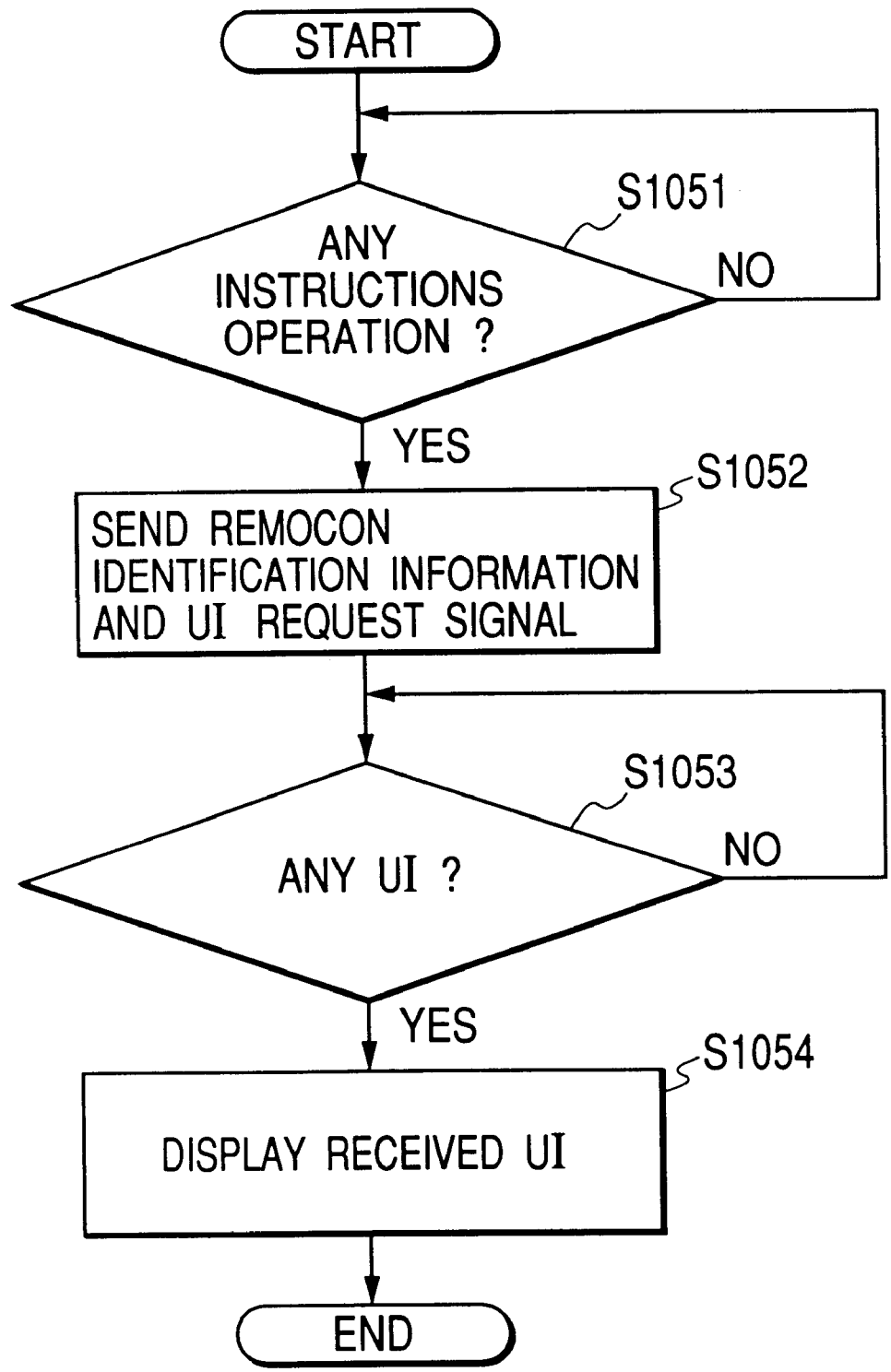
FIG. 105 is a flowchart showing the processing performed by a controller for the example wherein the controller receives a UI via a wireless LAN and displays it.

FIG. 105 is a flowchart showing the processing performed by the controller 960 when the controller receives a UI via the wireless LAN, instead of directly receiving it from a target model, and displays it.

The processing performed by the controller 960 will now be described. At step S1051 the controller 960 waits until an instruction from a user is input. At step S1052 a UI request signal for requesting a UI and controller identification data for identifying a controller are transmitted to the target model by an infrared ray communication method. At step S1053 the controller 960 waits until a UI signal is output by any device. At step S1054, the received UI is displayed.

Figure 106:
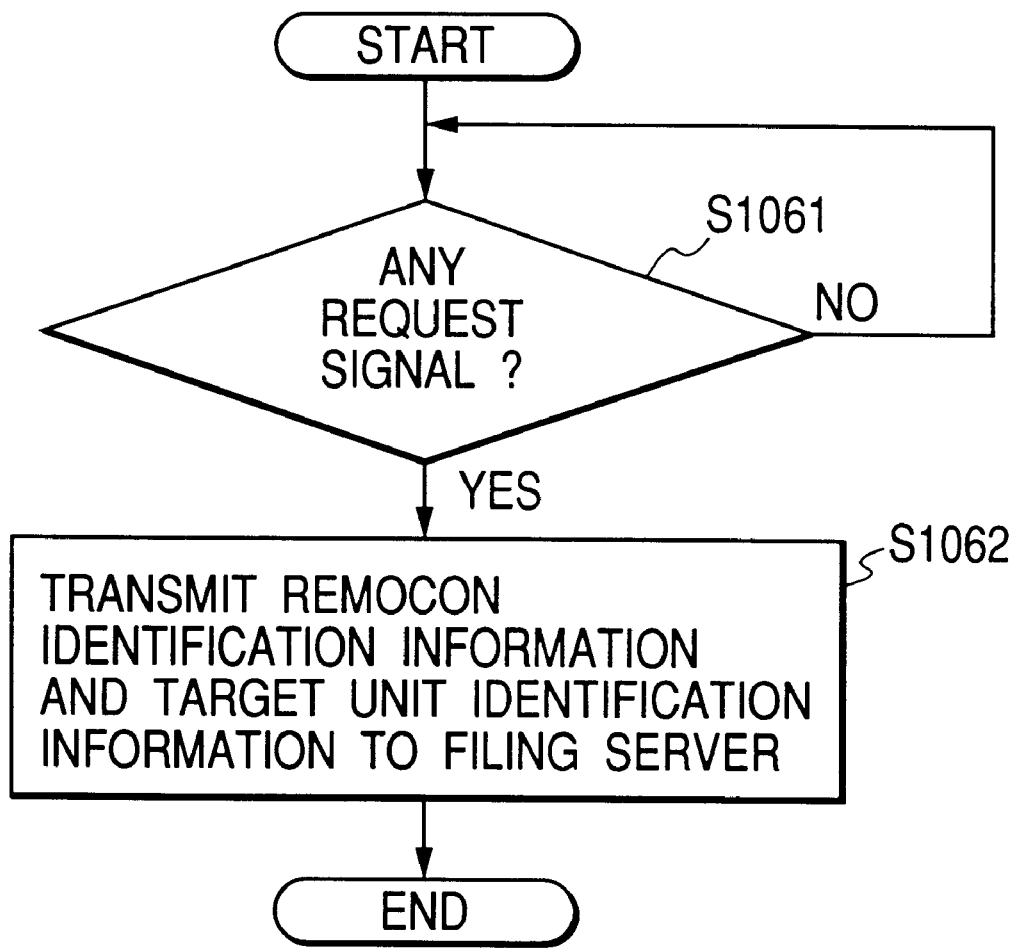
FIG. 106 is a flowchart showing the processing performed by a target model for the example wherein the controller receives a UI via a wireless LAN and displays it.

FIG. 106 is a flowchart showing the processing performed by the target model when the controller receives a UI via the wireless LAN, instead of directly receiving it from a target model, and displays it. The processing performed by the controller 960 will now be described.

At step S1061 the controller 960 waits until an instruction from a user is input. At step S1062 controller identification data received from the controller 960 and the target model identification data are transmitted to the server 1041, and issuance of the UI is requested.

Figure 107:
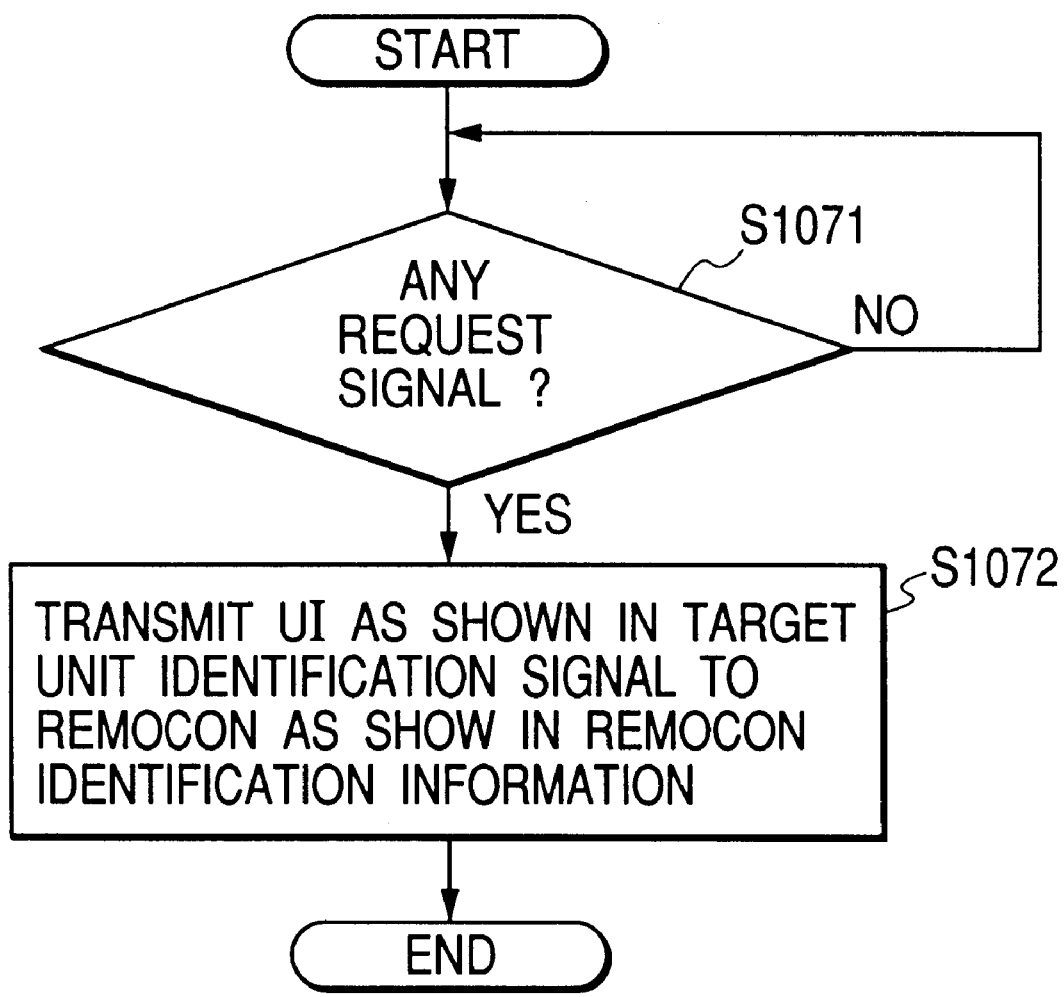
FIG. 107 is a flowchart showing the processing performed by a server for the example wherein the controller receives a UI via a wireless LAN and displays it.

FIG. 107 is a flowchart showing the processing performed by the server 1041 when the controller receives a UI via the wireless LAN, instead of directly receiving it from a target model, and displays it. The processing performed by the server 1041 will now be described.

At step S1071 the server 1041 waits until a UI transmission request signal is transmitted from the target model. At step S1072 the UI of the model, which is indicated by the target model identification data, is transmitted to the controller 960, which is indicated by identification data received from the target model.

[Thirty-seventh Embodiment]

Figure 108:
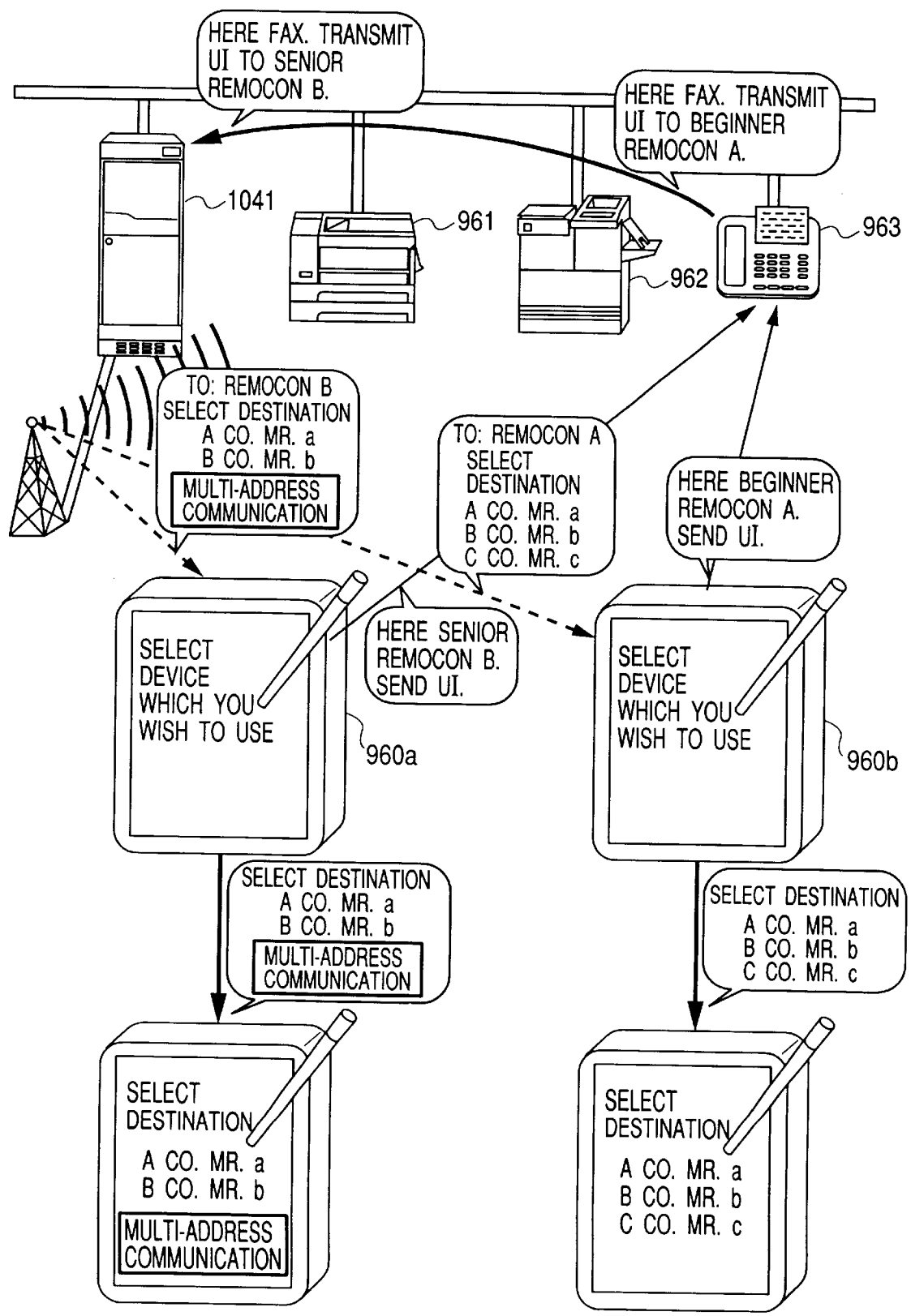
FIG. 108 is a diagram showing an example wherein via a wireless LAN a controller receives a different UI for each user and displays it.

FIG. 108 is a diagram showing an example where UIs of devices are stored in a wireless LAN server 1041 and when a controller 960a or 960b faces a facsimile machine 963 as a target model and requests a UI, a different UI for each user is transmitted, upon a request from the facsimile machine 963, from the wireless LAN server 1041 to the controller 960a or 960b, and is displayed.

The controller 960a or 960b, which does not face a target device, has a default screen, as is shown in the center in FIG. 108.

The communication between the user, the controller 960a or 960b and the target model will now be described.

(1) A user directs the controller 960a or 960b to a target model.
(2) The user touches a touch panel on the controller 960a or 960b in order to determine the timing at which the controller 960a or 960b transmits a UI request signal to the target model. Or, the controller 960a or 960b is set in advance to transmit a UI request signal at a predetermined interval.
(3) The controller 960a or 960b transmits controller identification data (controller A or controller B) to identify itself, user identification data (a senior or a beginner) for identifying the user, and a UI request signal to the target model.
(4) When the target model receives, from the controller 960a or 960b, the controller identification data, the user identification data and the UI request signal, the target model transmits, to the server 1041 that manages the target model, the received controller identification data, the user identification data and the target model identification data to identify itself.
(5) The server 1041 transmits the UI of the target model, which is indicated by the user identification data and the target model data, via a wireless LAN to the controller 960a or 960b, which is indicated by the controller identification data. In the example in FIG. 108, a UI that is used for multi-address communication, which is difficult for beginners, is transmitted only to seniors, not to beginners.
(6) The controller 960a or 960b receives the UI addressed to itself, and displays the UI.

In the above example, the controller transmits the level data for a user is transmitted as user identification data. However, the controller may transmit information, such as the names of users, to identify individual users, and the target device or the server may identify the level of a user from the received identification data. An independent UI may be prepared for each user.

The above example has been employed only for the UI. The contents of urgent mail addressed to the user or the schedule to be immediately informed are collected in, for example, the server, and they may be included in the UI while the user identification data that differs among the users is referred to, and the resultant data can be transmitted to the controller.

Figure 109:
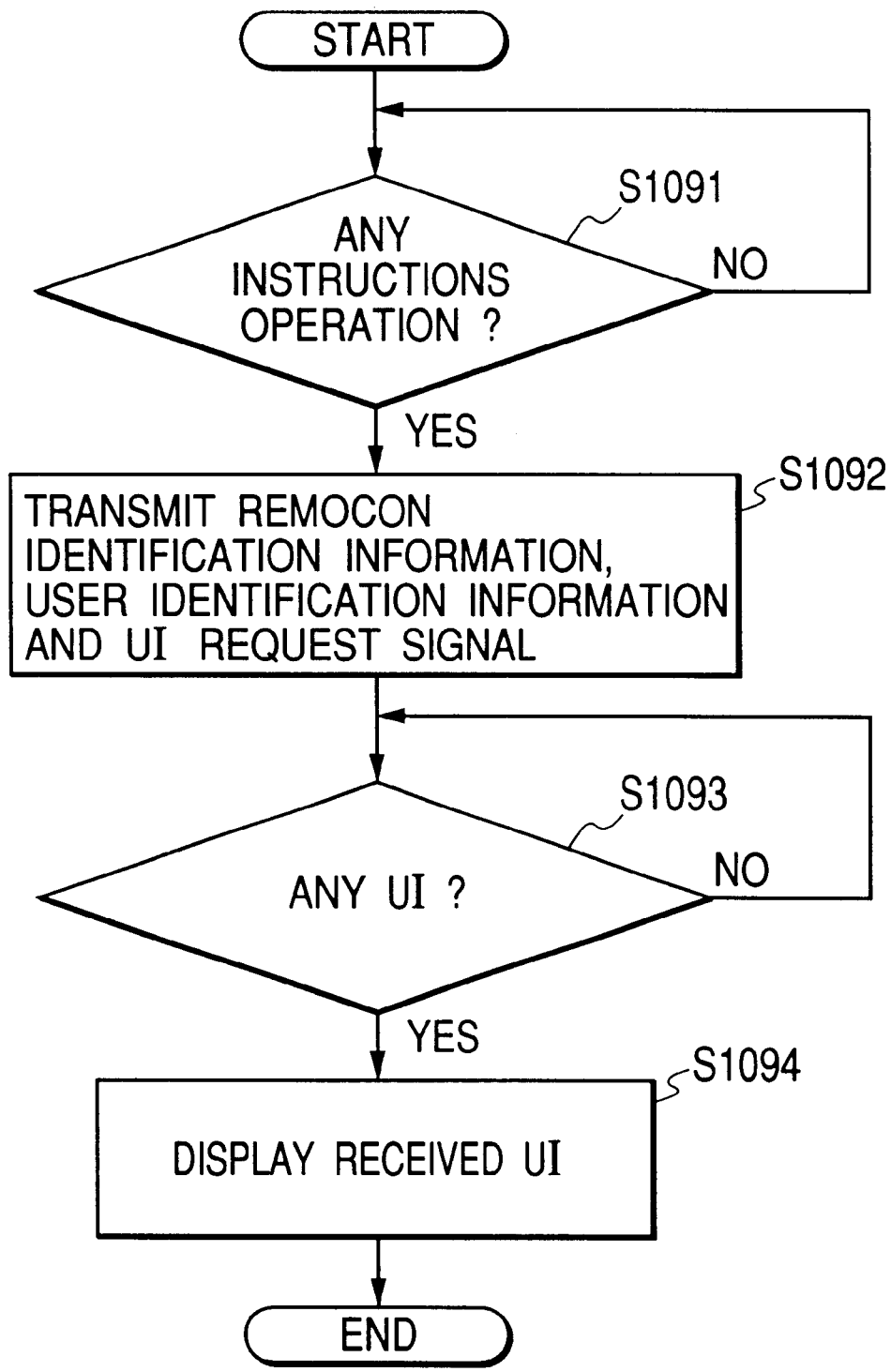
FIG. 109 is a flowchart showing the processing performed by a controller for the example wherein via a wireless LAN a controller receives a different UI for each user and displays it.

FIG. 109 is a flowchart showing the processing performed by the controller 960 when the controller receives a different UI for each user, via the wireless LAN, instead of directly receiving it from a target model, and displays it. The processing performed by the controller 960 will now be described.

At step S1091 the controller 960a or 960b waits until an instruction from a user is input. At step S1092 a UI request signal for requesting a UI, controller identification data for identifying a controller, the user identification data for identifying the user are transmitted to the target model by an infrared ray communication method. At step S1093 the controller 960a or 960b waits until a UI signal is output by any device. At step S1094, the received UI is displayed.

Figure 110:
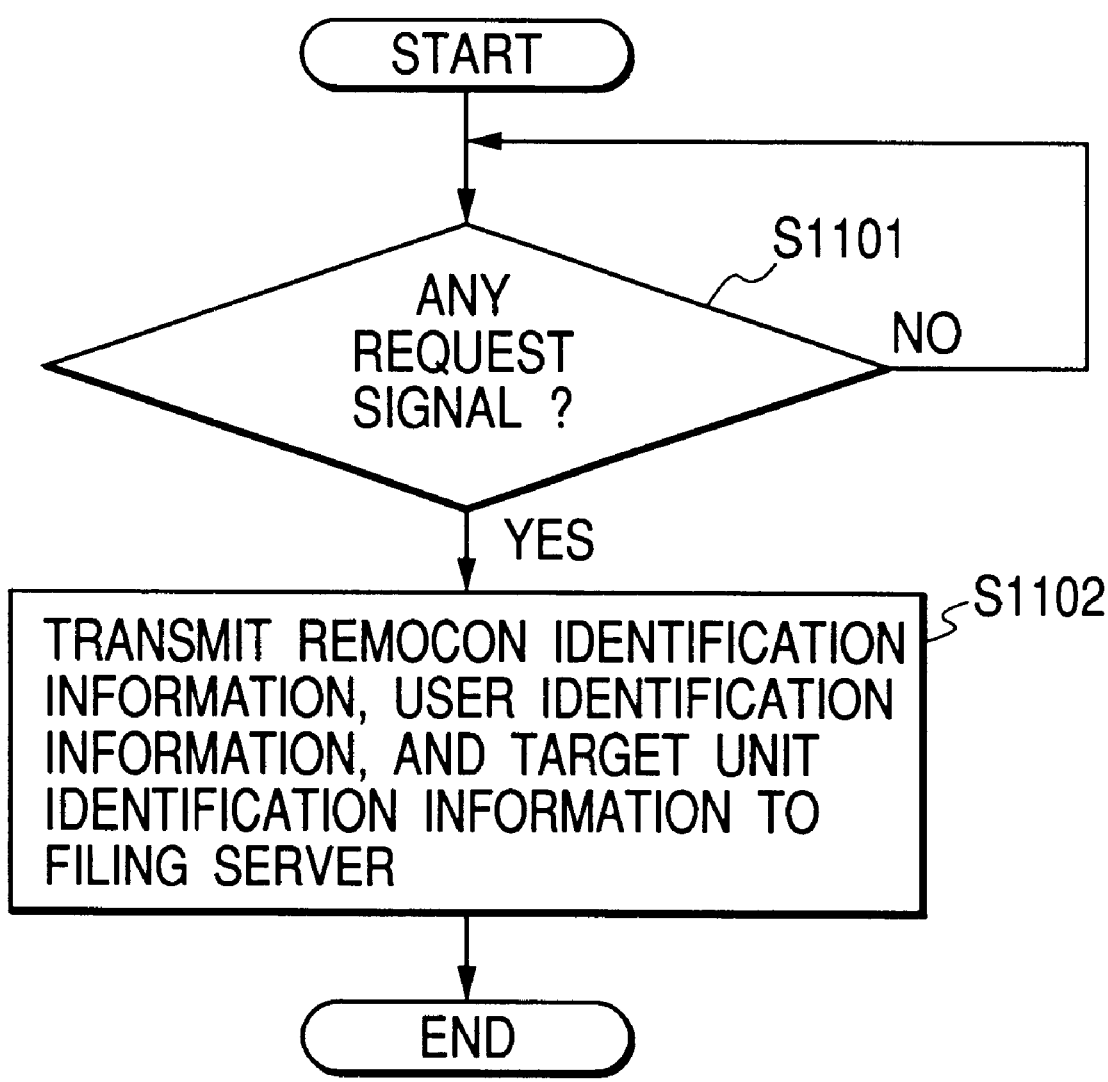
FIG. 110 is a flowchart showing the processing performed by a target model for the example wherein via a wireless LAN a controller receives a different UI for each user and displays it.

FIG. 110 is a flowchart showing the processing performed by the target model when the controller receives a different UI for each user, via the wireless LAN, instead of directly receiving it from a target model, and displays it. The processing performed by the controller 960a or 960b will now be described.

At step S1101 the controller 960a or 960b waits until an instruction from a user is input. At step S1102 the controller identification data received from the controller 960, the user identification data, and the target model identification data are transmitted to the server 1041, and the issuance of the UI is requested.

Figures 111, 112:
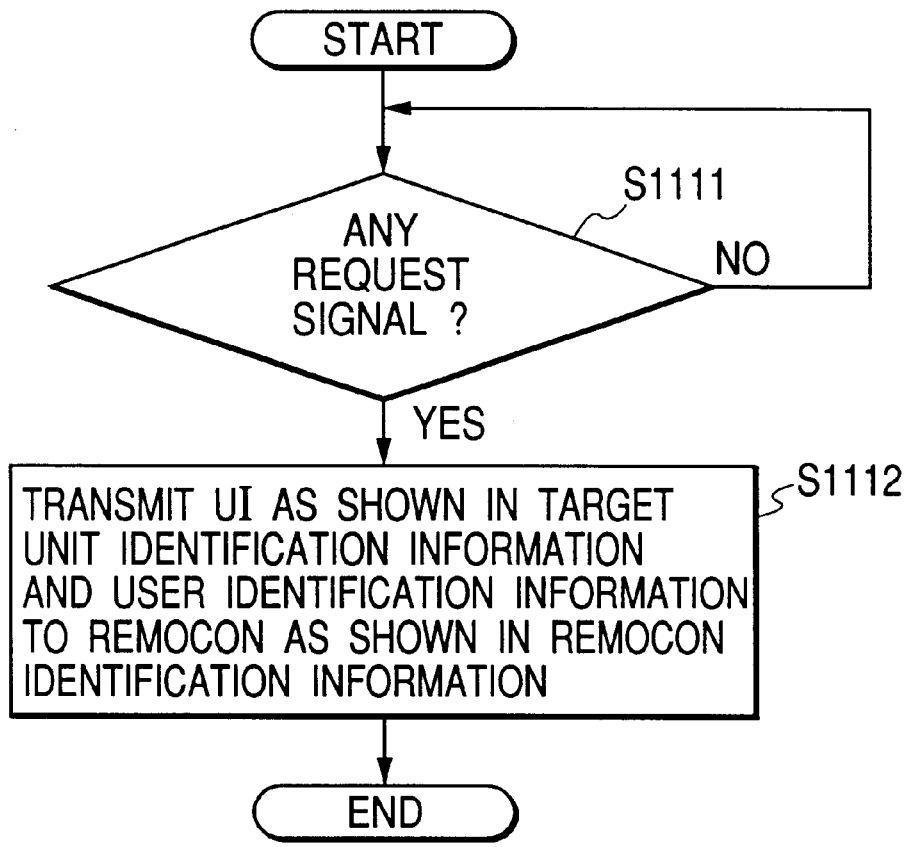
FIG. 111 is a flowchart showing the processing performed by a server for the example wherein via a wireless LAN a controller receives a different UI for each user and displays it.
FIG. 112 is a table showing a UI determined in consonance with a target model and user identification information.

FIG. 111 is a flowchart showing the processing performed by the server 1041 when the controller receives a different UI for each user via the wireless LAN, instead of directly receiving it from a target model, and displays it. FIG. 112 is a table showing UIs that are determined by the target model and user identification data. The processing performed by the server 1041 will now be described.

At step S1111 the server 1041 waits until a UI transmission request signal is transmitted from the target model. At step S1112 in accordance with the definitions in FIG. 112, the UI that corresponds to the target model identification data and the user identification data is transmitted to the controller 960a or 960b, which is indicated by identification data received from the target model.

[Thirty-eighth Embodiment]

Figure 113:
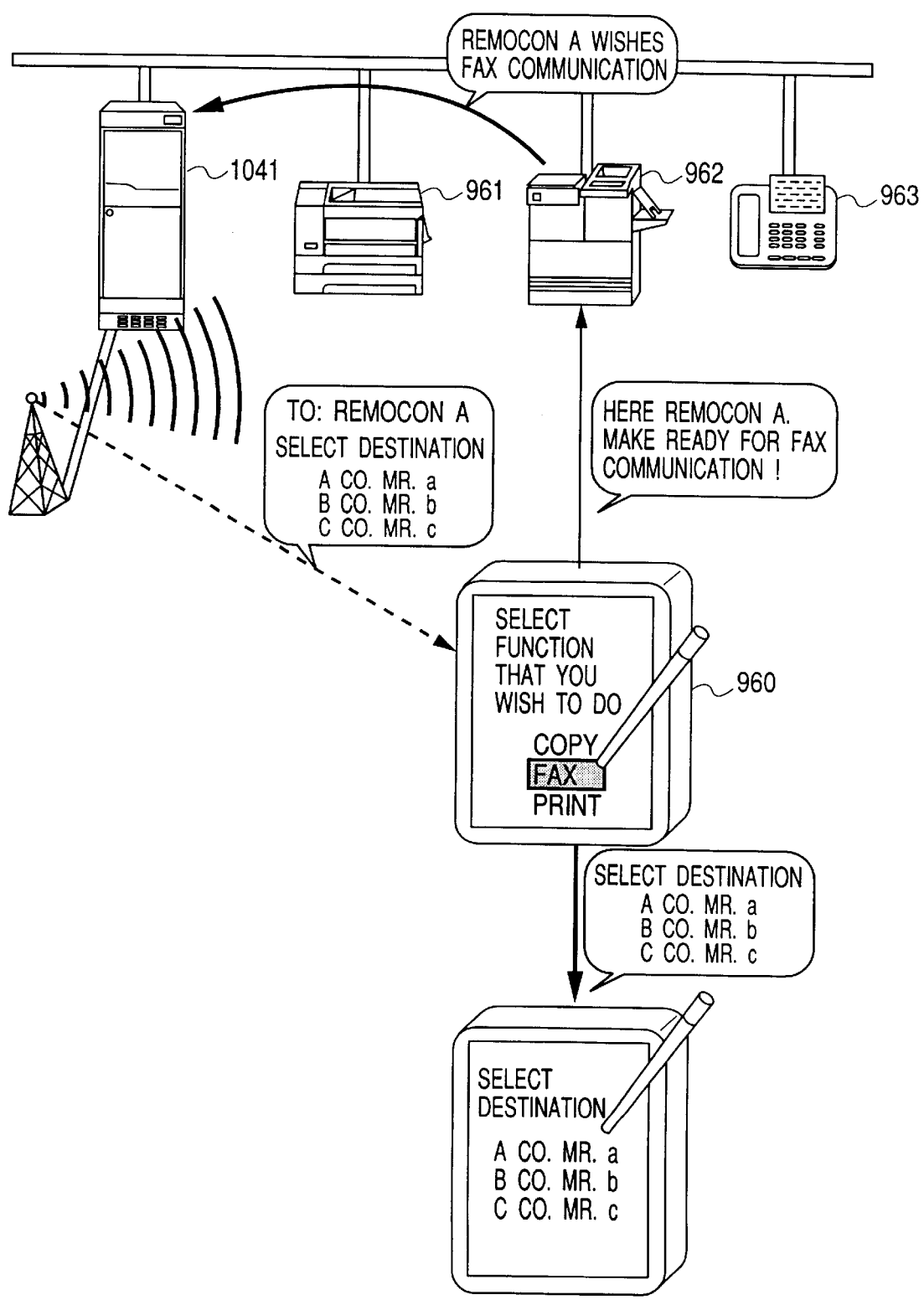
FIG. 113 is a diagram illustrating an example wherein a model in front that is to be operated performs a function that the model does not have.
Figure 114:
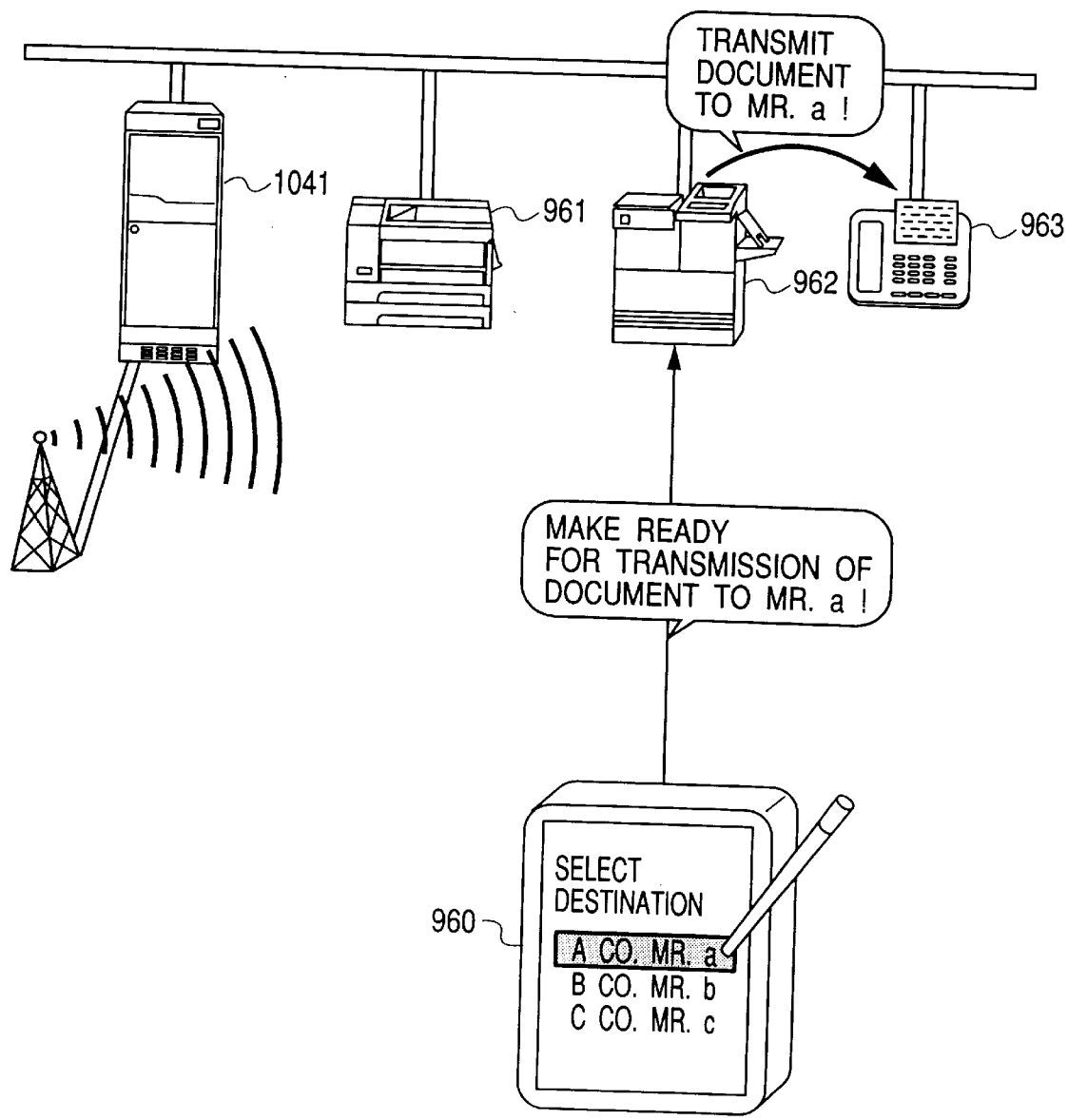
FIG. 114 is a diagram illustrating an example wherein a model in front that is to be operated performs a function that the model does not have.

FIGS. 113 and 114 are diagrams illustrating an example where provided is a function that a model to be operated in front does not have. The communication between a user, a controller and a target model will now be described.

(1) A user faces a controller 960 to a target model, and designated a desired function.
(2) The target model receives a request from the controller 960 and transmits it to a server 1041.
(3) The server 1041 transmits a UI of a model that corresponds to the requested function.
(4) The controller 960 displays a received UI.
(5) The user performs operation according to an instruction of the UI. In this example, the user sets a document to be transmitted to a copier 962 in front, and the controller 960 instructs the destination to execute the operation.
(6) The target model handles what it can do and requests another apparatus to process what it can not do. In this case, since the copier 962 reads a document but can not facsimile the document, it transmits to a facsimile machine 963 the document data and the contents of the operation instruction.
(7) The facsimile machine 963 transmits by fax the received document data to the instructed destination.

In the above example, to determine an apparatus that the copier 962 asks for the function that the copier 962 can not perform, each apparatus may have knowledge for other apparatuses. Or, the apparatuses on the network may be queried if they can execute the function, and according to the result, the apparatus to be asked for may be determined. Or, an inquiry may be issued to the server 1041 that has knowledge of the models that correspond to functions.

[Thirty-ninth Embodiment]

Figure 115:
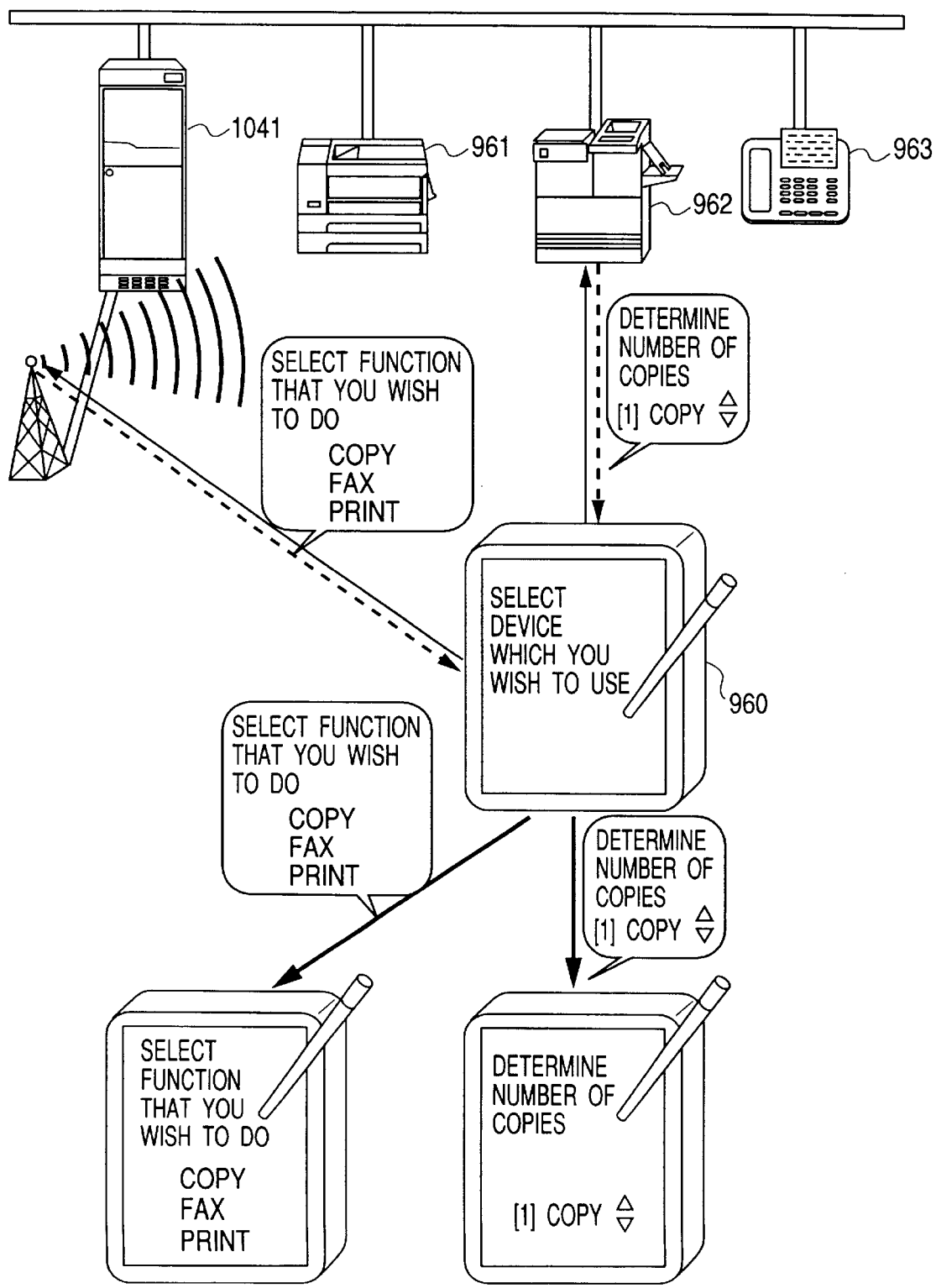
FIG. 115 is a diagram showing an example performed when communication can not be performed directly with a model in front that is to be operated.

FIG. 115 is a diagram illustrating an example where, when a controller can not directly communicate with a target model in front because an obstacle is present in route between the target model and the controller, indirect communication is attempted using another route.

The communication between the user, the controller and the target model will now be described. It should be noted that (2) and (3) are not necessarily required. When, for example, in (4) a target model generates a signal to the controller at predetermined intervals, the same effect can be obtained. In other words, only the essential portion is shown in FIG. 115.

(1) A user directs the controller 960 to a target model.
(2) The user touches a touch panel on the controller 960 in order to determine the timing at which the controller 960 transmits a UI request signal to the target model. Or, the controller 960 is set in advance to transmit a UI request signal at a predetermined interval.
(3) The controller 960 transmits a UI request signal to the target model.
(4) A UI signal is transmitted upon the receipt of the UI request signal from the controller 960, or according to the setup that a UI request signal at a specified interval.
(5) The controller 960 that receives the UI signal displays the UI.
(6) If a UI is not transmitted following a predetermined period of time after the UI request signal was transmitted, or if a UI is not transmitted during a period longer than a predetermined interval, which is set for transmission of UIs, another route is employed to transmit a UI request signal. In this example, when infrared communication can not be performed, communication through a wireless LAN is attempted.
(7) The UI acquired across the LAN is displayed.

Figure 116:
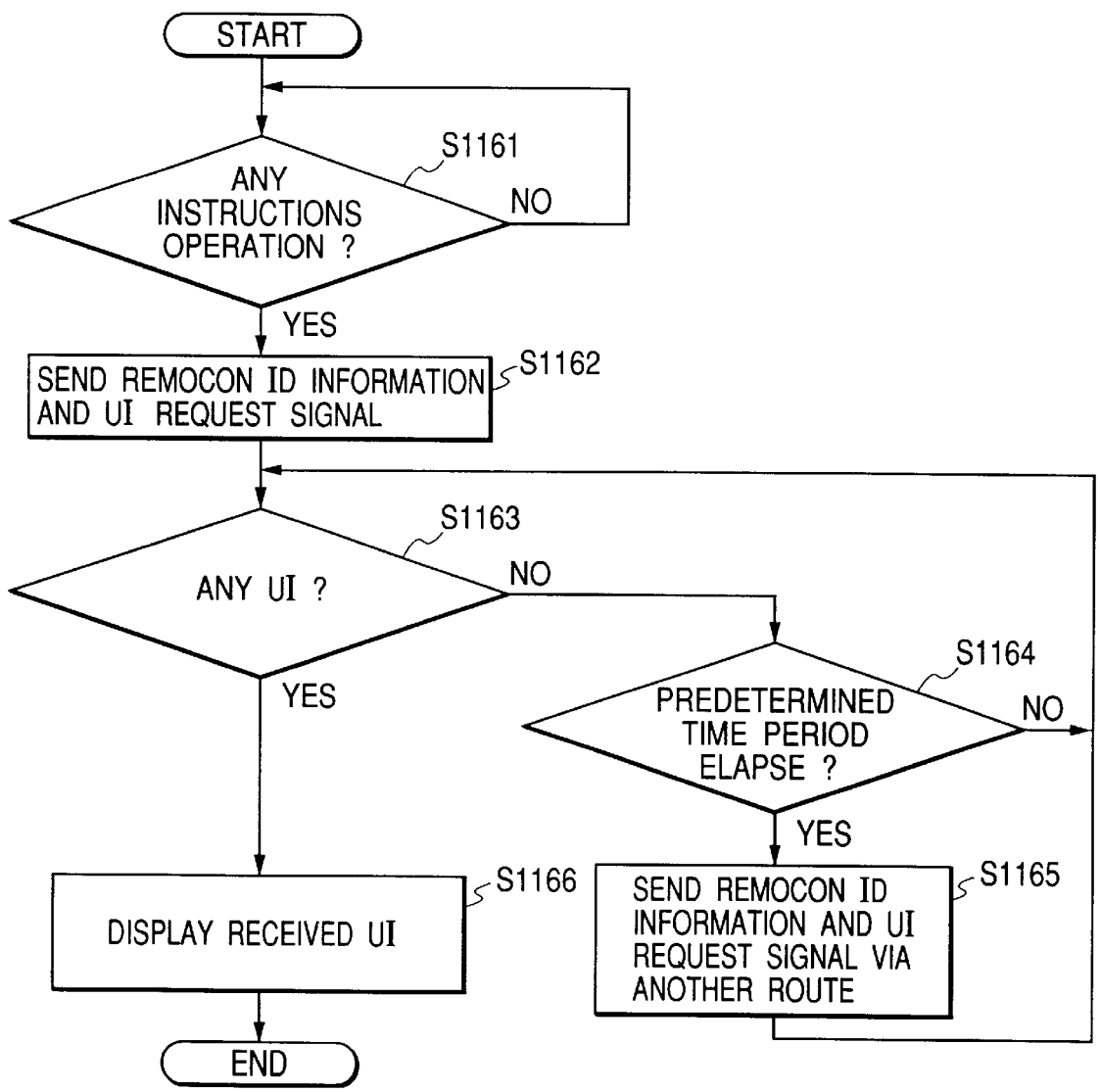
FIG. 116 is a flowchart showing the processing performed by a controller according to a thirty-ninth embodiment.

FIG. 116 is a flowchart showing the processing performed by a controller for an example where, when the controller can not directly communicate with a target model in front because an obstacle is present in route between the target model and the controller, indirect communication is attempted using another route. The processing performed by the controller 960 will now be described.

At step S1161 the controller 960 waits until an instruction from a user is input. At step S1162 a UI request signal for requesting a UI and controller identification data for identifying a controller are transmitted to the target model by an infrared ray communication method. At step S1163 a check is performed to determine whether or not the UI has been received. At step S1164 a check is performed to determine whether a predetermined period of time has elapsed following the transmission of the request. At step S1165 a UI request signal, for requesting a UI, and controller identification data, for identifying a controller, are transmitted by a route, such as across a wireless LAN, that is different from the route at step S1162. At step S1166 the received UI is displayed.

In this case, the UI request signal that is directly transmitted to the target model is to be sent to the wireless LAN server 1041. However, since the wireless LAN server 1041 that receives the UI request signal is not sure of a target model, first a menu for selecting a model (function) is displayed. A UI corresponding to the selected model is displayed. Upon receipt of the model selection signal from the controller 960, the wireless LAN server 1041 may transmit to the controller 960 a UI that corresponds to the model, or may transmit the menu and a plurality of UIs available from the menu.

[Fortieth Embodiment]

Figure 117:
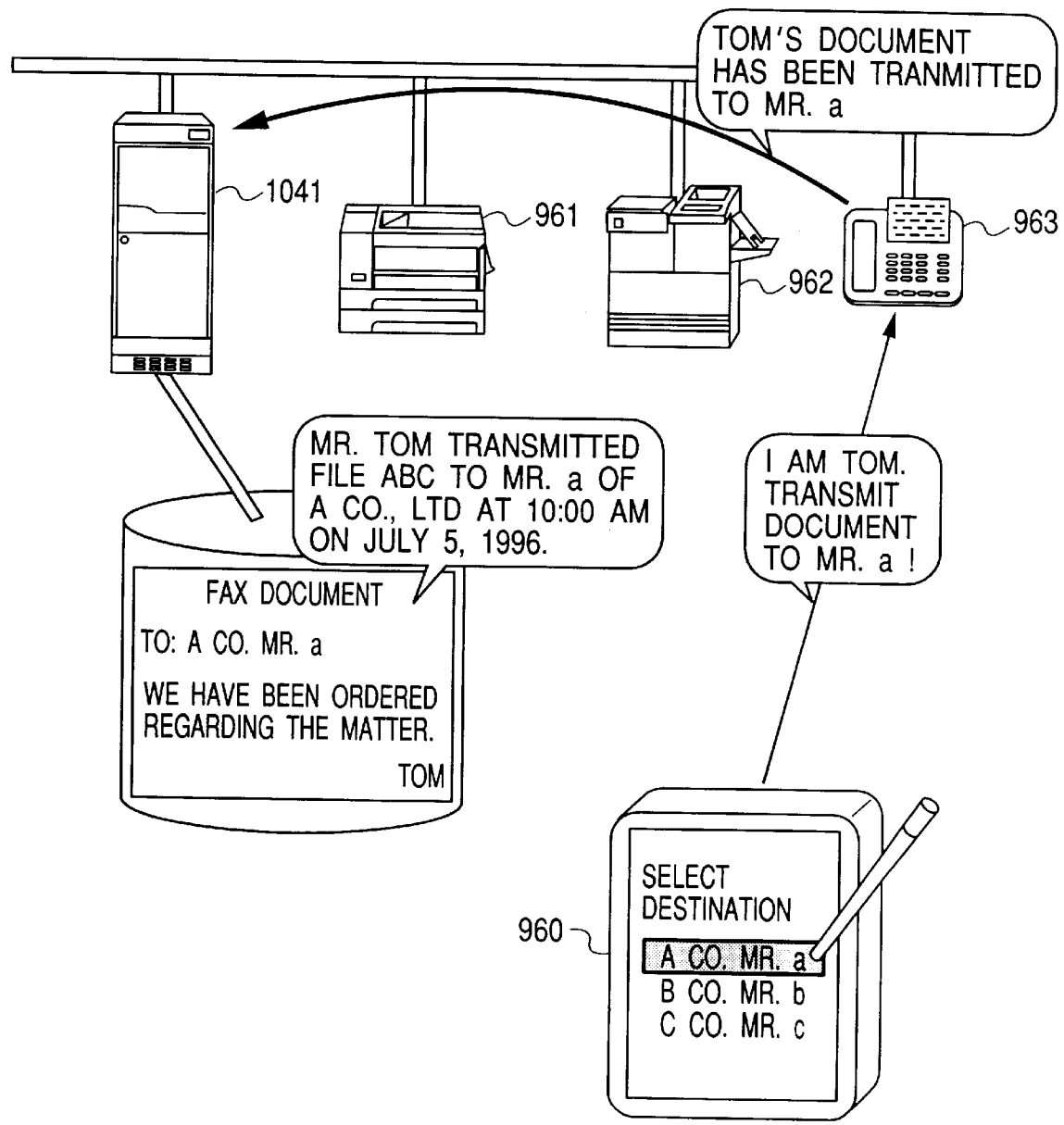
FIG. 117 is a diagram showing an example wherein an operation/action by a user and a time are jointly stored as history along with important associated information.

FIG. 117 is a diagram showing an example where an operation and an action performed by a user, the time and associated important information are stored as history.

An explanation will be given for the processing for storing, as history, the operation/action performed by the user, the time and the associated important information.

(1) A user sets a document in a facsimile machine 963, and instructs the transmission of the document and the user's name (sender's name) to Mr. a of A company.
(2) According to the instruction, the facsimile machine 963 transmits the document to Mr. a. Also according to the instruction from Tom, the facsimile machine 963 notifies the server 1041 of the fact that the document has been transmitted to Mr. a together with the transmitted document and the transmission time.

(3) The server 1041 saves the received document as a file "File ABC" and stores the fact of the receipt as history information.

Figure 118:
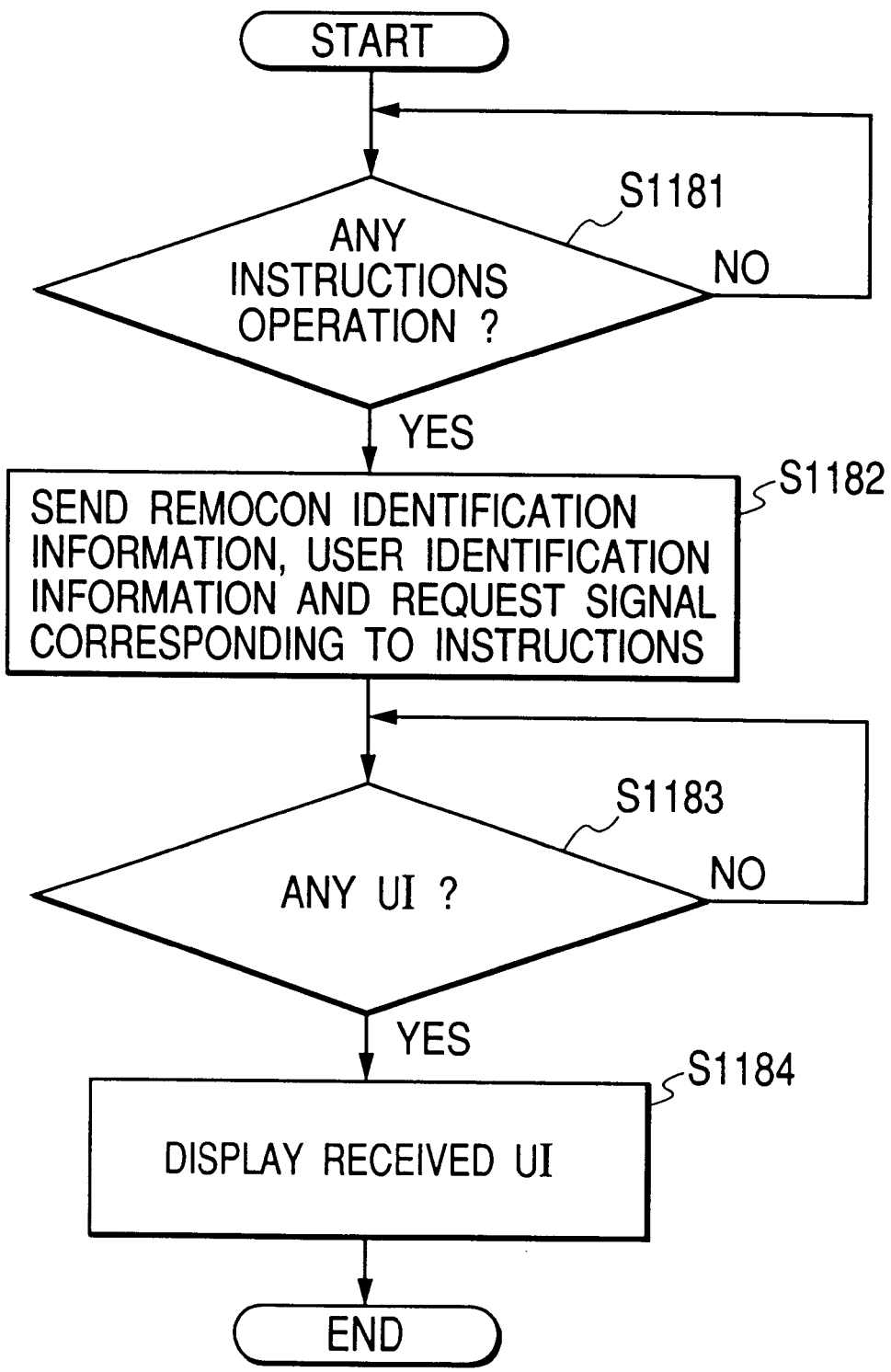
FIG. 118 is a flowchart for the processing performed by a controller according to a fortieth embodiment.

FIG. 118 is a flowchart showing the processing performed by the controller for an example where an operation and an action performed by a user, the time and the associated important information are stored as history data. The processing performed by the controller will now be described.

At step S1181 the controller 960 waits until an instruction from a user is input. At step S1182 a request signal, for the instruction of the user, controller identification data, for identifying a controller, and the user identification data, for identifying the user, are transmitted by an infrared ray communication method. At step S1183 the controller 960 waits until a UI signal is output by any device. At step S1184, the received UI is displayed.

Figure 119:
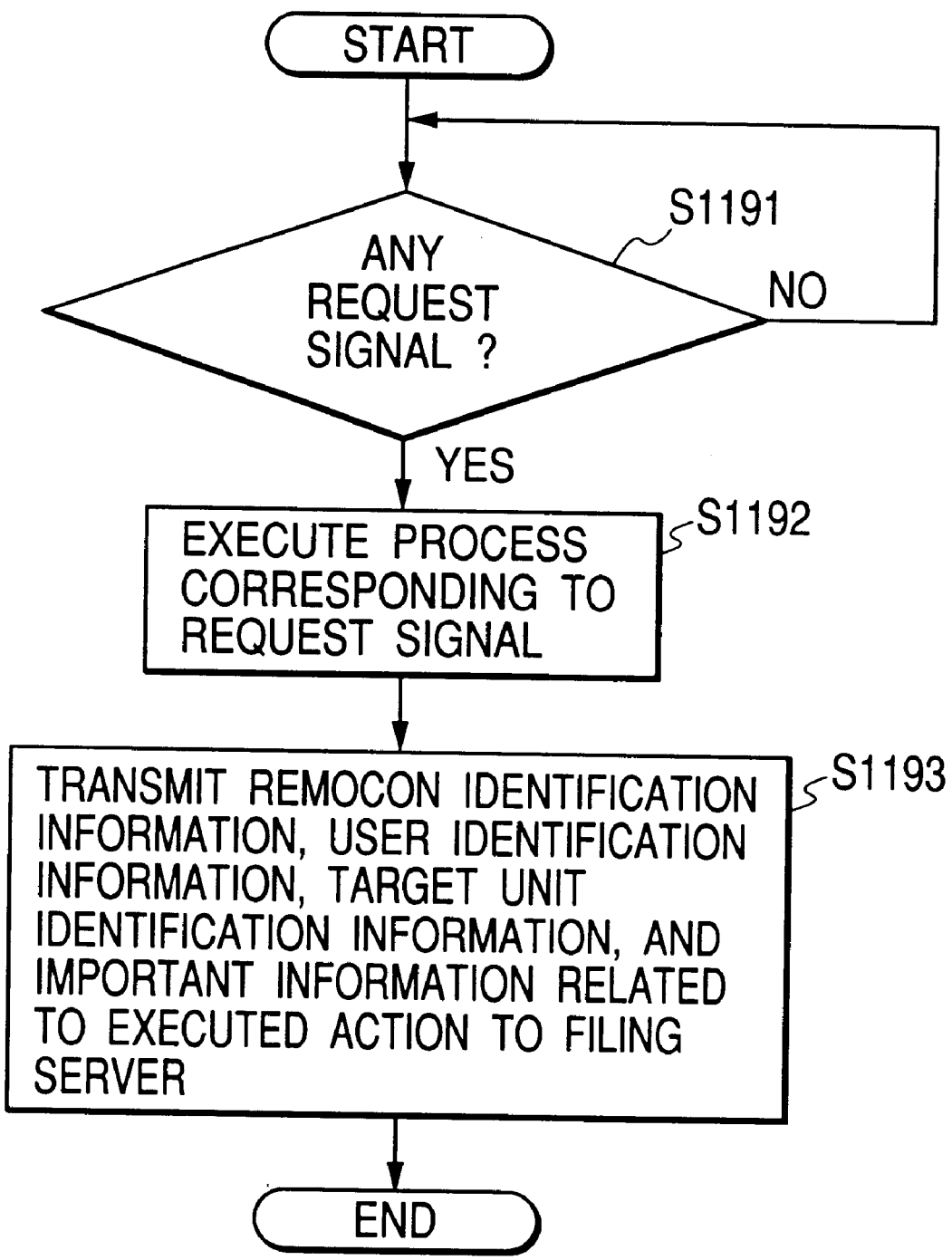
FIG. 119 is a flowchart for the processing performed by a target model according to the fortieth embodiment.

FIG. 119 is a flowchart showing the processing performed by the target model for an example where an operation and an action performed by a user, the time and the associated important information are stored as history data. The processing performed by the target model will now be described.

At step S1191 the target model waits until a request signal is transmitted by the controller 960. At step S1192 a process corresponding to the request signal from the controller 960 is performed. In the example shown in FIG. 117 a document set by the user is read and transmitted to Mr. a of A company. At step S1193 controller identification data received from the controller 960, the user identification data, and target model identification data, and important data associated with the action that was performed, are transmitted to the server 1401. In the example in FIG. 117, according to the instruction from Tom, the fact that the document was transmitted to Mr. a is sent to the server 1041, together with the transmission time and the transmitted document that is the important information associated with the fact.

Figure 120:
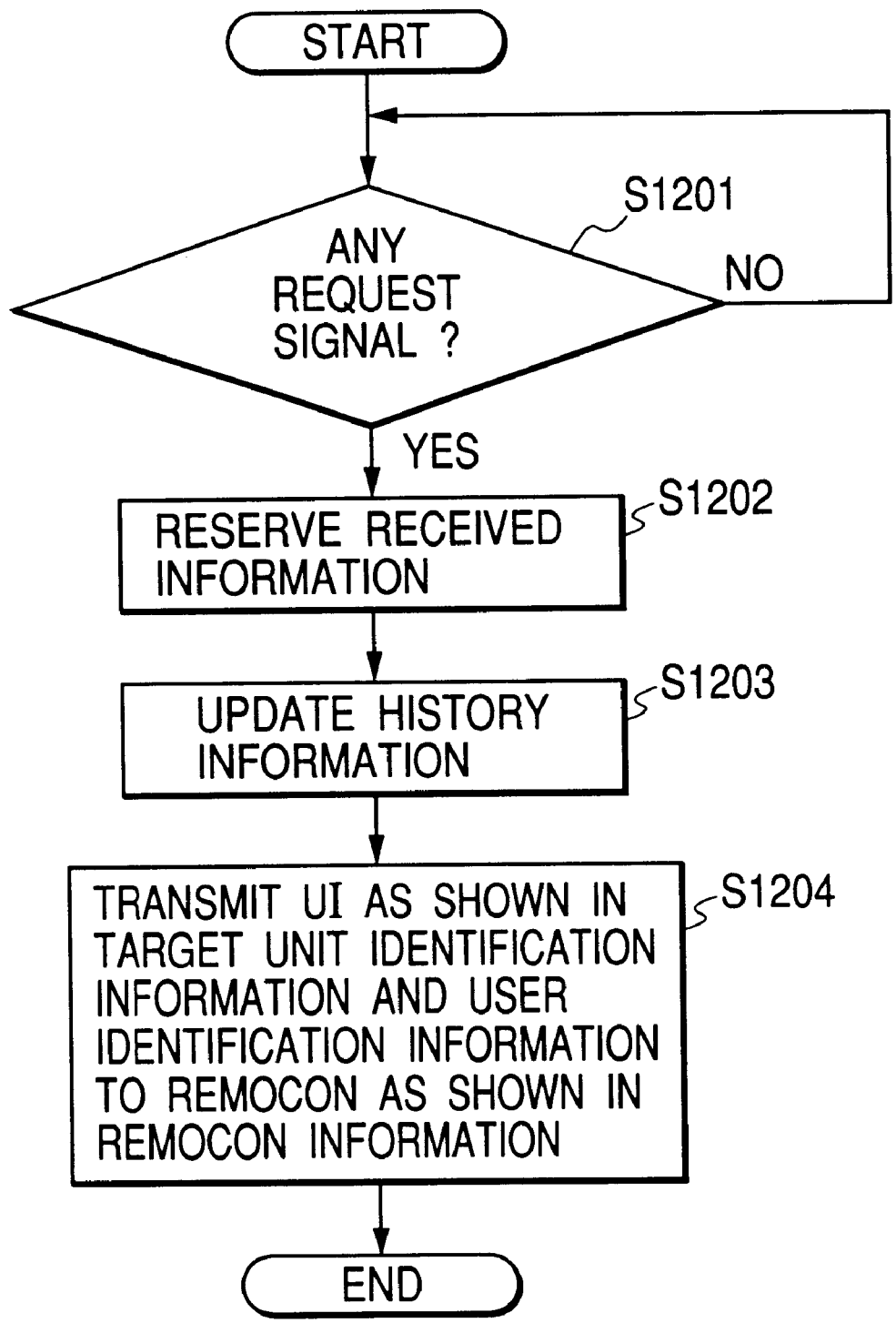

FIG. 120 is a flowchart showing the processing performed by the server for an example where an operation and an action performed by a user, the time and the associated important information are stored as history data. FIG. 121 is a diagram showing example history information that is updated as the result of processing. The processing performed by the server will now be described.

At step S1201 the server waits until it receives a request signal from the target model. At step S1202 the important information associated with the received fact is stored. In the example in FIG. 117 the document the transmission of which is instructed by Tom is saved as File ABC.

At step S1203 the history data are updated in consonance with the received fact. In the example shown in FIG. 117 the fact that Tom transmitted a document to M. a of A company at 10:00 on Jul. 5, 1996 is recorded together with the file name stored at step S1201. FIG. 121 is a table showing updated history data; the fact that Mary printed ten copies of File XYZ on Jul. 3, 1996, and the fact that Tom transmitted File ABC to Mr. a of A company at 10:00 on Jul. 5, 1996. At step S1204 a UI that indicates the normal termination of the processing is transmitted to the controller that is defined by the controller identification data received from the target model.

[Forty-first Embodiment]

Figure 122:
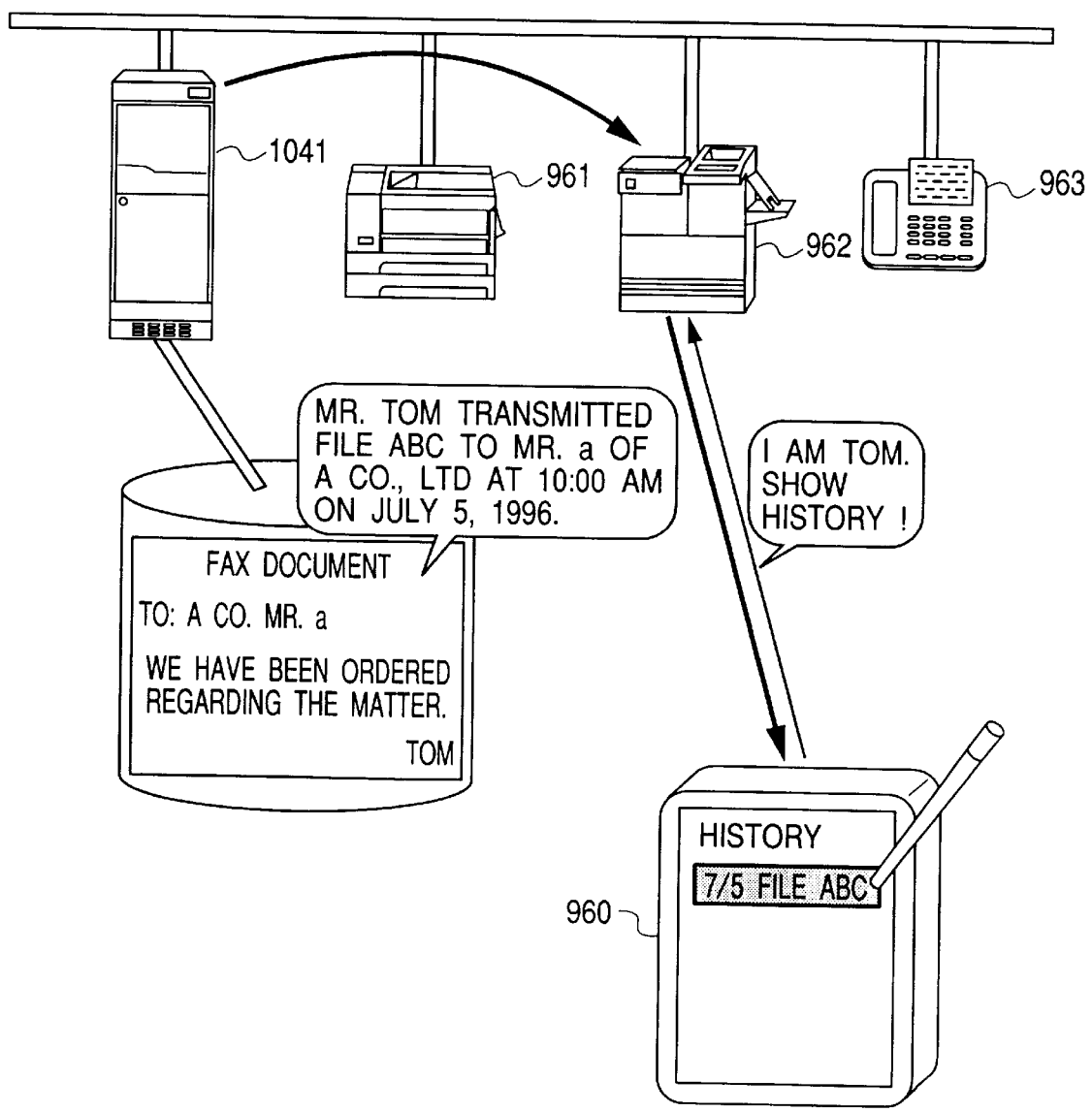
Figure 123:
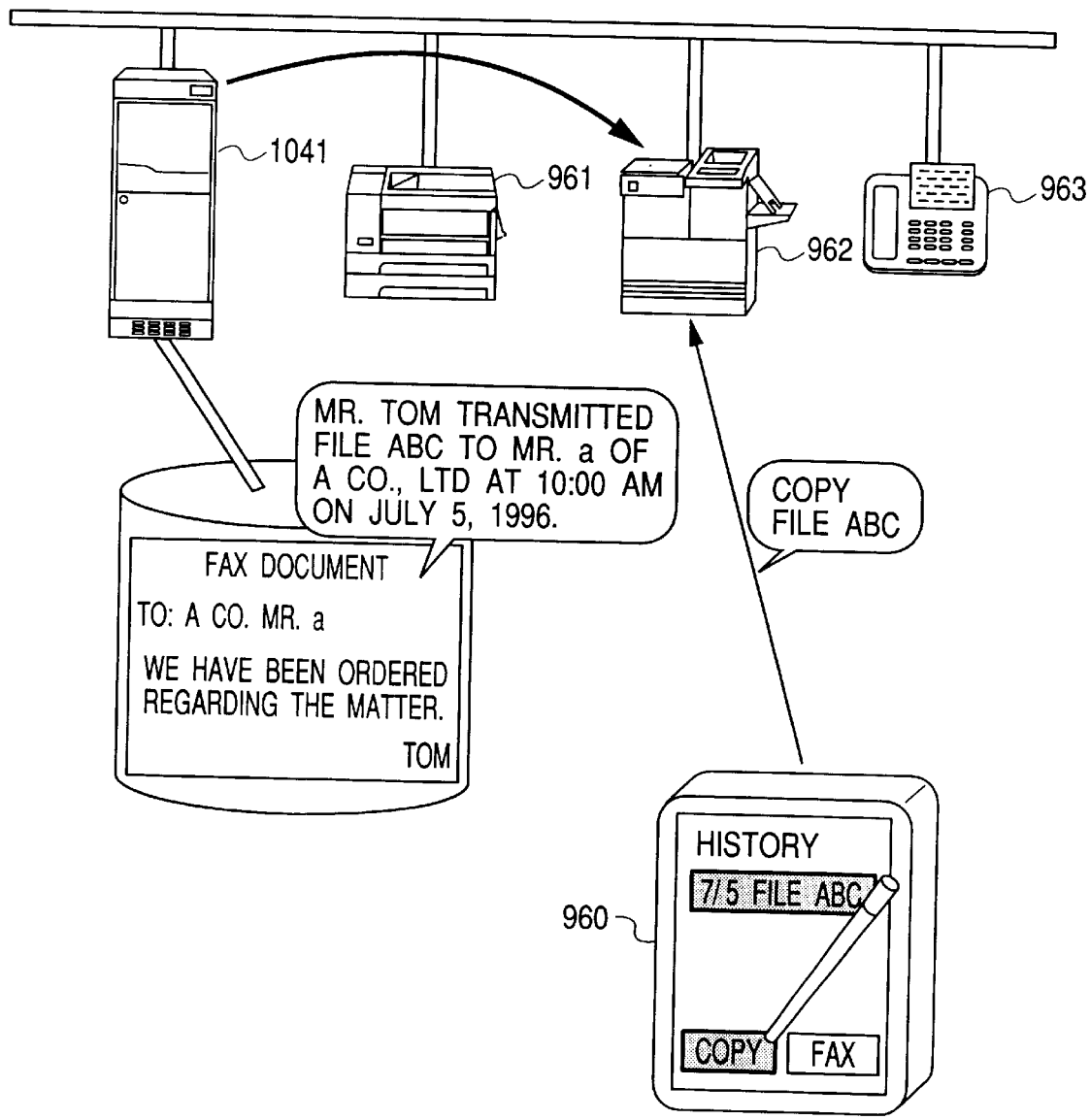

FIGS. 122 and 123 are diagrams showing an example where an operation/action performed by a user, the time and associated important information are stored as history data and based on the history data an operation is performed.

An explanation will be described the processing for the example where an operation/action performed by a user, the time and associated important information are stored as history data and based on the history data an operation is performed.

(1) A controller 960 instructs a copier 962 to show the history of Tom.

(2) Upon receipt of the instruction, the copier 962 asks a server 1401 for managing the history to show the history of Tom.

(3) The server 1041 refers to the history data and transmits, as a UI, only the history associated with the Tom to the copier 962. The copier 962 transmits the received history data to the controller 960.

(4) Tom selects a specific fact from the history data displayed on the controller 960, and instructs an action. In this case, since Tom needs a material that was previously sent to A company, the fact "File ABC was sent to Mr. a of A company" is selected and action "copy" is instructed to acquire the material from the copier 962 in front.

(5) The copier 962 transmits to the server 1041 the instruction "copy File ABC" from the user.

(6) The server 1041 sends a corresponding document "File ABC" to the copier 962.

(7) The copier 962 prints a document received by the server 1041.

In the above example, the fact "File ABC was sent to Mr. a of A company" is selected from the history in order to acquire necessary material from the copier 962 in front. When the name of document "File ABC" to be output is obtained, the list of files can be displayed instead of the history data and the file name can be selected, or the file name can be input directly.

In addition, in the above example, the document to be extracted is the one that is transmitted by the facsimile machine 963 and stored in the server 1041. A document stored in a PC across the network can also be employed.

Figure 124:
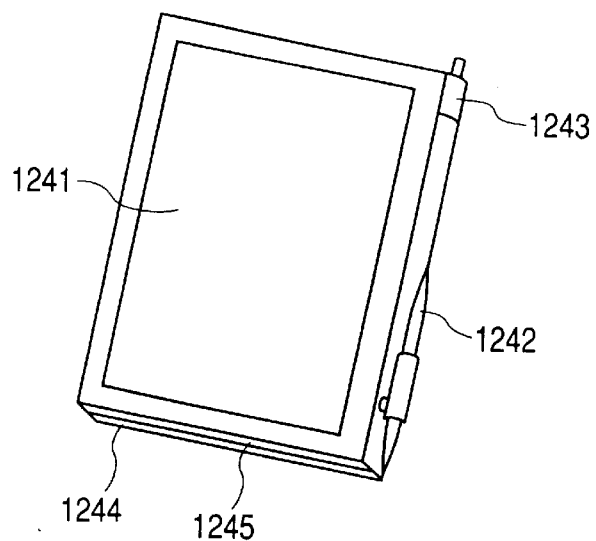

FIG. 124 is a diagram showing the structure of the controller 960 used in this embodiment.

A display 1241 is used to display data on a liquid crystal screen. A resistance film is attached to the display 1241, and data can be input with a pen 1242. A button on a screen may be selected by the pen 1242. Furthermore, a character recognition function is provided, and the characters written with the pen 1242 can be input. Instead of this function, a voice input/recognition function may be employed to input information.

The input information can be transmitted from a communication unit 1243 to another apparatus. A CPU 1244 for controlling and a storage unit 1245 are provided inside the apparatus, and input information and information received by the communication unit 1243 and the history of the operations are stored. The storage unit 1245 can be a SRAM card, an SIMM or an HDD. The controller 960 is battery operated and water resistant.

Figure 125:
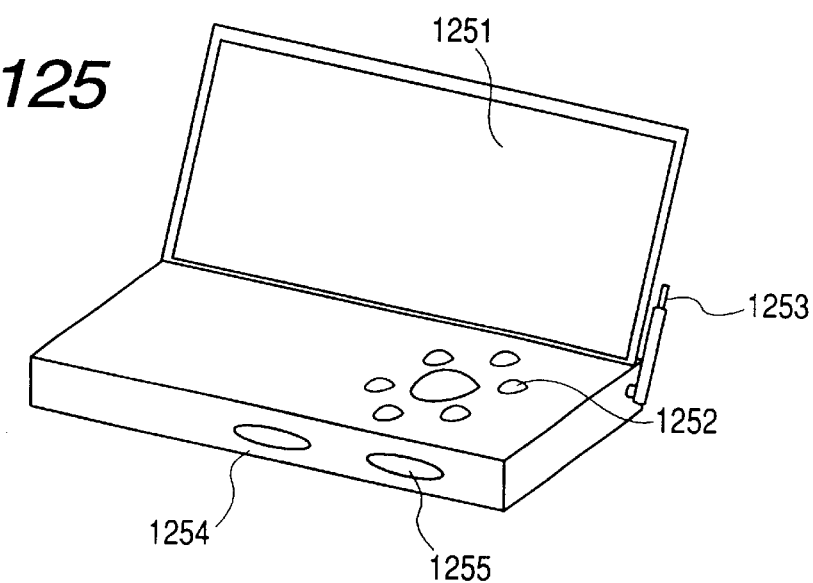

FIG. 125 is a diagram illustrating another example structure of the controller 960 used in the embodiment.

A display 1251 is used to display data using liquid crystal or a CRT. A touch panel can be additionally provided as an option to the display 1251. Thus, information can be input by a finger or a pen. An input unit 1252 is used to input information by manipulation of a button. The input data can be transmitted from a communication unit 1253 to another apparatus. A CPU 1254 for controlling and a storage unit 1255 are provided inside the apparatus, and input information and information received by the communication unit 1253 and the history of the operations are stored. The storage unit 1255 can be a SRAM card, an SIMM or an HDD.

The controller in FIG. 125 can be used as a button controller with the storage unit 1255 being removed. The controller can be used as a personal digital assistant (PC) with the communication unit 1253 being removed. In addition, the controller can be used as is shown in FIG. 124, with the input unit 1252 being removed and with the touch panel provided.

Figure 126:
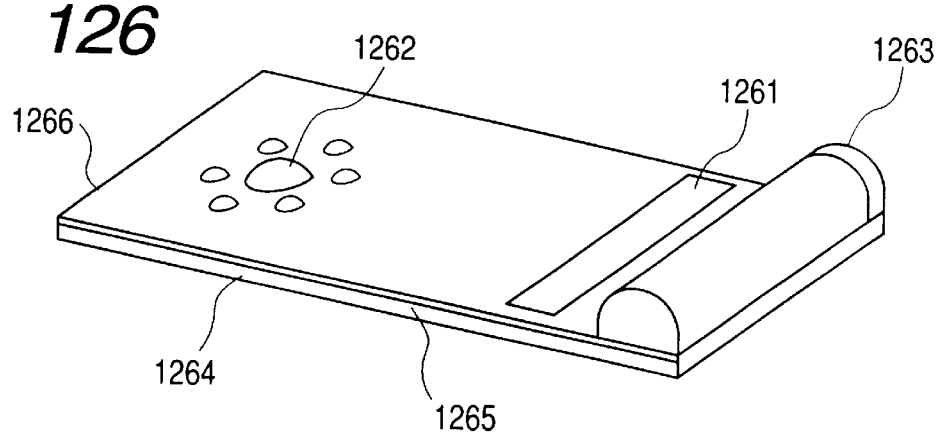

FIG. 126 is a diagram showing an additional example structure of the controller 960 used in this embodiment.

A display 1261 is used to display data using liquid crystal. An input unit 1262 is used to input information by manipulating a button. The input data can be transmitted by an infrared communication unit 1263 to another apparatus. A CPU 1264 for controlling and a storage unit 1265 are provided inside the apparatus, and input information and information received by the infrared communication unit 1263 and the history of the operations are stored. The storage unit 1265 can be a SRAM card, an SIMM or an HDD. Furthermore, a PCMCIA slot 1266 is provided, and, for example, a PCMCIA card is loaded into the slot 1266 to enable the connection by a PCMCIA bus, so that two communication channels can be employed. The infrared communication unit 1263 may be used only for transmission by light emission, and the PCMCIA bus may be used for reception. Of course, the connection by the PCMCIA bus may not be employed.

What is claimed is:

1. An information processing apparatus comprising:
    an input unit for inputting a document;
    a character recognition unit for recognizing a specific block of the document input by said input unit;
    a first character recognition controller for controlling said character recognition unit to recognize a character in a specific block of the document;
    a first identifier for identifying a form of the document based on a recognition result of the specific block in the document;
    a second character recognition controller for controlling said character recognition unit to recognize a character in the document as a whole when said first identifier cannot identify the form of the document;
    a second identifier for identifying a form of the document based on a recognition result of the document as a whole;
    an interpreter for interpreting a word formed of characters recognized by said character recognition unit by referring to a knowledge base corresponding to the form of the document identified by said first identifier or second identifier;
    a determination unit for determining a process to be performed for the document based on a result of interpretation by said interpreter; and
    an execution processor for performing the process determined by said determination unit for the document.

2. An information processing apparatus according to claim 1, further comprising:
    an inference unit for inferring a document type in advance of a recognition by said character recognition unit,
    wherein the specific block is determined in consonance with the document type inferred by said inference unit.

3. An information processing apparatus according to claim 2, wherein said inference unit reads a document at a higher speed and with a lower resolution than when reading the specific block, and infers the document type.

4. An information processing apparatus according to claim 2, wherein said first identifier identifies the form of the document when a document type obtained based on the recognition result of the specific block matches the document type inferred by said inference unit.

5. An information processing apparatus according to claim 1, wherein said determination unit determines whether the process to be performed for the document is a filling process or a transmission process.

6. An information processing apparatus according to claim 1, wherein, when said determination unit determines that the process to be performed for the document is a filing process, said execution processor files the document input by said input unit.

7. An information processing apparatus according to claim 6, wherein, in accordance with the result of interpretation obtained by said interpreter, said execution processor sorts and files the document input by said input unit.

8. An information processing apparatus according to claim 6, wherein said determination unit determines a filing destination in consonance with the result of interpretation.

9. An information processing apparatus according to claim 1, wherein, when said determination unit determines that the process to be performed for the document is a transmission process, said execution processor transmits the document input by said input unit.

10. An information processing apparatus according to claim 9, wherein said determination unit determines a transmission destination in consonance with the result of interpretation.

11. An information processing apparatus according to claim 9, wherein said determination unit identifies a medium at a transmission destination in accordance with the result of interpretation, and, as needed, performs a medium conversion.

12. An information processing apparatus according to claim 1, wherein said determination unit determines the process to be performed based on a date included in the document and on a current date.

13. An information processing apparatus according to claim 1, wherein said first identifier or said second identifier identifies the form of the document in accordance with a command described in the document.

14. An information processing apparatus according to claim 1, further comprising:
    a history memory for storing a history of operations performed by said execution processor.

15. An information processing, apparatus according to claim 14, wherein, when transmission of the document is not recorded in the history of operations, said determination unit determines that the process to be performed is the transmission process.

16. An information processing apparatus according to claim 1, further comprising:
    an extractor for extracting predetermined attribute information from results from said character recognition unit; and
    a register for registering in a database the extracted predetermined attribute information.

17. An information processing apparatus according to claim 1, further comprising a receiver for receiving a response from a user.

18. An information processing apparatus according to claim 1, further comprising a query unit for issuing a query to a user.

19. An information processing apparatus according to claim 1, wherein media information from various types of media is input to said input unit, and necessary information is extracted from the media information by performing processes corresponding to the media.

20. An information processing method comprising:
an input step, of inputting a document;
a first character recognition step, of recognizing a character in a specific block of the document input in said input step;
a first identification step, of identifying a form of the document based on a recognition result of the specific block in the document recognized in said first character recognition step;
a second character recognition step, of recognizing a character in the document as a whole when the form of the document cannot be identified in said first identification step;
a second identification step, of identifying a form of the document based on a recognition result of the document as a whole recognized in said second character recognition step;
an interpretation step, of interpreting a word formed of characters recognized in said first or second character recognition step by referring to a knowledge base corresponding to the form of the document identified in said first or second identification step;
a determination step, of determining a process to be performed for the document based on a result of interpretation in said interpretation step; and
an execution step, of performing the process determined in said determination step for the document.

21. An information processing method according to claim 20, further comprising:
an inference step, of inferring a document type in advance of a recognition in said character recognition step,
wherein the specific block is determined in consonance with the document type inferred in said inference step.

22. An information processing method according to claim 21, wherein, in said inference step, a document is read at a higher speed and with a lower resolution than when reading the specific block, and the document type is inferred.

23. An information processing method according to claim 21, wherein in said first identification step the form of the document is identified when a document type obtained based on the recognition result of the specific block matches the document type inferred in said inference step.

24. An information processing method according to claim 20, wherein in said determination step it is determined whether the process to be performed for the document is a filing process or a transmission process.

25. An information processing method according to claim 20, wherein, when it is determined in said determination step that the process to be performed for the document is a filing process, the document input in said input step is filed in said execution step.

26. An information processing method according to claim 25, wherein, in said execution step, the document input in said input step is sorted and filed in accordance the result of interpretation.

27. An information processing method according to claim 25, wherein said determination step includes determining a filing destination in consonance with the result of interpretation.

28. An information processing method according to claim 20, wherein, when it is determined in said determination step that the process to be performed for the document is a transmission process, the document input in said input step is transmitted in said execution step.

29. An information processing method according to claim 28, wherein said determination step includes determining a transmission destination in consonance with the result of interpretation.

30. An information processing method according to claim 28, wherein said determination step includes determining a medium at a transmission destination in accordance with the result of interpretation, and, as needed, performs a medium conversion.

31. An information processing method according to claim 20, wherein, in said determination step, the process to be performed is determined based on a date included in the document and on a current date.

32. An information processing method according to claim 20, wherein the form of the document is identified in said first or second identification step in accordance with a command described in the document.

33. An information processing method according to claim 20, further comprising:
a history storage step, of storing a history of operations performed in said execution step.

34. An information processing method according to claim 33, wherein, when transmission of the document input in said input step is not recorded in the history of operations, it is determined in said determination step that the process to be performed is the transmission process.

35. An information processing method according to claim 20, further comprising:
an extraction step, of extracting predetermined attribute information from results obtained in said character recognition step; and
a registration step, of registering in a database the extracted predetermined attribute information.

36. An information processing method according to claim 20, further comprising a reception step, of receiving a response from a user.

37. An information processing method according to claim 20, further comprising a query step, of issuing a query to a user.

38. An information processing method according to claim 20, wherein, in said input step, media information from various types of media is input, and necessary information is extracted from the media information by performing processes corresponding to the media.

39. A computer-readable storage medium on which is stored an information processing program for controlling a computer to perform information processing, the program comprising codes for causing the computer to perform:
an input step, of inputting a document;
a first character recognition step, of recognizing a specific block of the document input in said input step;
a first identification step, of identifying a form of the document based on a recognition result of the specific block in the document recognized in the first character recognition step;
a second character recognition step, of recognizing a character in the document as a whole when the form of the document cannot be identified in the first identification step;
a second identification step, of identifying a form of the document based on a recognition result of the document as a whole recognized in the second character recognition step;
an interpretation step, of interpreting a word formed of characters recognized in the first or second character recognition step by referring to a knowledge base corresponding to the form of the document identified in the first or second identification step;
a determination step, of determining a process to be performed for the document based on a result of interpretation in the interpretation step; and
an execution step, of performing the process determined in said determination step for the document.

* * * * *

UNITED STATES PATENT AND TRADEMARK OFFICE
CERTIFICATE OF CORRECTION

PATENT NO. : 6,697,165 B2
DATED : February 24, 2004
INVENTOR(S) : Wakai et al.

It is certified that error appears in the above-identified patent and that said Letters Patent is hereby corrected as shown below:

Column 52,
Line 6, "filling" should read -- filing --.

Column 53,
Line 44, "filling" should read -- filing --.

Signed and Sealed this

Thirteenth Day of September, 2005

JON W. DUDAS
*Director of the United States Patent and Trademark Office*